US011411966B2

(12) United States Patent
Muddu et al.

(10) Patent No.: US 11,411,966 B2
(45) Date of Patent: *Aug. 9, 2022

(54) PROCESSING ANOMALY DATA TO IDENTIFY THREATS TO NETWORK SECURITY

(71) Applicant: Splunk Inc., San Francisco, CA (US)

(72) Inventors: Sudhakar Muddu, Cupertino, CA (US); Christos Tryfonas, Foster City, CA (US)

(73) Assignee: SPLUNK INC., San Francisco, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 16/516,471

(22) Filed: Jul. 19, 2019

(65) Prior Publication Data

US 2019/0342311 A1 Nov. 7, 2019

Related U.S. Application Data

(63) Continuation of application No. 14/929,037, filed on Oct. 30, 2015, now Pat. No. 10,419,450.

(Continued)

(51) Int. Cl.
*H04L 9/00* (2022.01)
*H04L 9/40* (2022.01)
(Continued)

(52) U.S. Cl.
CPC ........ *H04L 63/1416* (2013.01); *G06F 3/0482* (2013.01); *G06F 3/0484* (2013.01);
(Continued)

(58) Field of Classification Search
CPC ............. H04L 63/1416; H04L 63/1425; H04L 63/1433; H04L 63/1441; H04L 63/20; G06N 20/00
See application file for complete search history.

(56) References Cited

U.S. PATENT DOCUMENTS 8,205,259 B2 * 6/2012 Stute ................... H04L 63/1408
726/23
8,677,480 B2 3/2014 Yen et al.
(Continued)

OTHER PUBLICATIONS

Non-Final Office Action dated Mar. 19, 2020 for U.S. Appl. No. 14/929,047 of Muddu et al., filed Oct. 30, 2015.

(Continued)

*Primary Examiner* — Beemnet W Dada
(74) *Attorney, Agent, or Firm* — Perkins Coie LLP

(57) ABSTRACT

A security platform employs a variety techniques and mechanisms to detect security related anomalies and threats in a computer network environment. The security platform is "big data" driven and employs machine learning to perform security analytics. The security platform performs user/entity behavioral analytics (UEBA) to detect the security related anomalies and threats, regardless of whether such anomalies/threats were previously known. The security platform can include both real-time and batch paths/modes for detecting anomalies and threats. By visually presenting analytical results scored with risk ratings and supporting evidence, the security platform enables network security administrators to respond to a detected or threat, and to take action promptly.

29 Claims, 115 Drawing Sheets

Related U.S. Application Data

(60) Provisional application No. 62/212,541, filed on Aug. 31, 2015.

(51) Int. Cl.

| | |
|---|---|
| *G06N 20/00* | (2019.01) |
| *G06F 16/25* | (2019.01) |
| *G06F 16/28* | (2019.01) |
| *G06F 16/44* | (2019.01) |
| *G06F 16/901* | (2019.01) |
| *G06F 16/2457* | (2019.01) |
| *H04L 43/00* | (2022.01) |
| *G06F 40/134* | (2020.01) |
| *G06N 20/20* | (2019.01) |
| *G06V 10/22* | (2022.01) |
| *G06N 7/00* | (2006.01) |
| *G06F 3/0482* | (2013.01) |
| *G06F 3/0484* | (2022.01) |
| *G06F 3/04847* | (2022.01) |
| *H04L 41/0893* | (2022.01) |
| *H04L 43/062* | (2022.01) |
| *H04L 43/045* | (2022.01) |
| *H04L 43/08* | (2022.01) |
| *G06F 3/04842* | (2022.01) |
| *G06N 5/04* | (2006.01) |
| *H04L 41/14* | (2022.01) |
| *H04L 41/22* | (2022.01) |
| *G06N 5/02* | (2006.01) |

(52) U.S. Cl.
CPC ...... *G06F 3/04842* (2013.01); *G06F 3/04847* (2013.01); *G06F 16/24578* (2019.01); *G06F 16/254* (2019.01); *G06F 16/285* (2019.01); *G06F 16/444* (2019.01); *G06F 16/9024* (2019.01); *G06F 40/134* (2020.01); *G06N 5/022* (2013.01); *G06N 5/04* (2013.01); *G06N 7/005* (2013.01); *G06N 20/00* (2019.01); *G06N 20/20* (2019.01); *G06V 10/225* (2022.01); *H04L 41/0893* (2013.01); *H04L 41/145* (2013.01); *H04L 41/22* (2013.01); *H04L 43/00* (2013.01); *H04L 43/045* (2013.01); *H04L 43/062* (2013.01); *H04L 43/08* (2013.01); *H04L 63/06* (2013.01); *H04L 63/1408* (2013.01); *H04L 63/1425* (2013.01); *H04L 63/1433* (2013.01); *H04L 63/1441* (2013.01); *H04L 63/20* (2013.01); *H05K 999/99* (2013.01); *H04L 2463/121* (2013.01)

(56) References Cited

U.S. PATENT DOCUMENTS

| | | | |
|---|---|---|---|
| 8,779,921 | B1 | 7/2014 | Curtiss |
| 9,288,220 | B2 | 3/2016 | Raugas et al. |
| 10,419,450 | B2* | 9/2019 | Muddu ............... G06F 3/0484 |
| 2012/0304288 | A1 | 11/2012 | Wright et al. |
| 2014/0165207 | A1 | 6/2014 | Engel et al. |
| 2014/0279762 | A1 | 9/2014 | Xaypanya et al. |
| 2015/0128263 | A1 | 5/2015 | Raugas et al. |
| 2015/0273693 | A1 | 10/2015 | Cohen et al. |
| 2015/0381712 | A1 | 12/2015 | De Castro Alves et al. |
| 2016/0028762 | A1* | 1/2016 | Di Pietro ............ H04L 63/1416 726/23 |
| 2016/0065603 | A1 | 3/2016 | Dekel et al. |
| 2016/0182559 | A1* | 6/2016 | Francy ............... H04L 63/1425 726/1 |
| 2016/0342903 | A1 | 11/2016 | Shumpert |
| 2017/0063905 | A1 | 3/2017 | Muddu et al. |
| 2017/0063907 | A1 | 3/2017 | Muddu et al. |
| 2017/0192872 | A1* | 7/2017 | Awad .................. G06K 9/6284 |

OTHER PUBLICATIONS

Advisory Action dated Jun. 6, 2018 for U.S. Appl. No. 14/929,037 of Muddu et al. filed Oct. 30, 2015.
Corrected Notice of Allowability dated Mar. 8, 2019 for U.S. Appl. No. 14/929,037 of Muddu et al., filed Oct. 30, 2015.
Final Office Action dated Dec. 18, 2017 for U.S. Appl. No. 14/929,047 of Muddu et al. filed Oct. 30, 2015.
Final Office Action dated Jan. 4, 2019 for U.S. Appl. No. 14/929,047 of Muddu et al., filed Oct. 30, 2015.
Final Office Action dated Mar. 8, 2018 for U.S. Appl. No. 14/929,037 of Muddu et al. filed Oct. 30, 2015.
Non-Final Office Action dated Aug. 11, 2017, for U.S. Appl. No. 14/929,047 of Muddu et al. filed Oct. 30, 2015.
Non-Final Office Action dated Aug. 9, 2017, for U.S. Appl. No. 14/929,037 of Muddu et al. filed Oct. 30, 2015.
Non-Final Office Action dated Jun. 27, 2018 for U.S. Appl. No. 14/929,037 of Muddu et al. filed Oct. 30, 2015.
Non-Final Office Action dated Jun. 29, 2018 for U.S. Appl. No. 14/929,047 of Muddu et al. filed Oct. 30, 2015.
Non-Final Office Action dated May 2, 2019 for U.S. Appl. No. 14/929,047 of Muddu et al., filed Oct. 30, 2015.
Notice of Allowance dated Jan. 29, 2019 for U.S. Appl. No. 14/929,037 of Muddu et al., filed Oct. 30, 2015.
"Palantir Technologies, Product Brochure for "Palantir Cyber," 9 pages, 2013".
Notice of Allowance dated Apr. 29, 2019 for U.S. Appl. No. 14/929,037 of Muddu et al., filed Oct. 30, 2015.
Final Office Action dated Nov. 21, 2019 for U.S. Appl. No. 14/929,047 of Muddu et al., filed Oct. 30, 2015.

* cited by examiner

| Data Type | Where to Find It | What It Can Tell You |
|---|---|---|
| Application Logs | Local log files, log4j, log4net, Weblogic, WebSphere, JBoss, .NET, PHP | User activity, fraud detection, application performance |
| Business Process Logs | Business process management logs | Customer activity across channels, purchases, account changes, trouble reports |
| Call Detail Records | Call detail records (CDRs), charging data records, event data records logged by telecoms and network switches | Billing, revenue assurance, customer assurance, partner settlements, marketing intelligence |
| Clickstream Data | Web server, routers, proxy servers, ad servers | Usability analysis, digital marketing and general research |
| Configuration Files | System configuration files | How an infrastructure has been set up, debugging failures, backdoor attacks, time bombs |
| Database Audit Logs | Database log files, audit tables | How database data was modified over time and who made the changes |
| Filesystem Audit Logs | Sensitive data stored in shared filesystems | Monitoring and auditing read access to sensitive data |
| Management and Logging APIs | Checkpoint firewalls log via the OPSEC Log Export API (OPSEC LEA) and other vendor specific APIs from VMware and Citrix | Management data and log events |
| Message Queues | JMS, RabbitMQ, and AquaLogic | Debug problems in complex applications and as the backbone of logging architectures for applications |

*FIG. 7A*

| Data Type | Where to Find It | What It Can Tell You |
|---|---|---|
| Operating System Metrics, Status and Diagnostic Commands | CPU and memory utilization and status information using command-line utilities like ps and iostat on Unix and Linux and performance monitor on Windows | Troubleshooting, analyzing trends to discover latent issues and investigating security incidents |
| Packet/Flow Data | tcpdump and tcpflow, which generate pcap or flow data and other useful packet-level and session-level information | Performance degradation, timeouts, bottlenecks or suspicious activity that indicates that the network may be compromised or the object of a remote attack |
| SCADA Data | Supervisory Control and Data Acquisition (SCADA) | Identify trends, patterns, anomalies in the SCADA infrastructure and used to drive customer value |
| Sensor Data | Sensor devices generating data based on monitoring environmental conditions, such as temperature, sound, pressure, power, water levels | Water level monitoring, machine health monitoring and smart home monitoring |
| Syslog | Syslogs from your routers, switches and network devices | Troubleshooting, analysis, security auditing |
| Web Access Logs | Web access logs report every request processed by a web server | Web analytics reports for marketing |
| Web Proxy Logs | Web proxies log every web request made by users through the proxy | Monitor and investigate terms of service and the data leakage incidents |
| Windows Events | Windows application, security and system event logs | Detect problems with business critical applications, security information and usage patterns. |
| Wire Data | DNS lookups and records, protocol level information including headers, content and flow records | Proactively monitor the performance and availability of applications, end-user experiences, incident investigations, networks, threat detection, monitoring and compliance |

*FIG. 7B*

| View | Fields |
|---|---|
| Abstract (all events contain it) | timestamp, evcls, srcUser, riskClassification, eventStatus, eventReturnCode, externalAction, alert.explanation.malware-detected.malware.name |
| Authentication | destUser, sourceIp, clientIp, evid, status, authLoginType, authLoginCtx, clientWorkstation, authType, authError |
| DLP | dlpType, sourcePath, destinationPath, department, businessUnit, dlpScannerType, dlpSeenBefore, dlpStatus, dlpPreventionStatus |
| HTTP | externalURL, httpReferrer, httpForwardingChain, sourceIp, destinationIp, httpClientIp, peeringHost, bytesSent, bytesReceived, httpMethod, httpContentType, cookie, httpBody, httpRequest, httpApplicationType, browserInfo, sessionDuration |
| DNS | dnsQuery, dnsResponse |
| Firewall | sourceZoneName, destinationZoneName, policyName, protocol, ingressInterface, egressInterface, natSourceIp, natDesitnationIp |
| Network | externalURL, sessionID, sourceIp, destinationIp, serverIp, httpClientIp, peeringHost, sessionDuration, bytesSent, bytesReceived, bytesTransmitted, userGroup, protocol |
| ExternalAlarm | evctg, evsubctg, HostName, category, file.name |

*FIG. 12*

| Anomaly | Model | View | View Fields |
|---|---|---|---|
| Blacklisted Domain | Fixed logic | HTTP | external URL, externalAction |
| Blacklisted IP Address | Fixed logic | Network | Network, destinationIp, authenticaiton.sourceIp, externalAction |
| Domain Name Anomaly | HTTP Malware | HTTP | externalURL |
| External Alarm | External Alarm | External Alarm | evctg, evsubctg, HostName, category, file.name, alert.explanation.malware-detected.malware.name, externalAction |
| Machine Generated Beacon | HTTP machine generated beacon | HTTP | externalURL, sourceIp, destinationIp, httpClientIp, peeringHost, bytesSent, bytesReceived, httpMethod, httpContentType, httpRequest, httpApplicationType, externalAction, riskClassification |
| Machine Generated Beacon | IP machine generated beacon | Firewall | Protocol, externalAction, riskClassification |
| Malicious Domain | HTTP Malware | HTTP | externalURL, httpReferrer, SourceIp, destinationIp, bytesSent, bytesReceived, httpMethod, httpContentType, httpRequest, httpApplicationType, browserInfo, riskClassification |
| Unusual Web Browser | Rare categorical | HTTP | browserInfo |
| Unusual Network Activity | Rare categorical | Firewall | sourceZoneName, destinationZoneName, policyName, protocol |
| Unusual Geolocation | Rare categorical | Authentication | Geo info for sourceIp |
| Exploit Chain | HTTP Malware | HTTP | externalURL, httpReferrer, sourceIp, destinationIp, bytesSent, bytesReceived, httpMethod, httpContentType, httpRequest |
| Excessive Data Transmission | Timeseries, Outliers | Network | bytesSent, bytesReceived |

*FIG. 13A*

| Anomaly | Model | View | View Fields |
|---|---|---|---|
| Multiple DLP Alarms | Timeseries | DLP | dlpType, dlpStatus, dlpPreventionStatus |
| Multiple AWS Instance Operations | Timeseries | | AWS Cloudtrail Eventclass |
| Multiple Outgoing Connections, Multiple Sessions Denial | Timeseries | Network | .destinationip, sourceip, externalAction |
| Multiple Login Errors, Multiple Logins | Timeseries | Authentication | status, authLoginType, authType, authError |
| Unusual AD Activity | Content Based | Authentication | Evid, status, authLoginType, authType, authError |
| Unusual DLP Alarm | Content Based | DLP | dlpType, dlpStatus, dlpPreventionStatus |
| Land Speed Violation | Fixed logic | Authentication | Geo info for sourceip |
| Unusual Machine Access | Collaborative Filtering | Authentication Network | Evid, status, authLoginType, authType, authError destinationip |
| Unusual Activity Time, Unusual VPN Session Duration | Outliers | Authentication Network | Evid sessionDuration |
| External Website Attack | Fixed logic | HTTP | externalURL, httpClientIp |
| Unusual Activity Sequence, Unusually Fast Activity | PST | Authentication | Evid |
| Webshell Activity | Webshel | HTTP | externalURL, httpReferrer, httpClientIp, bytesSent, bytesReceived, httpMethod, httpContentType, httpRequest, httpApplicationType, browserInfo |

FIG. 13B

External: Data Exfiltration by Compromised Account

Remote account takeover followed by unusual activity and data exfiltration

Multiple entities involved in a sequence of events constituting a threat: multiple entities first involved in unusual login activity and unusual internal activity, followed by an unusual data transfer to external destination. This threat should be investigated for possible user compromise followed by data exfiltration.

☆ Watchlists ▾   ( Reviewed )  ← 4411

| ⏱ TIMELINE | ⚑ ANOMALIES (13) | ⚇ USERS (2) | ▢ DEVICES (9) | ▦ APPS (2) |
|---|---|---|---|---|
| Start Date 15 | Excessive Data Transmission (2) | Fred Samuels | Internal | junos-ftp |

*FIG. 44B*

Home / Threats Table / Threat Details

External: Data Exfiltration by Compromised Account — 4540
Remote account takeover followed by unusual activity and data exfiltration «6»
Score Multiple entries involved in a sequence of events constituting a threat: multiple entities first involved in unusual login activity and unusual internal activity, followed by an unusual data transfer to external destination. This threat should be investigated for possible user compromise followed by data exfiltration.

☆ Watchlists ▾    Reviewed          ⚙ Actions ▾

| ⏱ TIMELINE | ⚑ ANOMALIES (13) | 👤 USERS (2) | 💻 DEVICES (9) | 📱 APPS (2) | WHAT NEXT? |
|---|---|---|---|---|---|
| Start Date 15 Nov. 2014 Last Update 3 Dec. 2014 Duration 17 Days | Excessive Data Transmission (2) Land Speed Violation (2) Unusual Activity Time (1) Unusual Network Activity (8) | Fred Samuels (3) Mark Pittman (2) | Internal 10.1.21.12 10.1.21.153 10.1.21.67 10.116.200.222 10.116.240.105 | junos-ftp (2) ms-ds-smb (1) | Collect more information for the users involved and investigate their activities. Disable the account of the user |

THREAT RELATIONS

10.116.240.105 → 10.1.21.12
          → 10.1.21.67
          → Fred Samuels, Mark Pittman, 10.1.21.153, ms-ds-smb → 1.94.32.234, 66.39.90.193, 10.116.200.222 → 199.188.204.182

— — Critical  · · · · Major  ——— Minor

KILL CHAIN   2014

15 NOV — 21 NOV — -2 Days- — 23 NOV — -2 Days- — 3 DEC
Intrusion        Expansion              Exfiltration
3 Anomalies     8 Anomalies            2 Anomalies

| Land Speed Violation (2) | Unusual User Behavior (8) | Excessive Data Transmission (2) |
|---|---|---|
| From Pittsburgh, US to Beijing, CN  1 | Found 2 rare value(s). Source Zone [contractor]. Source Zone [contractor] with Target Zone [pci]  3 | 1.01 GB bytes/day sent (average 508 Bytes)  1 |
| From Beijing, CN to Pittsburgh, US  1 | | 2.80 GB bytes/day sent (average 49.06 MB)  1 |
| Total Duration: 1 Day | Found 2 rare value(s). Source Zone [pci], Target zone [corp]  5 | Total Duration: 2 Days |
| Unusual Activity Time (1) | | |
| Time of day: 07:15 (16:52 most common)  1 | | |
| Total Duration: 1 Day | Total Duration: 2 Days | |

*FIG. 45E*

| Caspida | | | Views ⌄ | Analytics | rimma@splunk.com ⌄ |
|---|---|---|---|---|---|

Home / Users Table

▦ | ▭ All Scores ⌄ | 📅 All Time ⌄ | More Filters

Users Table ← 4700

| USERS (135) | | 4702 | 4703 | 4704 | 4705 | Search | |
|---|---|---|---|---|---|---|---|
| NAME ← 4701 | DEPARTMENT | ANOMALIES | THREATS | LAST UPDATE ▼ | | SCORE ▼ | |
| 👤 gimfeld | | 1 | 0 | Jan 20, 2015 1:40 PM | | ⊛ | 4706 |
| 👤 scastl | | 1 | 0 | Dec 9, 2014 4:13 PM | | ⊛ | |
| 👤 nt authority\\system | | 1 | 0 | Oct 30, 2014 2:03 AM | | ⊛ | |
| 👤 gmlee | | 1 | 0 | Sep 30, 2014 9:21 PM | | ⊛ | |
| 👤 James Salva ← 4707 | Sales | 1 | 0 | Aug 15, 2014 11:54 AM | | ⊛ | |
| 👤 Rick Browne ◄ | Sales | 2 | 1 | Nov 1, 2014 1:05 PM | | ⊛ | |
| 👤 twong | | 2 | 1 | Oct 15, 2014 2:30 PM | | ⊛ | |
| 👤 admin4_sys | | 4 | 1 | Nov 16, 2014 5:02 AM | | ⊛ | |
| 👤 srikant@companystorage.com | | 1 | 0 | Nov 11, 2014 10:27 AM | | ⊛ | |
| 👤 administrator | | 1 | 0 | Nov 11, 2014 1:04 AM | | ⊛ | |

*FIG. 47A*

| USER ANOMALIES (2) | |
|---|---|
| All Anomalies | 2 |
| Exploit Chain | 1 |
| Machine Generated Beacon | 1 |

4744

| | | | Search | |
|---|---|---|---|---|
| ANOMALY TYPE | PARTICIPANTS | SUMMARY | EVENT DATE ▲ | SCORE |
| Exploit Chain | 👤 Rick Browne<br>💻 10.104.105.166<br>🖥 46.214.107.142<br>🌐 mpdhgokh.ddns.net | Malicious Device<br>Device Exploit Chain | Jul 28, 2014 5:49 PM | ⑤ |
| Machine Generated Beacon | 👤 Rick Browne<br>💻 10.104.105.166<br>🖥 46.214.107.142<br>🌐 46.214.107.142 | Periodic, 30 sec | Jul 28, 2014 5:51 PM | ⑦ |

*FIG. 47F*

| DEVICES (275) | 4801 SCOPE | 4802 | 4803 ANOMALIES | THREATS | 4804 LAST UPDATE | 4805 SCORE 4806 |
|---|---|---|---|---|---|---|
| IP ADDRESS | | | | | | |
| 207.46.1.160 | External | | 1 | 0 | Mar 1, 2015 8:45 AM | |
| 207.46.1.234 | External | | 1 | 0 | Mar 1, 2015 8:43 AM | |
| 207.46.2.164 | External | | 1 | 0 | Mar 1, 2015 8:43 AM | |
| 207.46.2.205 4807 | External | | 1 | 0 | Mar 1, 2015 8:41 AM | |
| 10.10.12.78 | Internal | | 1 | 0 | Mar 1, 2015 8:38 AM | |
| 207.46.4.154 | External | | 1 | 0 | Mar 1, 2015 8:36 AM | |
| 207.46.4.120 | External | | 1 | 0 | Mar 1, 2015 8:36 AM | |
| 207.46.2.54 | External | | 1 | 0 | Mar 1, 2015 8:35 AM | |
| 10.10.29.1 | Internal | | 1 | 0 | Mar 1, 2015 8:33 AM | |
| 207.46.4.128 | External | | 1 | 0 | Mar 1, 2015 8:32 AM | |
| 207.46.2.36 | External | | 1 | 0 | Mar 1, 2015 8:31 AM | |

| Caspida | | Views ⌄ | Analytics | rimma@splunk.com ⌄ |
|---|---|---|---|---|

Home / Apps Table

| ▦ All Scores ⌄ | 🗓 All Time ⌄ | More Filters |
|---|---|---|

Apps Table ▸ ⌐ 4900

APPS (4)                                                                    Search

| NAME | ANOMALIES | THREATS | LAST UPDATE ▾ | SCORE |
|---|---|---|---|---|
| junos-ftp | 2 | 1 | Dec 1, 2014 2:56 AM | ③ |
| ssh | 3 | 2 | Dec 26, 2012 6:11 AM | ③ |
| ms-ds-smb | 11 | 1 | Oct 21, 2014 8:31 PM | ① |
| tcp | 1 | 0 | Oct 5, 2014 3:36 PM | ① |

*FIG. 49A*

| Domain | Log-Probability |
|---|---|
| pbmrnbrlmbdaehafmypuwcunvbe.info | -67.99783 |
| nvqcuwyddovtcnkbytpqgusor.org | -70.977974 |
| ceawhimhaovcynzjvwccmrsxotc.net | -78.465485 |
| lnlbvwhhieqxwttcuyhrkrsibrw.biz | -75.263084 |
| amhordnvgihajzfibwoxonfq.ru | -56.47637 |
| dpttlnggelggiuotsxbbqkb.com | -63.99644 |
| gehqovcmvntwgxwivuklhxp.net | -72.348366 |
| jvtferoscongutoayifdtsqsjhdu.org | -60.839737 |

7002

| Domain | Log-Probability |
|---|---|
| doctissimo.fr | -16.21527 |
| timeanddate.com | -15.3231735 |
| premierleague.com | -18.23304 |
| zazzle.com | -11.9486475 |
| getafreelancer.com | -15.822635 |
| myfreepaysite.com | -16.584959 |
| armorgames.com | -15.793335 |
| nationalgeographic.com | -7.030276 |

| Domain | Communication Score | Timing Score | Layer 7 Score | NLP Score | Analyst Recommendation |
|---|---|---|---|---|---|
| www.evil.com | High Risk | Moderate Risk | Moderate Risk | No Risk | Critical Priority: Communication is active and going unblocked |
| www.khhjdkshj33ejj.com | 0 | Moderate Risk | 0 | High Risk | Low Priority: Traffic is blocked by firewall |
| www.google.com | No Risk | No Risk | No Risk | No Risk | No Action Needed |

*FIG. 71*

Parameters Considered For Distinguishing Between Machine-Generated and User-Generated Traffic — 7300

- Number of connections in a predefined period
- Periodicity of the connections
- Number of different IP addresses (diversity) contacted
- Number of Web objects requested
- Number of ports through which the connections are requested
- URI's of destinations

*FIG. 73*

CloudTrail Event 8105

| | Event Class | User Agent | Device | User |
|---|---|---|---|---|
| Event Class | ● | | | |
| User Agent | | | (Event Class::Device) | (Event Class::User) |
| Device | | ● | (User Agent::Device) | (User Agent::User) |
| User | | | ● | ● |

Threshold and/or Parameters of Rarity Criteria

| | Score Threshold | Minimum No. of Rare Features/ Feature Pairs | Anomaly Count Threshold | Rare Features | Rare Feature Pairs | Ignore Features |
|---|---|---|---|---|---|---|
| Port-Application | 0.001 | 1 | 50 | - | - | - |
| Network Zones | 0.001 | 2 | 20 | - | - | - |
| Proxy User Agent String | 0.001 | 2 | 100 | User Agent String | - | - |
| VPN Geo Location | 0.001 | 1 | 20 | Geo Location | - | - |

PROCESSING ANOMALY DATA TO IDENTIFY THREATS TO NETWORK SECURITY

This application is a continuation of U.S. patent application Ser. No. 14/929,037, filed on Oct. 30, 2015, and titled "Detection of Anomalies, Threat Indicators, and Threats to Network Security", which application claims the benefit of U.S. provisional patent application No. 62/212,541 filed on Aug. 31, 2015, and titled "Network Security System," which is incorporated by reference herein in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least one embodiment of the present disclosure pertains to distributed data processing systems, and more particularly, to intelligence generation and activity discovery from events in a distributed data processing system.

BACKGROUND

Activity detection, both friendly and malicious, has long been a priority for computer network administrators. In known public and private computer networks, users employ devices such as desktop computers, laptop computers, tablets, smart phones, browsers, etc. to interact with others through computers and servers that are coupled to the network. Digital data, typically in the form of data packets, are passed along the network by interconnected network devices.

Unfortunately, however, malicious activities can cause harm to the network's software or hardware, or its users. Malicious activities may include unauthorized access or subsequent unpermitted use of network resources and data. Network administrators seek to detect such activities, for example, by searching for patterns of behavior that are abnormal or otherwise vary from the expected use pattern of a particular entity, such as an organization or subset thereof, individual user, IP address, node or group of nodes in the network, etc.

Security appliances are used in known systems to provide network security. The appliance approach involves installing security appliances (which are typically servers or computers configured for providing security) at one or more locations in the network. Once installed, the appliance monitors traffic that traverses the network. Functions provided by the appliance may include malware detection, intrusion detection, unauthorized access or unauthorized use of data, among others. Unfortunately, security appliances cannot easily be scaled to handle temporary or permanent increases in network traffic. Increased network traffic often requires a security vendor to perform an appliance swap or an equally time-consuming appliance upgrade. Appliances also tend to have only limited network visibility because they are typically configured to monitor data traversing the link on which a respective appliance is installed only. Such an appliance will be unaware of activities occurring on other network segments monitored by other appliances and thus cannot use the additional context information pertaining to activities occurring on other network segments to detect a cleverly-designed piece of malware that may be difficult to detect from purely localized information.

Installed software products, rather than security hardware appliances, provide another approach to security for data networks. These products, such as anti-virus or anti-malware software, typically are installed on terminal devices (e.g., desktop and laptop computers, tablets, or smart phones). Data traversing the network between the terminal device is monitored by the installed products to detect malware in either inbound or outbound data. Unfortunately, installed software products also do not perform well in terms of scalability or network visibility. Installed products tend to be disposed locally on the terminal devices and thus also tend to have fairly localized views of the data on the network. They also tend to be installed on hardware that cannot be upgraded easily.

BRIEF DESCRIPTION OF THE DRAWINGS

Certain embodiments of the present disclosure are illustrated, by way of example, in the figures of the accompanying drawings, in which like references indicate similar elements.

FIGS. 7A and 7B collectively show a table listing example types of machine data that can be found in different environments.

FIG. 12 shows a table of example uniform access interfaces ("event views") that can be implemented in the data intake and preparation stage.

FIGS. 13A and 13B collectively show a table including example anomalies that can be identified by machine learning models and/or other types of processing entities, and various example uniform access interfaces and fields that can be used by the models/entities to receive relevant information about the events for performing further analytics.

FIG. 44B is an illustrative view of an "Anomaly Details" screen in the GUI of FIG. 39A, including a "Watchlists" designation, in accordance with various embodiments of the disclosure.

FIG. 45E is an illustrative view of a "Threats Details" screen in the GUI of FIG. 39A, in accordance with various embodiments of the disclosure.

FIG. 47A is an illustrative view of a "Users Table" screen in the GUI of FIG. 39A, in accordance with various embodiments of the disclosure.

FIG. 47F is an additional illustrative view of a "User Anomalies" screen in the GUI of FIG. 39A, in accordance with various embodiments of the disclosure.

FIG. 48A is an illustrative view of a "Devices Table" screen in the GUI of FIG. 39A, in accordance with various embodiments of the disclosure.

FIG. 48C is an illustrative view of a "Device Anomalies" screen in the GUI of FIG. 39A, in accordance with various embodiments of the disclosure.

FIG. 49A is an illustrative view of an "Apps Table" screen in the GUI of FIG. 39A, in accordance with various embodiments of the disclosure.

FIG. 70 shows two tables illustrating application of lexical analysis to a character-based entity identifier.

FIG. 71 shows an example incident response output configured for display to a user.

FIG. 73 lists an example of a set of parameters that can be considered for distinguishing between machine-generated traffic and user-generated traffic.

FIG. 79 is a flow diagram of a process for determining whether machine-generated traffic is anomalous.

FIG. 80 is a block diagram of an environment in which a system for detecting anomalies based on rarity scores of features can be implemented.

FIG. 81 shows a table of example features and/or feature pairs to be considered for determining whether an example event is anomalous, consistent with various embodiments.

FIG. 82 shows a table listing example thresholds and/or parameters of a rarity criterion for various example events that can be used for determining whether an event is anomalous.

FIG. 83 is a flow diagram of an example process for determining an anomaly based on a rarity score for a particular value of a feature.

FIG. 84 is a flow diagram of an example process for determining a rarity score for a particular value of a feature.

FIG. 85 is a block diagram of a computing device that may be used to implement the techniques introduced here.

DETAILED DESCRIPTION

Figure 1:
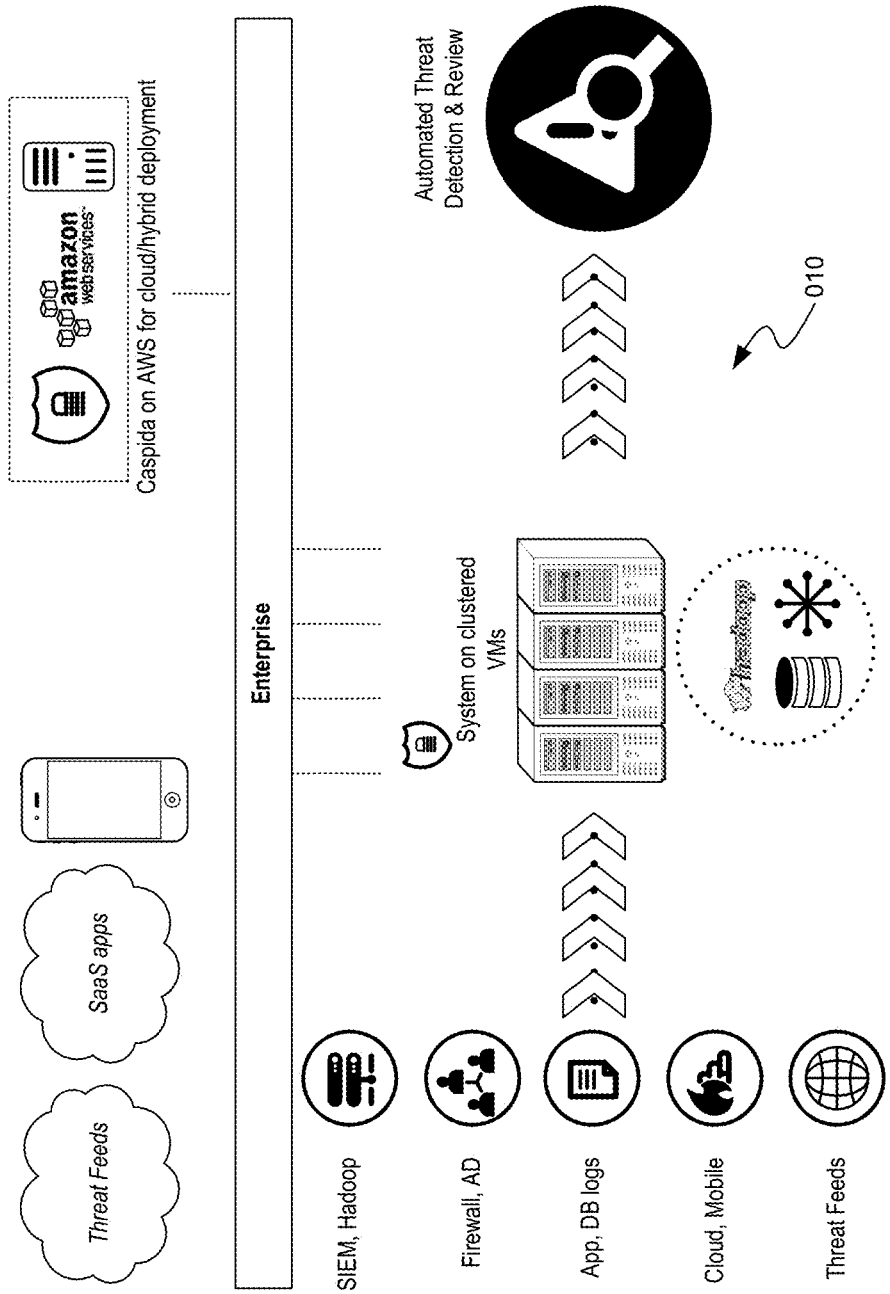
FIG. 1 shows a general environment in which a security platform, which is an example application of a data processing system introduced here, may be implemented.

References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

In the following description, the example of a security platform is used, for illustrative purposes only, to explain various techniques that can be implemented by the data processing system. Note, however, that the techniques introduced here are not limited in applicability to security applications, security information and event management (SIEM) applications, or to any other particular kind of application. For example, at least some of the techniques introduced here can be used for automated fraud detection and other purposes, based on machine data. Additionally, the techniques introduced here are not limited to use with security-related anomaly and threat detection; rather, the techniques can be employed with essentially any suitable behavioral analysis (e.g., fraud detection or environmental monitoring) based on machine data. In general, "machine data" can include performance data, diagnostic information and/or any of various other types of data indicative of performance or operation of equipment (e.g., an action such as upload, delete, or log-in) in a computing system, as described further below. In general, "machine data" as used herein includes time-stamped event data, as discussed further below. Examples of components that may generate machine data from which events can be derived include: web servers, application servers, databases, firewalls, routers, operating systems, and software applications that execute on computer systems, mobile devices, sensors, Internet of Things (IoT) devices, etc. The data generated by such data sources can include, for example, server log files, activity log files, configuration files, messages, network packet data, performance measurements, sensor measurements, etc., which are indicative of performance or operation of a computing system in an information technology environment.

In today's enterprises, attacks by users with trusted access often go undetected by existing security approaches. Indeed, traditional security products often suffer from several major drawbacks, including the inability to detect unknown threats and insider threats, and the inability to scale and process huge amount of data. Whether access is obtained by using compromised accounts/systems or by leveraging existing privileges to conduct malicious activities, nowadays attackers often do not need to employ additional malware. The patterns of these malicious activities vary dynamically, and attackers can almost always find ways to evade traditional security technologies, such as rules-driven malware detection, malicious file signature comparison, and sandboxing. Also, as the amount of the data increases, using human analysis to perform threat detection becomes increasingly expensive and time prohibitive and such human analysis does not allow the threat to be responded to in a timely and effective manner. Further, security analysts such as network administrators often use a "kill chain" methodology to identify and stop the progression of malicious activities (e.g., from intrusion to lateral movement, and to exfiltration). These analysts need supporting evidence to make educated decisions in the kill chain, but traditional security products generally do not provide the support for such methodology.

Introduced here, therefore, is a data processing and analytics system (and, as a particular example, a security platform) that employs a variety of techniques and mechanisms for anomalous activity detection in a networked environment in ways that are more insightful and scalable than the conventional techniques. As is described in more detail below, the security platform is "big data" driven and employs a number of machine learning mechanisms to perform security analytics. More specifically, the security platform introduced here can perform user behavioral analytics (UBA), or more generally user/entity behavioral analytics (UEBA), to detect the security related anomalies and threats, regardless of whether such anomalies and threats are previously known or unknown. Additionally, by presenting analytical results scored with risk ratings and supporting evidence, the security platform can enable network security administrators or analysts to respond to a detected anomaly or threat, and to take action promptly. The behavioral analytics techniques introduced here enable the security platform to detect advanced, hidden and insider threats. As one aspect of this disclosure, the behavior analytics leverage machine learning data processing procedures and do not require any preexisting knowledge such as known signatures or rules. The security platform can also improve threat detection and targeted response by using a variety of threat indicators. Further, the security platform supplies supporting evidence within context of the kill chain to enable targeted remediation of any detected anomaly or threat.

Moreover, as introduced here, the security platform can increase a security operations center's (SOC) efficiency with a number of rank-ordered lists having events in the context of a kill chain. In some examples, the kill chain can be linked from an anomaly or threat summary to the supporting information that is gathered over time. All generated security-related information can then be sent to a security information and event management (SIEM) application, such as the Splunk® App for Enterprise Security, to further scope, disrupt, contain and/or recover from the attack.

FIG. 1 shows a general environment 10 in which the security platform introduced here can be implemented. The environment 10 may represent a networked computing environment of one or multiple companies or organizations, and can be implemented across multiple geographic regions. One or more elements in the environment 10 are communicatively coupled to each other through a computer communications network, which can include the Internet and one or more wired or wireless networks (e.g., an Internet Protocol (IP)-based local area network (LAN), metropolitan area network (MAN) wide area network (WAN), a Wireless LAN (WLAN) network such as Wireless Fidelity (WiFi), and/or a cellular telecommunications network such as Global System for Mobile Communications (GSM) network, 3G network, or long term evolution (LTE) network). The computing devices shown in the environment 10 can be, for example, a personal computer, a smart phone, a computer server, a notebook computer, or any other form of computing system or device that allows a user to access the information within the environment 10. Each of the aforementioned computer systems can include one or more distinct physical computers and/or other processing devices which, in the case of multiple devices, can be connected to each other through one or more wired and/or wireless networks.

The security platform can detect anomalies and threats produced by a user, a device, or an application, for example, regardless of whether the entity that causes the anomalies or threats is from outside or inside the organization's network. The security analytics techniques that can be adopted by the security platform include behavioral analytics that enable organizations of any size or skillset to detect and respond to unknown threats. Some specific examples that behavioral analytics can be based on include machine learning, behavior modeling, peer group analysis, classification, statistical models, and graph analysis. As introduced in more detail below, these analyses can utilize, for example, Markovian processing flows, inference and grouping processes, and risk scoring mechanisms to develop user and entity profiles in order to compare and contrast activities, which ultimately allow the platform to detect and expose anomalies and threats. Also, as mentioned above, the security platform can include a graphical user interface (GUI) that can create visualizations of the detected anomalies and threats within an organization, and optionally, map the threats across an attack kill-chain in a visual way, which the security analysts in the organization can quickly and easily assimilate.

The security platform can be deployed at any of various locations in a network environment. In the case of a private network (e.g., a corporate intranet), at least part of the security platform can be implemented at a strategic location (e.g., a router or a gateway coupled to an administrator's computer console) that can monitor and/or control the network traffic within the private intranet. In the case of cloud-based application where an organization may rely on Internet-based computer servers for data storage and data processing, at least part of the security platform can be implemented at, for example, the cloud-based servers. Additionally, or alternatively, the security platform can be implemented in a private network but nonetheless receive/monitor events that occur on the cloud-based servers. In some embodiments, the security platform can monitor a hybrid of both intranet and cloud-based network traffic. More details on ways to deploy the security platform and its detailed functionality are discussed below.

By addressing the entire lifecycle of known and unknown advanced security threats, and by providing a platform to detect, respond to, and automate actions, the security platform introduced here provides a comprehensive solution to the security-related issues in a modern network environment.

I. Security Platform System Overview

The security platform introduced here is capable of handling large volumes of data, particularly machine data, from multiple data sources. These data sources may have different data formats and may provide data at very high data rates (e.g., gigabytes of data per second or more). In some embodiments, incoming data is processed using machine learning/data science techniques to extract knowledge from large volumes of data that are structured or unstructured. In a general sense, data science is a continuation and expansion of the field of data mining and predictive analytics, also known as knowledge discovery and data mining (KDD).

The security platform may be cloud-based and may employ big data techniques to process a vast quantity of high data rate information in a highly scalable manner. In certain embodiments, the security platform may be hosted in the cloud and provided as a service. In certain embodiments, the security platform is provided as a platform-as-a-service (PaaS). PaaS is a category of cloud computing services enabling customers to develop, run and manage Web applications without the complexity of building and maintaining the infrastructure typically associated with developing and launching such applications. PaaS can be delivered in at least two ways, namely: (i) as a public cloud service from a provider, wherein the consumer controls software deployment and configuration settings and the provider provides the networks, servers, storage devices and other services to host the consumer's application, or (ii) as software installed in private data centers or public infrastructure and managed by internal information technology (IT) departments.

Machine learning is employed in certain embodiments to make it unnecessary to know in advance what activity constitutes a security threat or a security threat signature. For example, a security threat may be discovered from the event data as the events occur even though that threat has not been seen before and no signature for that threat existed previously.

In various embodiments discussed herein, security threats are examples of a type of activity to be detected. It should be understood, however, that the security platform and techniques introduced here can be applied to detect any type of unusual or anomalous activity involving data access, data transfer, network access, and network use regardless of whether security is implicated or not.

In this description the term "event data" refers to machine data related to activity on a network with respect to an entity of focus, such as one or more users, one or more network nodes, one or more network segments, one or more applications, etc.). In certain embodiments, incoming event data from various data sources is evaluated in two separate data paths: (i) a real-time processing path and (ii) a batch processing path. Preferably, the evaluation of event data in these two data paths occurs concurrently. The real-time processing path is configured to continuously monitor and analyze the incoming event data (e.g., in the form of an unbounded data stream) to uncover anomalies and threats. To operate in real-time, the evaluation is performed primarily or exclusively on event data pertaining to current events contemporaneously with the data being generated by and/or received from the data source(s). In certain embodiments, the real-time processing path excludes historical data (i.e., stored data pertaining to past events) from its evaluation. Alternatively, in an embodiment, the real-time processing path excludes third-party data from the evaluation in the real-time processing path. These example types of data that are excluded from the real-time path can be evaluated in the batch processing path.

In this description the term "event" is sometimes used synonymously with the term "event data" to mean a discrete set of machine data that represents or corresponds to a specific network activity, although "event" can also refer to the underlying activity itself, as will be apparent from context.

Also in this description, an "anomaly" is a detected variation from an expected pattern of behavior on the part of an entity, which variation may or may not constitute a threat. An anomaly represents an event of possible concern, which may be actionable or warrant further investigation. An anomaly is an observable or detectable fact, or data representing such fact. An anomaly or a set of anomalies may be evaluated together and may result in a determination of a threat indicator or a threat. A threat is an interpretation of one or more anomalies and/or threat indicators. Threat indicators and threats are escalations of events of concern. As an example of scale, hundreds of millions of packets of incoming event data from various data sources may be analyzed to yield 100 anomalies, which may be further analyzed to yield 10 threat indicators, which may again be further analyzed to yield one or two threats. This manner of data scaling is one of the reasons the security platform can provide anomaly and threat detection in a real-time manner.

In the context of machine-learning evaluation, historical data and third-party data may be used to create and improve the machine learning models employed to perform the evaluation; however, the amount of such historical data and/or third-party data can be potentially much larger than the real-time data stream. As such, the actual evaluation of the historical data tends to be slower. Consequently, in certain embodiments, the real-time processing path does not use either or both the historical data and third-party data as inputs. In other embodiments, historical and third-party data may be used as inputs but the majority of the data used for evaluation in the real-time processing path still pertains to contemporaneous incoming event data. This is a consequence of the need to process the voluminous incoming event data quickly to obtain actionable threat information to prevent imminent harm.

The anomalies and threats detected by the real-time processing path may be employed to automatically trigger an action, such as stopping the intrusion, shutting down network access, locking out users, preventing information theft or information transfer, shutting down software and or hardware processes, and the like. In certain embodiments, the discovered anomalies and threats may be presented to a network operator (e.g., a network security administrator or analyst) for decision. As an alternative or in addition to automatically taking action based on the discovered anomalies and threats, the decisions by the user (e.g., that the anomalies and threats are correctly diagnosed, or that the discovered anomalies and threats are false positives) can then be provided as feedback data in order to update and improve the models.

In the batch processing path, historical data and third-party data are processed, optionally with the incoming real-time event data, to uncover, for example, more subtle anomalies and threats than the real-time processing path can uncover because of the real-time processing path's responsive time constraints. Batch processing may occur synchronously with real-time processing or in accordance with a predefined schedule.

Historical data represents past events and may include data from different instantiations of the real-time evaluators deployed in different locations in the network. The historical data may span time and geography. In some implementations, only an abridged version of the incoming event data is analyzed in the real-time processing path while a more complete version is stored as historical data. Thus, the historical data may, in one or more of these implementations, include event data that has more attributes than the abridged event data presented to the real-time processing path for evaluation.

As in the real-time data path, anomalies, threat indicators and threats discovered by the batch analyzer may be actionable automatically or may be presented to a human operator for decision on whether to take action. The action taken by the operator to validate or invalidate the conclusions reached by the batch analyzer may serve as a source of feedback to the security platform to improve its evaluation of subsequently processed data.

Figure 2:
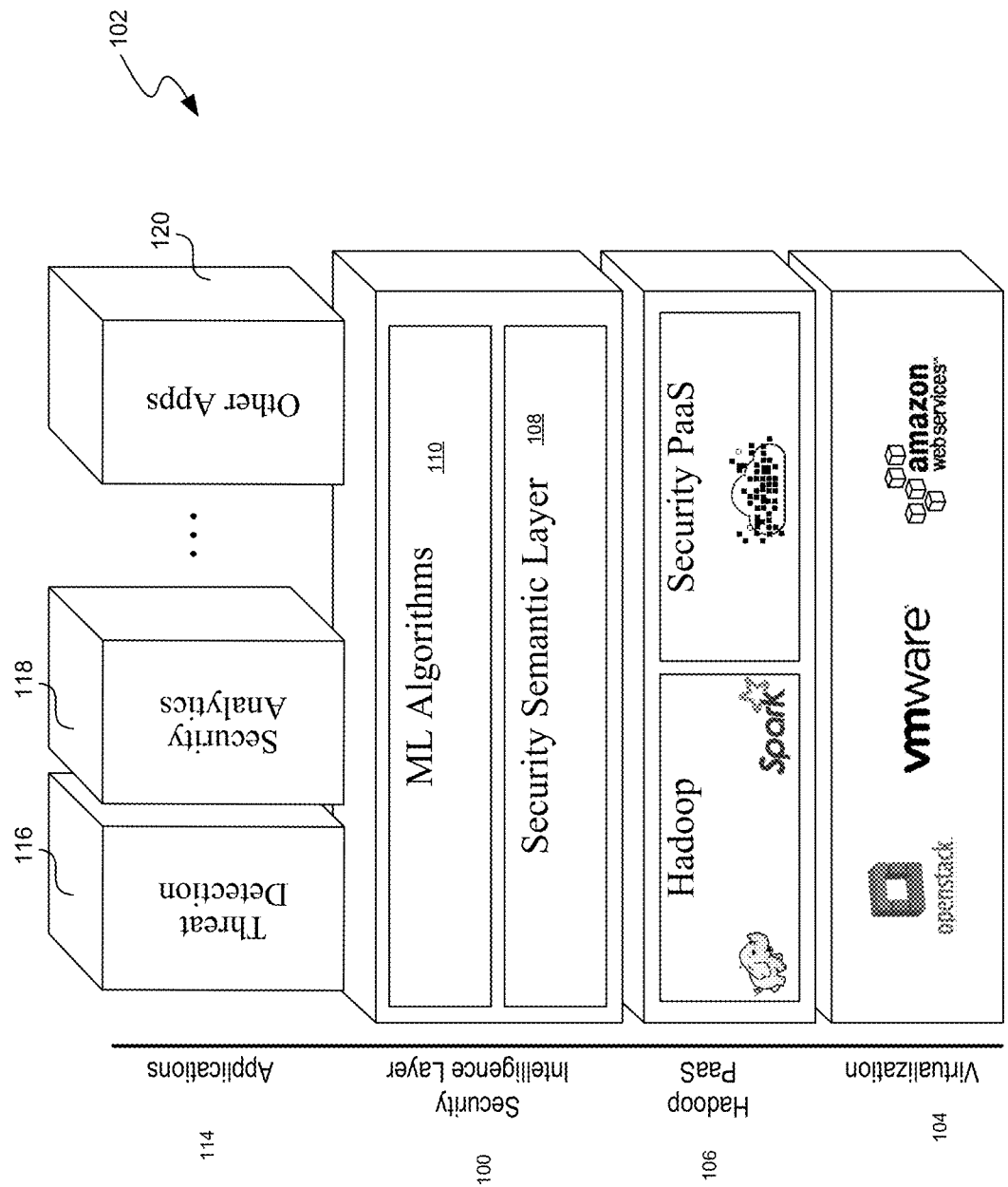
FIG. 2 shows an example of functional layers of a security platform.

FIG. 2 illustrates a high-level view of an example security platform 102. In FIG. 2, a cloud computing infrastructure is shown, represented in part by a virtualization layer 104. Various cloud computing operating systems or platforms, such as OpenStack™, VMware™, Amazon Web Services™, or Google Cloud™ may be employed in virtualization layer 104 to create public clouds or private clouds. Generally speaking, these cloud computing operating systems and others permit processing and storage to be implemented on top of a set of shared resources. Among its many advantages, cloud computing permits or facilitates redundancy, fault tolerance, easy scalability, low implementation cost and freedom from geographic restrictions. The concept of cloud computing and the various cloud computing operating systems or infrastructures are known.

Above the virtualization layer 104, a software framework layer 106 implements the software services executing on the virtualization layer 104. Examples of such software services include open-source software such as Apache Hadoop™, Apache Spark™, and Apache Storm™ Apache Hadoop™ is an open-source software framework for distributed storage and distributed processing of very large data sets on computer clusters built from commodity hardware. Apache Storm™ is a distributed real-time computation engine that processes data stream record-by-record. Apache Spark™ is a large-scale data processing engine that collects events together for processing in batches. These are only examples of software that may be employed to implement the software framework layer 106.

A security intelligence layer 100 implements a security semantic layer 108 and a machine learning layer 110. The security semantic layer 108 performs the extract, transform, and load (ETL) functions that prepare the incoming event data for further processing by downstream consumers. Note that the term ETL here is used in an illustrative sense to facilitate understanding, as the ETL stage described herein may include functionality in addition to or different from traditional ETL techniques. The machine learning layer 110 represents one of the consumers of the data output of the security semantic layer 108. In an example, event data may be received by the security semantic layer 108, and prepared (or "pre-processed") to be further processed by the machine learning layer 110.

Above the security intelligence layer 100 is an application layer 114. The application layer 114 represents the layer in which application software modules may be implemented. In an example, the output of the machine learning layer 110 includes anomalies, threat indicators, and/or threats. This output may be analyzed by the various applications such as a threat detection application 116, a security analytics application 118 or other applications 120. These layers, modules and their operation will be discussed in greater detail below.

Figure 3:
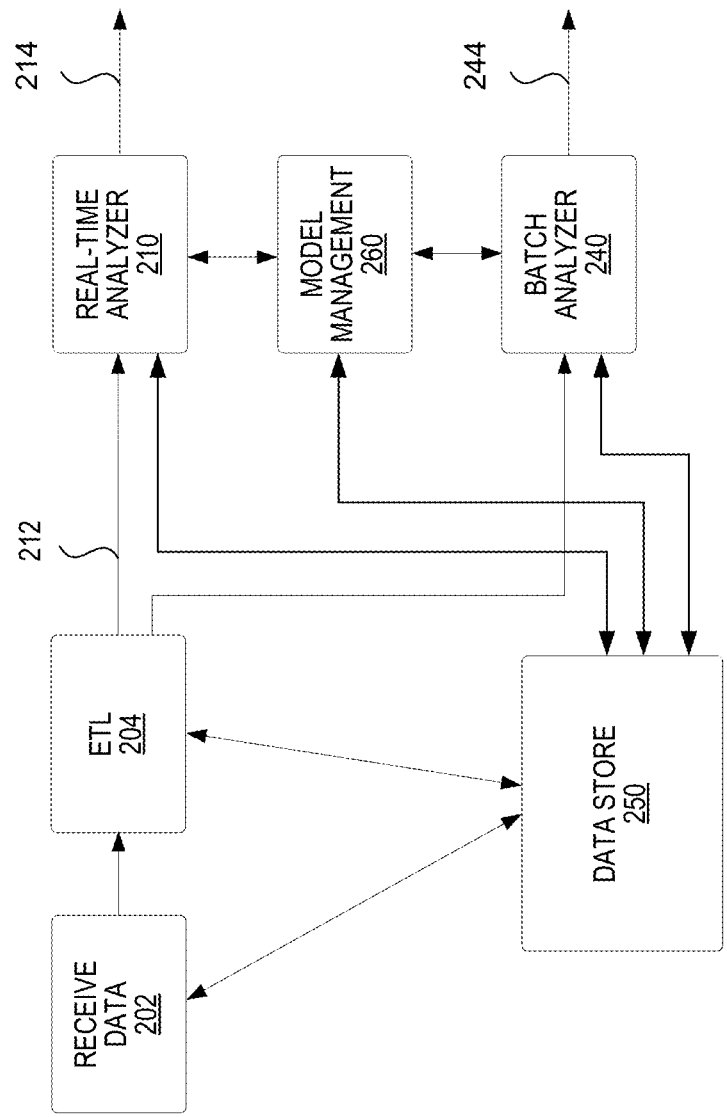
FIG. 3 shows a high-level view of an example of the processing within the security platform.

FIG. 3 shows a high-level conceptual view of the processing within security platform 102 in FIG. 2. A receive data block 202 represents a logical component in which event data and other data are received from one or more data sources. In an example, receive data block 202 includes application programming interfaces (APIs) for communicating with various data sources. An ETL block 204 is the data preparation component in which data received from the receive data block 202 is pre-processed, for example, by adding data and/or metadata to the event data (a process interchangeably called decoration, enrichment or annotation herein), or otherwise prepared, to allow more effective consumption by downstream data consumers (e.g., machine learning models).

The enriched event data from the ETL block 204 is then provided to a real-time analyzer 210 over a real-time processing path 212 for detecting anomalies, threat indicators and threats. Output 214 from the real-time analyzer 210 is provided for action by the human operator, in certain embodiments. It should be noted that the real-time analyzer 210 operates in real-time by analyzing event data as the event data received by the security platform 102.

The event data from the ETL block 204 is also provided to a batch analyzer 240 over a batch processing path 242 for detecting anomalies, threat indicators and threats. However, while the event data is provided to the real-time analyzer 210 in an unbounded, streaming, record-by-record manner, it is provided to the batch analyzer in the form of batches of event data (i.e., where each batch of event data contains a collection of events that arrived over the batch period). Because the batch analyzer 240 processes data in batch mode instead of in real-time, in addition to the event data that the real-time analyzer 210 receives, the batch analyzer 240 can receive additional historical event data from the security platforms, prior analysis (including the analysis results, the model states, and the supporting data) from the real-time analyzer 210 (e.g., through a model management component 260), or prior analysis from other analyzers (real-time or batch) implemented elsewhere in the same or other networks.

Machine learning and machine learning models are employed to evaluate and analyze data in certain embodiments, that is not necessarily the case in every embodiment. In some cases, the security platform may also adapt more appropriately or more efficiently to the environment by using a combination of other suitable forms of analysis, including rule-based analysis, algorithm-based analysis, statistical analysis, etc.

Figure 4:
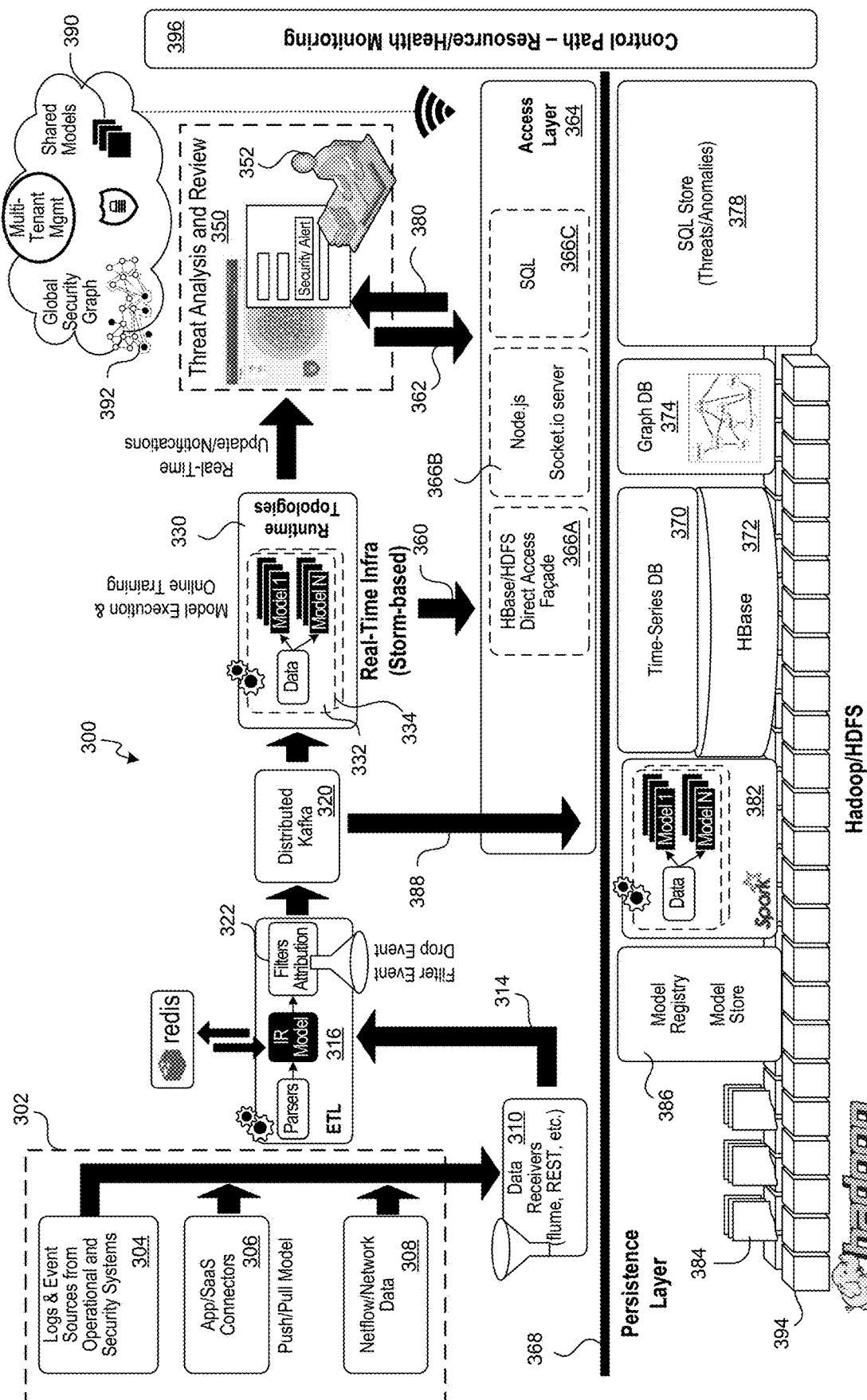
FIG. 4 shows an example of the architecture of the security platform.

FIG. 4 illustrates an example of an overall architecture of the security platform 300. Data sources 302 represent various data sources that provide event data including machine data, to be analyzed for anomalies and threats. The event data represents events that take place in the network environment. For example, data source 304 is a source of data pertaining to logs including, for example, user log-ins and other access events. These records may be generated from operational (e.g., network routers) and security systems (e.g., firewalls or security software products). Data source 306 is a source of data from different types of applications, including software as a service (e.g., Box™). Data source 306 may use different mechanisms for transmitting the event data, including a push mechanism, a pull mechanism, or a hybrid mechanism. Other data sources which may fall into the data source 306 category include human resource systems, accounting systems, customer relation databases, and the like. Data source 308 is a source of network management or analyzer data (e.g., event data related to traffic on a node, a link, a set of nodes, or a set of links). The network management or analyzer data may be obtained from various network operating systems and protocols, such as Cisco Netflow™. The data sources mentioned here are only examples, as other suitable data sources may also be used.

The data sources 302 provide event data to data receivers 310, which implement various APIs and connectors to receive (or retrieve, depending on the mechanism) the event data for the security platform 300. The data receivers 310 may also optionally filter some of the event data. For example, to reduce the workload of the security platform, a business rule may be set to state that all query events to "www.google.com" should be filtered out as not interesting (e.g., this type of access is determined not to represent any security threat). Technologies employed to implement the data receiver 310 may include Flume™ and REST™. Flume™ is an open-source distributed service for collecting, aggregating, and moving large amounts of log data. REST™ is an interface for accessing large databases.

The received data is then provided via a channel 314 to a semantic processor (or data preparation stage) 316, which in certain embodiments performs, among other functions, ETL functions. In particular, the semantic processor 316 may perform parsing of the incoming event data, enrichment (also called decoration or annotation) of the event data with certain information, and optionally, filtering the event data. The semantic processor 316 introduced here is particularly useful when data received from the various data sources through data receiver 310 is in different formats, in which case the semantic processor 316 can prepare the data for more efficient downstream utilization (including, for example, by an event processing engine) while avoiding binding the unstructured data into any particular type of data structure.

A parser in the semantic processor 316 may parse the various fields of received event data representing an event (e.g., a record related to a log-in event). An identity resolution (IR) component (not shown in FIG. 4) may be optionally provided within the semantic processor 316 to correlate IP addresses with users, for example. This correlation permits the security platform to make certain assumptions about the relationship between an IP address and a user so that, if any event data arrives from that IP address in the future, an assumption regarding which user is associated with that IP address may be made. In some implementations, the event data pertaining to that IP address may be annotated with the identity of the user. Technology used to implement the data preparation functions of the semantic processor 316 may include Redis™.

An optional filter attribution block 322 in the semantic processor 316 removes certain pre-defined events. The attribution filter 322 in the semantic processor 316 may further remove events that need not be processed by the security platform. An example of such an event is an internal data transfer that occurs between two IP addresses as part of a regular file backup. In some embodiments, the functions of semantic processor 316 are configurable by a configuration file to permit easy updating or adjusting. Examples of configurable properties of the semantic processor 316 include how to (i) parse events, (ii) correlate between users and IP address, and/or (iii) correlate between one attribute with another attribute in the event data or an external attribute. The configuration file can also adjust filter parameters and other parameters in the semantic processor 316.

Data processed by the semantic processor 316 is sent to a distribution block 320. The distribution block 320 can be a messaging mechanism to distribute data to one or both of the real-time processing path and the batch processing path. The real-time processing path is entered via the right-facing arrow extending from the distribution block 320, whereas the batch processing path is entered via arrow 388 extending downward from the distribution block 320.

The real-time processing path includes an analysis module 330 that receives data from the distribution block 320. The analysis module 330 analyzes the data in real-time to detect anomalies, threat indicators, and threats. In certain embodiments, the aforementioned Storm™ platform may be employed to implement the analysis module 330. In other embodiments, the analysis module could be implemented by using Apache Spark Streaming.

In FIG. 4, at least two topologies 332 and 334 are illustrated in analysis module 330. Generally, a topology in this context is a specification of how an analysis module (e.g., module 330) groups and distributes work (e.g., to the different computation workers). A topology can also specify how the analysis module 330 groups and distributes input data for the model-related process threads. More details on the analysis module 330 and topologies are discussed below in relevant sections. Different machine learning models may evaluate different aspects of the pre-processed event data received from the distribution block 320. The machine learning models can also generate security-related scores for the events. The results from the analysis module 330 may be, for example, anomalies, threat indicators, and threats.

These anomalies, threat indicators and threats may be provided to a user interface (UI) system 350 for review by a human operator 352. As an example, a visualization map and a threat alert may be presented to the human operator 352 for review and possible action. The output of the analysis module 330 may also automatically trigger actions such as terminating access by a user, terminating file transfer, or any other action that may neutralize the detected threats. In certain embodiments, only notification is provided from the analysis module 330 to the UI system 350 for review by the human operator 352. The event data that underlies those notifications or that gives rise to the detection made by the analysis module 330 are persistently stored in a database 378. If the human operator decides to investigate a particular notification, he or she may access from database 378 the event data (including raw event data and any associated information) that supports the anomalies or threat detection. On the other hand, if the threat detection is a false positive, the human operator 352 may so indicate upon being presented with the anomaly or the threat. The rejection of the analysis result may also be provided to the database 378. The operator feedback information (e.g., whether an alarm is accurate or false) may be employed to update the model to improve future evaluation.

Arrow 360 represents the storing of data supporting the analysis of the anomalies and threats in the real-time path. For example, the anomalies and threats as well as the event data that gives rise to detection of the anomalies and threats may be stored in database 378 (e.g., an SQL store) using a path represented by the arrow 360. Additional information such as the version of the models, the identification of the models used, and the time that the detection is made, may also be stored.

The human operator 352 may review additional information in response to the notification presented by the UI system 350. The data supporting the analysis of the anomalies and threats may be retrieved from database 378 via an access layer 364. Arrow 362 represents a data retrieval request via the access layer 364 to one or more of databases 370, 372, 374 and 378. The data served up by the databases would be provided to the UI 350 by means of data pathway 380. The access layer 364 includes the APIs for accessing the various databases and the user interfaces in the UI 350. For example, block 366A represents the API for accessing the HBase or HDFS (Hadoop File Service) databases. Block 366B represents the various APIs compatible for accessing servers implementing sockets.io or node.js servers. SQL API 366C represents the API for accessing the SQL data store 378, which stores data pertaining to the detected threats and anomalies.

Line 368 is a conceptual line that separates the batch processing path (below line 368) from the real-time processing path (above line 368). The infrastructure which may operate in batch mode includes the SQL store 378 that stores information accessible by scripted query language (SQL), a time series database 370 that represents the database for storing time stamped data, an HBase 372 that can be an open-source, distributed, non-relational database system on which databases (e.g., the time serious database 370) can be implemented, and a GraphDB database 374 that stores security graphs 392, which may be based on relationship graphs generated from events. In some embodiments, the GraphDB database 374 comprises a Neo4j™ graph database.

A security graph, as described further below, is generally a representation of the relationships between entities in the network and any anomalies identified. For example, a security graph may map out the interactions between users, including information regarding which devices are involved, who or what is talking to whom/what, when and how interactions occur, which nodes or entities may be anomalous, and the like. The nodes of the security graph may be annotated with additional data if desired.

A batch analysis module 382 is the analysis module that processes data in batches. The analysis module 382 may take into account the historical event data stored in databases 370, 372, 374, and 378 (including "relatively" contemporary event data that is passed from distribution block 320 to the persistent layer below line 368 via network channel 388). In one example, the batch analysis module 382 may employ third party data 384. With more time allowance and more data available for analysis, the batch analysis module 382 may be able to uncover additional anomalies and threats that may not be easily detectable by the real-time analysis module 330. The model management block 386 includes a model store and a model registry. The model registry can store model type definitions for machine learning models, and the model store can store model states for machine learning models. Additional details on the model registry and the model store are discussed below.

In certain embodiments, the models that are employed for evaluation by one analysis module may be shared with another module. Model state sharing 390 may improve threat detection by various modules (e.g., two modules belonging to an international network of the same company, but one deployed in Asia and another one deployed in North America; or, one module being used in the real-time path and another in the batch path) as the model state sharing leverages knowledge learned from one module to benefit others. Security graphs 392 may also be shared among modules, and even across different organizations. For example, activities that give rise to a detection of anomalies or a threat in one enterprise may thus be shared with other enterprises. Hadoop nodes 394 represent the use of cloud-based big data techniques for implementing the architecture of FIG. 4 to improve scalability as well as the ability to handle a large volume of data. Control path 396 represents the control software that may be used for monitoring and maintaining the security platform 300.

Figure 5:
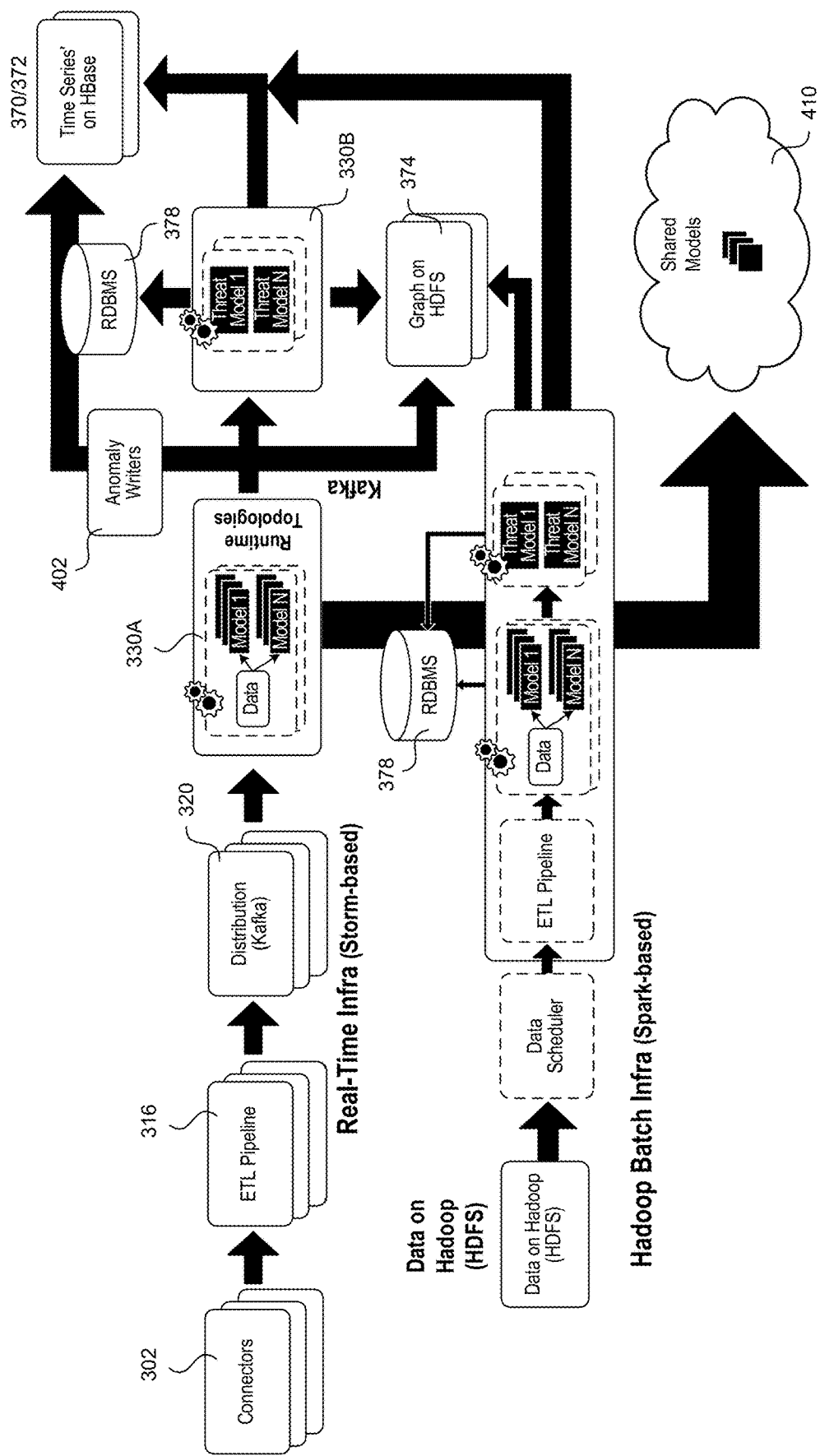
FIG. 5 shows an example implementation of the real-time processing path in greater detail.

FIG. 5 shows an example implementation of the real-time processing path in greater detail. With reference to both FIGS. 4 and 5, the analysis module 330 has been expanded as two analysis modules 330A and 330B to represent the anomaly detection stage and the threat detection stage, respectively. The analysis module 330A is responsible for detecting anomalies, and the output of the analysis module 330A is provided to the analysis module 330B for detecting threats based on the detected anomalies. In practice, the two stages may be performed by the same module utilizing different models in a staged manner.

The output of analysis module 330A, representing the anomalies, is provided to an anomaly writer 402. The anomaly writer 402 can store the anomalies (e.g., including event data representing an anomalous event and any associated information) in the database 378. The same anomalies may also be stored in the time series database 370 and the HBase 372. The anomalies may also be stored in the graph database 374. In some embodiments, the anomalies can be stored in graph database 374 in the form of anomaly nodes in a graph or graphs; specifically, after an event is determined to be anomalous, an event-specific relationship graph associated with that event can be updated (e.g., by the anomaly writer 402) to include an additional node that represents the anomaly, as discussed further below. Certain embodiments of the security platform provide the ability to aggregate, at a specified frequency (e.g., once a day), the individual event-specific relationship graphs from all the processed events in order to compose a composite relationship graph for a given enterprise or associated network. This aforementioned update to an individual event's relationship graph allows the composite relationship graph to include nodes representing anomalies, thereby providing more security-related information. The individual event-specific relationship graph and the composite relationship graph are discussed in more detail below. The information stored may include the anomalies themselves and also relevant information that exists at the time of evaluation. These databases allow rapid reconstruction of the anomalies and all of their supporting data.

The output from the analysis modules 330B, representing threats, may be stored in the database 378, the times series database 370 or the Hbase 372. As in the case of anomalies, not only are the threats themselves stored, but relevant information that exists at the time of evaluation can also be stored.

The batch analysis module 382 can also operate in two stages for anomaly and threat detection in a similar fashion as discussed above with respect to the real-time analysis module 330.

II. User Behavior Analysis (UBA)/User-Entity Behavior Analysis (UEBA)

The security platform 300 can detect anomalies and threats by determining behavior baselines of various entities that are part of, or that interact with, a network, such as users and devices, and then comparing activities of those entities to their behavior baselines to determine whether the activities are anomalous, or even rise to the level of threat. The behavior baselines can be adaptively varied by the platform 300 as new data are received. These functions can be performed by one or more machine-learning models, for example, in the real-time path, the batch path, or both.

Figure 6:
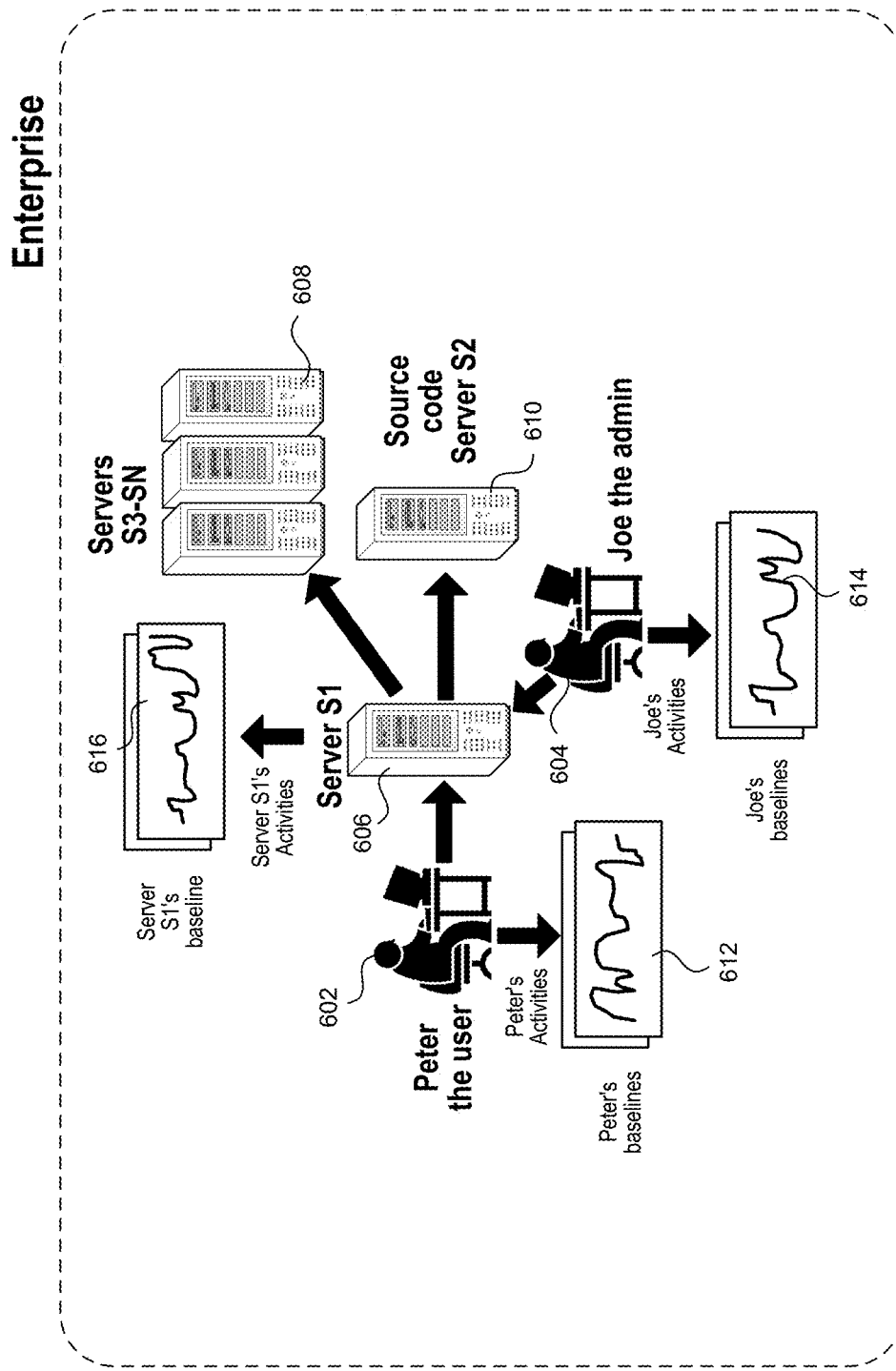
FIG. 6 shows an example representation of the process of building adaptive behavioral baselines and evaluating against such baselines to support the detection of anomalies.

FIG. 6 shows an example representation of a process of building behavior baselines to support the detection of anomalies. A human end user 602 may employ a server 606 to access a source code server 610 for his work, for example. Assume that the human user 602 occasionally accesses the data stored in servers 608. In a manner described in more detail below, the security platform 300 can generate a baseline profile 612 for access activities of user 602, based on event data indicative of network activities of user 602. Likewise, a human administrative user 604 other than user 602 may employ the server 606 to access the data stored in the servers 608. A baseline profile 614 specific for access activities of user 604 can also be generated over time by the security platform 300, based on event data indicative of network activities of user 604.

The security platform 300 can create a behavior baseline for any type of entity (for example, a user, a group of users, a device, a group of devices, an application, and/or a group of applications). In the example of FIG. 6, the activities of server 606 are monitored and a baseline profile 616 specific for the server 606 is generated over time, based on event data indicative of network activities of server 606.

Baseline profiles can be continuously updated (whether in real-time as event data streams in, or in batch according to a predefined schedule) in response to received event data, i.e., they can be updated dynamically and/or adaptively based on event data. If the human user 604 begins to access source code server 610 more frequently in support of his work, for example, and his accessing of source code server 610 has been judged to be legitimate by the security platform 300 or a network security administrator (i.e., the anomalies/threats detected upon behavior change have been resolved and deemed to be legitimate activities), his baseline profile 614 is updated to reflect the updated "normal" behavior for the human user 604.

In certain embodiments, anomalies and threats are detected by comparing incoming event data (e.g., a series of events) against the baseline profile for an entity to which the event data relates (e.g., a user, an application, a network node or group of nodes, a software system, data files, etc.). If the variation is more than insignificant, the threshold for which may be dynamically or statically defined, an anomaly may be considered to be detected. The comparison may be based on any of various techniques, for example, time-series analysis (e.g., number of log-ins per hour), machine learning, or graphical analysis (e.g., in the case of security graphs or security graph projections). Preferably, this detection is performed by various machine learning models.

Additional details are discussed below regarding various components of the security platform including, for example, the data intake and preparation engine, event processing engine, configurations for real-time implementations, configurations for batch implementation, machine learning models and different applications, various kinds of anomaly and threat detections, and graphic user interfaces for presenting security-related issues.

III. Data Intake and Preparation

FIGS. 7A and 7B collectively show a table 700 listing example types of machine data that can be generated in different environments and the meaning of these data. During operation, various components within a computing environment often generate significant volumes of machine-generated data (i.e., "machine data"). In general, machine data can include performance data, diagnostic information and/or any of various other types of data indicative of performance or operation of equipment (e.g., an action such as upload, delete, or log-in) in a computing system. Such data can be analyzed to diagnose equipment performance problems, monitor user actions and interactions, and to derive other insights like user behavior baseline, anomalies and threats.

As shown in the table 700, machine data may contain a record (e.g., a log) of an event that takes place in the network environment, such as an activity of a customer, a user, an transaction, an application, a server, a network or a mobile device. However, in many instances, machine data can be more than mere logs—it can include configurations, data from APIs, message queues, change events, the output of diagnostic commands, call detail records, sensor data from industrial systems, and so forth.

As used herein, "an event" may refer to the actual event or activity that takes place in the network, or for the simplicity of the discussion, it may refer to the machine data (or "event data") that records, corresponds to, or otherwise represents the event. The term's meaning is made apparent by the context of the discussion and the two meanings of the term may be used in an interchangeable manner in some scenarios. For example, "extracting a token from an event" will be understood as extracting a token from the event data that represents the event. Also, note that the data intake and preparation stage described herein may be as alternatively called the extract-transform-load (ETL) stage; however, the data intake and preparation stage disclosed here is not limited to traditional ETL techniques. In some implementations, the data intake and preparation stage includes an ETL engine/pipeline, but also includes/performs other functions beyond or different from a traditional ETL stage, as henceforth described herein. Consequently, the term "data pre-processing" is used interchangeably with "data preparation," and is intended to include any combination of data extraction, transformation, annotation/supplementation, and/or other additional techniques introduced here. The term "stage," as in the data intake and preparation stage, may also be referred to as "engine."

Events occurring in a computer network may belong to different event categories (e.g., a firewall event, a threat information, a login event) and may be generated by different machines (e.g., a Cisco™ router, a Hadoop™ Distributed File System (HDFS) server, or a cloud-based server such as Amazon Web Services™ (AWS) CloudTrail™). Therefore, machine data can come in many different formats, at least some of which may not be predictable. Traditional monitoring and analysis tools are not designed for the variety, velocity, volume or variability of such a data environment. Furthermore, different kinds of event data types can contain different information. Generally, the higher the communication layer (in terms of the well-known open system interconnection (OSI) model) to which an event belongs, the richer the information that event contains. For example, a network packet log may only include information on which machine communicates with which other machine(s); in contrast, an application log may have the richest information, thereby having a higher value. Particularly, in an application log, not only is it possible to obtain information on which machine is communicating with which other machine(s), but it is also possible to ascertain what kind of information these machines are sharing. For another example, session layer data may be used to identify (e.g., via techniques disclosed here) which user is attempting to log in with what credential and using which particular session, and therefore would be more valuable than lower-level network layer data. However, a typical computer network has significantly more lower-level layer data than higher-level layer data. Therefore, as the variety, velocity, and volume of the data in the environment greatly increase, traditional monitoring and analysis systems either simply ignore a large portion of the data, or they quickly become overloaded by the data, thereby losing accuracy and responsiveness.

Accordingly, the security platform introduced here includes various aspects that are specifically tailored to this data environment, including techniques for obtaining different kinds of data, preparing data, and processing data, by using different stages, to enable quick diagnosis of service problems, detection of sophisticated security threats, understanding of the health and performance of remote equipment, and demonstration of compliance.

Figure 8:
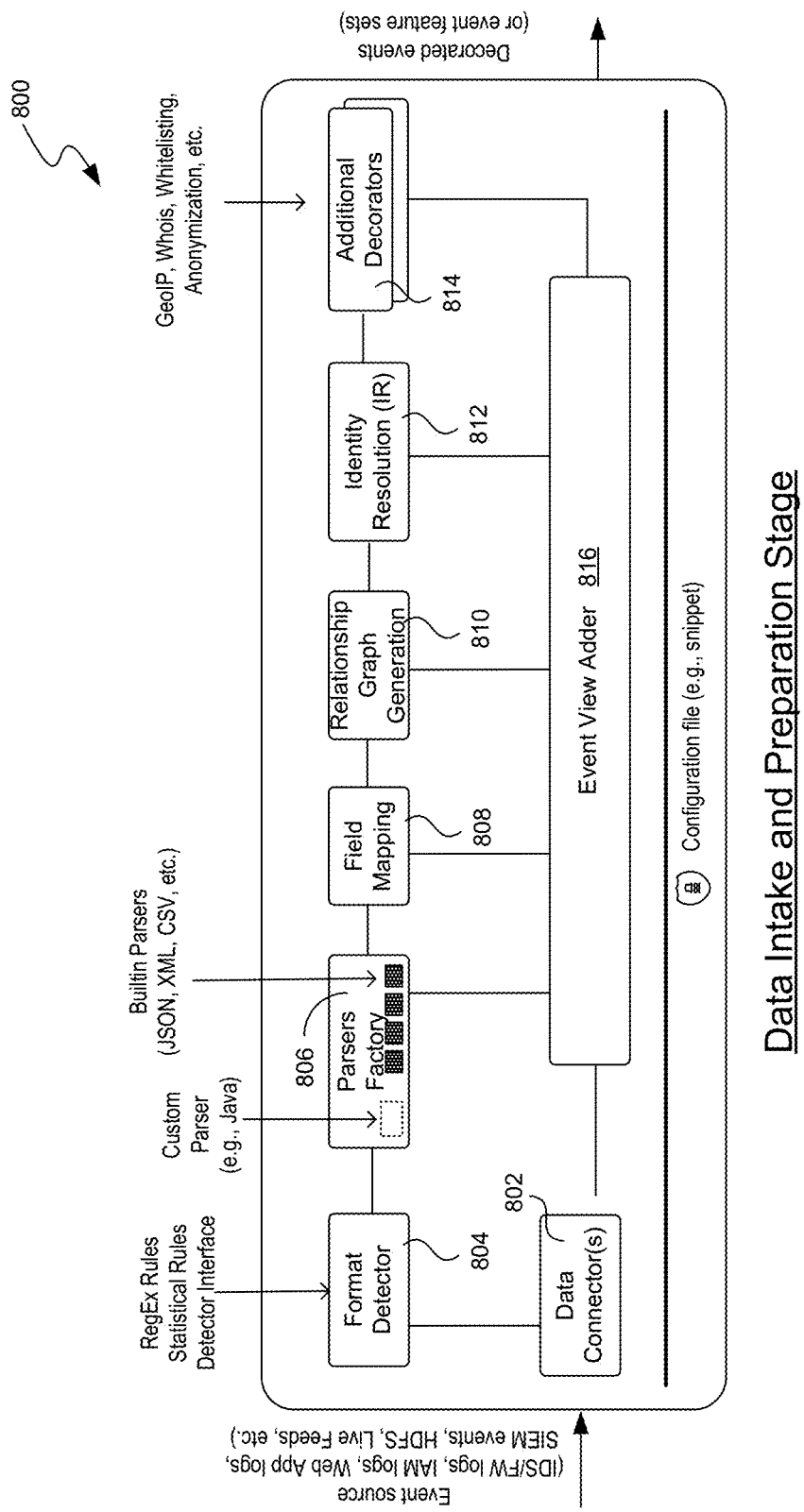
FIG. 8 shows an example implementation of the data intake and preparation stage of the security platform.

FIG. 8 shows an example implementation of a data intake and preparation stage 800 of the security platform. The data intake and preparation stage (or engine) 800 can be an implementation of ETL stage 204 in FIG. 3 and/or semantic processor 316 in FIG. 5. The data intake and preparation stage 800 can include a number of components that perform a variety of functions disclosed herein. In the example of stage 800, the data intake and preparation stage of the security platform includes a number of data connectors 802, a format detector 804, a number of parsers 806, a field mapper 808, a relationship graph generator 810, an identity resolution module 812, a number of decorators 814, and event view adder 816. These components (e.g., sets of instructions) need not be implemented as separate software programs, procedures or modules, and thus various subsets of these components may be combined or otherwise rearranged in various embodiments. Also, the components shown in FIG. 8 are only one example of the data intake and preparation stage components that can be used by the security platform; the data intake and preparation stage could have more or fewer components than shown, or a different configuration of components.

The various components shown in FIG. 8 can be implemented by using hardware, software, firmware or a combination thereof, including one or more signal processing and/or application specific integrated circuits. The components in the stage 800 are shown arranged in a way that facilitates the discussion herein; therefore, any perceivable sequence in the stage 800 is merely an example and can be rearranged. Any step in the stage 800 may be performed out-of-sequence and/or in parallel to the extent that such rearrangement does not violate the logic dependency of the steps. One or more steps described for the stage 800 may be optional, depending on the deployed environment. The data output from the data intake and preparation stage 800 can also be referred to herein as "decorated events" or "event feature sets." A decorated event includes the raw machine data associated with an event, plus any decoration, enrichment, information, or any other suitable intelligence that is generated based upon or extracted from the event during the data intake and preparation stage. In some embodiments, because of the computationally intensive processes that the data intake and preparation stage may perform, the data intake and preparation engine may be implemented separately from the rest of the stages in the security platform, for example, on a standalone server or on dedicated nodes in a distributed computer cluster.

Various data connectors 802 can be employed by the security platform (e.g., at the data intake stage) to support various data sources. Embodiments of the data connectors 802 can provide support for accessing/receiving indexed data, unindexed data (e.g., data directly from a machine at which an event occurs), data from a third-party provider (e.g., threat feeds such as Norse™, or messages from AWS™ CloudTrail™), or data from a distributed file system (e.g., HDFS™). Hence, the data connectors 802 enable the security platform to obtain machine data from various different data sources. Some example categories of such data sources include:

(1) Identity/Authentication: e.g., active directory/domain controller, single sign-on (SSO), human resource management system (HRMS), virtual private network (VPN), domain name system (DNS), or dynamic host configuration protocol (DHCP);

(2) Activity: e.g., web gateway, proxy server, firewall, Netflow™, data loss prevention (DLP) server, file server, or file host activity logs;

(3) Security Products: e.g., endpoint security, intrusion prevention system, intrusion detection system, or antivirus;

(4) Software as a Service (SaaS) or Mobile: e.g., AWS™ CloudTrail™, SaaS applications such as Box™ or Dropbox™, or directly from mobile devices; and (5) External Threat Feeds: e.g., Norce™, TreatStream™, Financial Services Information Sharing and Analysis Center (FS-ISAC)™, or third-party blacklisted IP/domains.

Depending on the embodiment, external threat feeds may directly feed to the security platform, or indirectly through one or more security products that may be coexisting in the environment within which the security platform is deployed. As used herein, the term "heterogeneous event" refers to the notion that incoming events may have different characteristics, such as different data formats, different levels of information, and so forth. Heterogeneous events can be a result of the events originating from different machines, different types of machines (e.g., a firewall versus a DHCP server), being in a different data format, or a combination thereof.

The data connectors 802 can implement various techniques to obtain machine data from the data sources. Depending on the data source, the data connectors 802 can adopt a pull mechanism, a push mechanism, or a hybrid mechanism. For those data sources (e.g., a query-based system, such as Splunk®) that use a pull mechanism, the data connectors 802 actively collect the data by issuing suitable instructions to the data sources to grab data from those data sources into the security platform. For those data sources (e.g., ArcSignt™) that use a push mechanism, the data connectors 802 can identify an input (e.g., a port) for the data sources to push the data into the system. The data connectors 802 can also interact with a data source (e.g., Box™) that adopts a hybrid mechanism. In one embodiment of the data connectors 802 for such hybrid mechanism, the data connectors 802 can receive from the data source a notification of a new event, acknowledges the notification, and at a suitable time communicate with the data source to receive the event.

For those data connectors 802 that may issue queries, the queries can be specifically tailored for real-time (e.g., in terms of seconds or less) performance. For example, some queries limit the amount of the anticipated data by limiting the query to a certain type of data, such as authentication data or firewall related data, which tends to be more relevant to security-related issues. Additionally or alternatively, some queries may place a time constraint on the time at which an event takes place.

Moreover, in some examples, the data connectors 802 can obtain data from a distributed file system such as HDFS™. Because such a system may include a large amount of data (e.g., terabytes of data or more), it is preferable to reduce data movement so as to conserve network resources. Therefore, some embodiments of the data connectors 802 can generate a number of data processing jobs, send the jobs to a job processing cluster that is coupled to the distributed file system, and receive the results from the job processing cluster. For example, the data connectors 802 can generate MapReduce™ jobs, and issue those jobs to a job processing cluster (e.g., YARN™) that is coupled to the distributed file system. The output of the job processing cluster is received back into the security platform for further analysis, but in that case, no or very little raw machine data is moved across the network. The data is left in the distributed file system. In some examples, the generated jobs are user behavior analysis related.

Optionally, after the data connectors 802 obtain/receive the data, if the data format of the data is unknown (e.g., the administrator has not specified how to parse the data), then the format detector 804 can be used to detect the data format of the input data. For example, the format detector 804 can perform pattern matching for all known formats to determine the most likely format of a particular event data. In some instances, the format detector 804 can embed regular expression rules and/or statistical rules in performing the format detection. Some examples of the format detector 804 employ a number of heuristics that can use a hierarchical way to perform pattern matching on complex data format, such as an event that may have been generated and/or processed by multiple intermediate machines. In one example, the format detector 804 is configured to recursively perform data format pattern matching by stripping away a format that has been identified (e.g., by stripping away a known event header, like a Syslog header) in order to detect a format within a format.

However, using the format detector 804 to determine what data format the input data may be at run time may be a time- and resource-consuming process. At least in the cybersecurity space, it is typical that the formats of the machine data are known in advance (e.g., an administrator would know what kind of firewall is deployed in the environment). Therefore, as long as the data source and the data format are specified, the data intake and preparation stage can map the data according to known data formats of a particular event source, without the need of performing data format detection. In certain embodiments, the security platform can prompt (e.g., through a user interface) the administrator to specify the data format or the type of machine(s) the environment includes, and can automatically configure, for example, the parsers 806 in the data intake and preparation stage for such machines.

Further, the security platform provides a way to easily supporting new data format. Some embodiments provide that the administrator can create a new configuration file (e.g., a configuration "snippet") to customize the data intake and preparation stage for the environment. For example, for a particular data source, the configuration file can identify, in the received data representing an event, which field represents a token that may correspond to a timestamp, an entity, an action, an IP address, an event identifier (ID), a process ID, a type of the event, a type of machine that generates the event, and so forth. In other examples (e.g., if a new data format is binary), then the security platform allows an administrator to leverage an existing tokenizer/parser by changing the configuration file, or to choose to implement a new, customized parser or tokenizer.

In a number of implementations, through the configuration file (e.g., snippet), the administrator can also identify, for example, field mappings, decorators, parameters for identity resolution (IR), and/or other parameters of the data intake and preparation stage. The configuration snippet can be monitored and executed by the data intake and preparation engine on the fly to allow the an administrator to change how various components in the data intake and preparation engine functions without the need to recompile codes and/or restart the security platform.

After receiving the event data by the data connectors 802, the parsers 806 parse the event data according to a predetermined data format. The data format can be specified in, for example, the configuration file. The data format can be used for several functions. The data format can enable the parser to tokenize the event data into tokens, which may be keys, values, or more commonly, key-value pairs. Examples of supported data format include event data output from an active-directory event, a proxy event, an authentication event, a firewall event, an event from a web gateway, a virtual private network (VPN) connection event, an intrusion detection system event, a network traffic analyzer event, or an event generated from a malware engine.

Each parser can implement a set of steps. Depending on what type of data the data intake and preparation stage is currently processing, in some embodiments, the initial steps can include using regular expression to perform extraction or stripping. For example, if the data is a system log (syslog), then a syslog regular expression can be first used to strip away the packet of syslog (i.e., the outer shell of syslog) to reveal the event message inside. Then, the parser can tokenize the event data into a number of tokens for further processing.

The field mapper 808 can map the extracted tokens to one or more corresponding fields with predetermined meanings. For example, the data format can assist the field mapper 808 to identify and extract entities from the tokens, and more specifically, the data format can specify which of the extracted tokens represent entities. In other words, the field mapper 808 can perform entity extraction in accordance with those embodiments that can identify which tokens represent entities. An entity can include, for example, a user, a device, an application, a session, a uniform resource locator (URL), or a threat. Additionally, the data format can also specify which tokens represent actions that have taken place in the event. Although not necessarily, an action can be performed by one entity with respect to another entity; examples of an action include use, visit, connect to, log in, log out, and so forth. In yet another example, the filed mapper 808 can map a value extracted to a key to create a key-value pair, based on the predetermined data format.

The entity extraction performed by the field mapper 804 enables the security platform to gain potential insight on the environment in which the security platform is operating, for example, who the users are, how many users there may be in the system, how many applications that are actually being used by the users, or how many devices there are in the environment.

A. Event Relationship Discovery/Mini-Graphs

Figures 9A, 9B:
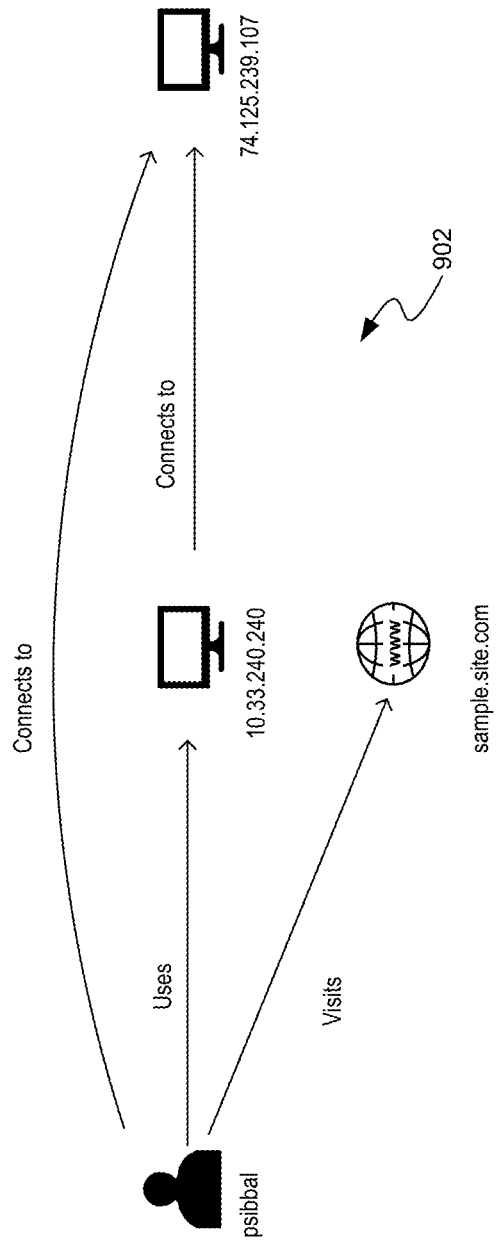
FIG. 9A shows raw event data received by the data intake and preparation stage
FIG. 9B shows an event-specific relationship graph based on the event shown in FIG. 9A.

FIGS. 9A and 9B show an example event relationship discovery and recordation technique, which can be implemented in the data intake and preparation stage. To facilitate description, FIGS. 9A and 9B are explained below with reference to FIG. 8. The relationship discovery and recordation technique can be performed by, for example, the relationship graph generator 810. Specifically, after the entities are identified in the tokens, the relationship graph generator 810 is operable to identify a number of relationships between the entities, and to explicitly record these relationships between the entities. Some implementations of the relationship graph generator 810 generate a single relationship graph for each event; such an event-specific relationship graph may also be called a "mini-graph." Further, some implementations incorporate the generated relationship graph into the event data that represents the event, in the form of a data structure representing the relationship graph. A graph in the context of this description includes a number of nodes and edges. Each node in the relationship graph represents one of the entities involved in the event, and each edge represents a relationship between two of the entities. In general, any event involves at least two entities with some relationship between them (e.g., a device and a user who accesses the device) and therefore can be represented as an event-specific relationship graph.

In some implementations, the graph generator 810 can identify a relationship between entities involved in an event based on the actions that are performed by one entity with respect to another entity. For example, the graph generator 810 can identify a relationship based on comparing the action with a table of identifiable relationships. Such a table of identifiable relationship may be customizable and provides the flexibility to the administrator to tailor the system to his data sources (described above). Possible relationships can include, for example, "connects to," "uses," "runs on," "visits," "uploads," "downloads," "successfully logs onto," "restarts," "shuts down," "unsuccessfully attempts to log onto," "attacks," and "infects." Also, the identified relationship between the entities can be indicative of the action, meaning that the identifiable relationship can include the action and also any suitable inference that can be made from the action. For example, an event that records a GET command (which is an action) may indicate that the user is using a machine with a certain IP address to visit a certain website, which has another IP address. In practice, however, the number of identifiable relationships can be directly correlated to the size of the graph, which may impact the security platform's responsiveness and performance. Also, identifiable relationships can include a relationship between entities of the same type (e.g., two users) or entities of different types (e.g., user and device).

In some embodiments, specific details on how to construct the edges and the identifiable relationships are recorded in the configuration file (e.g., snippet). For example, a portion of the configuration file can specify, for the relationship graph generator 810, that an edge is to be created from an entity "srcUser" to another entity "sourceIP," with a relationship that corresponds to an event category to which the event belongs, such as "uses."

FIG. 9A illustrates raw event data 900 received by the data intake and preparation stage. The raw event data 900, representing an event that occurs, are log data generated by a web gateway server. The web gateway is located where network traffic in and out the environment goes through, and therefore can log the data transfer and web communication from a system inside the environment. The particular event as represented by the event data 900 indicates that, at a particular point of time identified by the timestamp, the user "psibbal" uses the IP address "10.33.240.240" to communicate with an external IP address "74.125.239.107," and transfers 106 bytes of data. The status code of that event is "200," and the event is a TCP event where the HTTP status is "GET." As illustrated, the event data 900 also includes a significant amount of additional information.

Using the aforementioned techniques (e.g., the parsers 806, and the field mapper 808), the graph generator 810 can readily identify that the event represented in the FIG. 9A involves a number of entities, such as the user "psibbal," the source IP "10.33.240.240," the destination IP "74.125.239.107," and an URL "sample.site.com." The graph generator 810 also identifies that an action "GET" is involved in the event. Accordingly, the graph generator 810 can compare the action to the table of identifiable actions, identify one or more relationships between the entities, and create an event-specific relationship graph 902 based on the event. As shown in FIG. 9B, the relationship graph 902 includes the entities that are involved in the events. Each entity is represented by a different node. The relationship graph 902 also includes edges that link the nodes representing entities. The identified relationships between the entities are the edges in the graph 902. The relationship graph 902 can be stored in known data structures (e.g., an array) suitable for representing graphs that have nodes and edges.

Note, however, that the components introduced here (e.g., the graph generator 810) may be tailored or customized to the environment in which the platform is deployed. As described above, if the network administrator wishes to receive data in a new data format, he can edit the configuration file to create rules (e.g., in the form of functions or macros) for the particular data format including, for example, identifying how to tokenize the data, identifying which data are the entities in the particular format, and/or identifying the logic on how to establish a relationship. The data input and preparation stage then can automatically adjust to understand the new data format, identify identities and relationships in event data in the new format, and create event relationship graphs therefrom.

Then, in some embodiments, the graph generator 810 attaches the relationship graph 902 to the associated event data 900. For example, the graph 902 may be recorded as an additional field of the event data 900. In alternative embodiments, the relationship graph 902 can be stored and/or transferred individually (i.e., separate from the event data 900) to subsequent nodes in the security platform. After additional processes (e.g., identity resolution, sessionization, and/or other decorations) in the data intake and preparation stage, the event data 900 including the relationship graph 902 can be sent to a distributed messaging system, which may be implemented based on Apache Kafka™. The messaging system can in turn send the event data 900 to an event processing engine (e.g., a machine learning model execution and analytics engine, such as the complex event processing engine introduced here and described further below) for further processing. As described further below, the event processing engine is operable to use machine learning models to perform analytics based on the events and, in some instances, in conjunction with their associated relationship graphs, to security-oriented anomalies and threats in the environment.

The messaging system (e.g., Apache Kafka™) can also accumulate or aggregate, over a predetermined period of time (e.g., one day), all the relationship graphs that are generated from the events as the events come into the security platform. Particularly, note that certain types of behavioral anomalies and threats can become more readily identifiable when multiple events are compared together, and sometimes such comparison may even be the only way to identify the anomalies and/or threats. For example, a beaconing anomaly happens when there is a device in the network that communicates with a device outside the network in an unexpected and (mostly) periodic fashion, and that anomaly would become more identifiable when relationship graphs associated with all the device's related beacons are combined into a composite relationship graph. As such, at the messaging system, the relationship graphs (mini-graphs) for all events, or at least for multiple events, can be combined into a larger, composite relationship graph. For example, a computer program or a server can be coupled to the messaging system to perform this process of combining individual relationship graphs into a composite relationship graph, which can also be called an enterprise security graph. The composite relationship graph or enterprise security graph can be stored, for example, as multiple files, one file for each of multiple predetermined time periods. The time period depends on the environment (e.g., the network traffic) and the administrator. In some implementations, the composite relationship graph is stored (or "mined" in data mining context) per day; however, the graph mining time period can be a week, a month, and so forth.

In some embodiments, event-specific relationship graphs are merged into the composite relationship graph on an ongoing basis, such that the composite relationship graph continuously grows over time. However, in such embodiments it may also be desirable to remove ("age out") data deemed to be too old, from the composite relationship graph, periodically or from time to time.

In some embodiments, the nodes and edges of the composite graph are written to time namespaces partitioned graph files. Then, each smaller segment can be merged with a master partition (e.g., per day). The merge can combine similar nodes and edges into the same record, and in some embodiments, can increase the weight of the merged entity nodes. Note that the exact order of the events' arrival becomes less important, because even if the events arrive in an order that is not the same as how they actually took place, as long as the events have timestamps, they can be partitioned into the correct bucket and merged with the correct master partition. Some implementations provide that the composite graphs can be created on multiple nodes in a parallelized fashion.

In this manner, this composite relationship graph can include all identified relationships among all identified entities involved in the events that take place over the predetermined period of time. As the number of events received by the security platform increases, so does the size of this composite relationship graph. Therefore, even though a relation graph from a single event may not carry much meaning from a security detection and decision standpoint, when there are enough events and all the relationship graphs from those events are combined into a composite relationship graph, the composite relationship graph can provide a good indication of the behavior of many entities, and the quality/accuracy of this indication increases over time as the composite relationship graph grows. Then, the subsequent processing stages (e.g., the complex processing engine) can use models to perform analytics on the composite relationship graph or on any particular portion (i.e., "projection", discussed further below) of the composite relationship graph. In some embodiments, the composite relationship graph is persistently stored using a distributed file system such as HDFS™.

In some embodiments, when various individual events' relationship graphs (along with their associated decorated events) are stored in the messaging system but have not yet been combined to create the composite relationship graph, each such event's relationship graph can be further updated with any information (e.g., anomalies) that is discovered by downstream processes in the security platform. For example, if an event is found to be an anomalous, then the relationship graph associated with that anomalous event can be updated to include this information. In one example, the individual relationship graph of that anomalous event is revised to include an anomaly node (along appropriate edges), so that when the composite relationship graph is created, it can be used to determine what other entities might be involved or affected by this anomaly.

At least in some embodiments, the composite graph enables the security platform to perform analytics on entity behaviors, which can be a sequence of activities, a certain volume of activities, or can be custom defined by the administrator (e.g., through a machine learning model). By having an explicit recordation of relationships among the events, the relationship graph generator 810 can enable the analytics engines introduced here (e.g., the complex processing engine) to employ various machine learning models, which may focus on different portions or aspects of the discovered relationships between all the events in the environment, in order to detect anomalies or threats.

B. Identity Resolution (IR) and Device Resolution (DR)

Figure 10:
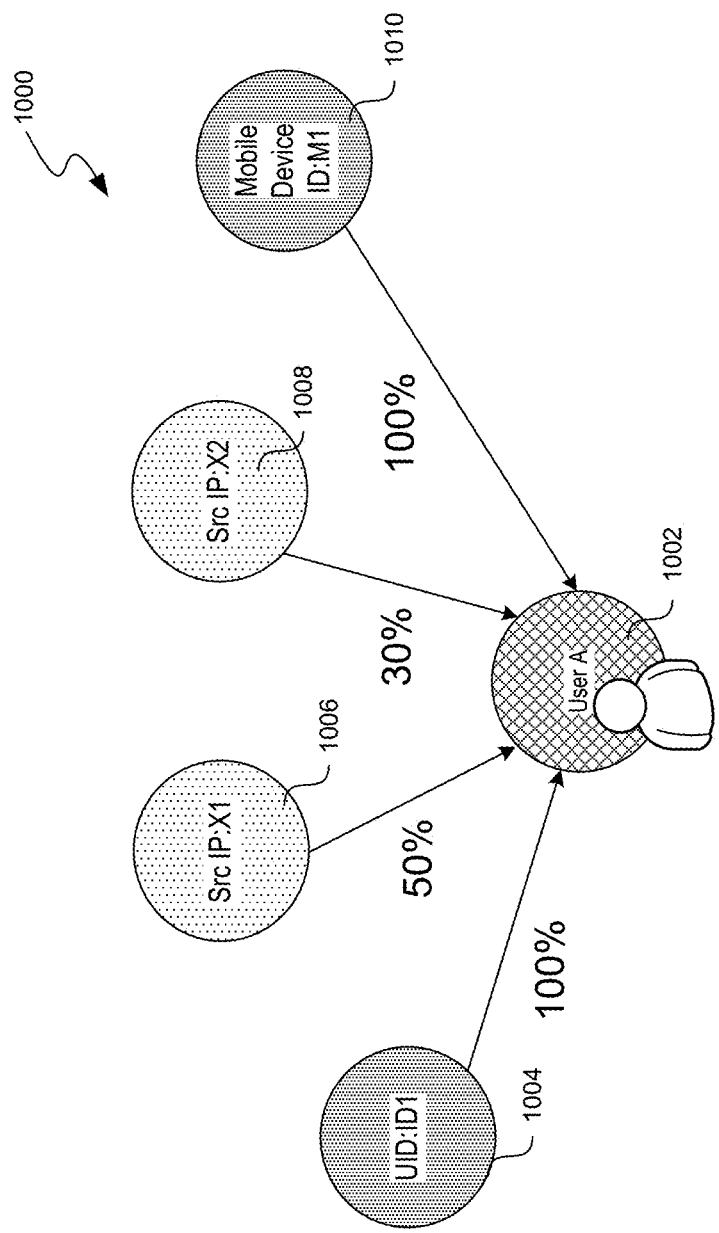
FIG. 10 shows an example implementation of an identity resolution technique based on the information in the events.

FIG. 10 shows an example identity resolution technique based on the information in the events, which can be implemented in the data intake and preparation stage described above. To facilitate description, FIG. 10 is explained below with reference to FIG. 8. Identity resolution can be performed by, for example, the identity resolution module 812. Specifically, after the entities are identified in the tokens, the identity resolution module 812 is operable to perform an identity resolution, which enables keeping track of which user logged into which particular computer system or device across the network.

In the context of computer security and especially unknown threat detection, information about a user's behavior can be very important. However, as previously discussed, not all events/activities/logs include user information. Consider a typical firewall event as an example. Except for a few advanced firewall products, many typical firewalls do not know and do not record the user's identity in an event. Therefore, many times even when a particular communication is determined to be malicious, traditional security products are unable to attribute the malicious behavior to a particular user. Thus, when logs or device-level events do not capture the user information, the identity resolution module 812 in the data intake and preparation stage can attribute those events (and behaviors) to the right user.

In addition, traditional solutions for identity resolution adopt techniques that are too simplistic and lack responsiveness to any changes to the environment. For example, one traditional technique may be a simple lookup, such as where the administrator maintains a resource attribution file that records a particular IP address belongs to a particular person. However, such a file is often hard to keep accurate and easily becomes obsolete, especially when the amount of the devices in the environment is very large, as is often the case in today's environment.

Accordingly, the security platform introduced here can perform identity resolution based on the facts. The identity resolution module 812 can gain the knowledge by observing the system environment (e.g., based on authentication logs), thereby building the intelligence to make an educated identity resolution determination. That is, the identity resolution module 812 is able to develop user identity intelligence specific and relevant to the system's environment without any explicit user identity information.

To facilitate this fact-based identity resolution functionality in the security platform, the identity resolution module 812 can utilize a machine learning model to generate and track a probability of association between a user and a machine identifier. Specifically, after the entities in event data that represents an event are extracted (e.g., by the field mapper 808), the identity resolution module 812 can identify whether the event data includes a user identifier and/or a machine identifier, and can create or update the probability of association accordingly. As is discussed in more detail in other sections of this disclosure, the model initiated by the identity resolution module 812 can, in some embodiments, obtain the information it needs, e.g., obtaining machine identifiers in an event, through one or more interfaces. A machine identifier is an identifier that can be associated with a machine, a device, or a computing system; for example, a machine identifier can be a media access control (MAC) address, or an Internet Protocol (IP) address. Different machine identifiers can be generated by the same machine. A user identifier is an identifier that can be associated with a user; for example, a user identifier can be a user login identifier (ID), a username, or an electronic mail address. Although not illustrated in FIG. 8, some embodiments of the identity resolution module 812 can resolve a user identity of a particular user by, for example, querying a database using a user identifier as a key. The database, which may be a human resource management system (HRMS), can have records indicating a number of user identifiers that are registered to the user identity. Note that, in some alternative embodiments, a user identifier may be directly treated as a user for simpler implementation, even though such implementation may not be an ideal one because behaviors of the same user may not be detected because the user has used different user identifiers.

More specifically, a machine learning model can have different phases, for example, a training phase (after initiation and before ready) and an active phase (after ready and before expiration). In a training phase of a machine learning model, if an event that is received involves both a user and a machine identifier (e.g., if the event data representing the event has both a user identifier and a machine identifier), then machine learning model that is employed by the identity resolution module 812 can use this event to create or update the probability of association between the user and the machine identifier. For example, when an authentication event is received (e.g., when a user logs into a particular machine) and involves a user (e.g., identified by a user identifier such as a username) and a machine identifier, the model learns that the user is now associated with the machine identifier, at least for a period of time until the user logs out or times out from the particular machine.

As more events are received, the model can become increasingly better trained about the probability of association between the user and the machine identifiers. In some embodiments, the identity resolution module 812 creates a probabilistic graph to record a probability of association for each user it is currently tracking. The probabilistic graph can include peripheral nodes, a center node, and edges. An example of such probabilistic graph 1000 is shown in FIG. 10. In graph 1000, nodes 1004, 1006, 1008, and 1010 are the peripheral nodes representing the machine identifiers. Node 1002 is the center node representing the user. Edges between each peripheral node and the center node represent the probability of association between the particular machine identifier and the user. According to some embodiments, the machine learning models used for identification resolution are user specific. It is also noted that the machine learning models used in the identity resolution (and device resolution, introduced below) are generally simpler than those models that would be used for anomaly and threat detection. In many embodiments, the models that are used in the identity resolution and/or device resolution are time-sequenced probabilistic graphs, in which the probability changes over time.

According to a number of embodiments, the models that are used to generate and track the probability of association between each user and possible machine identifiers are time-dependent, meaning that a result from the models has a time-based dependence on current and past inputs. The time dependence is useful to capture the scenario where a device is first assigned or given to a particular user, and is subsequently reassigned to a different user, which happens often in a large organization. To achieve this, in some embodiments, the identity resolution module 812 can initiate, for a given user, different versions of the machine learning model at different point of time, and each version may have a valid life time. As events related to the given user arrive, versions of a machine learning model are initiated, trained, activated, (optionally) continually updated, and finally expired.

The models can be trained and, in some implementations, continually updated after their activation, by relevant events when the events are received. An example of a relevant event is an authentication event, which inherently involves a user (e.g., which may be represented by a user identifier) and a number of machine identifiers (e.g., an IP address or a MAC address). Depending on the model, other criteria for an event to be considered relevant for model training and/or updating purposes may include, for example, when a new event includes a particular machine identifier, a particular user identifier, and/or the recency of the new event. Moreover, some models may assign a different weight to the new event based on what type of event it is. For example, given that the new event is an authentication event, some models assign more weight to a physical login type of authentication event than to any other type of authentication event (e.g., a remote login).

Depending on the particular deployment, the machine learning model can be considered trained and ready when one or more criteria are met. In one example, a version of the model can be considered trained when a certain number of events have gone through that version of the model. In another example, a version of the model can be considered trained when a certain time period has passed after the version of the model is initiated. Additionally, or alternatively, a version of the model is considered trained when a certain number of criteria are met (e.g., when the model becomes sufficiently similar to another model). Additional details of machine learning models that can be employed (including training, readiness, activation, and expiration) by various engines and components in the security platform are discussed in other sections of this disclosure.

After a version of a model is sufficiently trained (e.g., when the probability of association exceeds a confidence threshold, which depends on the model's definition and can be tuned by the administrator for the environment), the identity resolution module 812 then can activate the version of the model. Thereafter, when a new event arrives, if the new event meets certain criteria for the identity resolution, the identity resolution module 812 can create a user association record (e.g., in memory) indicative that the new event is associated with a particular user. The criteria for the identity resolution can include, for example, when the new event includes a machine identifier (regardless of whether it also includes a user identifier), and/or when the new event is received during a time period which the version is active. It is observed that the identity resolution technique is especially useful to help identify an event that includes only a machine identifier but no user identifier.

Based on this user association record, the identity resolution module 812 can annotate the new event to explicitly connect the new event to the particular user. For example, the identity resolution module 812 can add, as a field, the particular user's name to the new event in its associated event data. Alternatively, the identity resolution module 812 can annotate the new event by adding a user identifier that belongs to the particular user. In addition, the identity resolution module 812 can send the user association record to a cache server that is implemented based on Redis™.

With the fact-based identity resolution techniques disclosed herein, the security platform has the ability to attribute an event that happens on a device to a user, and to detect behavioral anomalies and threats based on that attribution. The security platform can achieve this without the need of maintaining an explicit look-up file and irrespective of what the data source is (i.e., regardless of whether a data source for an event includes a user identifier or not).

Although not illustrated in FIG. 8, an embodiment of the data intake and preparation stage can also implement a device resolution module to create an association between one machine identifier and another. In a manner similar to how the identity resolution module 812 tracks the possibility of association between a user and a machine identifier, the device resolution module can track the possibility of association between a first machine identifier and a second machine identifier. Thereafter, when a new event is received, if the event includes the first machine identifier but not the second, the device resolution module can create a machine association record indicative that the new event having the first machine identifier is associated with the second machine identifier. Optionally, the machine identifier can be translated into a more user-friendly machine name, such as "Tony's Laptop."

The device resolution technique can be particularly useful in an environment that includes a dynamic host configuration protocol (DHCP) service, and therefore a computer in the environment does not have a static IP address. Because the same computer can potentially get a different IP address each time it starts in such environment, naively attributing a behavior to a particular IP address may lead to incorrect analysis. In manners similar to the identity resolution, the device resolution can create a mapping between, for example, a MAC address and an IP address, which can remain valid for a period of time. One example of events where the relationship between a MAC address and an IP address can be found is the DHCP logs. Like identity resolution, such machine identifier mapping can be dynamically updated as the time goes by and more events are received. Whenever the environment changes, the device resolution module can derive a new mapping, meaning that the same IP address can become associated with a different, updated MAC address. Note that, for the particular case of DHCP services, it is generally easier to estimate when a particular version of a device resolution model should expire, because a DHCP service setting typically includes explicit lease expiration provisions.

C. Additional Event Decoration

The data intake and preparation stage can also include additional event decorators 814. Similar to how a format detector 804 may be customized or how a new format detector may be added, the event decorators 814 can be in the form of software code (e.g., in Java™) written by a third-party (e.g., the administrator) or can be added/configured through the configuration snippet. In some embodiments, the event decorators 814 can include a geographical decorator, which can be configured to decorate the received events (e.g., by adding a field in the event data that represents the events) so all events with an IP address receive an additional field about their respective IP's geographical location. In another embodiment, the event decorators 814 can include a server identifier, which can explicitly annotate an event when the event is from a server. The server identifier can implement a look-up technique in order to identify that a machine is being used as a server, or it can implement heuristics and make a determination based on how many users have logged into it within a predetermined time period. Other examples of the event decorators 814 can include a Whois Lookup, Whitelisting, and so forth.

D. Event Views

Figure 11:
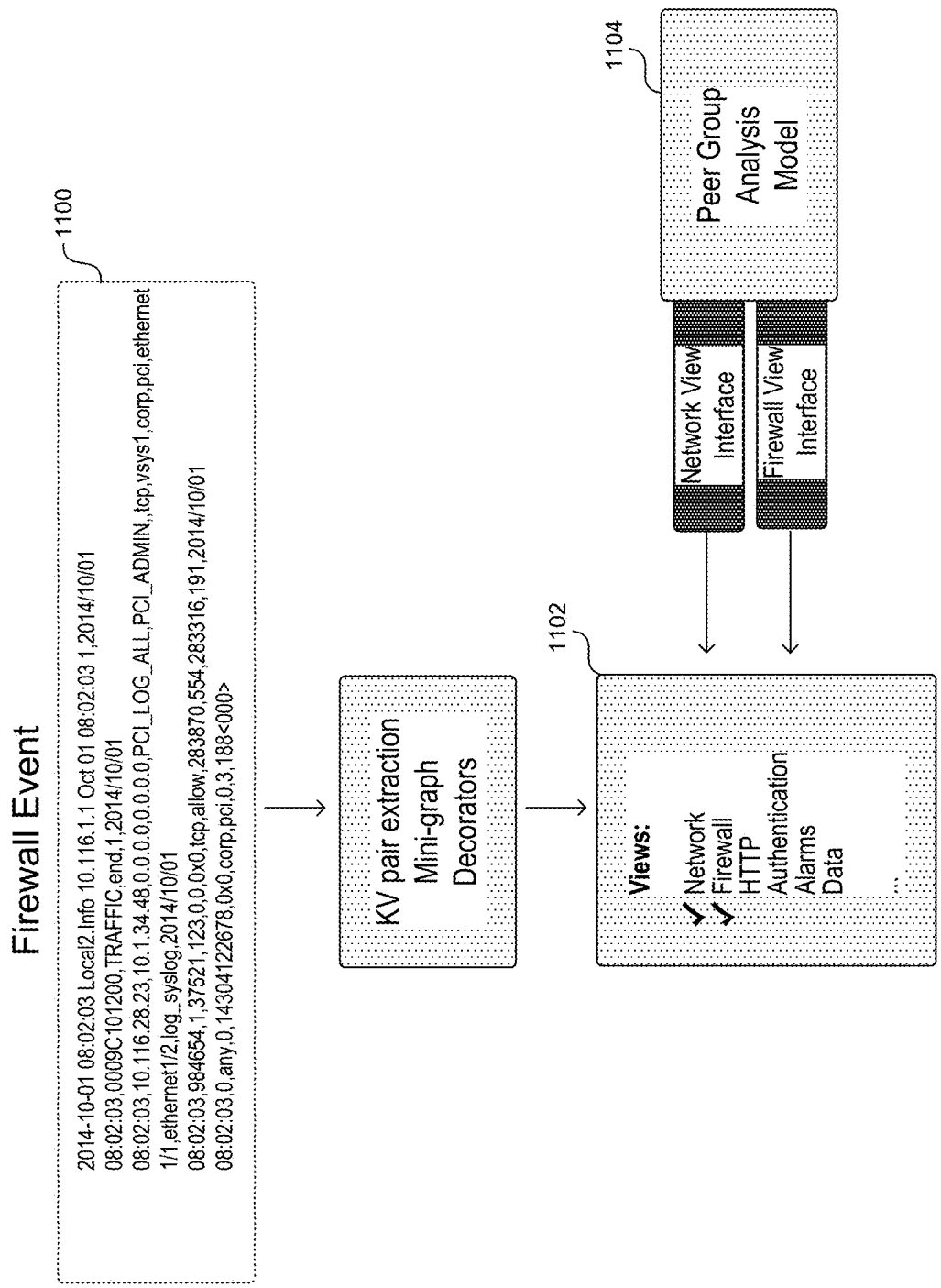
FIG. 11 shows a diagram of a technique for providing a uniform access interface ("event view") at the data intake and preparation stage for an event processing engine (e.g., at a subsequent stage) to obtain relevant information from various kinds of machine data.

FIG. 11 shows a diagram of a technique for providing uniform access interfaces (also called "event views") to event data at the data intake and preparation stage for an event processing engine (e.g., at a subsequent stage) to obtain relevant information from various kinds of machine data. To facilitate description, FIG. 11 is explained below with reference to FIG. 8.

The large variety of different types event data would make it difficult for traditional data analysis platforms to perform automated, real-time analysis. Therefore, the data intake and decoration stage introduced here can provide an uniform access interface for select information contained in the events. The uniform access interfaces described here serve to decouple the main intelligence of the security platform (e.g., the analytic models running therein) from the multiple, potentially heterogeneous data source inputs (which may be heterogeneous in nature (i.e., of different data types, formats, etc.)), and to create a homogeneous way of access information contained in the events that are originated from these various input systems.

In particular, binding is a process in which unstructured data is processed and transformed into structured data. However, during binding, any information in the original, unstructured data becomes lost if not captured in the structured data. Accordingly, the data intake and preparation stage introduced here generally implements the notion of a "late binding" schema, which means that the binding is only made when an operation (e.g., a query) is made against the data. In contrast, an "early binding" schema generally means that data is transformed into structured data (i.e., become bonded to data structures) at an early stage, typically at data intake. Even though an early binding schema can provide homogeneous ways to access the data (because the data becomes structured after intake), using an early binding schema may risk losing potentially important information, information that may later become particularly important when it comes to determining unknown anomalies and threats. On the other hand, unstructured data in various data format presents a technical problem to a systematic way to process these data, especially in an application (e.g., security platform) where both time and accuracy are of the essence, because there is no convenient way to access the data using an uniform manner (i.e., using the same way to access select information in events that are in various data formats).

In other words, the data intake and preparation stage introduced here does not put the event data into any kind of fixed structure; thus, even after the application of the various preparation or pre-processing techniques introduced here, the event data are still generally in the original form (more importantly, retaining all the raw event data) after the data intake and preparation stage. In the manner introduced here, the event view enables the security platform to both implement late binding and have a homogeneous way to access the unstructured event data.

According to some examples, an access interface, also called an "event view", can be implemented as a class (in object-oriented programming terms, e.g., a Java™ class). An event view includes a name (e.g., view identifier) for subscription purposes. An event view can include a number of fields to access certain attributes of an event; for example, the fields can be used by a machine learning model to identify which subset of the event data (e.g., serverIP, sourceIP, sourcePort, etc.) is the information that the model wants to receive. The event view can also include a number of methods (in object-oriented programming terms) and logic associated with the methods to access information generated based on attributes of an event; for example, a method can be used by a machine learning model to obtain a randomness of a URL in an event (e.g., getRandomnessOfURL( )), in which the logic associated with the method can include performing algorithmic operations to compute the URL against a predetermined set of URLs.

Regarding the late binding aspect, the binding is made only when a field in the event view is referenced or a method in the event view is called. Optionally, an event view can include an input for controlling actions or operations that the logic associated with a method performs. Note that any programming-related term of art used herein may, but does not necessarily, have the same meaning as how the term may be used in a traditional programming sense; therefore, any term of art used herein is to be construed in the context of the present disclosure. In a number of implementations, the event views (e.g., the object-oriented classes) can be stored in a library. When an event view is called (e.g., by the model execution library, which may be a part of an event processing engine such as the CEP engine), the event view can be loaded by, for example, a known Java™ class loader.

In various embodiments, the data intake and decoration stage includes an event view adder 816 that can provide the event views by adding one or more view identifiers to the event data. A view identifier can be added, for example, as a field in the event data. The view identifiers allow a downstream entity (e.g., a complex event processing (CEP) engine) to receive the select information through the event views identified by the view identifiers. For example, the information in the model registry (discussed herein in other sections) for each machine learning model can designate one or more view identifiers to indicate the event views that are of interest to the model, to identify the events of interest and to receive select information about those events. In other words, the security platform provides a mechanism for the machine learning models to subscribe (e.g., using the model registry) to a group of event views in order to receive select information about the events of interest as each event of interest arrives. In a number of embodiments, the view identifiers are added to event data by the event view adder 816 on a per-event basis.

More specifically, the view identifiers can be added by the event view adder 816 to an event at any suitable moment during the data intake and preparation stage after the data connector 802 retrieves or receives the event. The event view adder 816 can selectively add the view identifiers based on the event data, and more precisely, based on an event category to which the event belongs. The event view adder 816 can also determine the event category based on the type of machine that generated the event. For example, a firewall event can be an event category. Other example event categories include authentication, network, entity acquisition, and so forth. Shown in FIG. 13 is a table 1300 including example event views available for event annotation in the data intake and preparation stage.

A firewall event example is illustrated in FIG. 11. When a Cisco RSA™ event (event data) 1100 arrives, the event view adder 816 first determines that the machine that generated the event is a Cisco RSA™ type (which may be defined in the configuration snippet by the administrator). Based on the machine type, the event view adder 816 determines (e.g., by performing a lookup of the event code in the event against a list of Cisco RSA™ event codes) that the event belongs to a firewall event. Then, based on the configuration, the event view adder 816 automatically adds to the event 1100 two view identifiers, namely Network and Firewall. Note that the determination of which view identifiers should be added may be adjusted by the administrator (e.g., via the configuration file) based on the knowledge of the devices in the environment, such that the added view identifiers (and the corresponding event views) correctly reflect or correspond to the event category.

Thereafter, a downstream entity (e.g., the CEP engine) can run analytics on events using information about the plurality of events, for example, by using a machine learning model 1104. The machine learning model 1104 can subscribe to the event views in, for example, the model registry (e.g., by specifying corresponding view identifiers). In various embodiments, the subscription causes or allows the automatic routing of the select information to the machine learning model 1104. As previously described, the information accessible via the event views can include: information generated by logic included in the interface (e.g., through the methods in the interfaces), and/or a predefined subset of a complete set of the event data (e.g., through the fields).

FIG. 12 shows a table 1200 of example uniform access interfaces ("event views") that can be implemented in the data intake and preparation stage. FIGS. 13A and 13B collectively show a table 1300 that includes example anomalies that can be identified by machine learning models, as well as various event views and fields that can be used by the models to receive relevant information about the events for performing further analytics.

E. Sessionization

Figure 14:
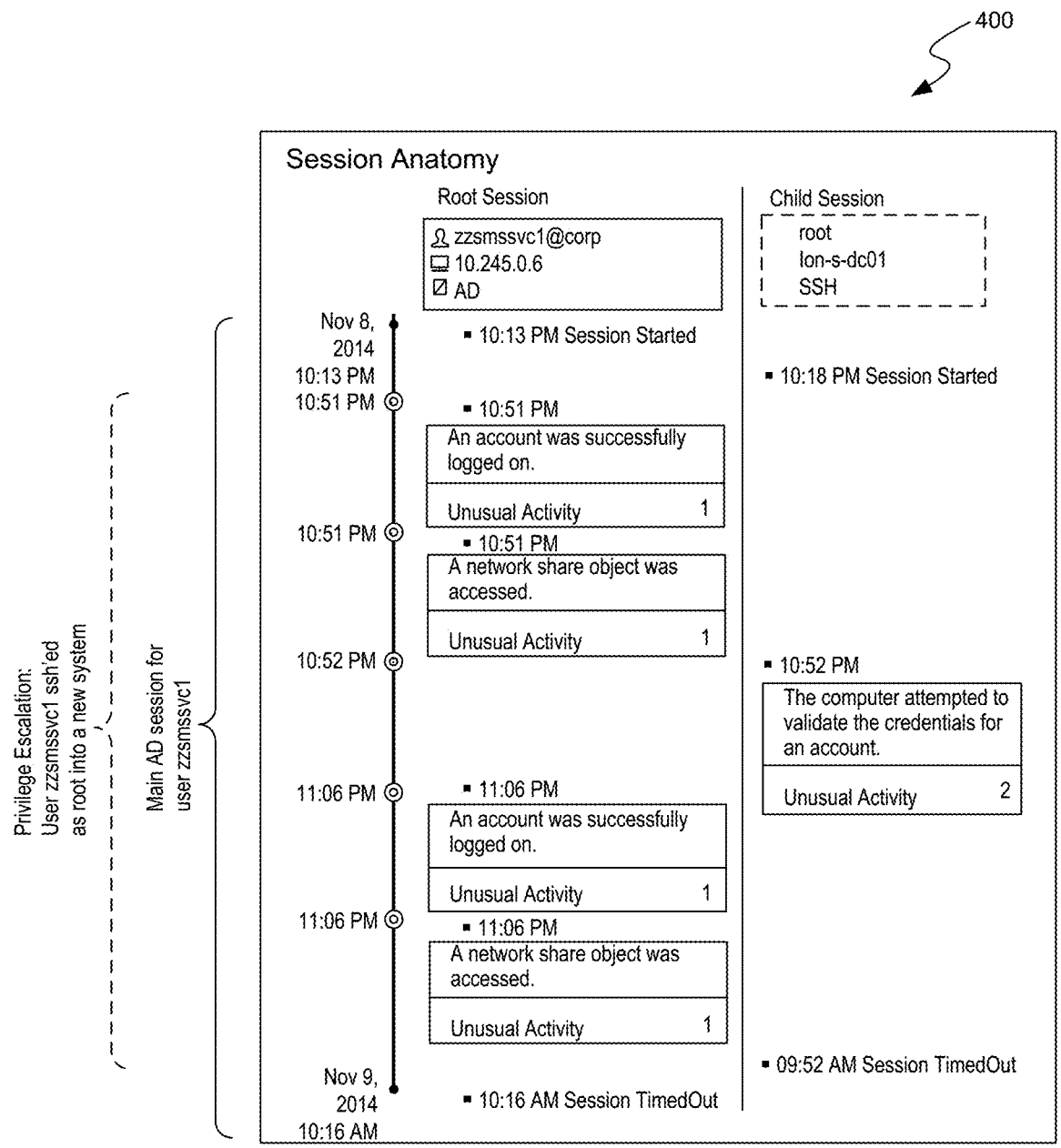
FIG. 14 shows a sessionization technique that can be implemented at the data intake and preparation stage.

FIG. 14 shows a technique for session correlation, also called "sessionization," that can be implemented in conjunction with other introduced techniques (e.g., identity resolution) in the data intake and preparation stage. In addition to what is discussed above with respect to identity resolution and device resolution, the data intake and preparation stage can further include a session tracker and a session resolver (not illustrated in FIG. 8 for simplicity).

Generally, sessionization can be created by using the same or similar data structure as that used for correlating users with devices in identity resolution. When the beginning or end of a session is detected, the event data associated with events from the session should be explicitly marked (e.g., as a field in the event data). Then, with the identity resolution and the device resolution techniques, all data events resolved to the user within the time window of an active session are associated with the session. The data intake and preparation engine can also mark certain events for session correlation, for example, events that may indicate a remote network login such as using a remote desktop protocol (RDP) or a secure shell (SSH) protocol to log into another device. Further, because a network login to a target device also creates a new session, the current session should be correlated with the new session. This correlation is referred to herein as session lineage. As shown in FIG. 14, an active directory (AD) session is first started on the machine with the IP address of 10.245.0.6 by user "zzsmssvc1" at time 10:13 PM. However, this user then started an SSH session to log into a new system as "root." These two sessions, along with any anomalies detected during these two sessions, should all be attributed to the user "zzsmssvc1." These two sessions are said to have session lineage, and can be correlated with each other using the sessionization technique introduced here.

More specifically, every session that is tracked can be assigned with a session identifier ("sessionId") and a correlation identifier ("correlationId"). The session identifier is used to identify the same session, and the correlation identifier is used to find other sessions that can possibly be in the same lineage. The session tracker is used to track the user sessions based on login/logout events, for example, from active directory (AD), virtual private network (VPN), and secure shell (SSH) logs. In some examples, the session tracker can create and maintain session states in a sessions database. The session tracker can also link sessions based on session linking events (e.g., an AD Event with code 5156, which may correspond to a remote-desktop connection from machine-A to machine-B). The session resolver queries the session database using user, device and event time information from data event. Then, if there is any closely matching active session found in the session database (e.g., which can be determined based on the event's time), then a corresponding session identifier (e.g., "sessionId") can be assigned to the data event.

Details on how to perform the session tracking may vary depending on what existing techniques (such as those introduced here) are implemented in the data intake and preparation stage. Introduced here is a specific implementation where session correlation is performed after entity extraction, device resolution and identity resolution, and event view assignment. Therefore, instead of using specific attributes of data events from various data formats, the components that are logically located after event view assignment, which include the session tracker, can conveniently operate over sets of normalized attributes (e.g., from calling a specific event view for obtaining select information, introduced above). With the specific information based on the attributes on the event, the session tracker can inspect the event data to determine whether the event represented by the event data belongs to any session of interest (e.g., AD, VPN, and SSH). If affirmative, then the session tracker starts to track the event.

For example, if a new event arrives, and an event type is set as "SessionStart" (e.g., by using an "association" event view), then that signifies that a new session is created. (For simplicity of discussion, assume that this session is a session of interest.) The session tracker then starts a tracking process by storing the new event in the session database. The session is stored with information about start time, user identifier (e.g., user account), device identifier (e.g., IP address), and sessionID (or perhaps a hash of the sessionID). According to the present embodiments, a derived property attribute "Link-Context" can also be generated from the event view, and the stored session also has its LinkContext stored along with session information. An example of a LinkContext of a session may be an IP address along with the user account used.

With the new session created in the session database, a process thread starts to automatically look for any preexisting session in the session database that can be linked with the information provided by the new session. Whether to link two sessions is determined based on comparing three items: "from-session-link-context", "to-session-link-context", and "Link-Event time." An example of the "from-session-link-context" is the combination of the IP address of and the user account used on a source machine from which the session is established. An example of the "to-session-link-context" is the combination of the IP address of and the user account used on a target machine to which the session is established. The "Link-Event time" is the time that the new session is recorded. Two existing sessions should be linked or correlated if the newly added session (1) matches a link event time range, (2a) has a match in one of its from-session-link-context or to-session-link-context with those of one existing session, and (2b) has at least a partial match in one of its from-session-link-context or to-session-link-context with those of another existing session.

Similar to what is shown in FIG. 14, a practical example of this sessionization technique would be where a user uses user account A to log into a first machine of a first IP address, thereby creating a first session. Then, from the first machine, the same user uses user account B to log into a second machine of a second IP address, thereby creating a second session. The two existing sessions that are visible in the environment are that the first machine of the first IP address is logged in by user account A, and that the second machine of the second IP address is logged in by user account B. Without sessionization, the two sessions would not be linked or correlated to each other. Now, if the user actually uses remote desktop protocol (RDP) to login from the first machine to the second machine, then an RDP event is received. This RDP event can be used by the sessionization technique introduced here to discover that these two seemingly unrelated sessions are actually initiated by the same user and should be correlated. This is because, using the aforementioned mechanisms and assuming the RDP event's time is within the valid range, the RDP event would have a match with the first session in its "from-session-link-context", and have a match with the second session in its "to-session-link-context."

If a matching link is not found, then additional linking can be done by an offline session scanner process, which can run at a configured interval (e.g., every 15 minutes). The offline session linking is discussed further below. Note that, if identity resolution is performed, then the user account may be further transformed into a user identity to more accurately track the user for sessionization.

In some situations, the sessionization process may receive an event indicating that a session may have been timed out. In such case, a new session entry can be created in the session database with a state "Timed Out." For example, an already timed out session may be identified if the sum of a session start time and an expiration duration is less than the current system time. When a user log-out event is received, a corresponding session is marked as "User Ended" in the session database.

Note that, in certain types of events, session ending events do not contain any specific context (e.g., lack a context that may be used as the LinkContext, and therefore unable to be used for matching purposes in the session database). For example, a certain type of AD event may contain only the from and to IP address of connection, but not the user account information. In such case, identity resolution (IR) lookup can help identify that existing session if the IR takes place before processing the session end event.

In some embodiments, for effective session linking and user assignment, all events pass through the session assignment logic (e.g., the session tracker and the session resolver) in the data intake and preparation stage. Based on session-lookup context (e.g., using event views) in an event, the session assignment logic tries to identify if there is any open session at time T of the event. This can be achieved by locating those sessions with the time T included between their start time and end time. Such identified session can be associated with the event, and if such event triggers an anomaly (e.g., in downstream processing), then the anomalous event can be annotated or otherwise associated with the sessionId of the identified session. Such anomalies with the associated session(s) can be displayed in the user interface for review. Further, if a session identified for an event has other sessions linked to the session, then the current user on the event is replaced with the user of the root (source) session.

Additionally, one aspect of the sessionization technique includes offline session linking. Specifically, if user login/logout events or events that indicate possible connection between two sessions are out of order, then session linking may be missed in real-time. To resolve this out of order data problem, a session linking process can run at a configurable intervals (e.g., configured in the configuration file). This process looks for any pending sessions that can be linked in the session database, and links the appropriate sessions together. Also, when this session linking process is executed, if any of the linked sessions is already associated with an anomaly, then the anomaly will also include the root session's sessionID.

IV. Complex Event Processing (CEP) Engine Utilizing Machine Learning Models

Certain embodiments introduced here include a machine learning- (ML-) based complex event processing (CEP)

engine that provides a mechanism to process data from multiple sources in a target computer network to derive anomaly-related or threat-related conclusions in real-time so that an appropriate response can be formulated prior to escalation. A CEP engine is a processing entity that tracks and reliably analyzes and processes unbounded streams of electronic records to derive a conclusion therefrom. An "unbounded stream" in this context is an open-ended sequence of data that is continuously received by the CEP engine. An unbounded stream is not part of a data container with a fixed file size; instead, it is a data sequence whose endpoint is not presently known by the receiving device or system. In a computer security context, a CEP engine can be useful to provide real-time analysis of machine data to identify anomalies.

The ML-based CEP engine described herein enables real-time detection of and response to computer security problems. For example, the input data of the ML-based CEP engine includes event feature sets, where each event feature set corresponds to an observable event in the target computer network.

A conventional CEP engine relies on user-specified rules to process an incoming event to identity a real-time conclusion. User-specified rules benefit from its computational simplicity that makes real-time computation plausible. However, conventional CEP engines rely on people to identify known event patterns corresponding to known conclusions. Accordingly, conventional CEP engines are unable to derive conclusions based on patterns or behaviors that are not previously known to authors of the user-specified rules. Conventional CEP engines do not consider historical events. The added complexity (e.g., memory consumption and processing power requirement) associated with the inclusion of the historical events would likely overtax an otherwise resource-limited computer system that supports a conventional CEP engine.

Certain embodiments introduced here include an ML-based CEP engine that utilizes distributed training and deliberation of one or more machine learning models. "Deliberation" of a machine learning model or a version of a machine learning model involves processing data through a model state of the machine learning model or version of the machine learning model. For example, deliberation can include scoring input data according to a model deliberation process logic as configured by the model state. The ML-based CEP engine processes event feature sets through the ML models to generate conclusions (e.g., security-related anomalies, security-related threat indicators, security-related threats, or any combination thereof) in real-time. "Real-time" computing, or "reactive computing", describes computer systems subject to a processing responsiveness restriction (e.g., in a service level objective (SLO) in a service level agreement (SLA)). In real-time processing, conclusions are reached substantially immediately following the receipt of input data such that the conclusions can be used to respond the observed environment. The ML-based CEP engine continuously receives new incoming event feature sets and reacts to each new incoming event feature set by processing it through at least one machine learning model. Because of real-time processing, the ML-based CEP engine can begin to process a time slice of the unbounded stream prior to when a subsequent time slice from the unbounded stream becomes available.

In some embodiments, the ML-based CEP engine is implemented as, or within, analysis module 330 in FIG. 8 and couples to a data intake and preparation stage (data intake and preparation stage 800 of FIG. 8) that receives raw event data from a target-side computer system (e.g., multiple data sources from the target-side computer system). The target-side computer system is operated in a target computer network, which the ML-based CEP engine monitors for computer security issues. The target-side computer system collects machine data from the target computer network as the raw event data. The data intake and preparation stage creates an event feature set from raw event data pertaining to a single machine-observed event or a sequence of machine-observed events. The event feature set can include at least a subset of the raw event data; metadata associated with the raw event data; transformed, summarized, and/or normalized representation of portions of the raw event data; derived attributes from portions of the raw event data; labels for portions of the raw event data; or any combination thereof. To facilitate real-time processing in the ML-based CEP engine, the data intake and preparation stage can process, in real-time, the raw event data as it is received. The data intake and preparation stage and the ML-based CEP engine can store its inputs and outputs in non-persistent memory (e.g., volatile memory), such that all I/O operations of the ML-based CEP engine and the data intake and preparation stage operate on the non-persistent memory. Operations in non-persistent memory can help reduce the time lag of the ML-based CEP engine to satisfy the processing responsiveness restriction. In some embodiments, instead of the non-persistent memory, the inputs and outputs are stored in solid-state memory (e.g., one or more Flash drives), which is typically faster than hard disks and other non-solid-state data storage devices.

The ML-based CEP engine trains and retrains (e.g., updates) the machine learning models in real-time and applies (e.g., during the model deliberation phase) the machine learning models in real-time. Parallelization of training and deliberation enables the ML-based CEP engine to utilize machine learning models without preventing or hindering the formation of real-time conclusions. The ML-based CEP engine can be implemented on a distributed computation system (e.g., a distributed computation cluster) optimized for real-time processing. For example, a distributed computation system, such as Apache Storm™, can implement task parallelism instead of data parallelism. Storm is an open source distributed real-time computation system. In other embodiments, the distributed computation system can be implemented with data parallelism, such as Apache Spark™ or Apache Spark Streaming. Spark is an open source cluster computing framework. The distributed computation system can be coupled to other distributed components, such as a cluster-based cache (e.g., Redis), a distributed file system (e.g., HDFS), a distributed resource management system, or any combination thereof. The ML-based CEP engine can implement additional services to facilitate the distributed training and deliberation of machine learning models, such as a distributed messaging platform and a central service for distributed synchronization and centralized naming and configuration services.

The ML-based CEP engine disclosed herein is advantageous in comparison to conventional CEP engines at least because of its ability to recognize unknown patterns and to incorporate historical data without overburdening the distributed computation system by use of machine learning models. Because the ML-based CEP engine can utilize unsupervised machine learning models, it can identify entity behaviors and event patterns that are not previously known to security experts. In some embodiments, the ML-based CEP engine can also utilize supervised, semi-supervised, and deep machine learning models.

The ML-based CEP engine is further capable of condensing and summarizing historical knowledge by observing streams of events to train the machine learning models. This enables the ML-based CEP engine to include a form of historical comparison as part of its analysis without consuming too much data storage capacity. For example, the ML-based CEP engine can train a decision tree based on the historical events. In this case, the trained decision tree is superior to a user-specified rule because it can make predictions based on historical sequence of events. In another example, the ML-based CEP engine can train a state machine. Not only is the state machine trained based on a historical sequences of events, but it is also applied based on a historical sequence of events. For example, when the ML-based CEP engine processes event feature sets corresponding to an entity through the state machine, the ML-based CEP engine can track a number of "states" for the entity. These run-time states (different from a "model state" as used in this disclosure) represent the history of the entity without having to track every historical event involving the entity.

The machine learning models enable the ML-based CEP engine to perform many types of analysis, from various event data sources in various contextual settings, and with various resolutions and granularity levels. For example, a machine learning model in the ML-based CEP engine can perform entity-specific behavioral analysis, time series analysis of event sequences, graph correlation analysis of entity activities, peer group analysis of entities, or any combination thereof. For example, the data sources of the raw event data can include network equipment, application service servers, messaging servers, end-user devices, or other computing device capable of recording machine data. The contextual settings can involve scenarios such as specific networking scenarios, user login scenarios, file access scenarios, application execution scenarios, or any combination thereof. For example, an anomaly detected by the machine learning models in the ML-based CEP engine can correspond to an event, a sequence of events, an entity, a group of entities, or any combination thereof. The outputs of the machine learning models can be an anomaly, a threat indicator, or a threat. The ML-based CEP engine can present these outputs through one or more output devices, such as a display or a speaker.

Examples of entity-specific behavioral analysis include hierarchical temporal memory processes that employ modified probabilistic suffix trees (PST), collaborative filtering, content-based recommendation analysis, statistical matches in whitelists and blacklists using text models, entropy/randomness/n-gram analysis for uniform resource locators (e.g., URLs), other network resource locators and domains (AGDs), rare categorical feature/association analysis, identity resolution models for entities, land speed violation/geo location analysis, or any combination thereof. Examples of time series analysis of event sequences include Bayesian time-series statistical foundation for discrete time-series data (based on variable-memory Markov models and context-tree weighting), dynamic thresholding analysis with periodicity patterns at several scales, change-point detection via maximum-a-posteriori-probability (MAP) modeling, cross-correlation and causality analysis via variable-memory modeling and estimation of directed mutual information, outlier analysis, or any combination thereof.

Examples of graph-based analysis of entity activities include command and control detection analysis, beaconing detector, device, IP, domain and user reputation analysis, lateral movement detector, dynamic fingerprinting for users/devices, or any combination thereof. Examples of peer group analysis of entities include grouping of entities based on similarity and page rank, social-neighborhood graph-based clustering, online distributed clustering, clustering for bipartite and generic graphs, or any combination thereof.

Figure 15:
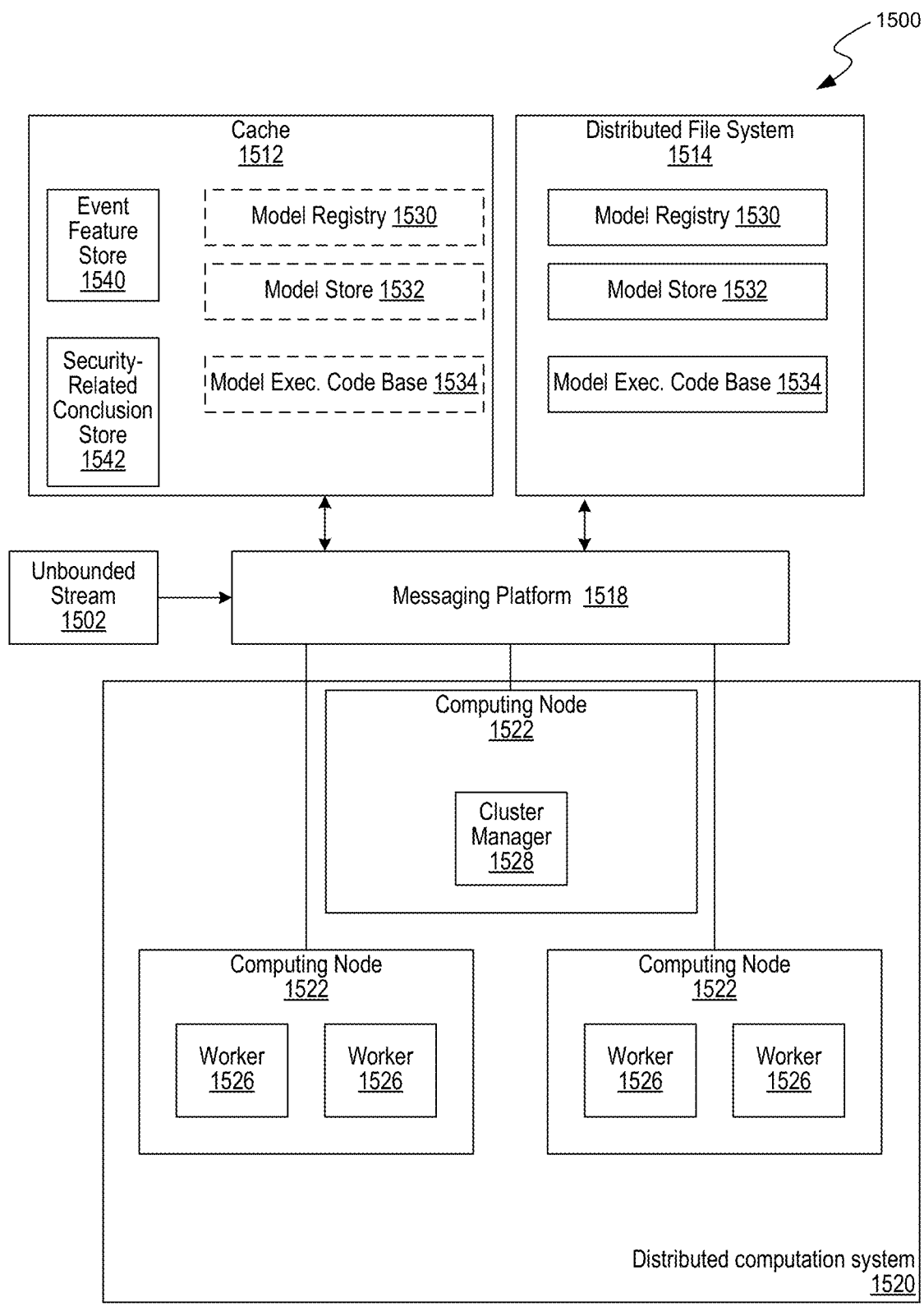
FIG. 15 is a block diagram of a machine learning-based complex event processing (CEP) engine.

FIG. 15 is a block diagram of an ML-based CEP engine 1500, in accordance with various embodiments. The ML-based CEP engine 1500 receives an unbounded stream 1502 of event feature sets as its input. For example, the ML-based CEP engine 1500 receives the unbounded stream 1502 from the data intake and preparation stage 800 of FIG. 8. Each event feature set corresponds to a machine-observed event. The ML-based CEP engine 1500 can train machine learning models using the unbounded stream 1502. The ML-based CEP engine 1500 can also compute security-related conclusions (e.g., an anomaly, a threat indicator, or a threat as described in this disclosure) by processing at least a subset of the event feature sets (e.g., from the unbounded stream 1502) through the machine learning models.

The ML-based CEP engine 1500 includes a cache component 1512, a distributed filesystem 1514, a messaging platform 1518, and a distributed computation system 1520. The ML-based CEP engine 1500 can include other data access systems. For example, the data access systems include a relational database (e.g., a structured query language (SQL) database), a non-relational database (e.g., HBase), a time series database, a graph database, or any combination thereof. The ML-based CEP engine 1500 can include other resource management systems (e.g., a distributed coordination system, such as ZooKeeper). The cache component 1512 can be non-persistent memory (e.g., volatile memory). The cache component 1512 can be a distributed cache, such as a cluster-based cache or a peer-to-peer cache. For example, the cache component 1512 is implemented in REDIS, an open source key-value cache.

The distributed filesystem 1514 stores data on a cluster of computing machines to provide high aggregate bandwidth across the cluster. The distributed filesystem 1514 includes at least a name node and a plurality of data nodes. Each data node serves blocks of data over a network using a file access protocol (e.g., block protocol or file-based protocol) specific to the distributed filesystem 1514. For example, the distributed filesystem 1514 is implemented according to the Hadoop distributed file system (HDFS).

The distributed filesystem 1514 stores a model registry 1530, a model store 1532, and a model execution code base 1534. In some embodiments, the model execution code base 1534 is part of the model registry 1530. The model registry 1530 stores model type definitions. A model type definition can configure whether a distributed computation system is responsible for a model type and can configure a model training workflow (i.e., a workflow of how to train machine learning models of a model type) and a model deliberation workflow (i.e., a workflow of how to apply machine learning models of a model type) of the model type. The model store 1532 stores model states that represent machine learning models or versions of the machine learning models. A model state, described further below, is a collection of numeric parameters in a data structure. A model training process thread produces and updates a model state. A model deliberation process thread is configured by a model state to process event feature sets into security-related conclusions. The model execution code base 1534 stores process logics for running model-related process threads. In some embodiments, the model execution code base 1534 also stores process logics associated with event views.

In some embodiments, the content of the distributed file system 1514 can be shared with another distributed computation system (e.g., a batch data processing engine discussed in various parts of this disclosure). For example, a model state stored in the model store 1532 representing a machine learning model or a version of a machine learning model can be shared with the other distributed computation system. For another example, one or more model types in the model registry 1530 and the model execution code base 1534 can be shared with the other distributed computation system.

The cache component 1512 stores an event feature store 1540 and a security-related conclusion store 1542. The cache component 1512 can cache (e.g., the most recently used or most recently received event feature sets) from the unbounded stream 1502 in the event feature store 1540. The cache component 1512 can cache the security-related conclusions (e.g., the most recently produced or the most recently used) in the security-related conclusion store 1542. The ML-based CEP engine 1500 can compute the security-related conclusions by processing the event feature sets through the machine learning models. In some embodiments, the cache component 1512 stores copies or references to entries in the model store 1532. In some embodiments, the cache component 1512 stores copies or references to entries in the model registry 1530. In some embodiments, the cache component 1512 stores copies or references to at least a portion of the model execution code base 1534.

The messaging platform 1518 provides a computer application service to facilitate communication amongst the various system components of the ML-based CEP engine 1500 and between external systems (e.g., the data intake and preparation stage) and the ML-based CEP engine 1500. For example, the messaging platform 1518 can be Apache Kafka, an open-source message broker utilizing a publish-subscribe messaging protocol. For example, the messaging platform 1518 can deliver (e.g., via self-triggered interrupt messages or message queues) the event feature sets from the unbounded stream 1502 to model-related process threads (e.g., one or more of model training process threads, model deliberation process threads, and model preparation process threads) running in the distributed computation system 1520. The messaging platform 1518 can also send data within the cache component 1512 or the distributed filesystem 1514 to the model-related process threads and between any two of the model-related process threads.

For the ML-based CEP engine 1500, the distributed computation system 1520 is a real-time data processing engine. The distributed computation system 1520 can be implemented on the same computer cluster as the distributed filesystem 1514. In some embodiments, an ML-based batch processing engine runs in parallel to the ML-based CEP engine. In those embodiments, the ML-based batch processing engine can implement a distributed computation system configured as a batch processing engine (e.g., using a data parallelism architecture). The system architecture of the ML-based batch processing engine can be identical to the ML-based CEP engine 1500, except for the distributed computing platform engine running on the distributed computation system, and the ML-based batch processing engine's inputs including batch data containers of event feature sets (instead of an unbounded stream of incoming event feature sets).

The distributed computation system 1520 can be a distributed computation cluster. The distributed computation system 1520 coordinates the use of multiple computing nodes 1522 (e.g., physical computing machines or virtualized computing machines) to execute the model-related process threads. The distributed computation system 1520 can parallelize the execution of the model-related process threads. The distributed computation system 1520 can implement a distributed resource manager (e.g., Apache Hadoop YARN) and a real-time distributed computation engine (e.g., Storm or Spark Streaming) to coordinate its computing nodes 1522 and the model-related process threads running thereon. The real-time distributed computation engine can be implemented based on a task parallel architecture. In an alternative embodiment, the real-time distributed computation engine can be implemented based on a data-parallel architecture.

Each computing node 1522 can implement one or more computation workers (or simply "workers") 1526. A computation worker is a logical construct of a sandboxed operating environment for process threads to run on. A computation worker can be considered a "processing node" of the computing cluster of the distributed computation system 1520. In some implementations, at least one of the computing nodes 1522 implements a cluster manager 1528 to supervise the computation workers 1526. Each of the computation workers 1526 can execute one or more model-related process threads. In some implementations, a computation worker 1526 only executes one type of model-related process thread, where process threads of that type share the same input data.

V. Model Registry

Figure 16:
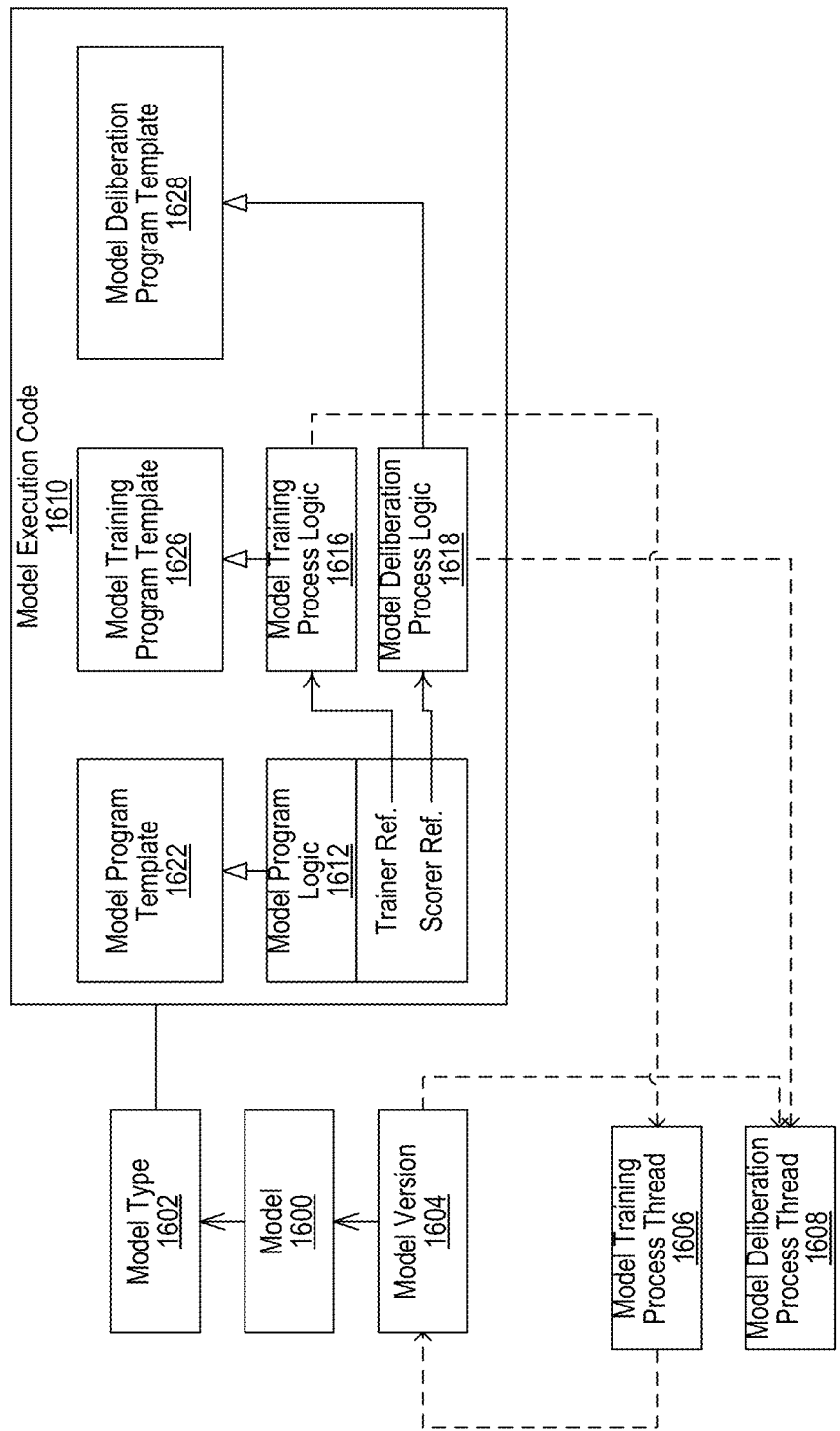
FIG. 16 is a block diagram illustrating an architectural framework of a machine learning model.
Figure 17:
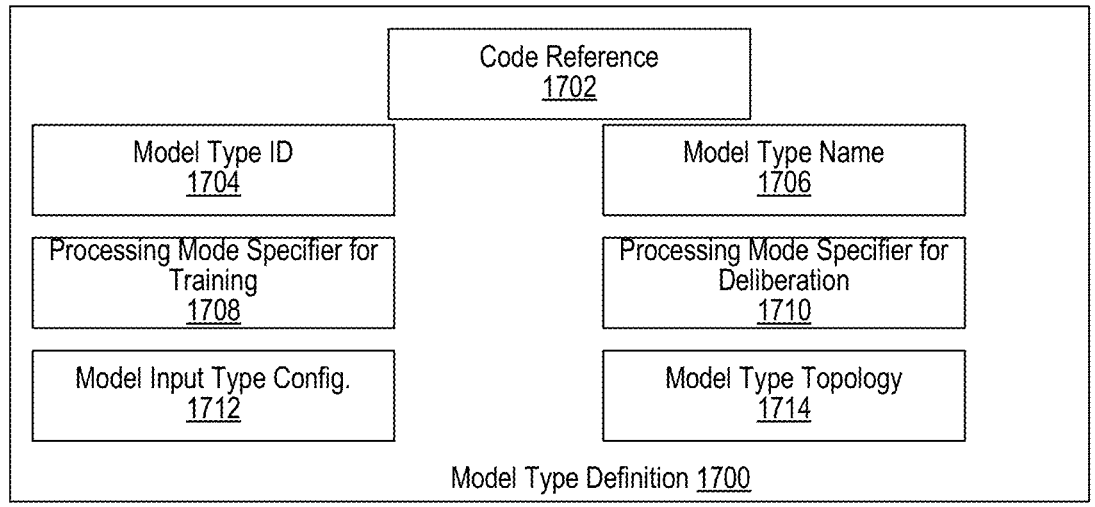
FIG. 17 is a block diagram illustrating an example of the model type definition.

FIG. 16 is a block diagram illustrating an architectural framework of a machine learning model, in accordance with various embodiments. A machine learning model 1600 corresponds to a model type 1602. The ML-based CEP engine 1500 can implement multiple machine learning models of the same model type. For example, a model type can define a workflow for entity-specific models to be trained and applied. In this example, the ML-based CEP engine 1500 trains as many models of the model type as there are known entities. The model type 1602 is defined by a model type definition 1700 stored in the model registry 1530. FIG. 17 is a block diagram illustrating an example of the model type definition 1700. The model type definition 1700 includes various configurations of how a machine learning model is to be trained or applied. The model type definition 1700 includes a code reference 1702 to a model execution code 1610 in the model execution code base 1534. The model type definition 1700 includes a model type identifier 1704, a model type name 1706, a processing mode specifier 1708 for the model training workflow, a processing mode specifier 1710 for the model deliberation workflow, a model input type configuration 1712 (e.g., one or more subscriptions to one or more event views as described in this disclosure), a model type topology 1714, or any combination thereof. A processing mode specifier specifies a processing mode, such as a real-time processing mode or a batch processing mode.

The model input type configuration 1712 specifies what event views (e.g., described in this disclosure) that the model type 1602 subscribes to. The event feature sets from the unbounded stream 1502 can be labeled with event view labels corresponding to the event views. The ML-based CEP engine 1500 can select the event feature sets received from the unbounded stream 1502 based on event view labels of the event feature sets (e.g., selecting only the event feature sets based on the event view labels corresponding to the event view subscriptions in the model input type configuration 1712). The ML-based CEP engine 1500 can call and execute an access interface associated with an event view subscription to organize the selected event feature sets and provide format/bind at least a subset of features within the selected event feature sets to a preferred data structure for a model-related process thread. The ML-based CEP engine 1500 can provide (e.g., stream via a data pipeline) the selected and formatted event feature sets to a model-related process thread of the model type 1602.

The model type topology 1714 specifies how the ML-based CEP engine 1500 groups and distributes model-specific process threads to, for example, the different computation workers 1526 in the distributed computation system 1520. The model type topology 1714 also specifies how the ML-based CEP engine 1500 groups and distribute the input data for the model-specific process threads of the same model type 1602. In some embodiments, the ML-based CEP engine 1500 groups and divides the input data for the model-specific process threads into mutually exclusive partitions. In other embodiments, the ML-based CEP engine 1500 groups the input data for the model-specific process threads into groups that have at least some overlap. For example, the model type topology 1714 can specify an entity type (e.g., a type associated with users, devices, systems, applications, process threads, network resource locators, or any combination thereof). In one specific example, if the model type topology 1714 specifies users as the entity type, the ML-based CEP engine 1500 groups the selected event feature sets by user groups. For example, the ML-based CEP engine 1500 can divide all known user entities into user groups, and divide the selected event feature sets by the user group or groups to which each event feature set corresponds. Consequently, the distributed computation system 1520 can assign a computation worker 1526 to process event feature sets corresponding to each group/partition.

One or more model states stored in the model store 1532 represent the machine learning model 1600. If the ML-based CEP engine 1500 trains and applies a single version of the machine learning model 1600, then a single model state represents the machine learning model 1600. In embodiments where the ML-based CEP engine 1500 trains multiple versions of the machine learning model 1600, each model version 1604 corresponds to a different model state stored in the model store 1532. In such embodiments, a group of model states corresponds to different model versions representing different training stages of the machine learning model 1600. In this case, the group of model versions is part of the same machine learning model 1600 because these model states are all trained for a specific entity or a specific purpose. For example, a machine learning model can be a label used to refer to the group of model states that are specifically trained by event feature sets corresponding to a single user and applied to event feature sets corresponding to that single user. Each model state of each model version can correspond to a different sequence of event feature sets used to train the model state (herein the different sequences of event feature sets correspond to different "training stages"). For another example, a machine learning model can be a label used to refer to the group of model states that are specifically trained by a specific type of anomalies and applied to that type of anomalies.

A model state is the output of a model training process thread 1606. The ML-based CEP engine 1500 instantiates a model deliberation process thread 1608 based on the model state. The model training process thread 1606 and the model deliberation process thread 1608 can be referred to as "model-specific process threads." The ML-based CEP engine 1500 can instantiate the model-specific process threads in the distributed computation system 1520. For simplicity, in parts of this disclosure, "instantiating" a model refers to instantiating the model deliberation process thread 1608 for a particular version of a machine learning model. Also for simplicity, in parts of this disclosure, "processing" input data "through" a model refers to processing the input data by the model deliberation process thread 1608 corresponding to the model.

The model execution code 1610 includes model program logic 1612 that describes data structures associated with model-related process threads and logic of the model-related process threads. The model program logic 1612 references model training process logic 1616 and model deliberation process logic 1618. The model training process logic 1616 defines how the model training process thread 1606 is to transform input data (e.g., one or more event feature sets) into a model state or an update to the model state. The model state is representative of a machine learning model or at least a version of a machine learning model (when there are multiple versions). As more input data is provided to the model training thread, the model training thread can update the model state. The model deliberation process logic 1618 defines how input data (e.g., one or more event feature sets) to a model deliberation process thread, configured by a model state, is to be transformed into security-related conclusions.

The model execution code 1610 also includes a model program template 1622, a model training program template 1626, and a model deliberation program template 1628. These program templates contain process logics that are shared amongst all types of machine learning models. These program templates also impose restrictions such that an author of the model program logic 1612, the model training process logic 1616, and the model deliberation process logic 1618 creates consistent process logics that can function in the ML-based CEP engine 1500. For example, the model program template 1622 can impose a restriction that any model program logic, such as the model program logic 1612, has to reference at least a model training process logic and a model deliberation process logic.

The architectural framework described in FIG. 16 enables real-time registration of a new model type. Real-time registration enables a network security administrator to deploy updates to the ML-based CEP engine 1500 or an ML-based batch processing engine without having to shut down the engines or any model-related process threads running thereon. The program templates and the workflow configurations using the model type definition 1700 provide a formal way to train and apply machine learning models. The use of the distributed filesystem 1514 facilitates persistence of model states while the model-related process threads are running in a distributed manner.

The ability to label the model version 1604 to a model state in the model store 1532 enables the ML-based CEP engine 1500 to maintain lineage between training data sets for a machine learning model and the model states produced therefrom. The versioning of the machine learning models enables simultaneous training of different machine learning models using the same data to produce model states corresponding to different windows of training data sets. The simultaneous training of the machine learning models further enables the ML-based CEP engine 1500 to "expire" model versions that have been trained with outdated data.

Figure 18:
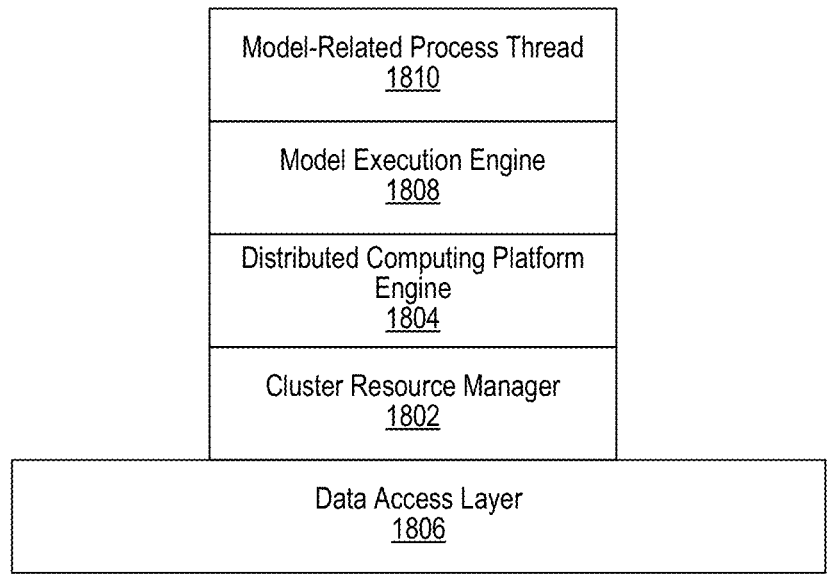
FIG. 18 is a block diagram illustrating an example system architecture for implementing the distributed computation system.

FIG. 18 is a block diagram illustrating a system architecture for implementing the distributed computation system 1520, in accordance with various embodiments. The distributed computation system 1520 implements a cluster resource manager 1802 (e.g., YARN). The cluster resource manager 1802 can function as an operating system for running data processing platform engines. For example, the cluster resource manager 1802 can implement a distributed computing platform engine 1804 (e.g., a real-time distributed computation platform, such as Storm or Spark Streaming). The processes running on the distributed computing platform engine 1804 can access various data access systems in a data access layer 1806. For example, the data access layer 1806 can provide access to a relational database, a graph database, a non-relational database, a time series database, the cache component 1512, the distributed filesystem 1514, or any combination thereof.

The distributed computing platform engine 1804 can implement a model execution engine 1808. The model execution engine 1808 can then initialize one or more model-related process threads 1810 (e.g., a model preparation thread, one or more model training threads and/or model deliberation threads) managed by the distributed computing platform engine 1804. Each model-related process thread 1810 is a sequence of program instructions related to training, deliberation, or preparation of a machine learning model. Each model-related process thread 1810 can be managed independently by the distributed computing platform engine 1804. For example, method 1900 illustrates a potential workflow of a model preparation thread; method 2000 illustrates a potential workflow of a model training thread, and method 2100 illustrates a potential workflow of a model deliberation thread. The data access layer 1806 can enable the model-related process threads 1810 to access model type definitions in the model registry 1530, model states in the model store 1532, and event feature sets in the cache component 1512.

Figure 19:
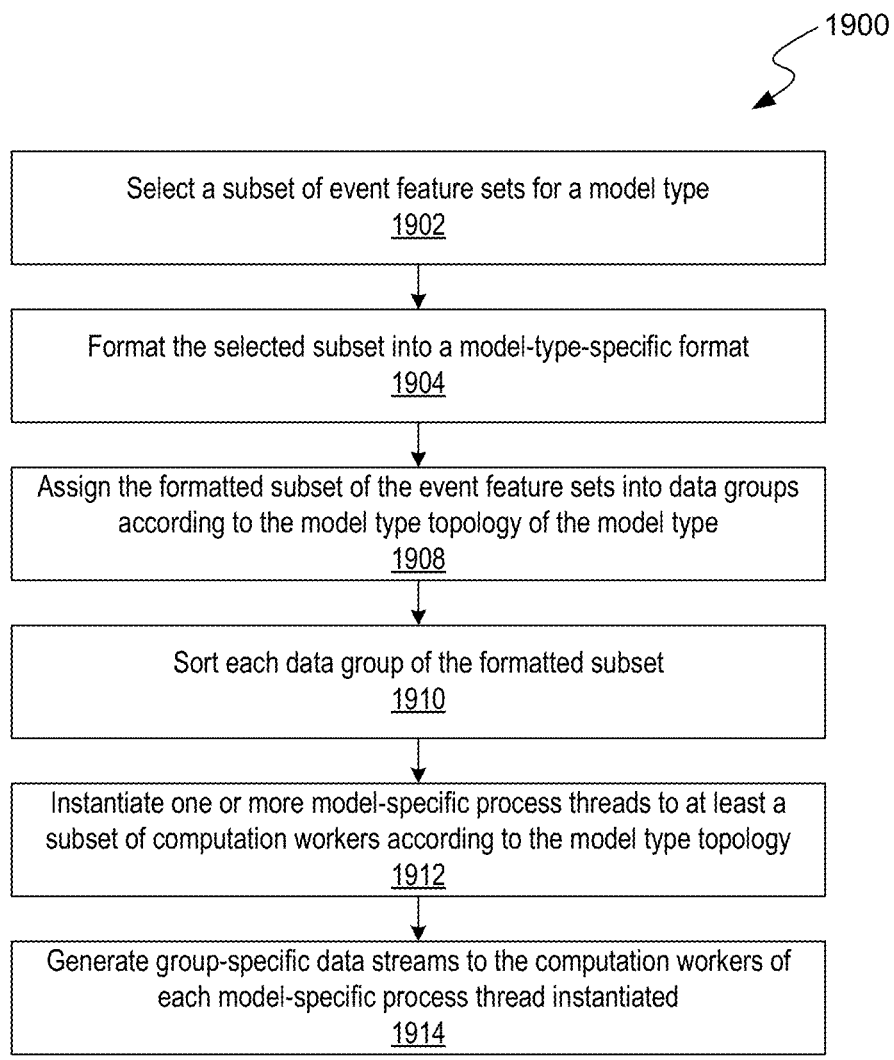
FIG. 19 is a flow diagram illustrating a method to execute a model preparation process thread.

FIG. 19 is a flow diagram illustrating a method 1900 to execute a model preparation process thread, in accordance with various embodiments. The model execution engine 1808 reads the model registry 1530 to determine which model types are assigned to the ML-based CEP engine 1500 (e.g., as opposed to an ML-based batch processing engine). The model execution engine 1808 executes the model preparation process thread. This process similarly applies to the model execution engine of the ML-based batch processing engine. The model execution engine 1808 running on the distributed computation system 1520 extracts the parameters of each model type definition to configure the workflows of that model type. The model execution engine 1808 can instantiate a model preparation process thread in the ML-based CEP engine 1500 for each model type that has either the processing mode specifier for training 1708 or the processing mode specifier 1710 designating the real-time processing mode. Each model preparation process thread can initiate multiple model-specific process threads corresponding to its model type. Accordingly, the ML-based CEP engine 1500 can be concurrently training and/or deliberating multiple machine learning models of different model types.

At step 1902, the model preparation process thread selects a subset of event feature sets in the cache component 1512 for the model type. The model preparation process thread can select the subset from the most recent event feature sets (e.g., a real-time time slice) that are yet to be processed by the model execution engine 1808 or any other model preparation process threads. For example, the model preparation process thread selects and filters the event feature sets based on event view labels in the event feature sets. In some embodiments, the model preparation process thread can request the subset from the messaging platform 1518. The model preparation process thread can select the subset that has event view labels corresponding to event view subscriptions in the model type associated with the model preparation process thread. The model input type configuration 1712 of the model type specifies the event view subscriptions. At step 1904, the model preparation process thread can format the selected subset into a model-type-specific format. A binding process specified by one or more access interfaces (described above in this disclosure) respectively associated with the event view subscriptions can configure the model-type-specific format. In some embodiments, the formatting includes removing some feature fields from the selected subset.

At step 1908, the model preparation process thread can assign (e.g., partition) the formatted subset of event feature sets into data groups (also referred to as "data partitions") according to the model type topology 1714 of the model type. The model type can correspond to an entity type (e.g., users, devices, systems, resource locators, applications, process threads, or anomalies) or a purpose type (e.g., for global beaconing detection). A global purpose-specific model type can have a single model training process thread and/or a single model deliberation process thread. For example, the model preparation process thread can determine the number of known entities of the entity type. The model preparation process thread can partition the event feature sets in the formatted subset into a number of data groups corresponding to the number of available computation workers for the model type. Each data group corresponds to the number of entities equal to the total number of known entities divided by the number of data groups.

For example, the model type topology 1714 may specify a user level topology. The model preparation process thread can request the total number of users from the target-side computer system. Based on the total number of available computation workers in the distributed computation system 1520, the model execution engine 1808 can evenly assign computation workers to each model type. Then, the model preparation process thread can assign a number of data groups based on the available computation workers for its model type. Each available computation worker can be assigned a data group. For example, there can be five available computation workers and 20 known users. In this example, the model preparation process thread can assign a data group corresponding to 4 users to each computation worker. Event feature sets corresponding to these 4 users would be part of the data group.

In some embodiments, the model preparation process thread can perform a consistent hash on the formatted subset of event-based features. The data group assignment can be based on the consistent hash, such as distributed hash tables (DHTs). Consistent hashing is a kind of hashing such that when a hash table is resized, and consistent hashing is used, only K/n keys need to be remapped on average, where K is the number of keys, and n is the number of slots. In contrast, in most traditional hash tables, a change in the number of array slots causes nearly all keys to be remapped. The consistent hashing concept applies to DHTs. DHTs use consistent hashing to partition a keyspace among a distributed set of nodes (e.g., the computation worker corresponding to the data group), and additionally provide an overlay network that connects nodes such that the node responsible for any key can be efficiently located.

Optionally, at step 1910, the model preparation process thread sorts each data group of the formatted subset (e.g., by timestamps of the formatted event feature sets). This step is executed if the order of the formatted event feature sets is part of model training or model deliberation. For example, time sequence prediction models, such as probabilistic suffix trees (PSTs), are trained based on an ordered sequence of event features. The data intake and preparation stage may not have received raw event data in temporal order from the target-side computer system. The target computer network may not have recorded the raw event data in temporal order. In these cases, step 1910 can ensure, via sorting, that groups of the formatted subsets are in order.

At step 1912, the model preparation process thread instantiates one or more model-specific process threads to at least a subset of the computation workers 1526 according to the model type topology 1714. In some embodiments, each computation worker runs only model-specific process threads of one model type. In some embodiments, each computation runs only model-specific process threads of one model type and either only model training process threads (e.g., corresponding to a model training workflow) or only model deliberation process threads (e.g., corresponding to a model deliberation workflow). In the ML-based CEP engine 1500, when the processing mode specifier 1708 corresponds to a real-time processing mode, the model preparation process thread can schedule one or more model training process threads to run on the subset of computation workers 1526. Also in the ML-based CEP engine 1500, when the processing mode specifier 1710 corresponds to a real-time processing mode, the model preparation process thread can schedule one or more model deliberation process threads to run on the subset of computation workers 1526. In the ML-based batch processing engine, when the processing mode specifier 1708 corresponds to a batch processing mode, the model preparation process thread can schedule one or more model training process threads to run on a subset of computation workers in a batch processing cluster. Also in the ML-based batch processing engine, when the processing mode specifier 1710 corresponds to a batch processing mode, the model preparation process thread can schedule one or more model deliberation process threads to run on a subset of computation workers in the batch processing cluster.

The model preparation process thread can determine, based on the model type topology 1714, how many model training process threads of the model type to instantiate for the model training workflow and/or how many model deliberation process threads for the model deliberation workflow. For example, the model type topology 1714 can correspond to an entity type (e.g., users, devices, applications, process threads, network resource locators, systems, anomalies, etc.) and/or a purpose-type. The number of model-specific process threads (e.g., training or deliberation) can match the number of known entities of the entity type. The model preparation process thread can identify the known entities and instantiate a model-specific process thread corresponding respectively to the known entities. The model preparation process thread can query the target-side computer system in the target computer network for the identities and/or the total number of the known entities. In some embodiments, the target-side computer system provides this information on its own and this information is saved in the cache component 1512 or the distributed filesystem 1514.

At step 1914, the model preparation process thread generates group-specific data streams to the computation workers of each model-specific process thread instantiated in step 1912. The group-specific data streams correspond to the assigned data groups in step 1908. The model preparation process thread can configure the messaging platform 1518 to send appropriate event feature sets in the data group through the group-specific data streams. The model preparation process thread can execute steps 1912 and 1914 concurrently.

Topology

In several embodiments, the ML-based CEP engine 1500 determines the assignments of the group-specific data streams and the model-specific process threads to the computation workers 1526 based on the model type topology 1714. These assignments can be referred to as topology-based assignments. The topology-based assignments can be used to optimize model-specific process threads regardless of whether the ML-based CEP engine 1500 or an ML-based batch processing engine is used as an execution platform. Here, the model type topology is decoupled from the execution platform unlike traditional methodologies. The topology-based assignments maintain a directed acyclical graph (DAG) structure that allows for dynamic execution of model-specific process threads and management of the input data dependencies of these model-specific process threads. For example, the DAG approach enables model-specific process threads to freely move, start, or stop amongst the computation workers 1526 based on the performance of the machine learning models. The DAG approach further enhances security, scalability (e.g., the ability to employ services for caching, the load-balancing, replication, or concentration of data streams), and modularity (e.g., updates to any particular model-specific process thread only affect a limited portion of the computation workers 1526). The DAG approach enables process replication, data redistribution, proxy processes or groups of proxy processes, integration of subsystems, and/or redundant connections to be added in the distributed computation system 1520.

Figure 20:
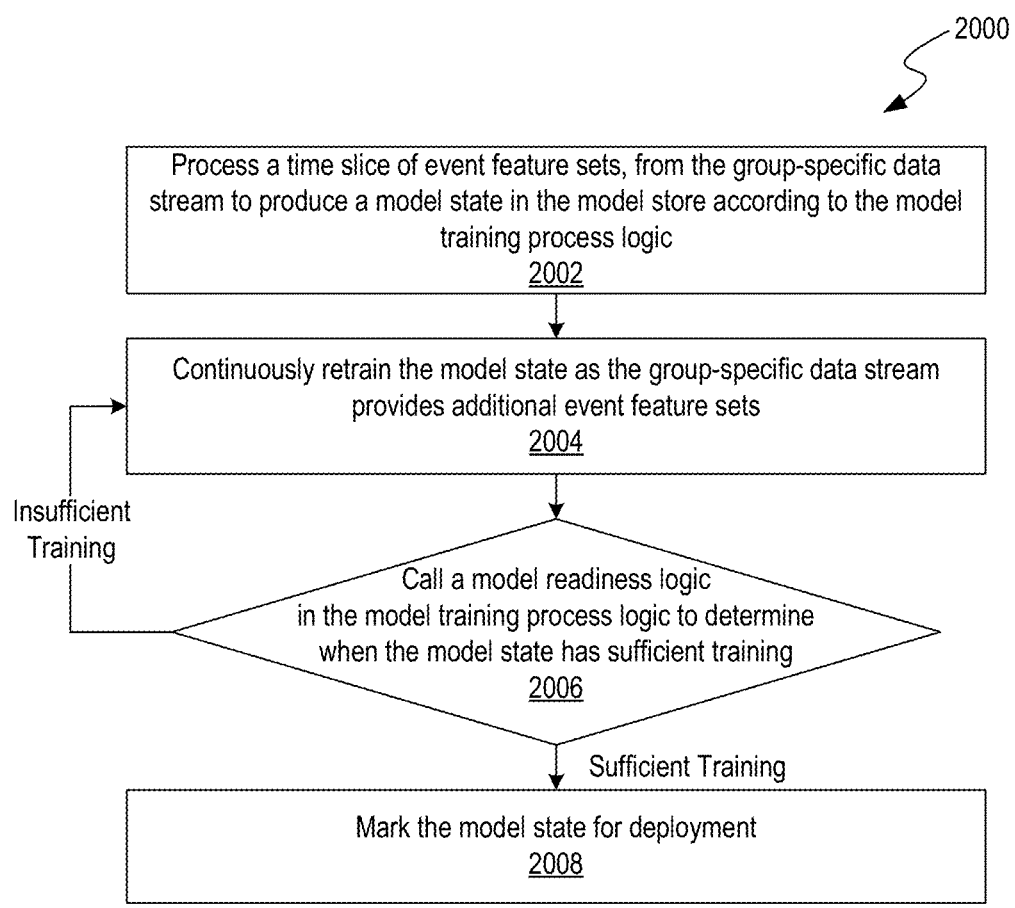
FIG. 20 is a flow diagram illustrating a method to execute a model training process thread.

FIG. 20 is a flow diagram illustrating a method 2000 to execute a model training process thread, in accordance with various embodiments. A computation worker executes the model training process thread. In some embodiments, the computation worker execute multiple model training process threads associated with a single model type. In some embodiments, the computation worker executes multiple model-specific process threads associated with a single model type. In some embodiments, the computation worker executes multiple model-specific process threads associated with different model types. If a model state corresponding to the model training process thread is not already in the model store 1532, at step 2002, the model training process thread processes a time slice of event feature sets, from the group-specific data stream described in step 1914 of FIG. 19, to produce a model state in the model store 1532 according to the model training process logic 1616. The time slice can correspond to an event or a sequence of events observed at the target computer network. The time slice can be the most recent event feature set or sequence of event feature sets. The model training process thread can save the model state in the model store 1532 (e.g., in the distributed filesystem 1514 or the cache component 1512).

At step 2004, the model training process thread continuously retrains the model state as the group-specific data stream provides additional event feature sets. In several embodiments, the model training process logic 1616 describes a single-pass training process logic. That is, the model training operates without recursion or iteration over the same input data. In some embodiments, the model training process logic 1616 involves an incremental training process. For example, the model training process thread isolates a portion of the model state affected by the time slice of event feature sets and re-trains only the portion of the model state. Model types with incremental property enable the ML-based CEP engine 1500 to execute in real-time because of reduction in resource consumption during model training.

At step 2006, the model training process thread calls a model readiness logic in the model training process logic 1616 to determine when the model state has sufficient training. The model readiness logic can include measuring how many event feature sets have been used to train the model state; measuring how long the model state has been in training in real-time; whether the model state is converging (i.e., not changing within a threshold percentage despite additional training); or any combination thereof. Different model types can have different model readiness logics. At step 2008, when the model readiness logic determines that the model state has sufficient training, the model training process thread marks the model state for deployment.

Figure 21:
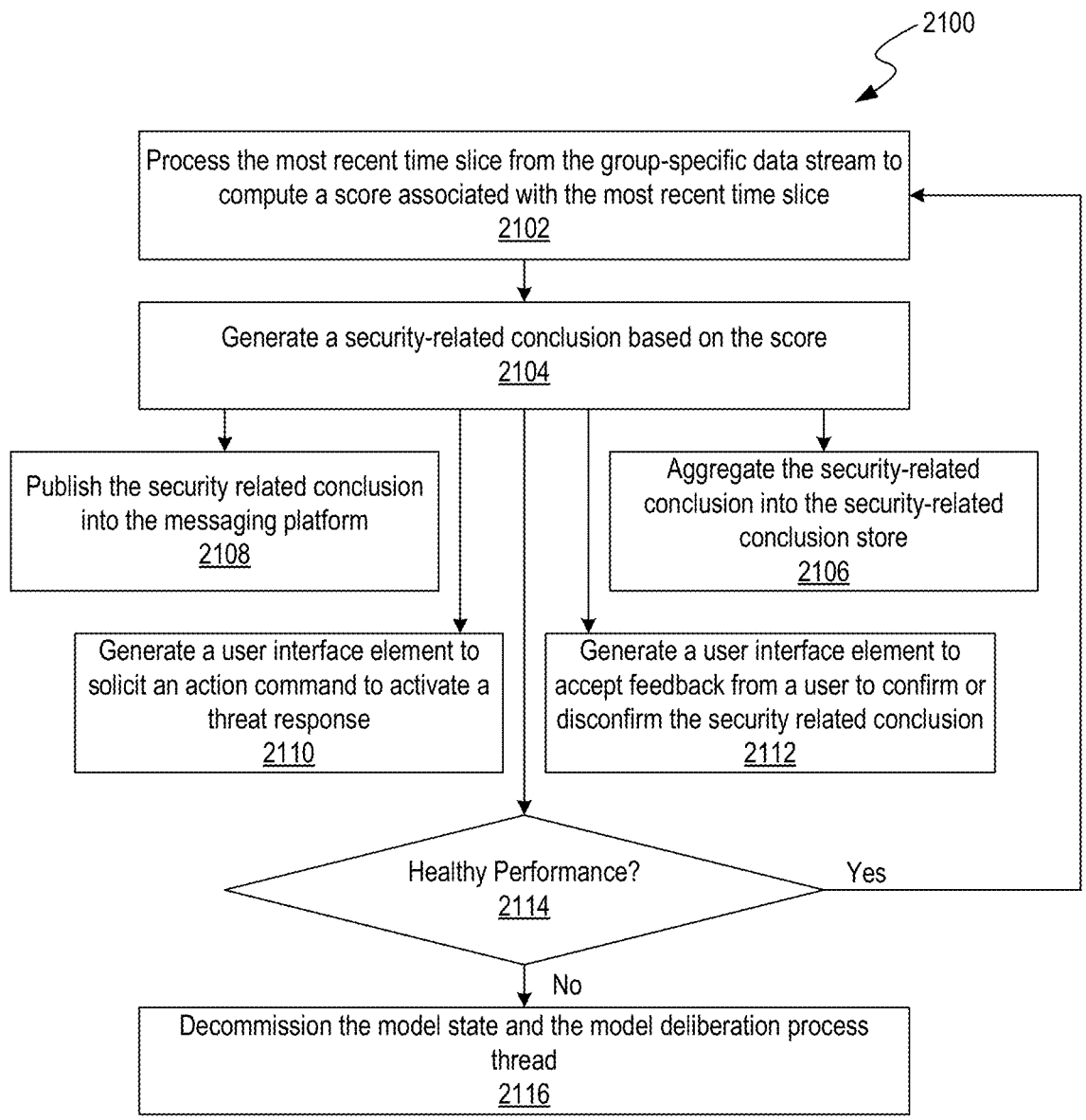
FIG. 21 is a flow diagram illustrating a method to execute a model deliberation process thread.

FIG. 21 is a flow diagram illustrating a method 2100 to execute a model deliberation process thread, in accordance with various embodiments. A computation worker executes the model deliberation process thread. In some embodiments, the computation worker executes multiple model training process threads associated with a single model type. In some embodiments, the computation worker executes multiple model-specific process threads associated with a single model type. In some embodiments, the computation worker executes multiple model-specific process threads associated with different model types. At step 2102, the model deliberation process thread processes the most recent time slice from the group-specific data stream to compute a score associated with the most recent time slice. The most recent time slice can correspond to an event or a sequence of event observed at the target computer network. In some embodiments, the group-specific data stream used by the model deliberation process thread is also used by a corresponding model training process thread for the same entity. That is, the model training process thread can train a model state of an entity-specific machine learning model by processing a previous time slice of the group-specific data stream. The model execution engine 1808 can initiate the model deliberation process thread based on the model state while the model training process thread continues to create new versions (e.g., new model states). In some embodiments, the model deliberation process thread can reconfigure to an updated model state without pausing or restarting.

At step 2104, the model deliberation process thread generates a security-related conclusion based on the score. The security-related conclusion can identify the event or the sequence of events corresponding to the time slice as a security-related anomaly, threat indicator or threat. In one example, the model deliberation process compares the score against a constant threshold and makes the security-related conclusion based on the comparison. In another example, the model deliberation process compares the score against a dynamically updated baseline (e.g., statistical baseline) and makes the security-related conclusion based on the comparison.

At step 2106, the model deliberation process thread aggregates the security-related conclusion into the security-related conclusion store 1542. The aggregation of the security-related conclusions can be used in an analytic platform of the ML-based CEP engine 1500. In some embodiments, the security-related conclusion store 1542 is backed up to the distributed file system 1514. Optionally, at step 2108, the model deliberation process thread publishes the security-related conclusion to the messaging platform 1518, such that another model deliberation process thread or model training process thread can utilize the security-related conclusion.

When the security-related conclusion indicates that a potential security breach (e.g., a threat or a threat indicator) has occurred, at step 2110, the model deliberation process thread can generate a user interface element to solicit an action command to activate a threat response. In one example, the user interface element triggers the action command for sending a message to the target-side computer system to demand termination of a problematic application, blocking of specific network traffic, or removal of a user account. In some embodiments, at step 2112, the model deliberation process thread can generate a user interface element to accept feedback from a user to confirm or reject the security-related conclusion. The model execution engine 1808 can provide the feedback to a model training process thread to update the model state used to configure the model deliberation process thread.

The model deliberation process thread can check, at step 2114, its own performance health. For example, the model deliberation process thread can compare the computed score or the generated security-related conclusion against that of other model deliberation process threads to determine if there are significant deviations or biases. The model deliberation process thread can also check to see if there is an unusual bias in its production of security-related conclusions. For example, if more than a threshold percentage of its security-related conclusions correspond to anomalies or threats, then the model deliberation process thread sets its own health status to failure. Based on the conclusion in step 2114, the model deliberation process thread can decommission itself at step 2116. In some embodiments, a separate process thread can perform steps 2114 and 2116 by externally monitoring the health status of the model deliberation process thread.

The method 2100 enables dynamic deployment of a model state. For example, the machine learning model associated with the model deliberation process thread can have multiple versions. Step 2102 can initially be configured by a model state corresponding to an active version of the machine learning model. However, while the active version is used to configure the model deliberation process thread, a model training process thread can train another version (e.g., another model state) of the machine learning model in parallel. When this other version is ready for active deployment (e.g., has sufficient training), the model deliberation process can "live swap" in the other version as the active version (e.g., to compute the score for subsequent time slices from the group-specific data stream). Live swapping involves re-configuring the model deliberation process thread with the other model state without terminating the model deliberation process thread.

VI. Batch Processing Path Considerations

In some embodiments, the security platform includes two event processing engines in different paths—a real-time path and a batch path. The event processing engine in the real-time path operates in a real-time mode to process unbounded, streaming data that enters the security platform. The event processing engine in the batch path operates in a batch mode to process batches of stored, historical event data. Because the batch event processing engine tends to have more time to process data but also tends to handle a larger amount of data (e.g., stored in HDFS™), it is desirable for an event processing engine implemented on the batch path be able to (1) interact with the distributed data cluster that stores the data, instead of moving or copying the data into the platform; and (2) utilize various programming models that are optimized for processing and generating large data sets in a parallel, distributed manner on a computer cluster. One example of such a programming model is MapReduce™.

Therefore, in one aspect, one of the data connectors that can be used by the security platform 300 introduced here is a specialized connector (e.g., the HDFS™ connector) that can issue instructions (e.g., a query), operations, or otherwise interact with the non-relational database that stores the data (e.g., HDFS™). In some embodiments, because the downstream processing may be dependent on the order of the events (e.g., for building a behavioral baseline for a user or a device), the HDFS connector can to retrieve the stored event data in the order that the event takes place.

In another aspect, the machine learning models utilized by the batch event processing engine can be "reducible," in order to be compatible with parallel, distributed types of operations (e.g., MapReduce™ operations). As used herein, a reducible model is a model that can be mapped into multiple copies for processing data. Each copy of the model only processes (e.g., for training and/or scoring) a particular subset of a larger set of data. Then, all the information generated by the copies of the model can be reduced back to the model, achieving the same result as if a single copy of the model has processed the entire data set. That is, a reducible model can process data in a parallel manner. Note that, depending on the model, some models may be reducible in their training phase but not their scoring phase, some models may be reducible in their scoring phase but not their training phase, and some models may be reducible in both training and scoring phases.

Generally, the batch event processing engine introduced here can cooperate with the HDFS™ connector to access data stored in the HDFS™. To achieve this functionality, in some embodiments, the platform can include (e.g., in the batch path) a job controller and a directory catalog. The job controller can function as the batch event processing engine's manager and works with the connector. For example, the job controller can cause the connector to run a query against the HDFS database, and select a set of the returning event data to be processed by the batch event processing engine. The query can, for example, specify a time range, and/or specify that the result should be ordered by event time.

In addition, in some embodiments, certain kinds of log files are preferably to be processed before others, and the HDFS connector can select to retrieve those log files that need to be processed first. Typically, data of events that have richer information can be retrieved first in order to increase the accuracy of the overall security analysis. For example, to enable identity resolution, device resolution, and session tracking, those log files with device information (e.g., DHCP) are preferably processed first, followed by log files which associate user data with devices (e.g., AD or VPN), followed by all other files. Additionally, or alternatively, the query that is sent by the connector can specify that the retrieved files (e.g., representing events) should be ordered by their formats (e.g., DHCP, then AD/VPN, then others).

In response to the retrieved data, the job controller then launches a job for the batch event processing engine (e.g., in Spark™) with the retrieved files, tracks the analysis progress, and marks the events as analysis completed or analysis failed. Once the analysis is completed, then the job controller can perform other tasks, such as exporting the result of identity resolution (e.g., into Redis™), exporting the time-series data (e.g., into OpenTSDB™), or pushing the anomalies raised by the batch event processing engine into a messaging system (e.g., Kafka™).

The job controller can start the aforementioned file retrieval process based on a time schedule. For example, the file retrieval process can be set to run every hour, every N hours, every N days, and so forth. After the connector retrieves the files, the batch of files is passed to the job controller, which in turn initiates the batch event processing engine to analyze the files.

The directory catalog is a database (e.g., coupled to the HDFS) that enables the job controller (working with the connector) to determine which files to parse and the order in which the files get parsed. The following is a specific example of how a specialized connector (e.g., the HDFS connector) introduced here can interact with a distributed database storage system (e.g., HDFS™) to retrieve files. In this example, the connector can determine a time for the first event in a file in the HDFS. The file records a number of events. The time for the first event can be used by the job controller to determine whether it should retrieve this file and process it for anomaly/threat detection.

When the connector (e.g., HDFS connector) is activated to retrieve files of a particular time range (e.g., each file representing a number of events that take place within the particular time range), the connector first refers to a table in the database ("directoryCatalog") to check if there is any row in the table (e.g., indicating a file) that still needs to process (e.g., which may be a leftover from a previous run). The connector also stores the last time it was run in the database ("lastRunTime").

If the connector does not find any files in the directory-Catalog, then the connector crawls the currently specified directory (that corresponds to the particular time range), to see if there is any file to process. When the connector encounters a file, the connector retrieves a modification time ("mtime") of the file, and discards the file if the file is earlier than the lastRunTime. Otherwise, the connector parses the file to get the time of the first event from the file. In one example, the connector can parse the file with a parser that corresponds to the file's data format, and extract only the time from the event. In this manner, the connector can continue to process a few select events in the file and determine if the events are recorded in the file in an ascending order (or in any order).

Thereafter, if the connector determines that the events are recorded in an ascending order (within a tolerance of a few seconds), then the connector can stop parsing and return the time of the first event. Conversely, if the events are stored in a descending order, the connector then seeks toward (e.g., to a few kilobytes short of) the end of the file and retrieves the time of the first event from there. In the case that the connector determines that the events are recorded in an unsorted manner, the connector parses the entire file and returns the lowest time found as the event time of the first event recorded in the file. Then, the connector adds an entry in the database with the filename, time of the first event and other status (e.g., retrieved).

The batch event processing engine can perform analysis based on information that is not available in the real-time path. An example of such information is the composite relationship graph (which is described in greater detail in a section below). Accordingly, the batch event processing engine can process a projection (portion) of the composite graph in utilizing some of the machine learning models.

In some embodiments, the batch event processing engine can first locate the composite relationship graph that is associated with the historic event data. Then, based on the requirement of a particular machine learning model, the batch event processing engine can obtain a projection of the composite relationship graph. The composite relationship graph can include information from the data intake and preparation stage (e.g., per-event relationship graph) and information generated by the real-time event processing engine processing the unbounded stream of event data (e.g., detected anomalies, which can be added to the per-event relationship graph of the anomalous event).

In some examples, a projection of the composite relationship graph includes a graph of users associated with machines, to facilitate tracking (by the particular machine learning model) of user lateral movement. In some examples, the projection includes a graph that associates entities identified as having security-related issues to facilitate correlating (by the particular machine learning model) user anomalies so as to identify sophisticated threats. In some examples, the projection includes a graph of website visitation activities of users to facilitate identification (by the particular machine learning model) of commonly accessed websites by potentially security-compromised users. More details on the models that can utilize projections of the composite relationship graph are discussed below with respect to anomaly and threat models.

VII. Model State Sharing

As discussed above, one of the features of the security platform introduced here is the capability to share information between different analytics entities (including, for example, an event processing engine such as the CEP engine). Information or knowledge sharing in this manner can be especially useful in detecting unknown security-related anomalies and threats.

Among other reasons, the big-data based, highly modularized characteristics of the security platform architecture introduced here present many opportunities for different components to benefit from intelligence sharing. For example, in certain implementations, as mentioned above, the security platform can include at least two event processing engines—one event processing engine operating in a real-time mode to process unbounded, streaming data that enters the security platform, and the other event processing engine operating in a batch mode to process batches of historical event data. In another example, a security platform deployed in an environment (e.g., an organization or an enterprise) may communicate with another security platform deployed in a different environment. All these event processing engines, because of their different operating modes, different data input, and/or different deployed environment, can potentially benefit from the knowledge gained by each another.

Thus, with the aforementioned discussion regarding the CEP engine's functionalities in mind, introduced here is a particular way to configure the security platform to further enhance anomaly and threat detection. Specifically, the security platform's architecture is configured so that the model store (which stores one or more groups of model states, each group corresponding to versions of an entity-specific or purpose-specific machine learning model) that is used in the security platform can be shared. As used herein, the phrase "sharing a model state" means more than one engine sharing the same version of a model. This notion should be distinguished from the notion of "sharing a model type," which implies that more than one engine can share the model registry (which stores the model type) in the security platform. Sharing a model type can enable two engines to use or produce machine learning models that have the same model execution logic (e.g., training logic and/or deliberation logic) for different purposes. The general notion of "sharing a model" can be referring to either or both of these notions, whichever is made apparent by the context.

By allowing different engines to access the model store in the security platform, this configuration enables the real-time event processing engine and the batch event processing engine to share a model state of a particular machine learning model. Then, for example, a first engine can first use a particular machine learning model to process a first set of data to produce a score for detecting a network security-related issue, and in doing so, the particular model is trained by the first engine with the first set of data, thereby creating a model state reflecting a version of such model. Thereafter, a second engine uses the same particular machine learning model to process a second set of data for producing a score for detecting a network security-related issue. With the model state sharing, the second engine can use the version of the model that has been trained by the first engine to process the second set of data, thereby leveraging the knowledge gained by the first engine to discover a security-related issue in the second set of data. Note that, in certain embodiments, this model state sharing is non-blocking, meaning that a model state can be read and/or updated by any engine at any time.

Figure 22:
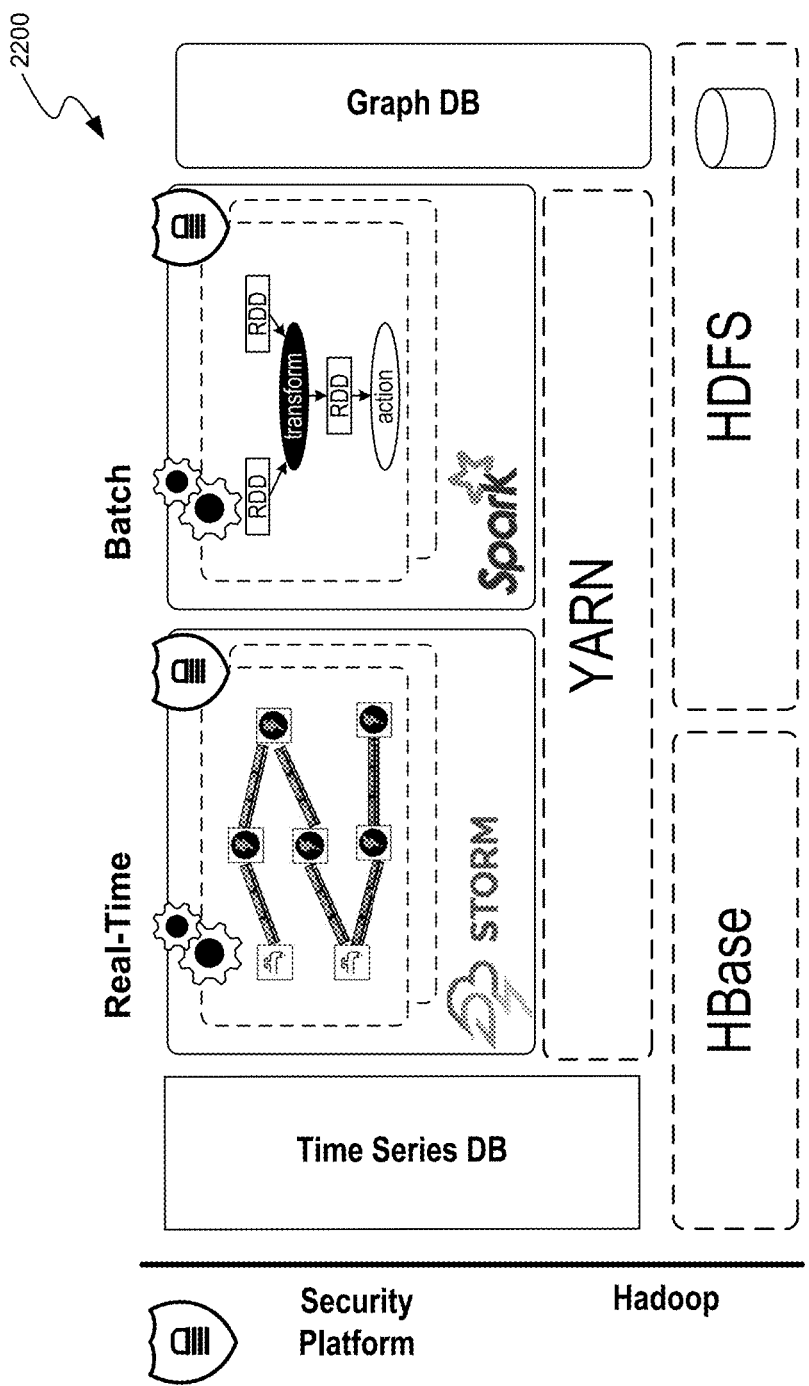
FIG. 22 shows a diagram of an example architecture of the security platform in which sharing of model state between real-time and batch processing paths can be implemented.

FIG. 22 shows of an example architecture 2200 of the security platform, in which the model state sharing technique introduced here may be implemented. As shown, the security platform can be implemented by using various components in a big data oriented software framework, such as Hadoop™. The framework enables the components in the platform to be able to communicate with each other. As shown in FIG. 22, the example security platform includes a real-time event processing engine implemented on a first processing system of the platform. In the illustrated example, this first processing system is implemented using Apache Storm™. In other embodiments, the first processing system could be implemented by using Apache Spark Streaming. The real-time event processing engine is configured to process an unbounded stream of event data to detect a plurality of network security-related issues. In a manner described above, the real-time event processing engine can utilize various machine learning models to perform anomaly and threat detection. In doing so, the real-time event processing engine trains the machine learning models, and in some embodiments, establishes behavioral baselines for various specific entities.

Similar to the real-time event processing engine, the example security platform includes a batch event processing engine on a second processing system of the platform. In the illustrated example, this first processing system is implemented using Apache Spark™. The batch event processing engine is configured to process a batch of historic event data to detect a plurality of network security-related issues. Like the real-time event processing engine, the real-time event processing engine can also utilize machine learning models, establish behavioral baselines, and so forth.

In accordance with some embodiments, the security platform can be configured to enable sharing of model states between the real-time processing engine and the batch processing engine for network security anomaly and threat detection. As described above with respect to the CEP engine and the machine learning models, a particular machine learning model can be configured to process a time slice of data to produce a score for detecting a network security-related issue, and with model state sharing, the size of the time slice can be controlled by whichever event processing engine currently utilizes the particular machine learning model. For example, if the real-time processing engine is utilizing the model, then the time slice can be set by the real-time processing engine to real-time (e.g., event-by-event as the data streams into the platform). Similarly, if the batch processing engine is utilizing the model, the time slice can be set by the batch processing engine to whichever time period length is suitable for grouping the historic events (i.e., events that are already stored as opposed to being currently streamed) into batches for processing.

In this way, the shared model state can form a positive intelligence feedback loop between the two engines. From the batch event processing engine's perspective, this loop enables the batch event processing engine to use knowledge gained by the real-time event processing engine to discover a security-related issue in the historic event data that is undetectable by the batch event processing engine without the knowledge. More specifically, the shared model state enables the batch event processing engine to use new knowledge gained by the real-time event processing engine from processing the unbounded stream of event data, to inspect the historic event data to discover a security-related issue that would be undetectable by the batch event processing engine without that new knowledge. The new knowledge is knowledge gained after the last time the batch event processing engine performs historic event data inspection using the particular machine learning model, and therefore it is valuable because the batch event processing engine would not have this new knowledge but for the model state sharing.

Further, after the batch event processing engine performs an analysis on the historic event data to detect a security-related issue, the analysis may result in acquisition of new knowledge of event data. For the benefit of the real-time event processing engine, the batch event processing engine can update the shared model state of the particular machine learning model to incorporate the new knowledge. In this way, by using the shared model state, the real-time event processing engine can perform an inspection of newly streamed event data based on this new knowledge gained by the batch event processing engine.

The behavioral baseline establishment technique described above (see discussion of UBA/UEBA) can also be integrated with the model state sharing technique here. That is, in addition or as an alternative to sharing model states, a behavioral baseline established by one engine (e.g., the real-time event processing engine) by using a particular machine learning model can be shared along with the model state with another engine (e.g., the batch event processing engine). With both the model state and the behavioral baseline established, one engine can take fuller advantage of the knowledge gained by another engine. In one example, a particular machine learning model is trained by the real-time event processing engine, and a behavioral baseline is established for a specific entity, also by the real-time event processing engine. Utilizing the techniques introduced here, the batch event processing engine can locate, in the batch of historic event data, data representing a plurality of events that are associated with the specific entity. Then, the batch event processing engine can perform a behavioral analysis of the entity to detect a behavioral anomaly using the same version of machine learning model that has been trained by the real-time event processing engine to compute a degree of behavioral deviation, as compared to the behavioral baseline specific to the entity.

Note that the behavioral anomaly analysis is not limited in application to comparing a specific entity with its past behavioral baseline; it can also include comparing a specific entity's behavior against the behavior of other similar entities. In other words, other similar entities' behaviors can be used for establishing a behavioral baseline for a specific entity. Therefore, the combination of the behavioral baseline establishment technique and the model state sharing technique can be particularly useful to detect a specific entity's anomalous behavior when historical data of that specific entity is not available (e.g., a new employee joins the enterprise).

In addition, the mechanism of sharing the model state also enables, at least indirectly, updating a machine learning model based on the user feedback when the security platform receives such user feedback regarding a determination of a detected security-related issue. For example, such an update can be performed by one of the engines to the model state, and through the shared model state, the effect of that feedback can be propagated into the other engine's anomaly and threat detection processes.

VIII. Anomalies, Threat Indicators, and Threats

As mentioned above, the security platform 300 detects anomalies in event data, and further detects threats based on detected anomalies. In some embodiments, the security platform also defines and detects an additional type of indicator of potential security breach, called threat indicators. Threat indicators are an intermediary level of potential security breach indicator defined within a hierarchy of security breach indicators that includes anomalies at the bottom level, threat indicators as an intermediate level, and threats at the top level.

Figure 23:
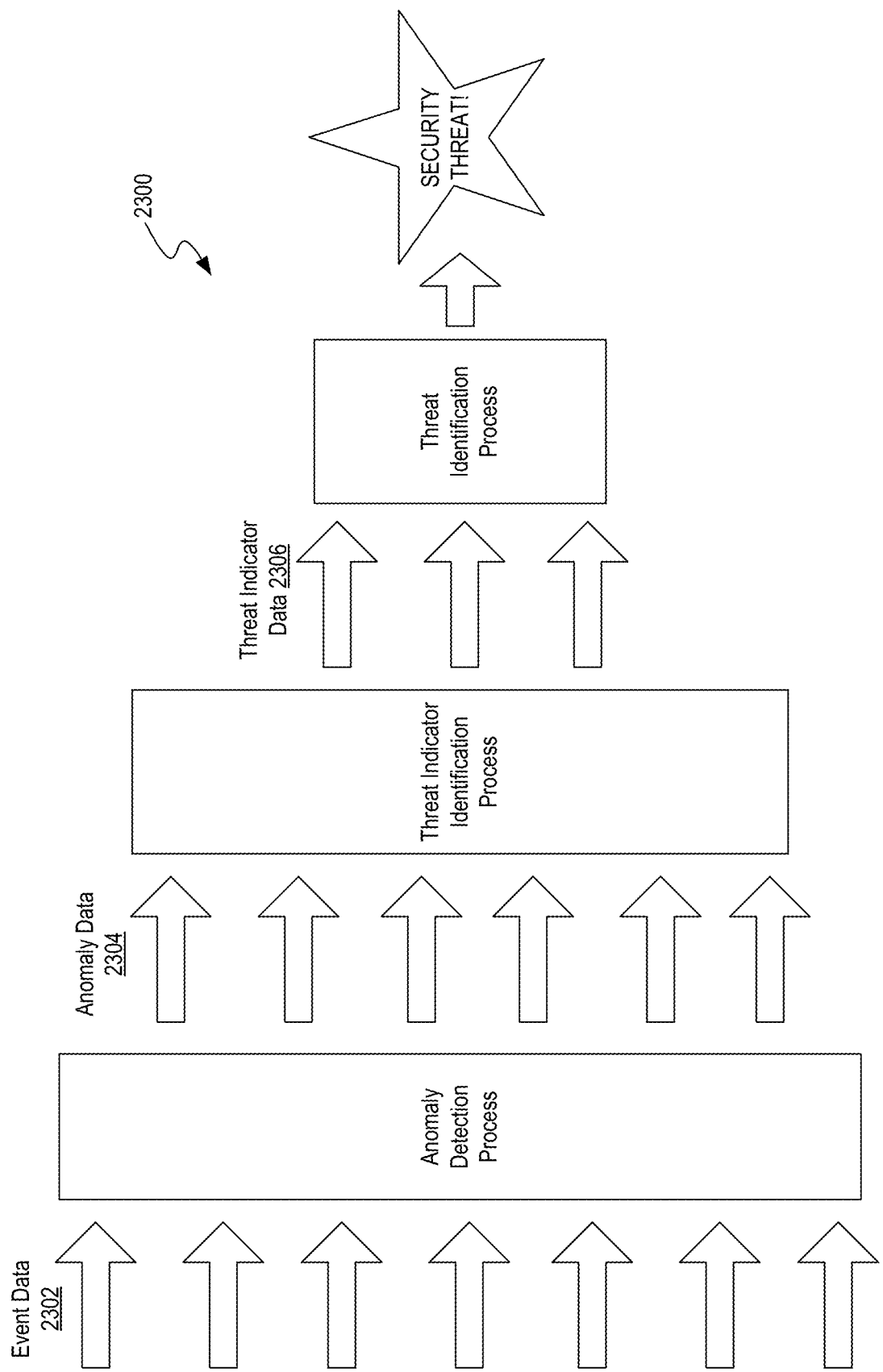
FIG. 23 is flow diagram illustrating at a high level, the processing hierarchy of detecting anomalies, identifying threat indicators, and identifying threats.

FIG. 23 is flow diagram illustrating at a high level, a processing hierarchy 2300 of detecting anomalies, identifying threat indicators, and identifying threats with the security platform 300. Reducing false positives in identifying security threats to the network is one goal of the security platform. To this end, flow diagram describes an overall process 2300 by which large amounts of incoming event data 2302 are processed to detect anomalies. The resulting anomaly data 2304 comprising a plurality of anomalies across a computer network is then further processed to identify threat indicators. This identification of threat indicators can be conceptualized as an intermediate step between detecting anomalies and identifying security threats to a computer network. As shown, the threat indicator data 2306 comprising a plurality of threat indicators identified across a computer network is further processed to identify a security threat or threats.

As discussed above, an anomaly represents a detected variation from an expected pattern of behavior on the part of an entity, which variation may or may not constitute a threat. An anomaly represents an event of possible concern and possibly may be actionable or warrant further investigation. A detected anomaly in the activity on a computer network is often associated with one or more entities of the computer network, such as one or more physical computing devices, virtual computing devices, users, software modules, accounts, identifiers, and/or addresses. An anomaly or a set of anomalies may be evaluated (e.g., scored) together, which evaluation may result in a determination of a threat indicator or a threat. Threat indicators represent an escalation of events of concern and are evaluated to identify if a threat to the security of the network exists. As an example of scale, hundreds of millions of packets of incoming event data from various data sources may be processed to yield 100 anomalies, which may be further processed to yield 10 threat indicators, which may again be further processed to yield one or two threats.

Figure 24:
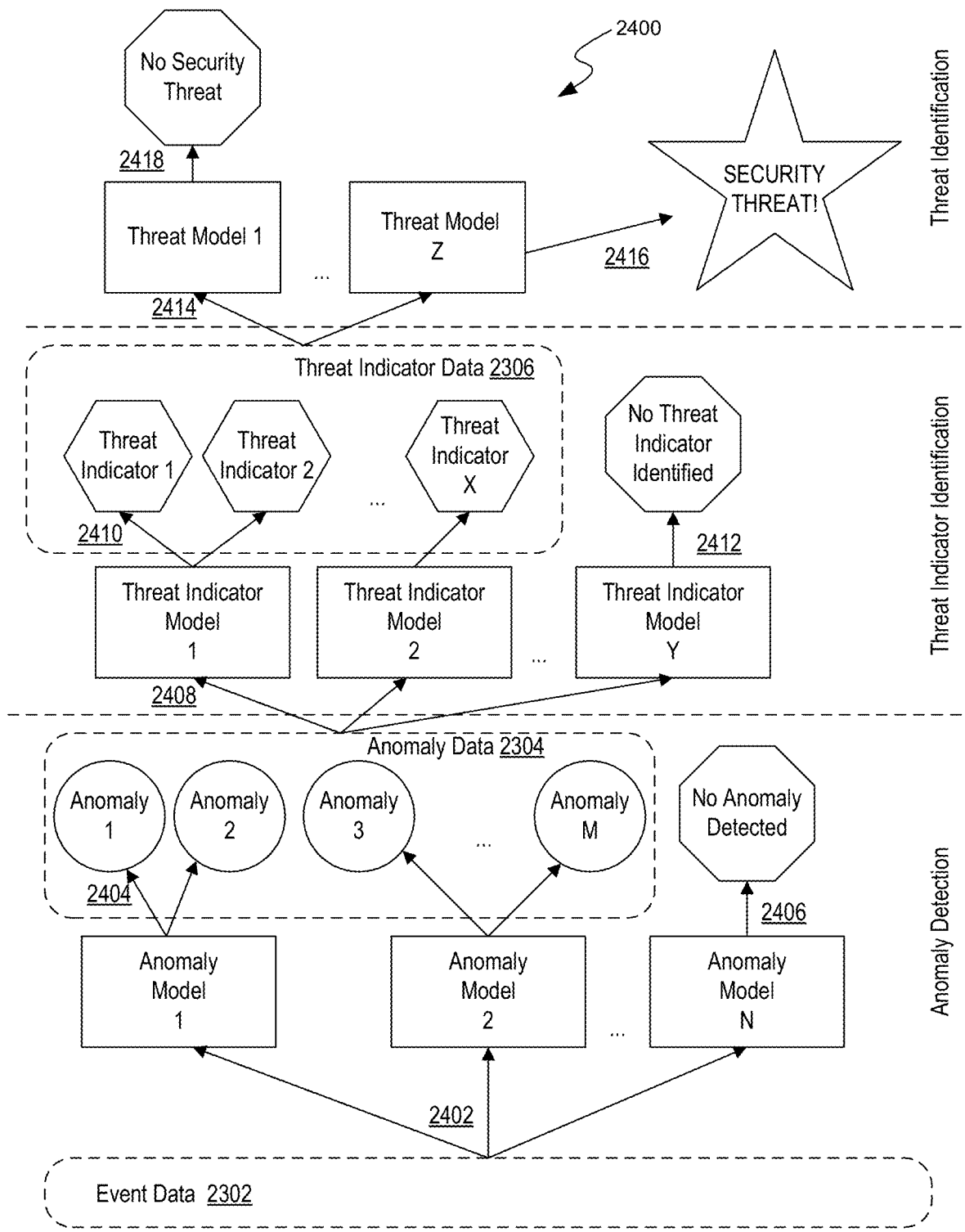
FIG. 24 is flow diagram illustrating in more detail an example process for detecting anomalies, identifying threat indicators, and identifying threats to network security.

FIG. 24 is flow diagram illustrating in more detail an example process 2400 for detecting anomalies, identifying threat indicators, and identifying threats to network security. The process begins by detecting anomalies in activity on a computer network, based on received event data. As shown in FIG. 24 at step 2402, incoming event data 2302 is processed through a plurality of anomaly models 1 through N, which may be machine learning models as discussed above, and which at step 2404 may output anomaly data 2304 indicative of a plurality of anomalies 1 through M. As shown in FIG. 24, an anomaly is not necessarily detected for a given set of event data 2302. For example, as shown at step 2406, when the event data 2302 is processed by anomaly model N, no anomaly is detected.

The process continues with generating anomaly data 2304 indicative of the anomalies in response to the detection. The anomaly data 2304, as used herein, generally refers to the entire set or a subset of the detected anomalies across the computer network. For example, as represented in FIG. 24, the processing of event data 2302 according to the plurality of models at step 2402 leads to the outputting of anomalies (or associated data) 1 through M at step 2404. In some embodiments, the anomaly data 2304 includes only the event data 2302 associated with detected anomalies. In other words, the anomaly processing can be viewed as a filtering process to pass on only event data associated with anomalous activity. In other embodiments and as explained elsewhere in this specification, the anomaly data 2404 includes data in addition to the underlying event data 2302. For example, the anomaly data associated with a particular entity may include the underlying event data associated with the anomalous activity, annotated information about that entity (e.g., a user ID or account associated with a device), timing data associated with the anomalous activity (e.g., when the anomaly occurred, when a similar anomaly last occurred, or periodicity of this type of anomaly showing up for the particular entity), etc. In some embodiments, the anomaly data 2304 is stored in a data structure in the form of an anomaly graph. In such embodiments, the anomaly graph includes a plurality of vertices (nodes) representing entities associated with the computer network and a plurality of edges, each of the plurality of edges representing an anomaly linking two of the plurality of vertices (nodes).

The process continues with identifying threat indicators by processing the anomaly data. As shown in FIG. 24, at step 2408 the anomaly data 2304 (or at least a subset of anomaly data 2304) is processed through a plurality of threat indicator models 1 through Y, which at step 2410 may output threat indicator data 2306 including a plurality of threat indicators. In an embodiment, the processing of event data 2302 at step 2402 to produce anomaly data 2304 occurs on a per entity basis, while the processing of anomaly data 2304 at step 2408 can occur across the computer network whose security is being monitored, or at least a subgroup of the computer network. In other words, each anomaly 1 through M is detected as anomalous for a particular entity given event data associated with the given entity. While useful, this evaluation is performed without reference to other activity on the computer network. At step 2408, however, the plurality of threat indicator models 1 through Y are evaluating the plurality of anomalies 1 through M that occur across the computer network being monitored, not just for a particular entity. As shown in FIG. 24, a threat indicator is not necessarily identified based on a given set of anomaly data 2304. For example, as shown at step 2412, when the anomaly data 2304 is processed according to threat indicator model Y, no threat indicator is identified.

The process continues with generating threat indicator data 2306 indicative of the threat indicators in response to the identifying the threat indicators. Again, as with the anomaly data 2304, the threat indicator data 2306, as used herein, generally refers to the entire set or a subset of the identified threat indicators across the computer network being monitored. For example, as represented in FIG. 24, the processing of anomaly data 2304 according to the plurality of threat indicator models at step 2408 leads to the outputting of threat indicators (or associated data) 1 through X at step 2410. In some embodiments, the threat indicator data 2306 simply includes only the event data 2302 associated with identified threat indicators. In other words, the threat indicator processing can be viewed as a further filtering of the event data 2302 to pass on only event data 2302 associated with threat indicators. In other embodiments and as explained elsewhere in this specification, the threat indicator data 2306 includes data beyond the underlying event data 2302. For example, the threat indicator data 2306 may include the underlying event data associated with the anomalous activity, annotated information about the entities (e.g., users, devices, etc.) associated with the threat indicator, timing data associated with the threat indicator (e.g., when the threat indicator was raised, when a similar threat indicator last occurred, periodicity of this type of threat indicator, etc.). In some embodiments the threat indicator data 2306 is stored in a data structure in the form of a threat indicator graph. In such embodiments, the threat indicator graph may include a plurality of vertices (nodes) representing entities associated with the computer network and a plurality of edges, each of the plurality of edges representing a threat indicator linking two of the plurality of vertices (nodes). In other embodiments, the threat indicator data 2306 is instead stored in a relational database or a key-store database.

In some embodiments, the threat indicator data 2306 is incorporated into a network security graph, which may be the composite relationship graph discussed above. The network security graph can include a plurality of vertices (nodes) representing entities associated with the computer network and a plurality of edges linking two or more of the plurality of vertices (nodes). Each edge in such a graph represents an association between the entities represented by the vertices (nodes). Accordingly, anomalies defined in the anomaly data 2304, and/or threat indicators defined in the threat indicator data 2306, can be incorporated into the graph as vertices (nodes), each linked to one or more of the entities by one or more edges. Consider an example in which a threat indicator is identified and is associated with a user 1 using a device 1 operating on a computer network. In a highly simplified network security graph, the user and device are each defined as a node with an edge linking them to represent the association (i.e., user 1 uses device 1). An anomaly or a threat indicator is then incorporated as a third node into the simplified graph with edges linking to both the node representing user 1 and the node representing device 1.

The process continues with at step 2414 with identifying threats to the security of the computer network by processing the threat indicator data 2306.

A. Detecting Anomalies

Figure 25:
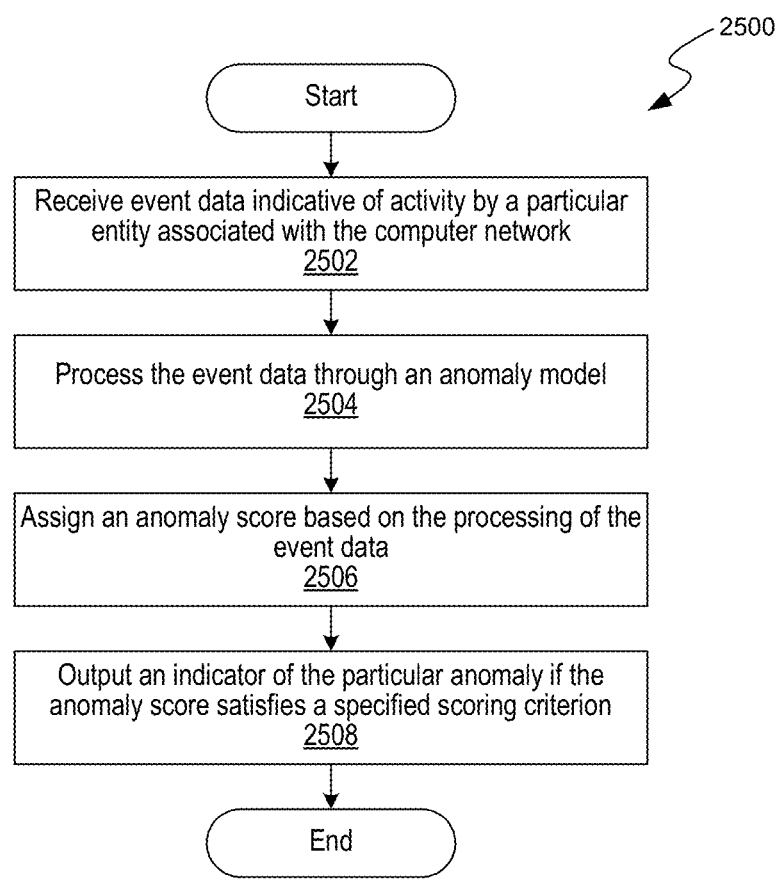
FIG. 25 is a flow diagram describing an example process for detecting anomalies.

FIG. 25 is a flow diagram describing an example process 2500 for detecting anomalies. Process 2500 begins at step 2502 with receiving event data 2302 indicative of activity by a particular entity associated with a computer network. As described in more detail herein, in some embodiments, event data 2302 is received by a security platform from a plurality of entities associated with the computer network via an ETL pipeline.

Process 2500 continues at step 2504 with processing the event data 2302 through an anomaly model. According to an embodiment, an anomaly model includes at least model processing logic defining a process for assigning an anomaly score to the event data 2302 and a model state defining a set of parameters for applying the model processing logic. A plurality of anomaly model instances may be instantiated for each entity associated with the computer network. Each model instance may be of a particular model type configured to detect a particular category of anomalies based on incoming event data. For example, in an embodiment, a computer on computer network is associated with various anomaly models, with one of the anomaly models configured to detect an anomaly indicative of a machine generated beacon communication to an entity outside the computer network. According to some embodiments, the security platform includes anomaly models configured to detect a number of different kinds of anomalous activity, such as lateral movement, blacklisted entities, malware communications, rare events, and beacon activity. Each of these anomaly models would include unique processing logic and parameters for applying the processing logic. Similarly, each model instance (i.e., for a particular entity) may include unique processing logic and parameters for applying the processing logic. In some embodiments, processing of event data 2302 is performed in real-time as the event data is received. In such an embodiment, real-time processing may be performed by a processing engine optimized for high rate or real-time processing, such as Apache Storm or Apache Spark Streaming.

Process 2500 continues at step 2506 with assigning an anomaly score based on the processing of the event data 2302 through the anomaly model. Calculation of the anomaly score is done by the processing logic contained within the anomaly model and represents a quantification of a degree to which the processed event data is associated with anomalous activity on the network. In some embodiments, the anomaly score is a value in a specified range. For example, the resulting anomaly score may be a value between 0 and 10, with 0 being the least anomalous and 10 being the most anomalous.

Process 2500 continues at step 2508 with outputting an indicator of a particular anomaly if the anomaly score satisfies a specified criterion (e.g., exceeds a threshold). Continuing with the given example, the specified criterion may be set such that an anomaly is detected if the anomaly score is 6 or above, for example. The specified criterion need not be static, however. In some embodiments, the criterion (e.g., threshold) is dynamic and changes based on situational factors. The situational factors may include volume of event data, presence or absence of pre-conditional events, user configurations, and volume of detected anomalies.

B. Identifying Threat Indicators—Generally

Figure 26:
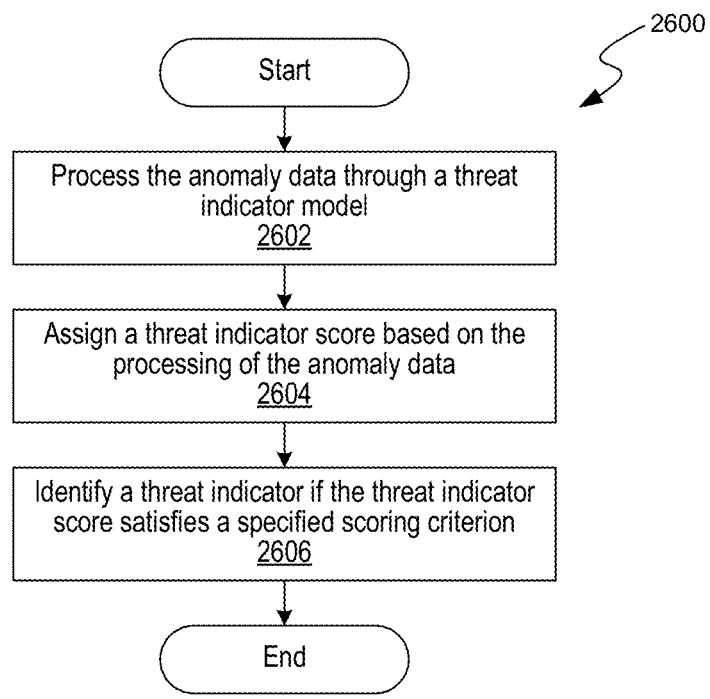
FIG. 26 is a flow diagram describing an example process for identifying threat indicators.

FIG. 26 is a flow diagram describing an example process 2600 for identifying threat indicators. Process 2600 begins at step 2602 with processing the anomaly data 2304 through a threat indicator model, which like the anomaly models may also be a machine learning model. As with the previously described anomaly models, according to some embodiments, a threat indicator model includes model processing logic defining a process for assigning a threat indicator score based on processing the anomaly data 2304 and a model state defining a set of parameters for applying the model processing logic. Specific use cases for identifying threat indicators based on detected anomalies are discussed in more detail herein. In each described use case the steps to identifying a threat indicator may be incorporated into the processing logic. In some embodiments, processing of the anomaly data 2304 may include aggregating anomaly data across the computer network, correlating different anomalies within the anomaly data, and/or enhancing the anomaly data through enrichment using external data sources. In some embodiments, processing of anomaly data 2304 is performed in real-time as the event data is received and anomalies are generated. In such an embodiment, real-time processing may be performed by a processing engine optimized for high rate or real-time processing, for example, Apache Storm or Apache Spark Streaming. In some embodiments, processing of anomaly data 2304 is instead or additionally performed in batch mode. In such an embodiment, batch mode processing may be performed by a processing engine optimized high volumes of data, such as Apache Spark on a Hadoop distributed computing cluster.

Process 2600 continues at step 2604 with assigning a threat indicator score based on processing the anomaly data 2304. As with the anomaly models, in some embodiments, calculation of the threat indicator score is based on the processing logic contained within the threat indicator model and represents a quantification of a degree to which the processed anomaly data is associated with activity that may be a threat to the security of the network. As previously described, a threat indicator can be conceptualized as an escalation or intermediate step between detection of an anomaly and identification of a threat to network security. In some embodiments, the threat indicator score is a value in a specified range. For example, the resulting threat indicator score may be a value between 0 and 10, with 0 being the least threating and 10 being the most threatening.

Process 2600 continues at step 2606 with identifying a threat indicator if the threat indicator score satisfies a specified criterion (e.g., a threshold). Continuing with the given example, the specified criterion may be set such that a threat indicator is identified if the threat indicator score is 6 or above, for example. The specified criterion need not be static, however. In some embodiments, the criterion (e.g., threshold) is dynamic and changes based on situational factors. The situational factors may include volume of event data, presence or absence of pre-conditional events, user configurations, and volume of detected anomalies.

C. Identifying Threat Indicators—Entity Associations

As described previously, a detected anomaly is typically associated with one or more entities associated with a computer network. For example, if an anomaly is detected that is suggestive of beacon activity (discussed further below), that beacon activity is typically from one or more devices operating within the network being monitored. Each of those devices may be associated with one or more users. In this particular use case, the threat indicator models, such as those described previously with respect to FIG. 26, are configured to analyze the relationships between entities on the computer network and the detected anomalies making up the set of anomaly data 2304 across the computer network.

Figure 27:
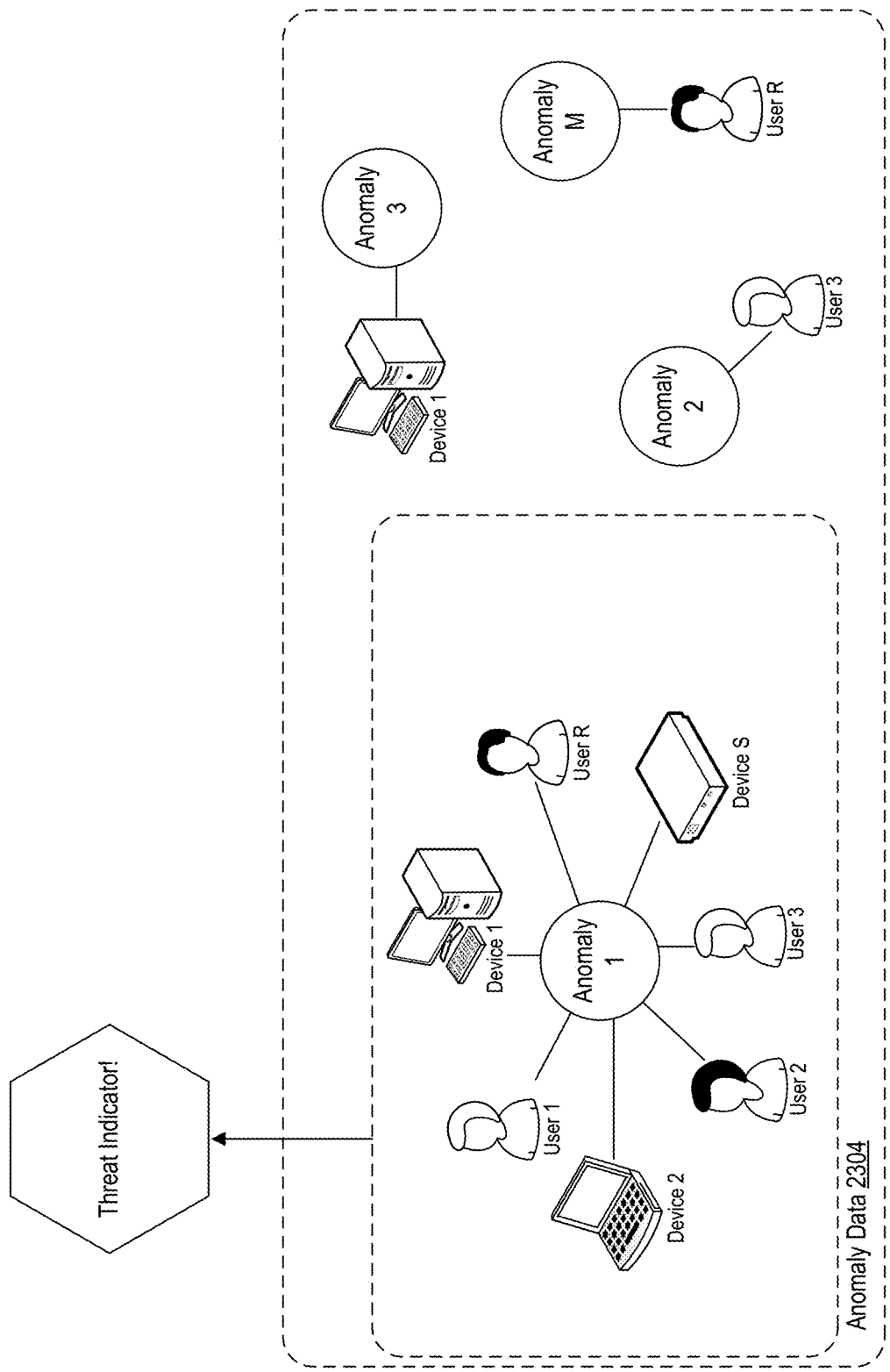
FIG. 27 shows a first use case for identifying threat indicators based on entity associations with detected anomalies.

FIG. 27 illustrates a use case for identifying threat indicators based on entity associations with detected anomalies. The use case illustrated in FIG. 27 is identifying a threat indicator if, based on processing the anomaly data, it is determined that a high number of entities are associated with a particular anomaly or a particular category of anomaly.

A shown in FIG. 27, a number of detected anomalies 1 though M are included in anomaly data 2304, which is surrounded by the larger dotted line box. Associated with these detected anomalies are various entities including devices 1 though S and users 1 through R. In this example, anomaly 1 is shown to be associated with at least seven unique entities, including users 1 through R, and devices 1 through S. Anomalies 2, 3, and M, however, are each associated with just one entity, user 3, device, 1, and user R (respectively). This use case assumes that a correlation among anomalies and entities that establishes relatively high interrelationship is more suspicious than individual occurrences of anomalous activity. In other words, if a detected anomaly is associated with a high number of entities (e.g., users and/or devices) on a computer network, that anomaly may be more indicative of threating activity. Accordingly, anomaly 1, surrounded by the smaller dotted line box, may be identified as a threat indicator based on the processing of anomaly data 2304. It is important to note here that this type of system wide view of anomalous activity is not possible at the anomaly detection level, according to some embodiments, because the anomaly model instances are set up to process event data on a per-entity basis. In other words, an anomaly model is only concerned with what is occurring at a particular entity, while a threat indicator model is concerned with what is occurring across the entire computer system.

Anomaly 1 is shown in FIG. 27 as a single anomaly for clarity purposes, however it may also represent a cluster of anomalies that are somehow related to one another. In one embodiment, anomaly 1, as shown in FIG. 27, may represent a set of anomalies of a particular category of anomaly. For example, a threat indicator may be identified if a high number of entities within a computer network are associated with beacon activity. That beacon activity may be associated with hundreds or thousands of detected anomalies across the network. In another embodiment, anomaly 1, as shown in FIG. 27, may represent a cluster of anomalies of not just the same category, but substantially matching on a lower level as well. For example, beacon activity broadly describes a wide range of behavior. However, analysis at a lower level can uncover similarities among certain types of beaconing. For example, beacon communications known to be associated with malware command and control communications may exhibit similar characteristics. These characteristics may be described in profile or footprint associated with a particular anomaly. This profile or footprint is based on the underlying event data 2302 that gave rise to the anomaly. For example, while individually unique, a set of anomalies based on beacon communications may exhibit patterns related to destination entities, periodicity of communications, etc. Accordingly, anomaly 1, as shown in FIG. 27 may represent a plurality of individual anomalies that, although unique, all have substantially matching profiles or footprints.

In some embodiments, the use case described in FIG. 27 involves a process that begins with determining a measure (e.g., a count) of entities of the computer network associated with a particular anomaly, a particular category of anomaly, or a set of anomalies with substantially matching profiles or footprints. In some embodiments, this determination is based on an absolute number tracked from when monitoring of the computer network commenced. In other embodiments, this determination may be over a pre-determined and/or dynamic time period.

The process continues with identifying a threat indicator if the measure of entities associated with the particular anomaly, particular category of anomaly, or a set of anomalies with substantially matching profiles or footprints, satisfies a specified criterion. The specified criterion may simply be a threshold number of entities associated with an anomaly. For example, identifying a threat indicator if 20 entities are associated with a beacon related anomaly. This threshold value need not be static however. The threshold value may depend on the type of anomaly detected, the types of entities associated (e.g., mission critical systems vs. non-critical systems), the temporal clustering of entities associated with the anomaly, etc. In the context of a threat indicator model as described with respect to FIG. 26, a threat indicator score can be assigned based on the processing of the anomaly data with a threat indicator being identified if the threat indicator score satisfies a specified criterion. For example, the 20 entities associated with a particular anomaly may lead to assigning an threat indicator score of 6 on a scale of 1 to 10. Accordingly, a threat indicator is identified because the assigned threat indicator score is at least 6.

Figure 28:
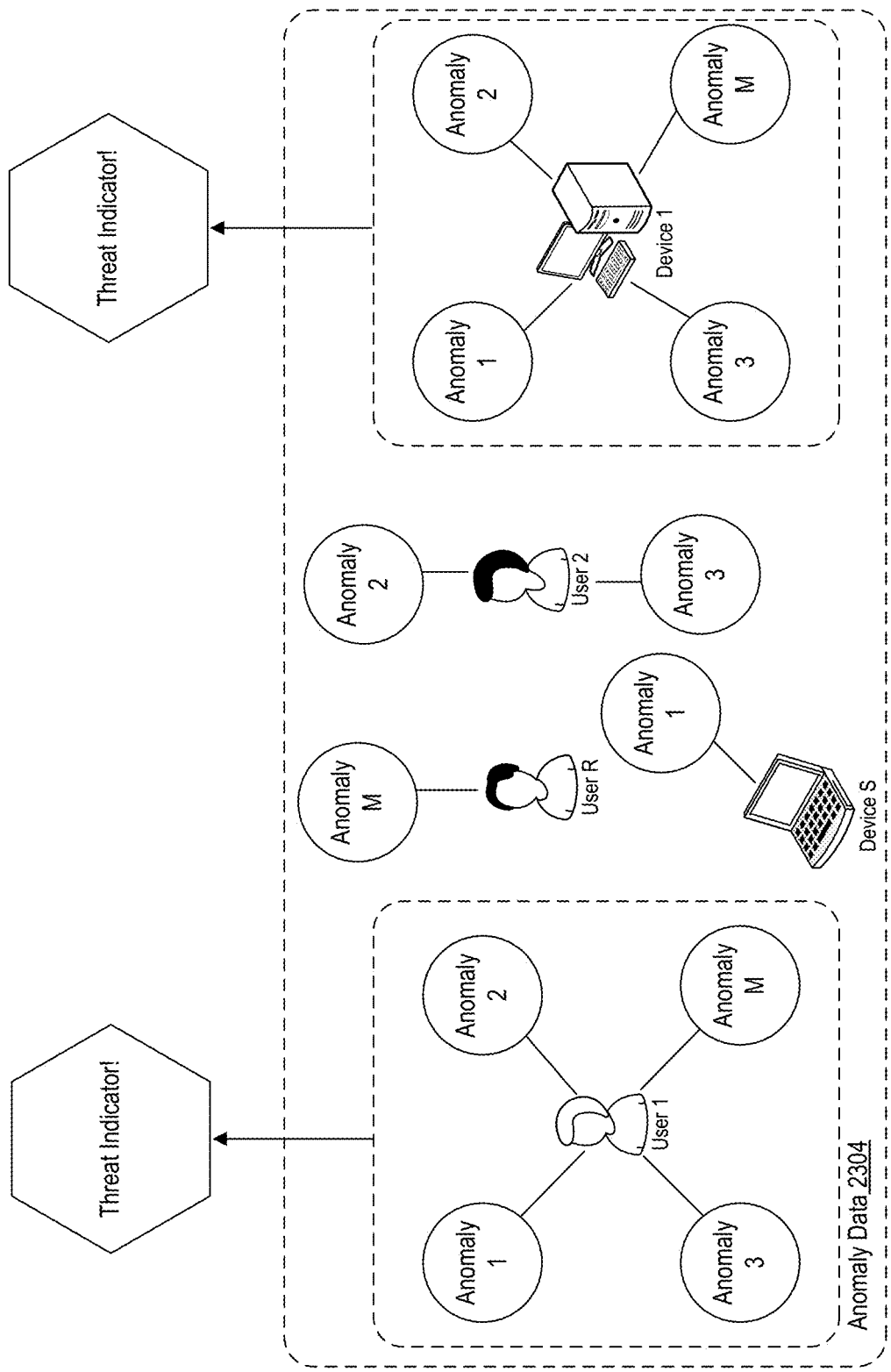
FIG. 28 shows a second use case for identifying threat indicators based on entity associations with detected anomalies.

FIG. 28 illustrates a second use case for identifying threat indicators based on entity associations with detected anomalies. The use case illustrated in FIG. 28 is identifying a threat indicator if, based on processing the anomaly data, it is determined that a high number of anomalies are associated with a particular entity.

As shown in FIG. 28, a number of detected anomalies 1 though M are included in anomaly data 2304, which is surrounded by the larger dotted line box. Associated with these detected anomalies are various entities including devices 1 though S and users 1 through R. Here, user 1 is shown to be associated with at least four anomalies 1 though M (as indicated by the first of two smaller dotted line boxes), and device 1 is shown to be associated with least four anomalies 1 though M (as indicated by the second of two smaller dotted line boxes). As with the use case described with respect to FIG. 27, this use case assumes that a correlation among anomalies and entities that establishes relatively high interrelationship is more suspicious than individual occurrences of anomalous activity. In other words, an entity (such as a user or device) that is associated with a high number of detected anomalies may be more indicative of threating activity. Accordingly, two threat indicators are identified based on the anomaly data 2304 shown in FIG. 28, one threat indicator based on the anomalies associated with user 1 and one threat indicator based on the anomalies associated with device 1.

As described with respect to FIG. 27, each anomaly 1 through M shown in FIG. 28 is shown as a single anomaly for clarity purposes. However, each anomaly shown in FIG. 28 may also represent a cluster of anomalies that are somehow related to one another. For example, anomaly 1 may represent a single instance of an anomaly, multiple anomalies of the same category, or multiple anomalies with substantially matching profiles or footprints.

In some embodiments, the use case described in FIG. 28 involves a process that begins with determining a measure (e.g., a count) of anomalies associated with a particular entity of the computer network. In some embodiments, this determination is based on an absolute number tracked from when monitoring of the computer network commenced. In other embodiments, this determination may be over a pre-determined and/or dynamic time period.

The process continues with identifying a threat indicator if the measure of anomalies associated with the particular entity satisfies a specified criterion.

In an embodiment, the specified criterion may simply be a threshold number of anomalies associated with a particular entity. For example, identifying a threat indicator if 20 beacon anomalies are associated with particular user device on the network. This threshold value need not be static, however. The threshold value may depend on the type of anomaly detected, the types of entity associated with the anomalies (e.g., mission critical systems vs. non-critical systems), the temporal clustering of anomalies associated with a particular entity, etc. In the context of a threat indicator model as described with respect to FIG. 26, a threat indicator score can be assigned based on the processing of the anomaly data 2304 with a threat indicator being identified if the threat indicator score satisfies a specified criterion.

For example, the 20 anomalies associated with a particular entity may lead to assigning a threat indicator score of 6 on a scale of 1 to 10. Accordingly, a threat indicator is identified because the assigned threat indicator score is at least 6.

D. Identifying Threat Indicators—Anomaly Duration

Figure 29:
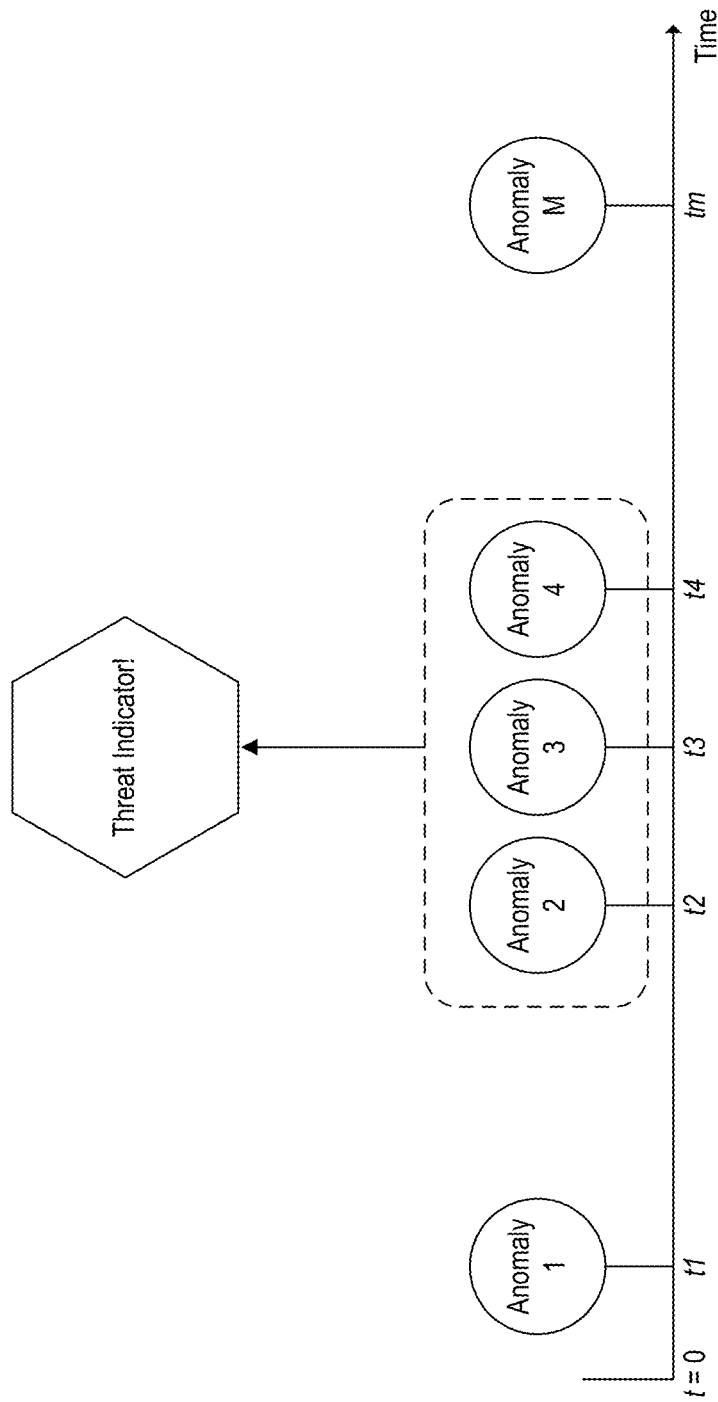
FIG. 29 illustrates a use case for identifying threat indicators based on duration of detected anomalous behavior.

FIG. 29 illustrates a use case for identifying threat indicators based on duration of detected anomalous behavior. Anomalies may be detected over a period of time, for example, as shown in FIG. 29, anomalies 1 through M are detected at time periods t1 through tm. This use case assumes that a temporal correlation among detected anomalies is indicative of suspicious activity. For example, a high number of anomalies occurring in a short time period may be indicative of a concentrated threat to the security of the network.

In some embodiments, the use case described in FIG. 29 involves a process that begins with monitoring a duration of a particular anomaly over a time period. Although anomalies 1 through M shown in FIG. 29 are shown as discrete events, in some cases an anomaly may have duration with a starting time and an end time. The process continues with identifying a threat indicator if the monitored duration of the anomaly satisfies a specified criterion.

In some embodiments, the use case described in FIG. 29 involves a process that begins with determining a number of anomalies that have substantially matching profiles or footprints (e.g., as described in the previous use case) over a time period. These substantially matching anomalies may indicate a pattern of anomalous activity that has duration. The process continues with identifying a threat indicator if the number of anomalies with substantially matching profiles satisfy a specified criterion.

E. Identifying Threat Indicators—Local Vs. Global Rarity Analysis

Figure 30:
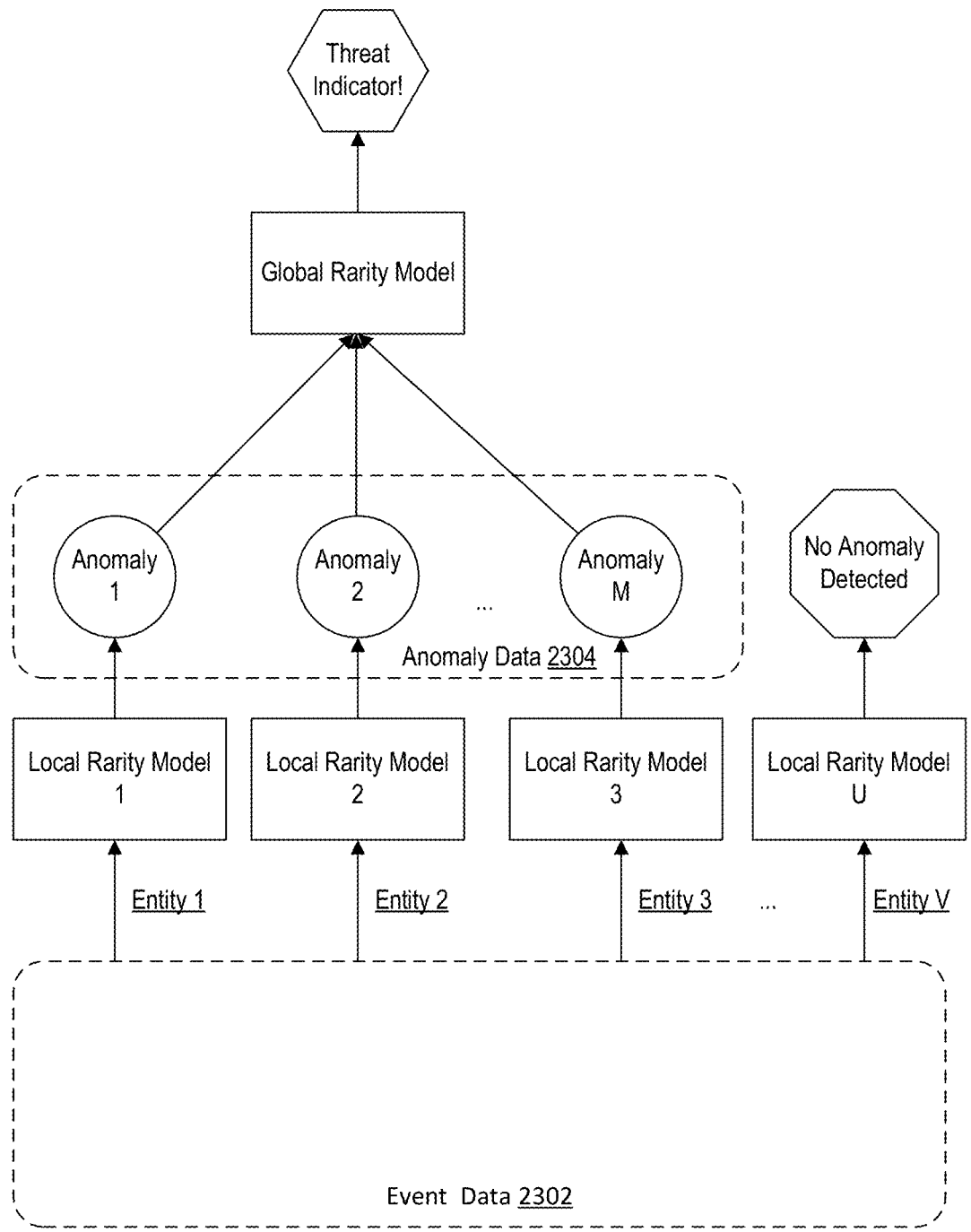
FIG. 30 illustrates a use case for identifying threat indicators based on local and global rarity analysis.

FIG. 30 illustrates a use case for identifying threat indicators based on local and global rarity analysis. As described elsewhere in this specification, in some embodiments, anomalies are detected based on a rarity analysis. In other words, if an event satisfies a rarity analysis (i.e., is determined to be rare), it is detected as an anomaly. This anomaly detection based on rarity analysis is local rarity analysis, because it looks at the rarity of the event in the context of a particular entity. In this use case the anomalies detected based on local rarity analysis are analyzed across the computer network according to a global rarity analysis. In some cases, the number of similar anomalies is important indicator of their severity. For example, a machine generated beacon anomaly may be interpreted as malicious if occurring in only a small number of systems (intruders of malware infections typically affect only a small number of systems, sophisticated attackers will infect a single device).

As shown in FIG. 30, event data 2302 is processed through a number of local rarity analysis models 1 through U that are associated with entities 1 through V. The detected anomalies 1 through M are then analyzed according to a global rarity analysis model to identify a threat indicator. In some embodiments, the use case described in FIG. 30 involves a process that begins with performing a global rarity analysis across the anomaly data 2304 (or a subset of the anomaly data 2304) over a time period, with the anomaly data 2304 based on anomalies detected using local rarity analysis. The process continues with identifying a threat indicator if a pattern in the detected anomalies satisfies a global rarity criterion. In some embodiments a global rarity model is a model that applies the same processing logic as a local rarity model, except that it is applied to the set of anomalies across the network being monitored instead of the event data pertaining to a single entity.

Detection of anomalies by using rarity analysis is discussed in greater detail in a section below.

F. Identifying Threat Indicators—Combining Anomalies

Figure 31B:
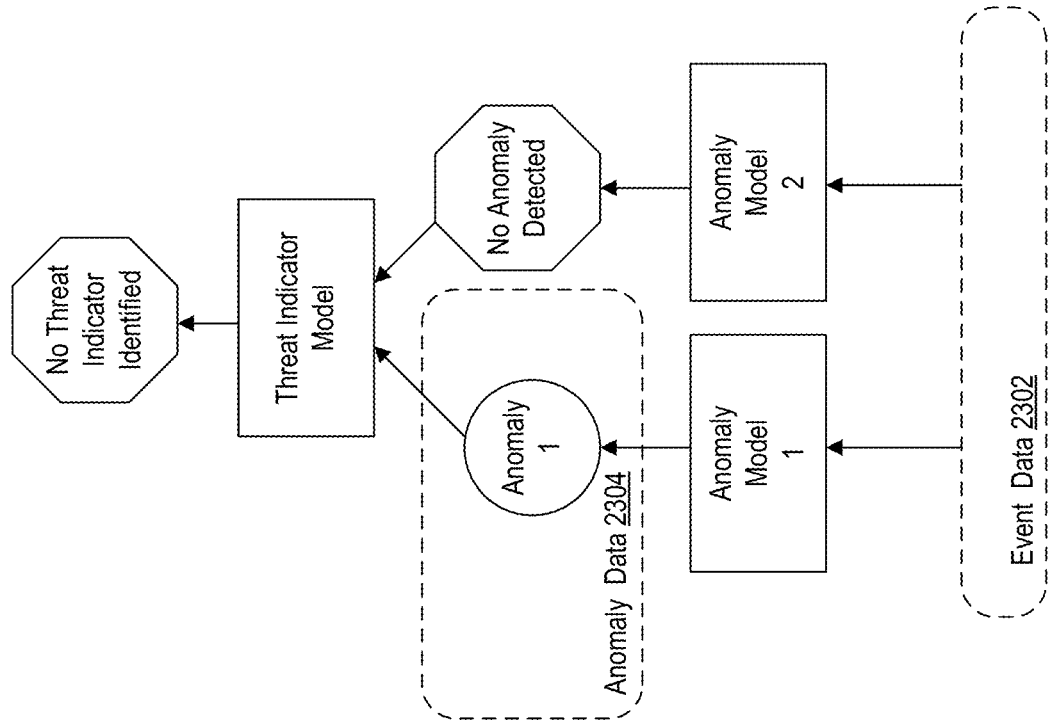
FIG. 31B illustrates nonidentification of a threat indicator according to the first use case based on combing the outputs from different anomaly models.
Figure 31A:
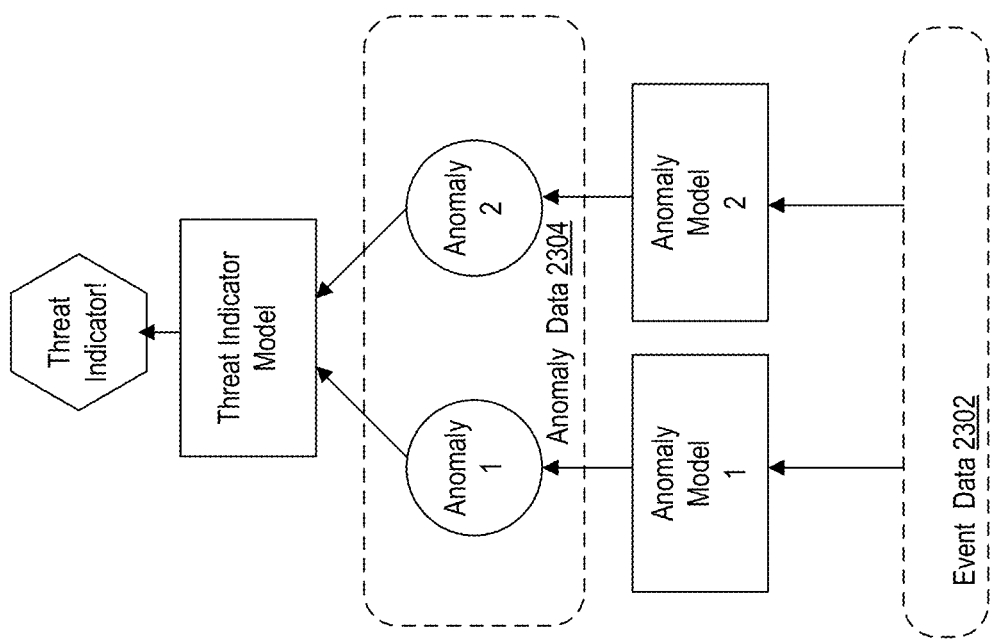
FIG. 31A illustrates identification of a threat indicator according to a first use case based on combining the outputs from different anomaly models.

FIGS. 31A-31B illustrate a use case for identifying threat indicators based on combining the outputs (i.e., detected anomalies) from different anomaly models. As described elsewhere in this specification, in some embodiments, different types of anomalies are detected based a different models. In such cases, it may be beneficial to correlate the anomalies detected using different model types. For example, a machine generated beacon anomaly (detected by a beacon detection model) provides more insight if the destination of the beacon is rare for the environment (detected with a rarity analysis model).

As shown in FIG. 31A, a threat indicator is identified by processing the anomaly data 2304 according to a threat indicator model if anomalies 1 and 2 are present. For example, two types of beacon activity may be considered to be more suspicious when observed in combination. However, as shown in FIG. 31B, if anomaly 2 is not detected (and therefore not part of anomaly data 2304), the threat indicator is not identified based on processing according to the threat indicator model.

In some embodiments, the use case described in FIGS. 31A-31B involves combining anomaly data associated with different types of anomalies, assigning a threat indicator score based on the result of the combining, and identifying a threat indicator if the threat indicator score satisfies a specified criterion.

Figure 32B:
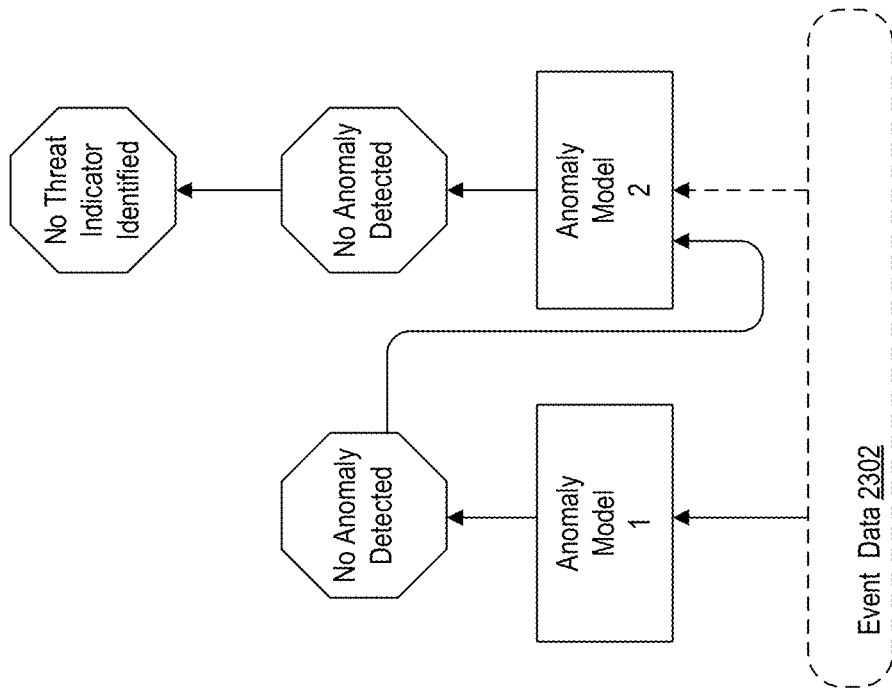
FIG. 32B illustrates nonidentification of a threat indicator according to the second use case based on combing the outputs from different anomaly models.
Figure 32A:
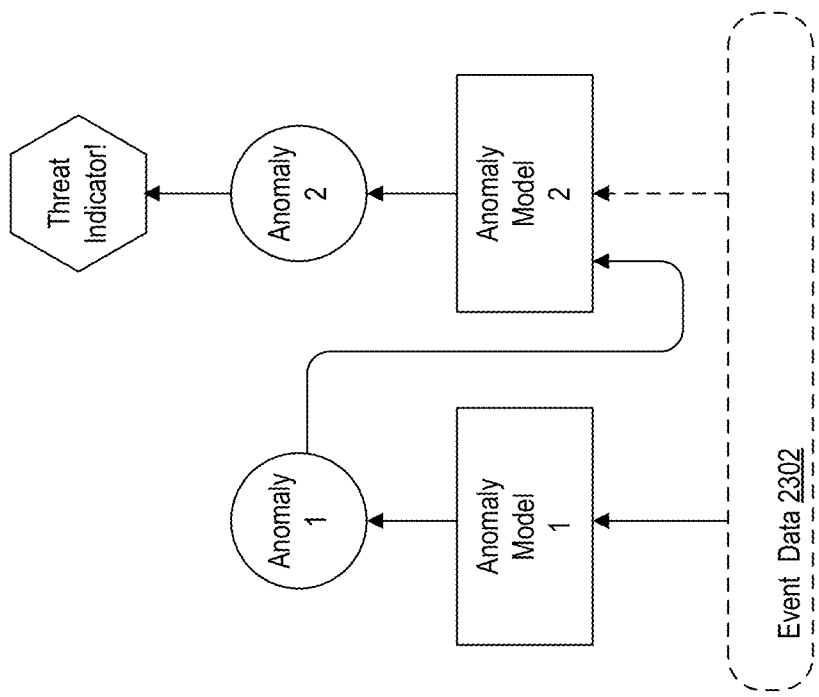
FIG. 32A illustrates identification of a threat indicator according to a second use case based on combining the outputs from different anomaly models.

FIGS. 32A-32B illustrate a second use case for identifying threat indicators based on combining the outputs (i.e., detected anomalies) from different anomaly models. In some embodiments, a threat indicator is identified by processing the output from an anomaly model of a first type with an anomaly model of a second type. Recall the previous example of a beacon anomaly processed according to a rarity analysis to determine if the beacon is rare for a given environment. That example involves processing event data 2302 according to a beacon detection model to detect a beacon anomaly and then processing the detected beacon anomaly according to a rarity analysis model to detect a rarity anomaly. In some embodiments, if the second anomaly is detected, a threat indicator is identified.

As shown in FIG. 32A, anomaly 1 is detected based on processing of event data 2302 through anomaly model 1. Anomaly 1 is then input into anomaly model 2 for processing. In some embodiments, the output anomaly 1 is processed along with other event data 2302 through anomaly model 2. A second anomaly 2 is detected based on processing anomaly 1 (and, and in some embodiments, event data 2302) through anomaly model 2. FIG. 32B shows the same process as in FIG. 32A except that a threat indicator is not identified because anomaly 1 was not detected. Although not shown, the same process may have yielded anomaly 1, but not anomaly 2. For example, a beacon anomaly is detected, but a rarity anomaly associated with that beacon is not detected because the beacon is common to a particular environment. Accordingly, a threat indicator is not identified.

In some embodiments, the use case described in FIGS. 32A-32B involves a process of detecting a first type of anomaly based on processing event 2302 data by a first type of anomaly model. The process continues with inputting the first type of anomaly into a second type of anomaly model. The process concludes with identifying a threat indicator if a second type of anomaly model is detected based on processing the first type of anomaly by the second type of anomaly model.

The processes described in FIGS. 31A-32B depict simple combinations of two anomalies, however, the concept can easily be applied to more complex combinations of multiple anomaly outputs.

G. Identifying Threat Indicators—Enrichment of Anomaly Data

Figure 33:
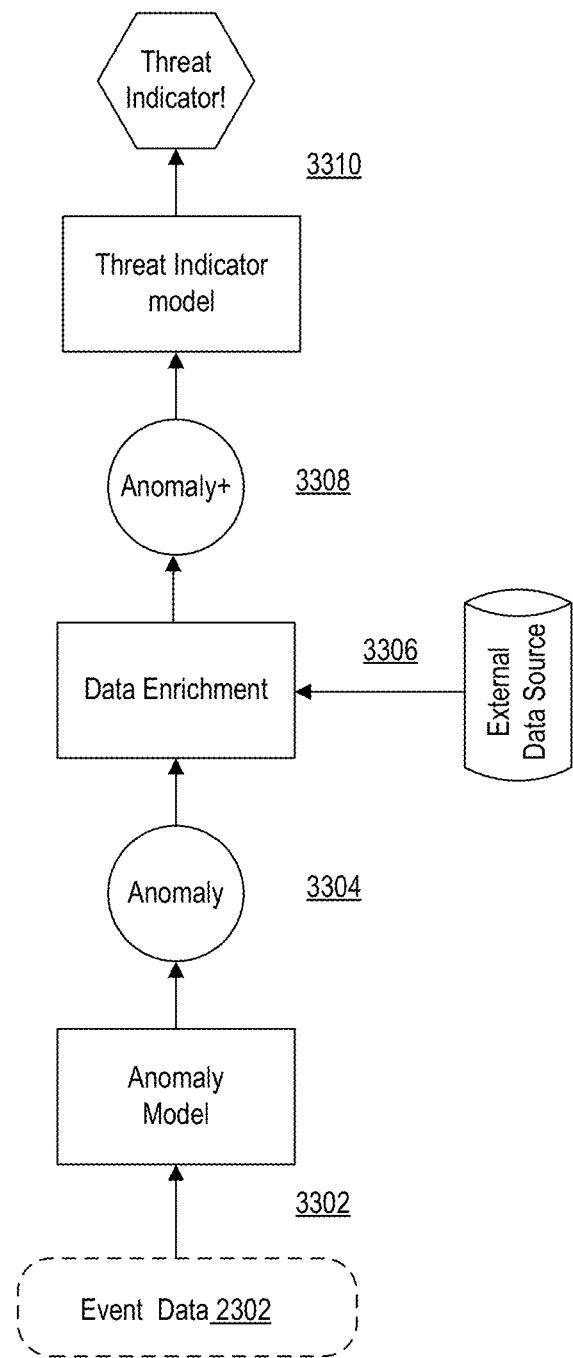
FIG. 33 illustrates a use case for identifying threat indicators by enriching the anomaly data using data from external sources.

FIG. 33 illustrates a use case for identifying threat indicators by enriching the anomaly data using data from external sources. A detected anomaly may provide more insight if combined with other data that indicates a malicious nature. For example, consider the detection of an anomalous connection to particular domain xyz.com outside the computer network. The detected anomaly indicates that the domain may be associated with malicious activity, however, beyond the fact that it may appear machine-generated or rare, additional information may be required to confirm that suspicion. It is therefore possible to access additional external public information (e.g., a WHOIS lookup) that will provide additional information about the domain, for example, who registered the domain name and how long ago. A website registered very recently in a country deemed to be "high risk" is likely to be viewed as more suspicious. By incorporating the external information, a confidence level that a particular anomaly is associated with malicious activity can be increased, and in some cases a threat indicator identified.

As shown in FIG. 33, at step 3302 event data 2302 is processed through an anomaly model resulting in detection of an anomaly at step 3304. Additional information from an external data source is obtained (e.g., by a push or pull modality) at step 3306 during a process of data enrichment resulting in annotated anomaly data at step 3308. This annotated anomaly data is processed according to threat indicator model and a threat indicator is identified if a specified criterion is satisfied. In some embodiments, pulling this external information at step 3306 (e.g., via a WHOIS lookup) is computationally expensive so it makes sense to annotate the anomaly data 2304 instead of the higher volume event data 2302 if the enrichment process is occurring in real-time or near real-time.

In some embodiments, the use case described in FIG. 33 involves a process that begins with identifying a particular entity associated with the anomaly data. This identification may be based on the underlying event data used to generate the anomaly. As in the last example, an anomaly may be associated with a domain xyz.com. The process continues with comparing the particular entity against data stored in a database of known security risks. For example, an external publicly available database may include a list of domains known to be associated with malicious beacon activity. The process continues with identifying a threat indicator if the particular entity substantially matches a known security risk contained in the external database.

In some embodiments, the use case described in FIG. 33 involves a process that begins with identifying an anomaly associated with a connection to a domain considered to be unfamiliar. The process continues with determining whether the domain considered to be unfamiliar matches a domain known to be a security risk, for example, by using information from an external data source. The process continues with identifying a threat indicator if the domain considered to be unfamiliar substantially matches a domain known to be a security risk.

H. Identifying Threats

Figure 34:
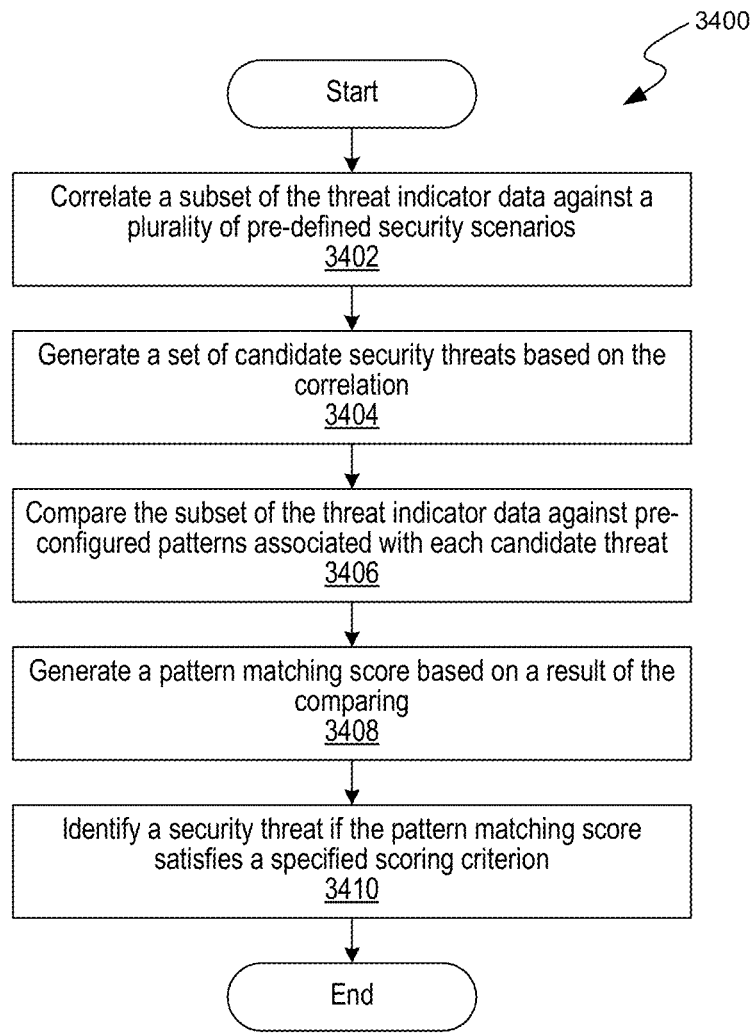
FIG. 34 is a flow diagram describing an example process for identifying threats to network security based on threat indicators.

FIG. 34 is a flow diagram depicting an example process 3400 for identifying threats to the security of a computer network based on threat indicators. The process of identifying threats based on correlation of anomalies is described in more detail elsewhere in this specification. The same concept applies here, except that the threat is identified based on correlating the threat indicator data 2306 including a plurality of identified threat indicators instead of the anomaly data 2404.

Process 3400 begins at step 3402 with correlating the threat indicator data 2306, or at least a subset of the threat indicator data 2306. Process 3400 continues at step 3404 with identifying a set of candidate security threats based on the correlation. Types of correlation are described elsewhere in this specification but can include network-wide correlation for malware threats, connected component correlation for kill chain type threats, per-entity analysis for kill chain type threats, and per-burst analysis for insider threats.

Process 3400 continues at step 3406 with comparing the subset of the threat indicator data against pre-configured patterns or pre-set rules associated with each candidate threat. For example, an insider threat may be associated with known patterns identified by security experts and therefore be associated with pre-set rules. Process 3400 continues at step 3408 with generating a pattern matching score based on a result of the comparing. In some embodiments, the pattern matching score is a value in a set range. For example, the resulting pattern matching score may be a value between 0 and 10 with 0 being the least likely to be a threat and 10 being the most likely to be a threat.

Process 3400 concludes at step 3410 with identifying a security threat if the pattern matching score satisfies a specified criterion. Continuing with the given example, the specified criterion may be set such that a threat is identified if the pattern matching score is 6 or above. The specified criterion need not be static, however. In some embodiments, the criterion is dynamic and changes based on situational factors. Situational factors may include volume of event data, presence or absence of pre-conditional events, user configurations, volume of detected anomalies, and involvement of mission critical systems.

IX. Composite Relationship Graph

As described above, the security platform 300 can combine the individual event-specific relationship graphs from all processed events into a composite relationship graph that summarizes all significant (from a security standpoint) network activity for an entire enterprise or network. The composite relationship graph can include nodes representing the various entities associated with the network as well as nodes representing the detected anomalies. Subsets, or "projections," of the composite relationship graph can then be used by various different threat models to detect security threats, as will now be further described.

FIGS. 35 through 38 relate to a method for storing and analyzing a security data structure (e.g., a graph including nodes and edges) for identifying security threats in a computer network. The nodes represent entities in or associated with the computer network, such as users, devices, applications, and anomalies. The edges, which connect nodes, represent the relationships between the entities. An ETL process generates event-specific graph data structures (also referred to as "mini-graphs" or "relationship graphs") corresponding to events that have occurred in the computer network. The method introduced here detects anomalies based on the mini-graphs, and combines the anomalies with the mini-graphs to generate the composite relationship graph, which may also be called an "enterprise security graph" to the extent it may relate to a network of a particular enterprise (e.g., a corporation, educational institution, government agency, etc.). The composite relationship graph includes nodes that represent the anomalies and edges that represent relationships between anomalies and other entities involved in the events.

During the above-mentioned combining, the method condenses network activities that are of the same type and associated with the same user into a single entry of combined network activity. The method further assigns these combined network activities into different projections of the composite relationship graph, depending on the type of activity. Each projection represents a subset of the composite relationship graph that relates to a certain type or types of user action or other category (e.g., login, web visit, file access, anomaly, etc.). The projection can be stored in a cluster (e.g., a Hadoop cluster) and further broken down into multiple files based on the timestamps. Relevant files can be stored in proximity in the cluster for data access efficiency.

The method further identifies security threats by correlating the anomalies across the composite relationship graph. For example, the method can use a neighborhood computation algorithm to identify a group of related anomalies in the composite relationship graph that represent a security threat. Alternatively, the method can identify an insider who poses a security threat based on a group of anomalies being close to each other in time and their confidence metrics.

Figure 35:
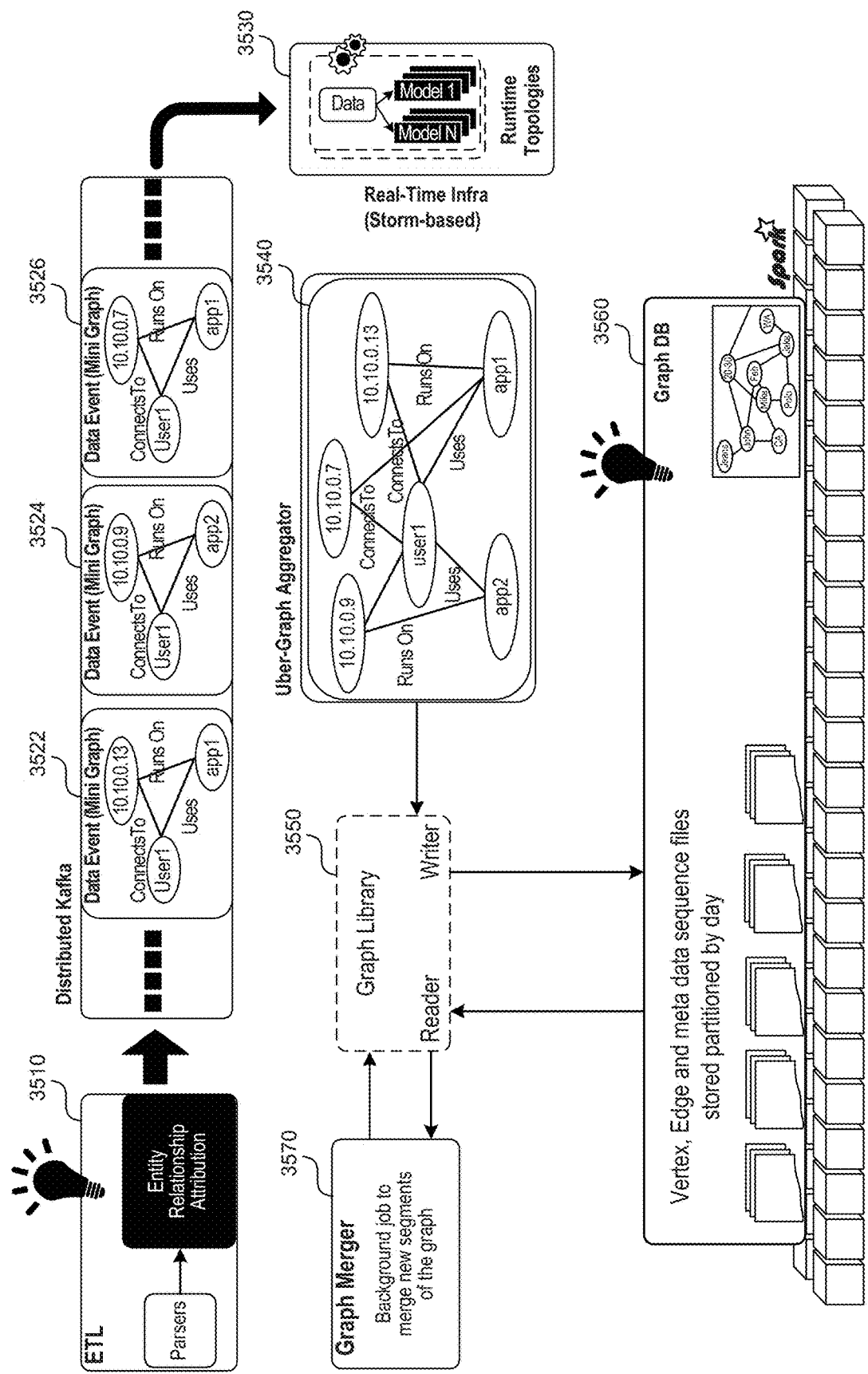
FIG. 35 illustrates an example process of combining and storing event-specific relationship graphs into a composite relationship graph.

FIG. 35 illustrates an example process of combining and storing relationship graphs into a composite relationship graph. The process receives event data from various data sources. The event data can be, e.g., timestamped machine data. The process uses parsers 3510 to conduct an ETL procedure to generate information about the entities in the computer network and the relationships between the entities.

The process organizes the information about the entities and the relationships for each event into a mini-graph. Each of the mini-graphs 3522, 3524 and 3526 includes nodes and one or more edges each interconnecting a pair of the nodes. The nodes represent the entities involved in the particular event. The edges represent the relationships between the entities in the event. An analytics engine 3530 can process these mini-graphs 3522, 3524 and 3526 (e.g., using various machine learning models) to detect anomalies.

A separate machine learning model called aggregator 3540 combines the mini-graphs and detected anomalies into the composite relationship graph. The composite relationship graph includes nodes that represent the entities, as well as nodes that represent the detected anomalies. In some embodiments, the composite relationship graph is created first in volatile memory of one or more computing devices, and then saved to non-volatile storage.

A graph library component 3550 handles the storage of the composite relationship graph in a non-volatile storage facility called graph database 3560. In the graph database 3560, the nodes (also referred to as vertices), edges and associated metadata of the composite relationship graph are stored in one or more data files. The nodes and edges of the composite relationship can be partitioned based on the timestamps (from the event data) of the corresponding network activities. Each data file can be designated for storing nodes and edges for a particular time period.

In addition, a graph merger component 3570 runs a background job to merge new segments into the composite relationship graph at a predetermined periodicity. As the system continuously receives new event data and generates new mini-graphs and new anomalies based on the new event data, the graph merger component 3570 merges these newly created mini-graphs and associated detected anomalies into the composite relationship graph.

Figure 36:
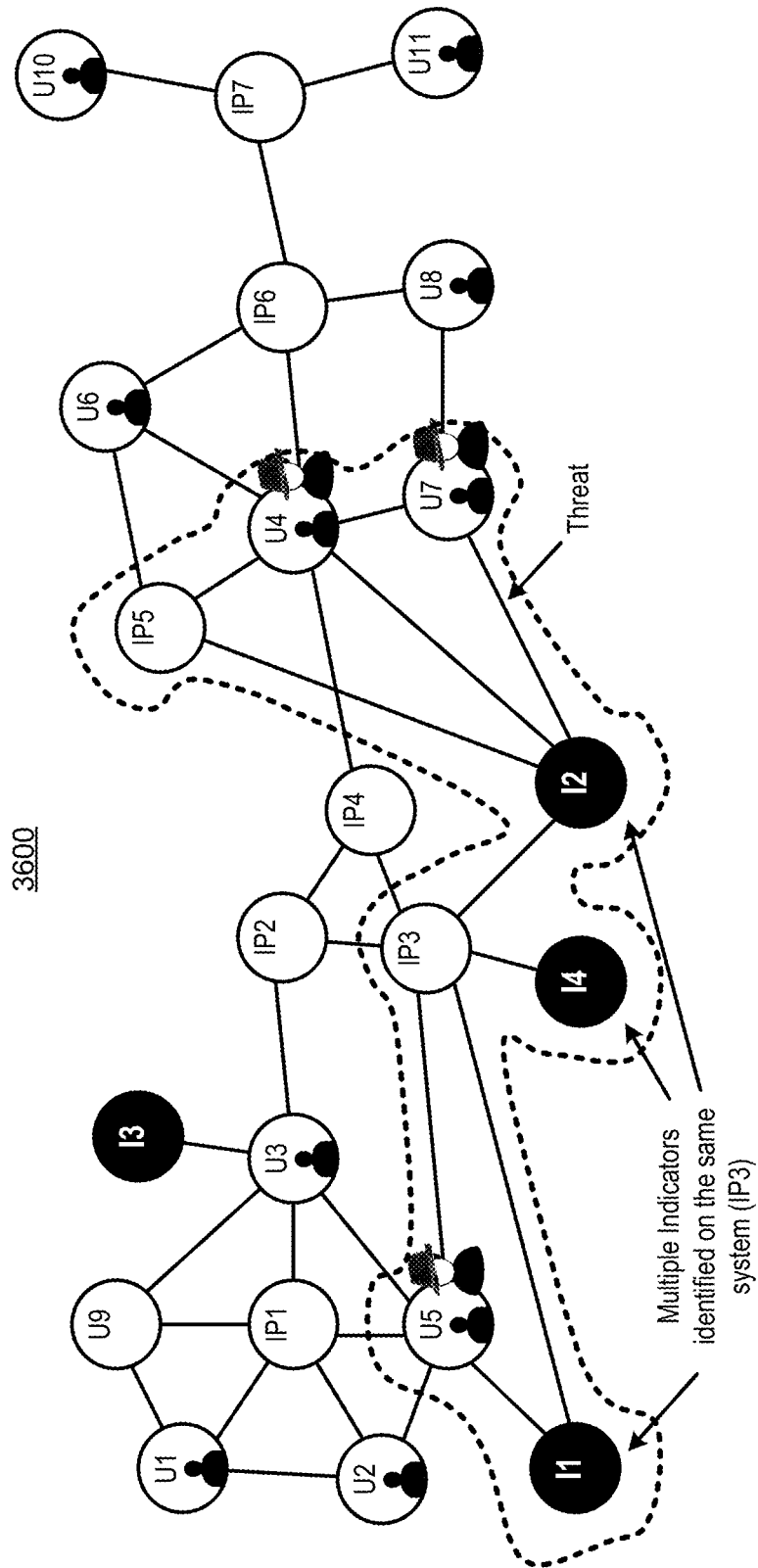
FIG. 36 illustrates an example of a composite relationship graph.

FIG. 36 illustrates an example of a composite relationship graph. The illustrated composite relationship graph 3600 includes a number of nodes U1 through U11 that represent users (also referred to as "user nodes") and a number of nodes IP1 through IP7 that represent network devices (also referred to as "device nodes"). The composite relationship graph 3600 further includes a number of nodes I1 through I4 that represent anomalies (also referred to as "anomaly nodes"). For example, anomaly node I1 suggests that a user represented by node U5 has engaged in certain suspicious activity with, or in relation to, the device represented by node IP3.

In graph 3600 there are three anomaly nodes I1, I2 and I4 connected to the same device node IP3. These anomaly nodes may be indicative of a security threat involving the device IP3. The anomaly nodes I1, I2 and I4 also connect to the user nodes U4, U5 and U7 and device node IP5. This may indicate that users U4, U5 and U7 are suspicious, meaning these users can potentially be malicious users who engage in or will engage in activities detrimental to the security of the computer network. For example, users U4, U5 and U7 may be invaders who have breached network devices with malicious intentions. Thus, a decision engine (e.g., including a machine learning model) can identify a security threat represented by a group of nodes in question, including, in the illustrated example, anomaly nodes I1, I2 and I4, user nodes U4, U5 and U7, and device nodes IP3 and IP5.

The composite relationship graph can include a number of projections that correspond to different categories of computer network activities. Each projection is a subset of the composite relationship graph and includes edges representing computer network activities of a particular category. When the graph library component 3550 writes the composite relationship graph into non-volatile storage (as shown in FIG. 35), the graph library component 3550 can write the content of the different projections into separate data files. Alternatively, the graph library component 3550 can write the different projections into other types of data containers, such as logical unit numbers (LUNs).

Figure 37:
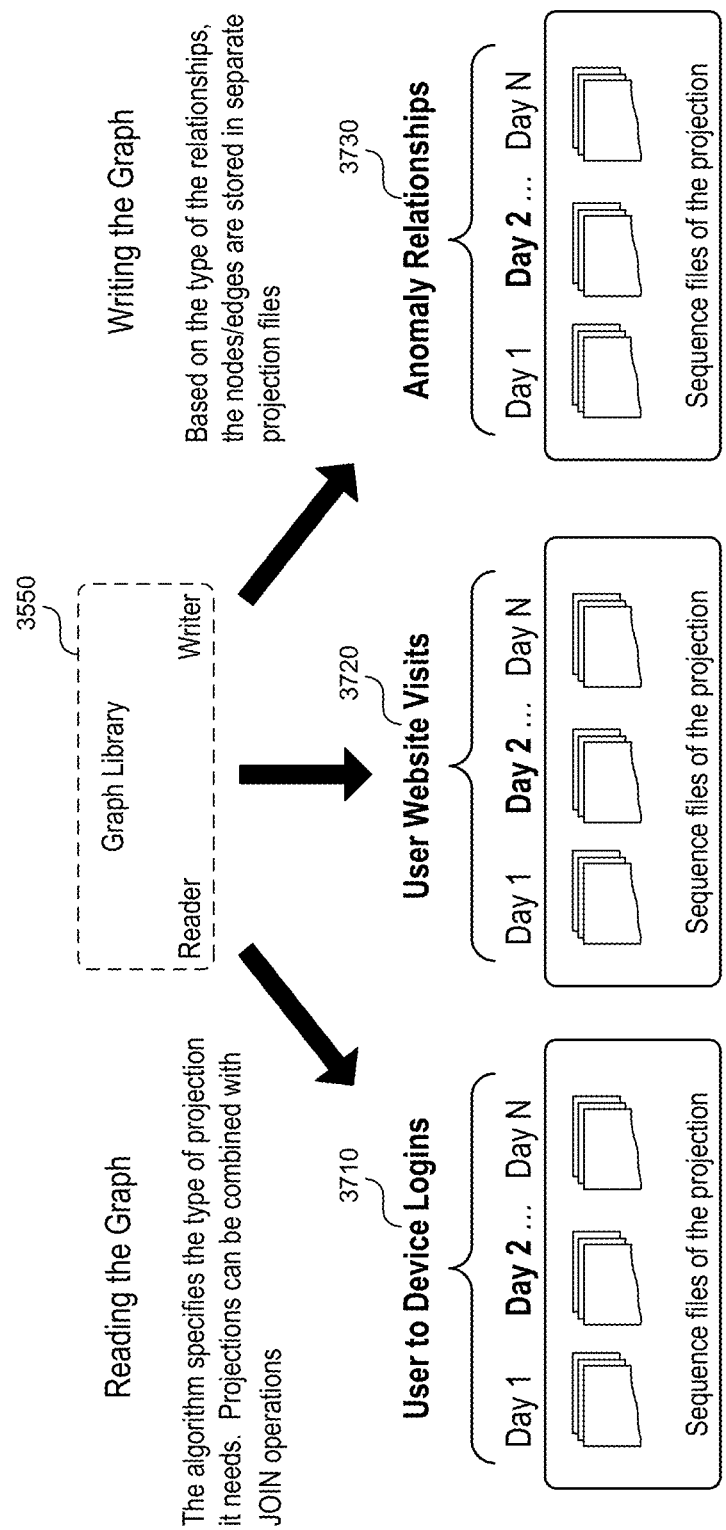
FIG. 37 illustrates an example of how a composite relationship graph can be stored as separate projections.

FIG. 37 illustrates an example of how a composite relationship graph can be stored as separate projections. For each edge (relationship) in the composite relationship graph, the graph library component 3550 examines the edge's type to determine the projection to which the edge belongs. The different projections in the illustrated example include a login projection 3710, a website-visit projection 3720 and an anomaly projection 3730. In some alternative embodiments, the composite relationship graph can include other types of projections, such as a projection for activities of users accessing files stored in the devices in the computer network.

If the graph library component 3550 determines that a particular edge corresponds to an activity of a user logging into a device, the graph library component 3550 assigns the particular edge to that particular login projection. For example, if the graph library component 3550 determines that a particular edge corresponds to an activity of a user visiting a website, the graph library component 3550 assigns the particular edge to the website-visit projection 3720. If the graph library component 3550 determines that a particular edge relates to an anomaly (e.g., the edge connecting to an anomaly node), the graph library component 3550 assigns the particular edge to the anomaly projection 3730.

The graph library component 3550 can further break down the projections into a plurality of files. Each of the files stores network activities that have occurred in a particular time period. For example, as shown in FIG. 37, the projection is broken down into a sequence of files, each of which stores network activities that have occurred in one particular day. In some alternative embodiments, the graph library component 3550 can further break down the projection into finer granularity. For example, the projection may be broken down into a sequence of directories corresponding to days. Each directory may then include files corresponding to each hour of the day.

In some embodiments, the graph library component 3550 can dynamically adjust the granularity. For example, in one embodiment, for network activities that occurred during the last two months, the graph library component 3550 may break down the projection data into files corresponding to each hour of the last two months; whereas, for network activities that occurred prior to the last two months, the graph library component 3550 breaks down the projection data into files corresponding two months the graph library component 3550 may break down the projection data into files corresponding to each week or each month. As time goes by, some network activities stored in a daily granularity become older than two months. Thus, the graph library component 3550 continuously combines files storing these network activities into files corresponding to the weekly or monthly granularity.

Figure 38:
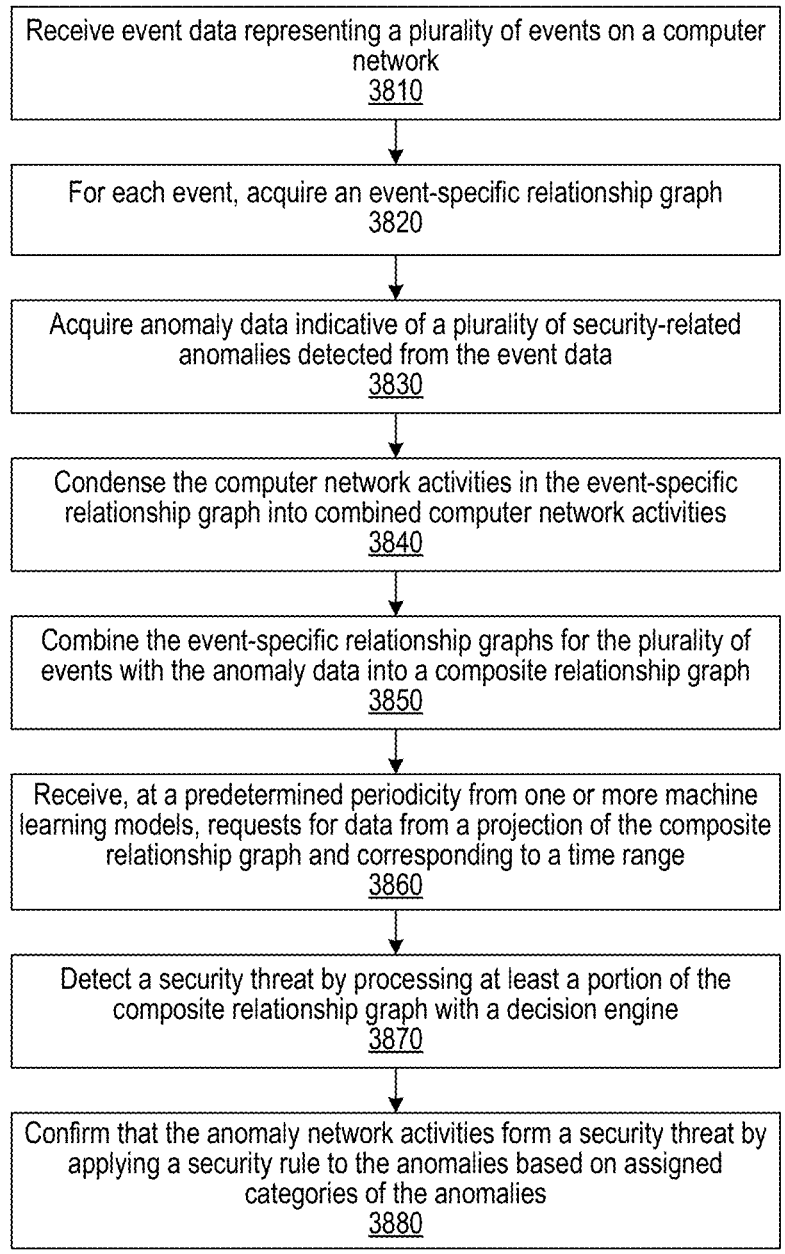
FIG. 38 illustrates a sample process of combining event-specific relationship graphs into a composite relationship graph and detecting a security threat based on the composite relationship graph.

FIG. 38 illustrates an example process of combining event-specific relationship graphs into a composite relationship graph and detecting a security threat based on the composite relationship graph. At step 3810, the process receives event data representing a plurality of events on a computer network. The event data are indicative of a plurality of entities and at least one anomaly involved in the events. The entities can include various types of entities involved in the computer network. For example, the entities can include, e.g., devices in the computer network, users of the devices in the computer network, websites, applications and/or data files stored in the devices in the computer network.

At step 3820, for each event, the process acquires an event-specific relationship graph (e.g., a mini-graph), for example, from the data intake and preparation stage via the distributed messaging platform. The event-specific relationship graph is indicative of entities involved in the associated event and one or more relationships between the entities involved in the event. The event-specific relationship graph includes a number of nodes and at least one edge interconnecting nodes. The nodes represent the entities involved in the event. Each edge represents an interaction between a pair of the entities.

At step 3830, the process acquires anomaly data indicative of various security-related anomalies detected from the event data. For each anomaly detected from the event data, the computer system can further store the event data associated with the anomaly in long-term (non-volatile) storage. In that way, the security platform 300 can generate a visualization of the event data associated with the anomaly when the platform receives an instruction to visualize details of the anomaly.

At step 3840, the process condenses the computer network activities in the event-specific relationship graph into combined computer network activities. For each event, the process identifies one or more computer network activities of a particular type based on the event-specific relationship graph. The identified computer network activities are associated with the same entity and occur during a predefined time period. The process then combines the computer network activities of the particular type into a data entry representing the combined computer network activity and counts the computer network activities that occur during the predefined time period.

The process stores the data entry representing the combined computer network activity and the count in non-volatile storage, such as a data file designated for the particular type and the time period. In some embodiments, the stored data entry for the combined computer network activity includes information about an activity type, an originating entity, a target entity, the number of times the computer network activities occur in the time period, a start time, an end time, an average gap period between the computer network activities that occur in the time period, or a standard deviation of gap periods between the computer network activities that occur in the time period.

At step 3850, the process combines the event-specific relationship graphs for the received events with the anomaly data into a composite relationship graph. The composite relationship graph includes nodes that represent the entities involved in the events and nodes that represent the anomalies detected based on the event data. The entities involved in the events include at least two types of entities, such as users and devices. The composite relationship graph further includes edges that represent the relationships between the entities involved in the events and the anomalies.

As shown in FIG. 37, the composite relationship graph can include a plurality of projections. Each of the projections is a subset of the composite relationship graph that includes edges representing a plurality of computer network activities of a particular category. In some embodiments, the particular category of network activities corresponds to users logging into devices in the computer network, users visiting websites, users accessing files stored devices in the computer network, or users conducting anomaly activities.

As illustrated in FIG. 37, one of the projections is the anomaly projection 3730, which is a subset of the composite relationship graph that includes edges representing anomalous activities conducted by users. Each projection can be stored in a cluster of storage device and distributed amongst data containers (e.g., files) based on timestamps of the associated event data. The computer system can further identify events that have timestamps satisfying a specific closeness criterion (e.g., the timestamps having differences less than a threshold value), and store the edge data of these identified computer network activities in proximity to each other in the long-term non-volatile storage. In this way, the read efficiency for the computer network activities can be improved.

For each combined computer network activity, the computer system can determine an association between the combined computer network activity of the particular type and a particular projection of the composite relationship graph. Then the combined computer network activity is stored into a file designated for the associated projection.

In one embodiment, the computer system transfers the data structures representing the edges of the composite relationship graphs from memory of the computer system to persistent (long-term) storage at a predetermined periodicity. For example, if the computer system detects that a time period since a last time of transferring the data structures representing the edges of the composite relationship graphs from memory of the computer system to a persistent storage exceeds a threshold value, the computer system transfers the data structures currently in memory to the persistent storage.

The computer system can further have a memory storage size limit. Once the size of the data structures representing the edges of the composite relationship graphs stored in the memory exceeds the memory storage size limit, the computer system transfers the data structures currently in the memory of the computer system to the persistent storage.

Referring again to FIG. 38, at step 3860, the process receives, at a specified periodicity from one or more machine learning models, requests for data of a projection of the composite relationship graph and corresponding to a time range. The requested data can include combined computer network activities including information about computer network activities from multiple events. Since the requests from the machine learning models are for data from a common projection range and corresponding to a common time range, at step 3870, the process combines the data within the common projection range and the common time range into a single input data structure as an input for the machine learning models.

In some embodiments, there are different types of machine learning models. Some machine learning model receives a portion (e.g., projection) of the composite relationship graph as inputs and identify security threats and/or anomalies based thereon. The one or more machine learning models can be executed in a batch mode.

At step 3870, the process detects a security threat by processing at least a portion (e.g., one or more projections) of the composite relationship graph with a decision engine. The decision can be, e.g., a machine learning model or an analytics engine running a machine learning model. During the detection, the process first converts at least a portion of the composite relationship graph (e.g., the anomaly projection) into an anomaly relationship graph. The anomaly relationship graph includes anomaly nodes that represent anomalies and entity nodes that represent entities in the computer network. The computer system inputs the anomaly relationship graph into the decision engine. The decision engine can then identify a security threat by analyzing the anomalies in any of various different ways.

One possible way is that a machine learning model identifies a set of anomaly nodes interconnecting entities nodes that form a neighborhood cluster in the anomaly relation graph. Another possible way is that the machine learning model identifies a subset of the anomaly relationship graph including anomaly nodes and entity nodes that have no relationships with other nodes outside of the subset in the anomaly relationship graph. Yet another possible way is that the machine learning model identifies a set of anomaly nodes directly connecting a particular entity node in the anomaly relationship graph. The machine learning model can further identify a group of anomaly nodes within the identified plurality of anomaly nodes, wherein the group of anomaly nodes have timestamps that satisfy a specific closeness criterion. For example, the timestamps may have an average time gap less than a threshold value.

At step 3880, as an optional step, the process confirms that the anomalies form a security threat by applying a security rule to the anomalies based on assigned categories of the anomalies. The computer system can assign the anomalies into categories of, e.g., internal anomaly, malware anomaly, incoming anomaly and exfiltration anomaly. An administrator of the computer network can specify the rules based on his/her knowledge of typical security threats that occur in the computer network.

The identified set of anomaly nodes represent a set of related anomalies. The process can present the security threat including the set of anomalies to an administrator of the computer network or any party that handles security issues of the computer network.

Any of the steps in the process illustrated in FIG. 38 can be performed by processing logic of a machine learning model. Further, any of the steps can be performed in real-time as the event data are received, or in a batch mode based on the event data retrieved from persistent storage.

X. Graphical User Interface (GUI) Features

In addition to, and in conjunction with, methods and systems for analyzing network activities to detect, identify, and track threats and anomalies on a computer network, the present disclosure relates to methods and systems for organizing and presenting information concerning potential network compromise to one or more users tasked with monitoring the network and thwarting attacks, stolen data, and other harm. Embodiments of the present disclosure include an innovative graphical user interface that is visually communicative, highly integrated, adaptable, and user interactive.

As described below with reference to FIGS. 39 through 51, the graphical user interface ("GUI") introduced here enables a user to configure displays according to the user's particular tasks and priorities. The security platform described herein may include a GUI generator module that gathers the generated anomaly data, threat data, and other data, and that based on such gathered data, generates display data. The GUI generator module sends the generated display data to one or more physical display devices, to cause those display devices to display the GUI features described herein. The GUI module also receives user inputs and modifies the display data based on those inputs to provide an interactive display.

In the described GUI, graphs, timelines, maps, charts, lists and other visualization features are generated to illustrate trends, recent activity, and relationships between different data. The GUI can provide views that are automatically configured via default settings, or the GUI can enable a user to customize a view, for example, to filter out data points that are less critical, distracting, or unnecessary, to zoom in and out, or re-format the view (e.g., from a line chart to a bar chart). To easily navigate between different views, and to better understand the relationships between different data associated with a security-related threat or anomaly, the GUI can include links in the data to generate different views that provide additional detail about information of interest.

The GUI also can enable the user to set watchlists to track information while navigating the various views. Watchlists can be used, for example, to remind the user that certain data already has been reviewed and considered by the user. Once a user reviews sufficient information to draw a conclusion about a threat, the GUI also enables a user to "take action," for example, by re-designating the identified threat as "Not a Threat," or by emailing threat data or exporting it to another data mining platform. The GUI provides these capabilities and many more to facilitate effective network security monitoring via simple user inputs (such as point-and-click actions), with little or no typing and without requiring the user to engage in laborious set-up or programming.

The GUI introduced here generates views pertaining to threats and anomalies identified from event data generated from network activities. As examples, network activities may include log-ins, email traffic, internet browsing, or file transfers on a network operated by a corporation, university, household, or other organization (referred to collectively as an "organization"). Event data comprises timestamped machine data related to network activity by various entities, including users, devices, and applications.

"Users" may be employees or others who are associated with an organization. Users might have unlimited rights or privileges to access an organization's network, or they might be authorized to have only limited network access. When user identification information is included in event data, it may appear as a "username" or "User ID" (or "User ID/Password" combination). Typically, users are registered with an account on an organization's network. Whenever a user logs into the organization's network or server(s), from any location and using any device, event data is created that can be tracked for potential instances of network compromise.

"Devices" may be machines that access the network. For example, a device might be an IP address associated with a client computer (laptop, desktop, tablet, smartphone, etc.), server, and/or any other machine capable of accessing the organization's network. A device may be operated by a user who is registered with the network, or it may be operated by someone else who can access the network, either in an authorized or unauthorized capacity. For example, many organizations allow guests to access their networks or allow network traffic by visitors to the organization's website. Emails and other file transfers from users to others outside the organization, such as clients, customers, etc., involve communications with devices that are external to the organization's network. When a device accesses the network, a network server generates logs and other machine data that identify the device, for example, by IP address. Machine data that includes device information is additional event data that also can be tracked for potential instances of network compromise.

"Application information" identifies a program that is executed on a network's servers or on a computer in communication. For example, an application might be run by a user without proper authorization, or by an intruder outside the organization. The application may be malware, or it might be authorized software that has become infected with a virus. Machine data that includes information about application activity is yet another example of event data that can be tracked for potential instances of network compromise.

In one aspect of the techniques introduced here, the event data is analyzed, via various machine learning techniques as disclosed herein, to identify anomalies from expected or authorized network activity or behavior. An "anomaly" in the context of this description is a detected fact, i.e., it is objective information, whereas a "threat" (discussed further below) is an interpretation or conclusion that is based on one or more detected anomalies. Anomalies can be classified into various types. As examples, anomalies can be alarms, blacklisted applications/domains/IP addresses, domain name anomalies, excessive uploads or downloads, website attacks, land speed violations, machine generated beacons, login errors, multiple outgoing connections, unusual activity time/sequence/file access/network activity, etc. Anomalies typically occur at a particular date and time and involve one or more participants, which can include both users and devices.

In another, related aspect of the disclosure, the event data is analyzed to identify threats. Threats are interpretations or conclusions based on, and therefore associated with, one or more anomalies. Threats can be categorized or grouped into various types, both external and internal to the organization. Examples of threats include data exfiltration (by compromised account, by malware, or by a suspicious user or device), public-facing website attack, suspicious behavior by an insider, and breach of a rule (such as a blacklist, file transfers). Like an anomaly, a threat can be associated with one or more participants, including users, devices, and applications. A threat need not have a specific event date, because it might be ongoing, in which case it can have a start date and a date of last update. Each threat is based on at least one anomaly.

Because network security monitoring can involve tracking network activity by users, devices, and applications (referred to collectively as "entities") to identify and track anomalies and threats (referred to collectively as "instance of potential network compromise," or "instances"), a graphical user interface for a user in accordance with the present disclosure also organizes, tracks, and presents information concerning these entities and instances of potential network compromise. Since information pertaining to different entities and instances may be interrelated, the graphical user interface, in accordance with various embodiments of the present disclosure, provides various views for causing display of this information. The graphical user interface also includes links in these views to cross-reference the information. These capabilities facilitate a user's ability to understand the connections and relationships between different entities and/or instances to better understand security risks and causes of a problem.

For example, the graphical user interface provides several different ways for a user to access information pertaining to a particular device that seems suspicious. The user may search for the device directly through a "device view." Alternatively, the user may notice the device when reviewing a threat, and then click on a link for the device from within a threat view. Instead, the user might become aware of the device when reviewing information about an anomaly, and click on a link for the device from an anomaly view. As yet another alternative, the user might notice the device when navigating a "user view," and clock on the link from within the user view. Once the user reviews information about the suspicious device, the user can use a "watchlist" to "mark" the device (e.g., as suspicious). Once the device is put in the watchlist, that tracking information can stay with the device and obtained upon access device information from any view.

Figure 39A:
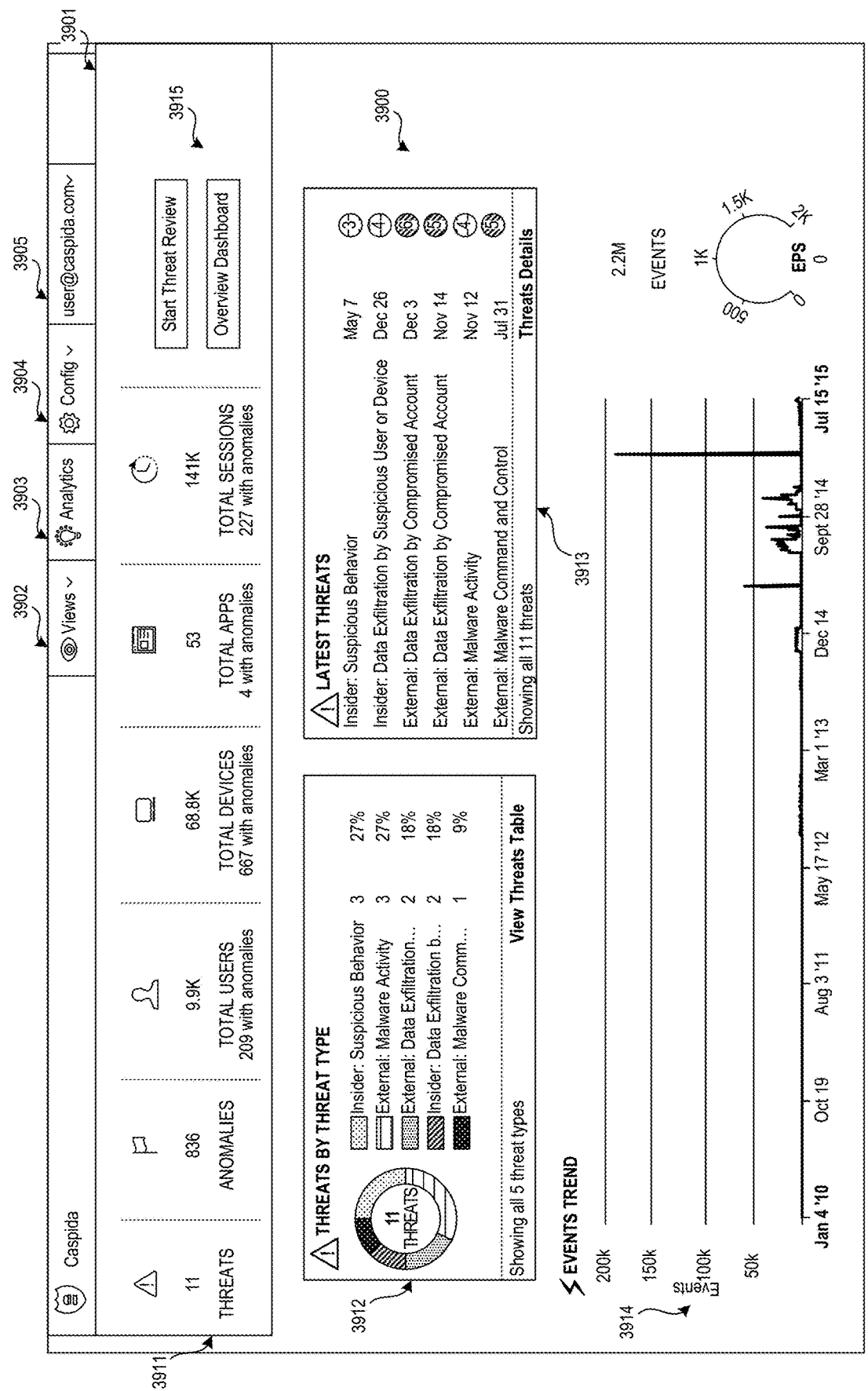
FIG. 39A is an illustrative home screen in a GUI of a system for monitoring potential computer network compromise, in accordance with various embodiments of the disclosure.

In accordance with various aspects of the present disclosure, FIG. 39A provides an example high level, "home screen" view 3900 generated by display data for display in a graphical user interface ("GUI"). This may be the first screen viewed after log-in. Toolbar 3901 also may be included in all views generated for display in the GUI. In this example, the toolbar includes a "Views" tab 3902, "Analytics" tab 3903, "Config" tab 3904, and GUI user name tab 3905 for log-in.

Figure 39B:
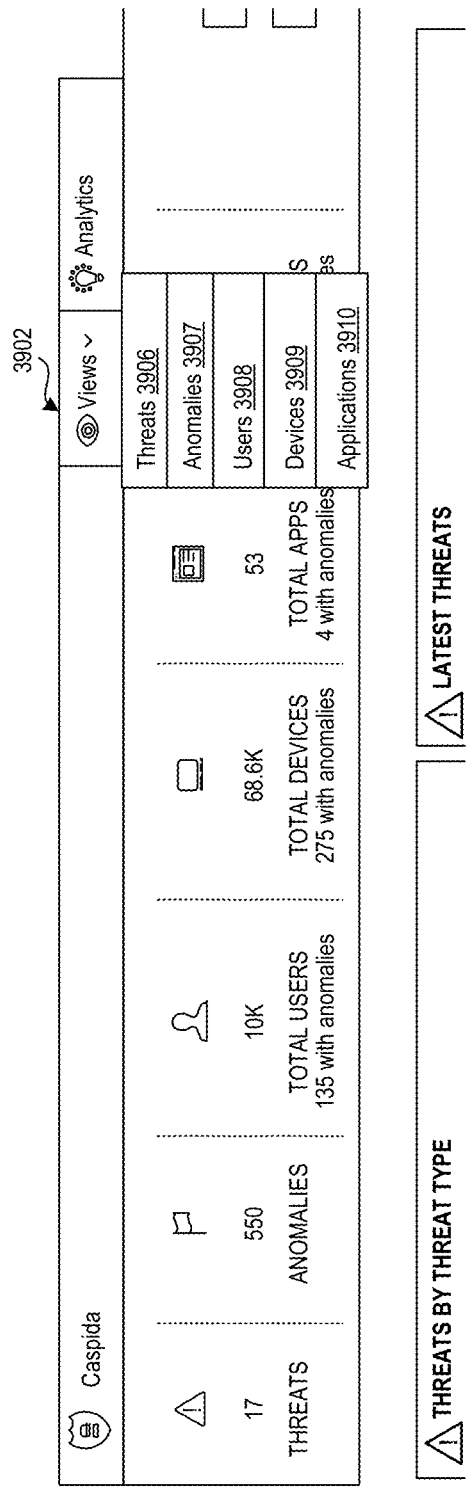
FIG. 39B is an illustrative screen in the GUI of FIG. 39A, depicting an expanded view of a "Views" tab selector, which enables a GUI user to select between viewing screens identifying instances of potential network compromise and viewing screens identifying entities associated with the instances of potential network compromise, in accordance with various embodiments of the disclosure.

By clicking on the "Views" tab 3902, as shown in FIG. 39B, a GUI user can toggle the GUI between a "Threats" view 3906, "Anomalies" view 3907, "Users" view 3908, "Devices" view 3909, and "Applications" view 3910. As described in further detail below, the "Threats" view 3906 provides a listing of all active threats and the "Anomalies" view 3907 provides a listing of all anomalies. The "Users" view 3908, "Devices" view 3909, and "Applications" view 3910 provide separate listings for each type of entity (namely, users, devices, and applications, respectively) that is associated with an anomaly or threat.

Returning to FIG. 39A, the home screen view 3900 also may include a summary status bar 3911 indicating, for example, the number of threats, anomalies, total users, total devices, total apps, and total sessions on the network being monitored. The summary status bar can enable the GUI user to see, at a glance, the volume of information that can be reviewed and evaluated.

The home screen view 3900 can additionally include summary charts and illustrations, such as, as shown in FIG. 39A, a "Threats by Threat Type" box 3912, a "Latest Threats" box 3913, and an "Events Trend" graphic 3914. The "Threats by Threat Type" box 3912 compares by number each different type of threat that has been identified. The listing in the "Latest Threats" box 3913 identifies the most recent threats by date. The "Events Trend" graphic 3914 is a timeline showing the volume of events along a timeline.

The example home screen view 3900 also prompts a user, via status bar 3911, to begin a "Threat Review" or view an "Analytics Dashboard." Upon clicking, via the graphical user interface, on the "Start Threat Review" button 3915, a "Threats Review" view 4000 is provided, as described with reference to FIG. 40A.

Figure 40A:
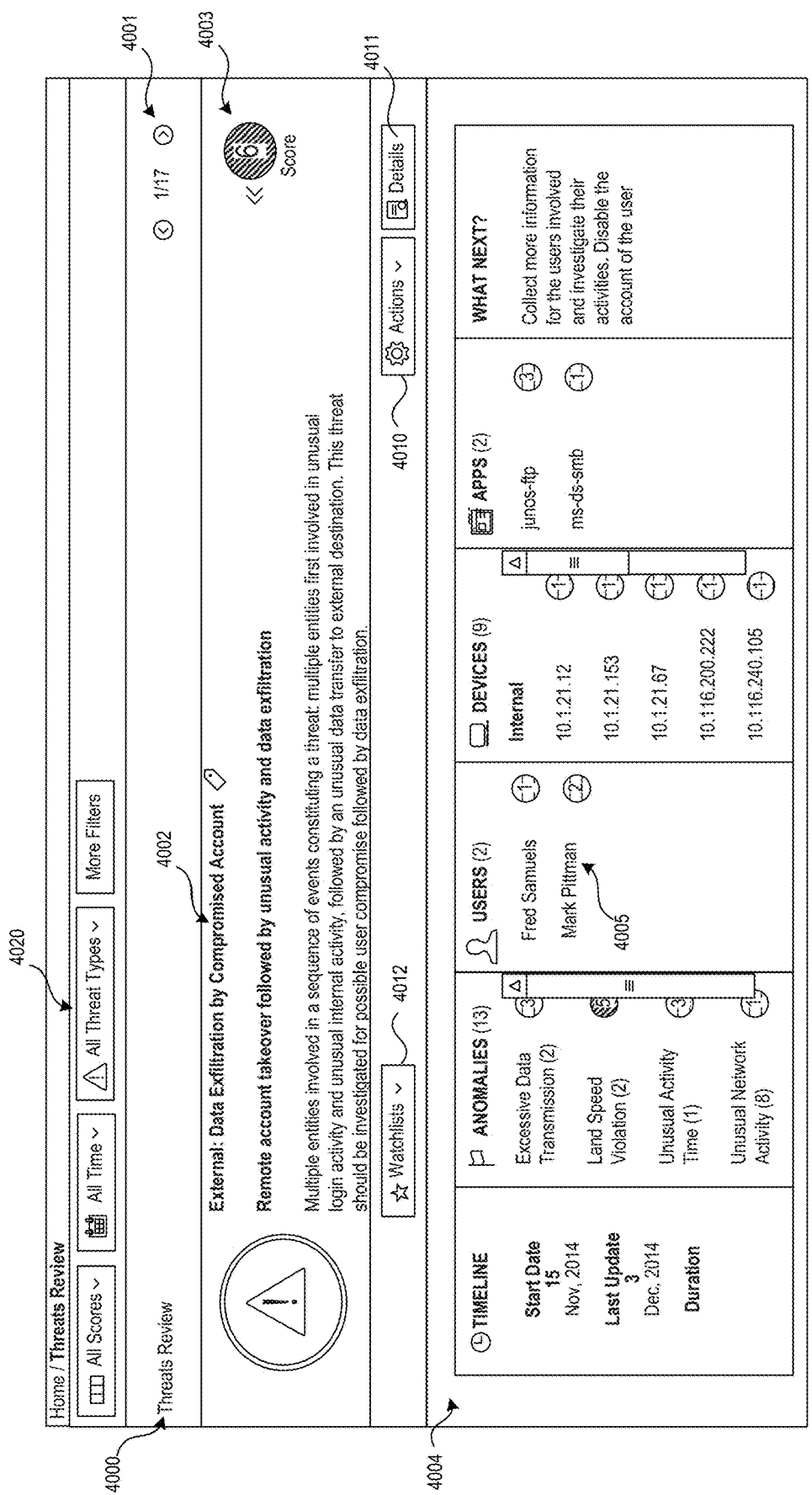
FIG. 40A is an illustrative view in the GUI of FIG. 39A of a "Threats Review" screen for reviewing identified threats, in accordance with various embodiments of the disclosure.

As shown in FIG. 40A, an example "Threats Review" view 4000 enables a user to separately click through each active threat that has been identified from the event data. In the upper-right of the view, a count and toggle 4001 enables the user to step through each identified threat.

Figure 40B:
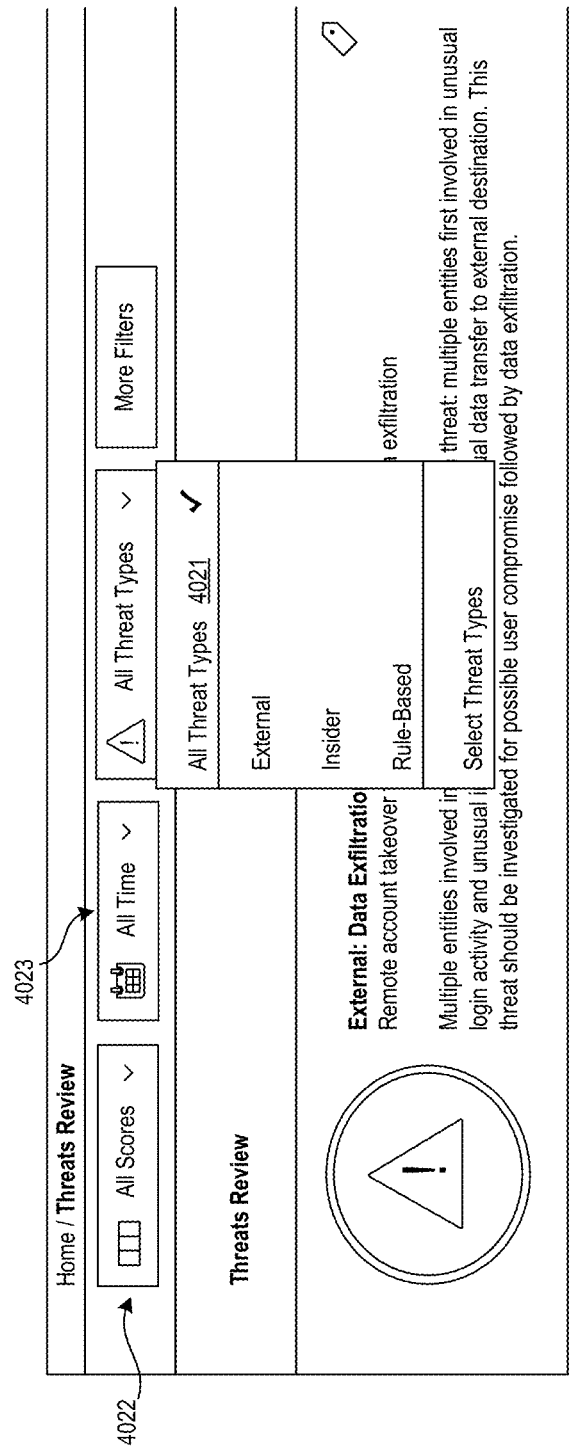
FIG. 40B is an illustrative view of an expanded "Threat Types" selector for filtering the "Threats Review" screen of FIG. 40A to display only a selected type of threat, in accordance with various embodiments of the disclosure.

The view 4000 can include a filter section 4020 that enables the user to selectively filter out threat results according to time, severity, or type. For example, as shown in FIG. 40B, the default provides views of "All Threat Types" 4021 but a user can change this to just review pages for "External," "Insider," or "Rule-Based" threats. The filter section 4020 also provides an option to "Select Threat Types," which enables the user to select the specific types of threats to be included in the Threat Review. The filter section 4020 also enables the user to filter out threats based on their scores by clicking the "Scores" tab 4022. (For example, if the user is only interested in evaluating high risk threats, the user might filter out any threats with a score less than 5). The user can also click on the "Time" tab 4023 to filter out threats based on a date range. For example, if the user is only interested in evaluating very recent threats, the user can choose to filter out any threats earlier than the past 24 hours.

Returning to FIG. 40A, each "Threat Review" view 4000 can identify a particular threat by its type and provides a summary description 4002 along with a threat score 4003. The threat score, determined based on machine learning from the event data, provides an indication of the severity of the risk for network compromise associated with the threat.

The "Threats Review" view 4000 can additionally include a status chart 4004 that provides a Timeline, list of Anomalies, list of Users, list of Devices, list of Apps, and a suggestion of "What Next." The Timeline identifies the date that the threat began, the last update concerning the threat, and the duration of time that the threat has been active. The list of Anomalies identifies each type of anomaly that is associated with the threat and how many anomalies of each type. The list of Anomalies also provides a score for each type of anomaly, which indicates the severity associated with each type of anomaly. The list of Users identifies each user associated with the threat and provides a score for each user. Similarly, the list of Devices and list of Apps identify each device (by IP address) and App (by file name/type), respectively, along with a score.

For each entity (e.g., user, device, and app), a link is included such that, if the link is clicked, the user is taken to a separate view for that selected entity. For example, if the link associated with "Mark Pittman" 4005 is clicked, a "Users Facts" page 300 within the Threats Review is generated, as can be seen from FIG. 41.

Figure 40C:
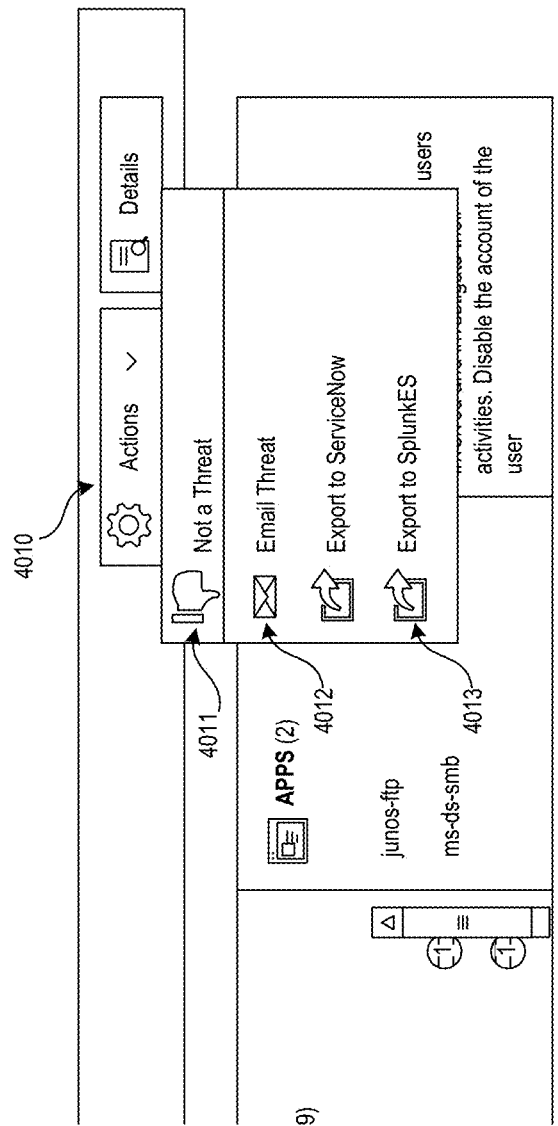
FIG. 40C is an illustrative view of an expanded "Actions" tab in the "Threats Review" screen of FIG. 40A, in accordance with various embodiments of the disclosure.

Returning again to FIG. 40A, Threats Review view 4000 additionally prompts the user to take "Actions" 4010, view additional "Details" 4011, or set up a "Watchlist" 4021. By clicking on the "Actions" tab 4010, the user can select from several options, as shown in FIG. 40C. If the user determines that the threat is not a concern, the user can select "Not a Threat" 4011. By making this selection, the user instructs the network security system to delete the threat page from the Threats View and to no longer identify it as a threat. As a consequence, the total number of threats will decrease (as will be depicted in the status bar 3911 in FIG. 39A). Another option in the "Actions" tab 4010 is the "Email Threat" selection 4012, which enables the user to email the threat to a designated email address. Yet another option is the "Export" selection 4013, which enables the user to export data associated with the threat to another data mining platform.

As shown in FIG. 40A, the Threats Review view 4000 also includes a "Details" tab 4011. When the user selects this tab, in the example provided in this figure, the Threats Review view is augmented with several additional charts and graphics, as shown in FIGS. 40D, 40E, and 40F, as will be described next.

Figure 40D:
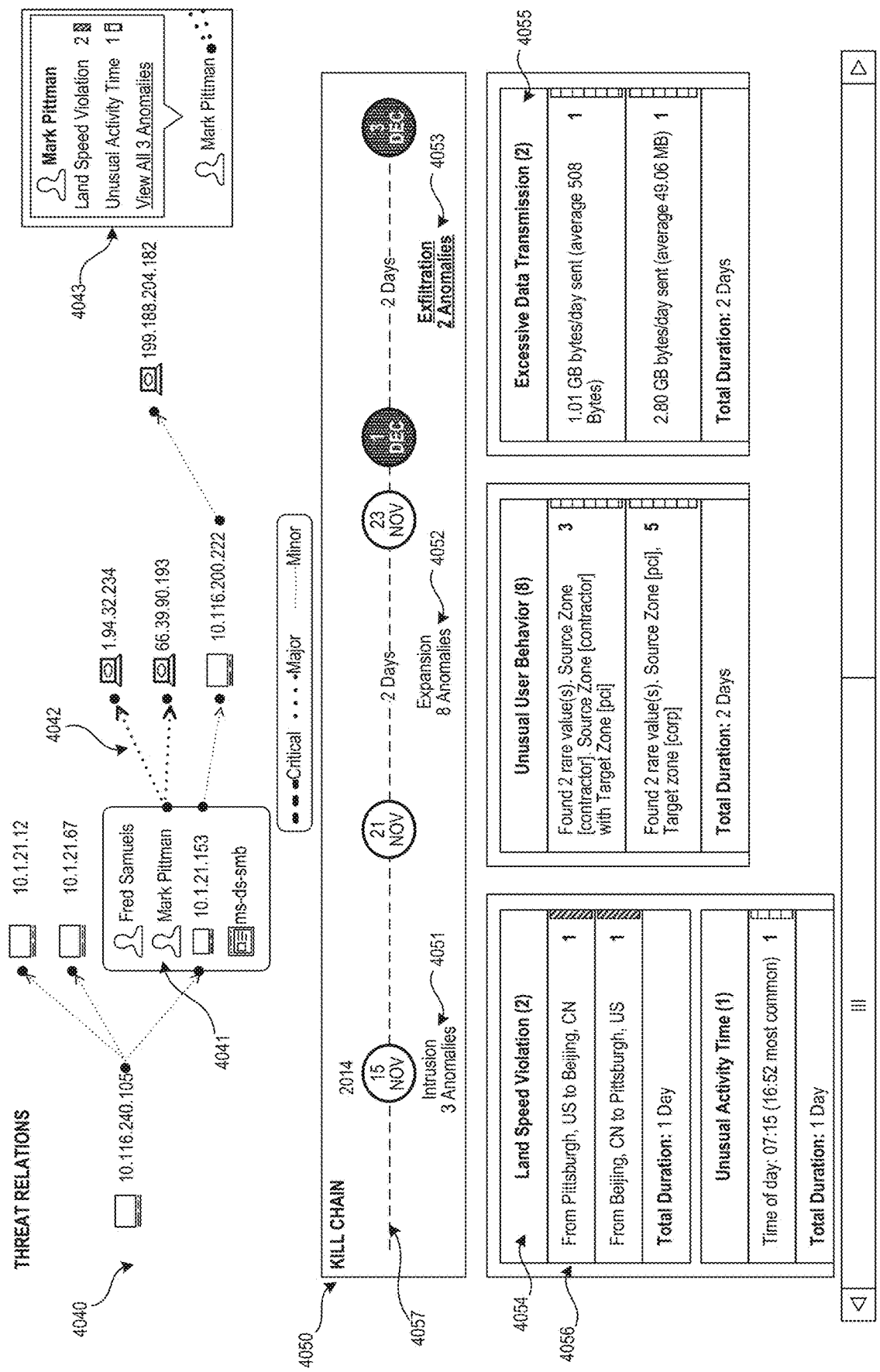
FIG. 40D is an illustrative view of a "Threat Relations" diagram and a "Kill Chain" diagram, which are generated upon clicking the "Details" tab in the "Threats Review" screen of FIG. 40A, in accordance with various embodiments of the disclosure.
Figure 40E:
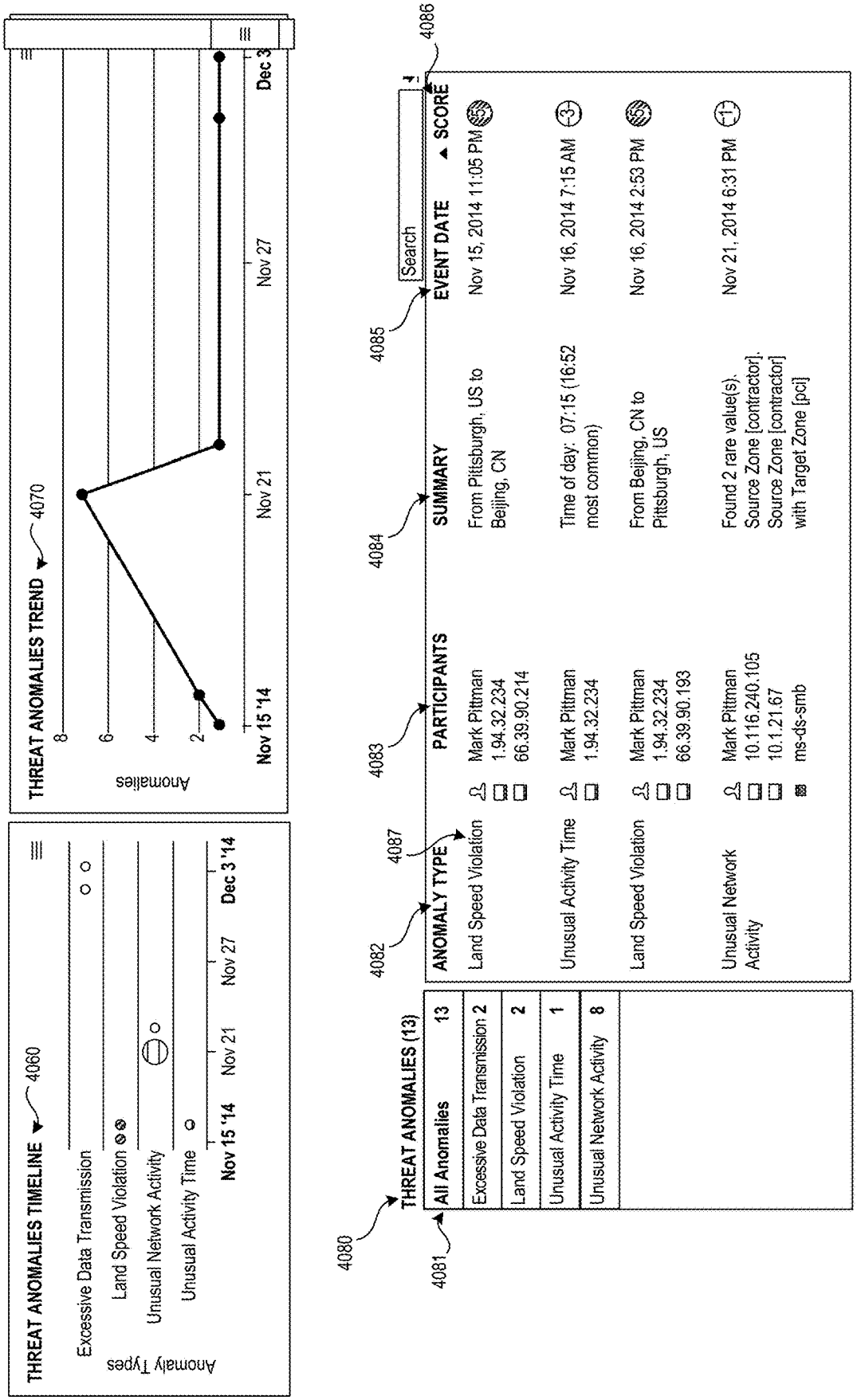
FIG. 40E is an illustrative view of a "Threat Anomalies Timeline," "Threat Anomalies Trend," and "Threat Anomalies" listing, which are generated upon clicking the "Details" tab in the "Threats Review" screen of FIG. 40A, in accordance with various embodiments of the disclosure.
Figure 40F:
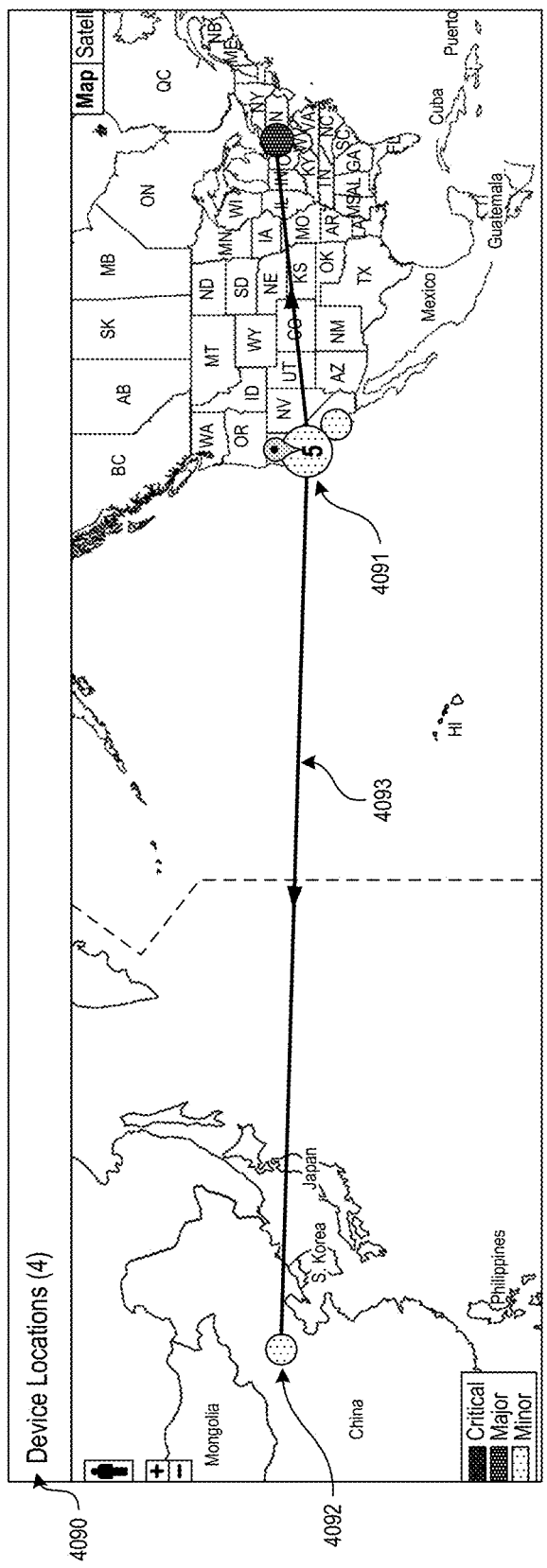
FIG. 40F is an illustrative view of a "Device Locations" map, which is generated upon clicking the "Details" tab in the "Threats Review" screen of FIG. 40A, in accordance with various embodiments of the disclosure.

FIG. 40D illustrates a "Threat Relations" flow 4040, which depicts the relationship between users, devices, and applications that are associated with the threat. Dotted lines connect one or more entities that are participants together in one or more anomalies associated with the threat. For example, in this flow, device "10.116.240.105" is connected via a dotted line with "10.1.21.153," which runs application "ms-ds-smb" and is associated with "Fred Samuels" and "Mark Pittman." The dotted is color-coded to indicate that it is "minor" in nature.

When a user "hovers" the cursor over (or highlights) the name of a user, device, or application (or an arrow pointing to the user, device, or application), display data generates a bubble in the GUI view that provides a high-level summary of information about that entity. For example, hovering over "Mark Pittman" causes bubble 4043 to appear, which indicates that "Mark Pittman" is associated with three anomalies: two "Land Speed Violations" (color-coded to indicate that these are considered "major") and one "Unusual Activity Time."

Figure 42:
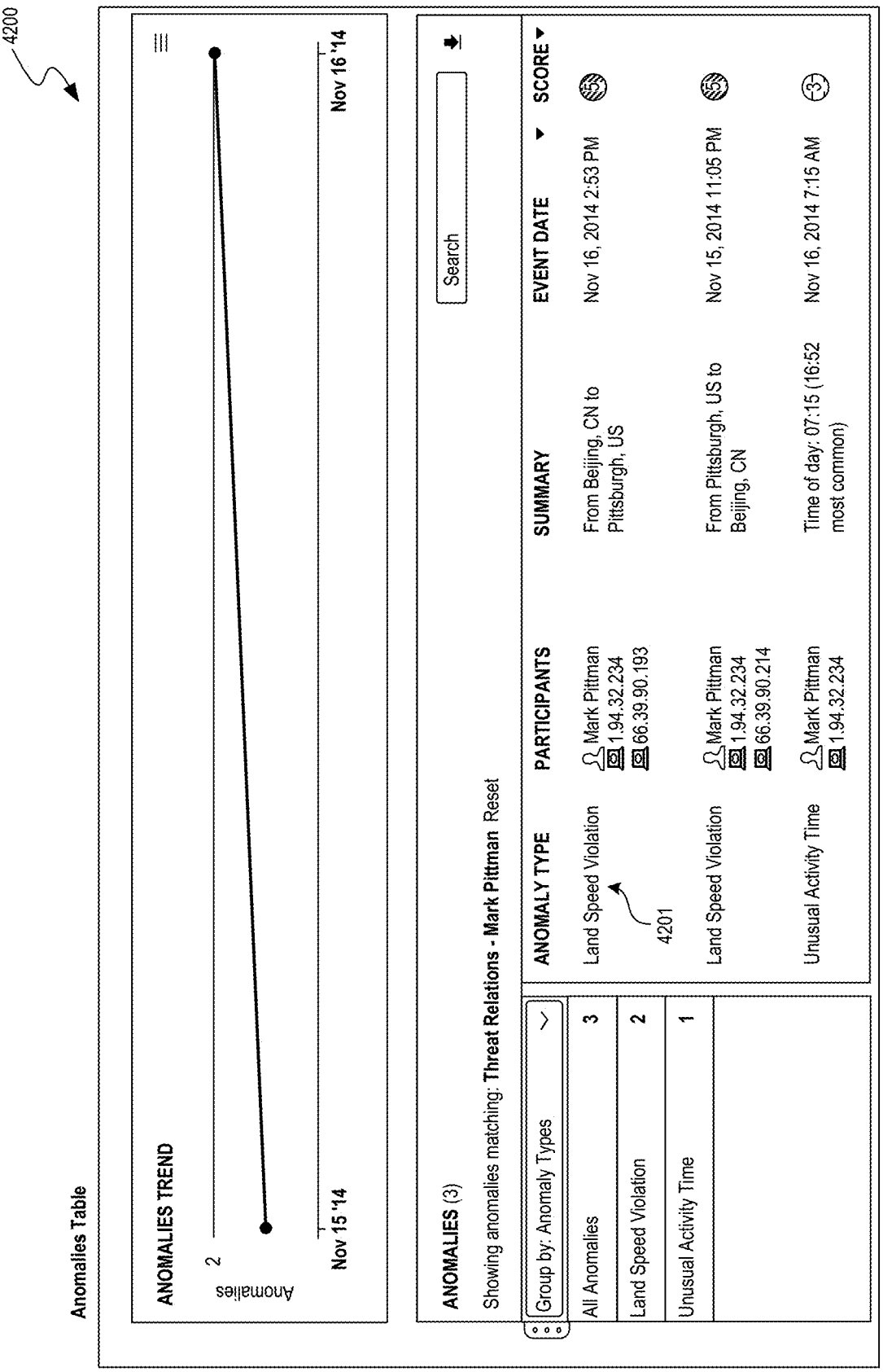
FIG. 42 is an illustrative view of an "Anomalies Table" screen in the GUI of FIG. 39A, in accordance with various embodiments of the disclosure.

In this example, the bubble 4043 additionally prompts the user to click a "View All 3 Anomalies" link. As shown in FIG. 42, clicking on this link causes the GUI to generate an Anomalies Table view 4200 that lists and provides high-level information about the three anomalies.

Figure 41:
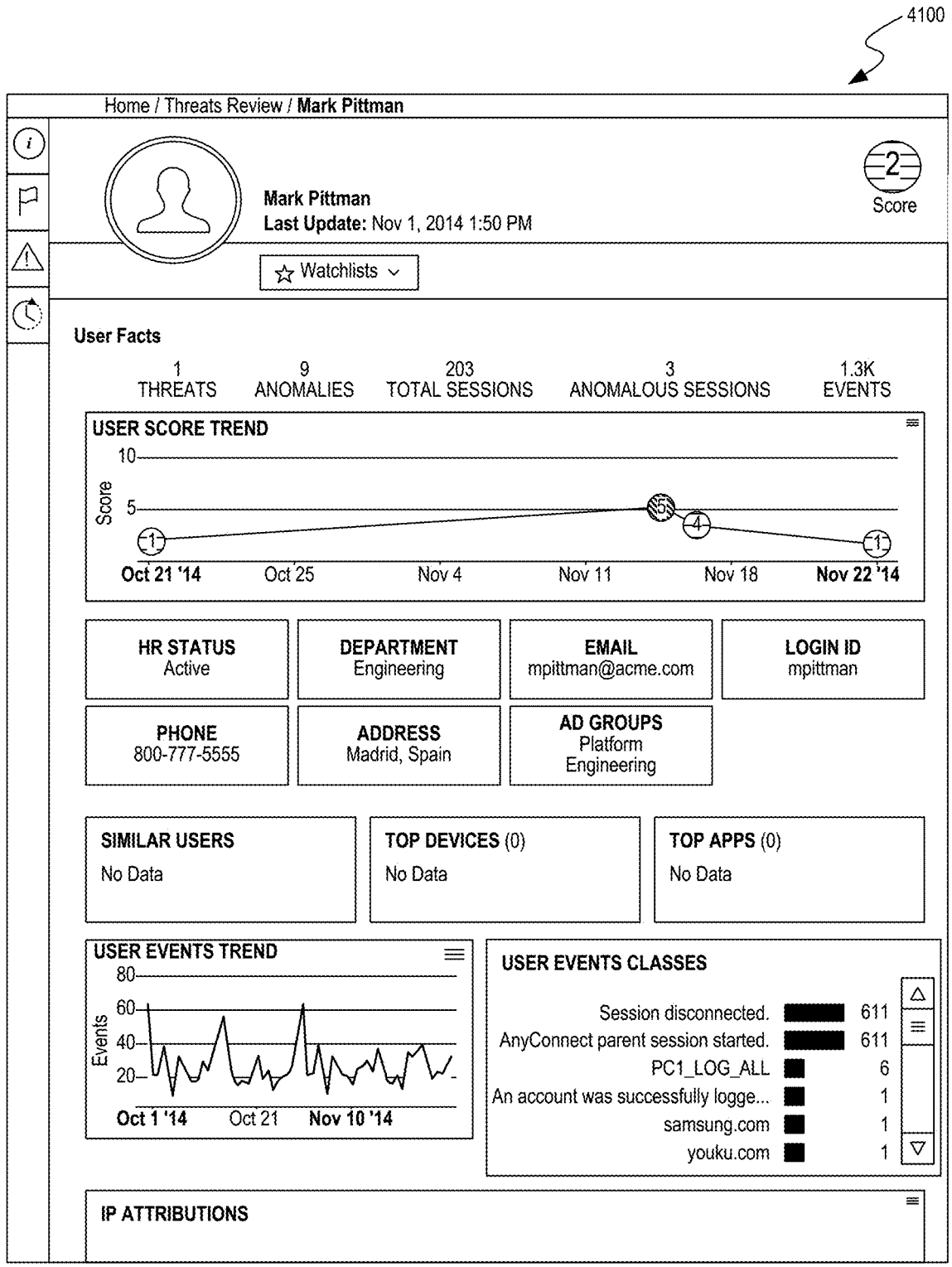
FIG. 41 is an illustrative view of a "User Facts" screen in the GUI of FIG. 39A, in accordance with various embodiments of the disclosure.

Instead of, or in addition to, hovering the cursor over an entity, the user can click on an entity to select to receive a view concerning that entity. For example, if the user clicks on "Mark Pittman," the GUI generates a "User Facts" view 4100 for Mark Pittman, as shown in FIG. 41.

FIG. 40D illustrates a "Kill Chain View" 4050 associated with the threat. The Kill Chain view illustrates three stages of the threat: "Intrusion" 4051, "Expansion" 4052, and "Exfiltration" 4053. For each stage, the GUI includes a summary of the anomaly or anomalies in that stage. For example, two Land Speed Violation anomalies 4054 occurred during the "Intrusion" stage. The GUI indicates that one of these violations 4056 was from Pittsburgh, in the US, to Beijing, in China. The GUI indicates the number of times that land speed violation occurred (once) and provides a color-code to indicate the severity of that violation as it relates to the threat.

Figure 43:
FIG. 43 is an illustrative view of an "Anomaly Details" screen in the GUI of FIG. 39A, in accordance with various embodiments of the disclosure.

The GUI can include a link for each anomaly in stages 4051, 4052, and 4053 of Kill Chain 4050 in FIG. 40D. For example, by clicking on "Land Speed Violation from Pittsburgh, US, to Beijing, China" 4056, the user navigates to Anomaly Details view 4300 for this selected anomaly, as shown in FIG. 43. In the example view provided in FIG. 40D, the two anomalies associated with the Exfiltration stage 4053 are both "Excessive Data Transmission" 4055. These are color-coded in red to provide an indication of their high level of severity.

The Kill Chain view additionally can include a timeline 4057 that illustrates the timing of each phase. In this example in FIG. 40D, the Intrusion phase 4051 is associated with 3 anomalies, beginning on Nov. 15, 2014. The Expansion phase 4052 is associated with 8 anomalies, beginning on Nov. 21, 2014, and concluding on Nov. 23, 2014. The Exfiltration stage 4053 is associated with 2 anomalies, beginning on Dec. 1, 2014, and concluding (or their last update occurred) on Dec. 3, 2014.

Returning to FIG. 40A, clicking on the "Details" tab 4011 in the Threats Review view 4000 also can generate illustrations of a Threat Anomalies Timeline 4060, Threat Anomalies Trend 4070, and Threat Anomalies listing 4080 and Device Locations 4090, in FIGS. 40E and 40F.

Referring to FIG. 40E, Threat Anomalies Timeline 4060 provides a timeline of each anomaly, sorted by anomaly type. In this example, there are four anomaly types: "Excessive Data Transmission," "Land Speed Violation," "Unusual Network Activity," and "Unusual Activity Time." The timeline shows a circle corresponding to each occurrence, which is color-coded to indicate its severity. If there is more than one anomaly of the same type on the same date, the circle is made larger. By hovering over a circle, a bubble is generated that provides the date of the anomaly or anomalies and prompts the user to select more detailed information (not shown). Upon clicking on a bubble, the GUI generates an associated Anomalies Table view 4200, in the format shown in FIG. 42.

FIG. 40E additionally includes Threat Anomalies Trend 4070. This provides a line graph indicating the number of anomalies during periods of time. With this illustration, a GUI user can quickly discern whether a large number of anomalies occurred on a particular date or time period, and whether there is a trend of increasing or decreasing anomalies. By hovering over a point on the line, the GUI generates a bubble indicating the date and number of anomalies on that date. Similar to the Threat Anomalies Timeline 4060, upon clicking on a bubble, the GUI generates an associated Anomalies Table view 4200, in the format shown in FIG. 42.

The "Details" version of the Threats Review view 4000 also includes a Threat Anomalies listing 4080. In the listing, each entry is associated with an "Anomaly Type" 4082, one or more "Participants" 4083, a "Summary" 4084, an "Event Date" 4095, and a "Score" 4086. For example, "Land Speed Violation" 4087, the first listed anomaly type, is associated with three "Participants," user "Mark Pittman" and devices "1.94.32.234" and "66.39.90.214." The listing summaries that the anomaly is "From Pittsburgh, US to Beijing, CN," and indicates that the anomaly occurred on "Nov. 15, 2014." The score associated with the anomaly is "5". By clicking on "Land Speed Violation," the GUI navigates to Anomaly Details view 4300 as shown in FIG. 43.

The listing of Anomalies 4080 provides a summary indicating each type of anomaly associated with the threat and the number of anomalies per type. The default for the listing is to display all anomalies as indicated by the "All Anomalies" tab 4081, but a GUI user can opt to view only anomalies of a selected type.

Figure 40H:
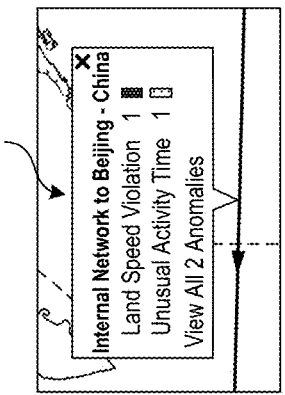
FIG. 40H is an illustrative view of a text bubble generated upon hovering a cursor over a line drawn between devices in the "Device Locations" map of FIG. 40F, in accordance with various embodiments of the disclosure.
Figure 40G:
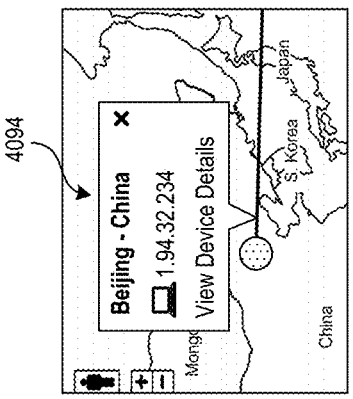
FIG. 40G is an illustrative view of a text bubble generated upon hovering a cursor over a device location in the "Device Locations" map of FIG. 40F, in accordance with various embodiments of the disclosure.

Referring to FIG. 40F, the detailed version of the Threats Review page 4000 also includes a Devices Location map 4090. This map provides a visual indication of the location of the devices associated with the threat. Device is represented on the map by a circle, color-coded to indicate the score, or severity of risk associated with the device or location. If there are multiple devices at a single location (or vicinity), it is represented by a larger circle. In FIG. 40F, there are four locations represented, one in China, two in California, and one in Pittsburgh, Pa. By hovering over a circle, such as 4092, the GUI generates a bubble, as shown in FIG. 40G, that provides more detailed location information (in this case, "Beijing—China"), the device name/IP address ("1.94.32.234"), and a link to "View Device Details." If the GUI user clicks on the link, the GUI navigates to the User Facts view 4100 of FIG. 41.

Devices Location map 4009 also includes color-coded lines that connect the devices. For example, line 4093 connects the devices represented by circle 4091 to the device represented by circle 4092. The lines correspond to the one or more anomalies for which the connected devices are participants. As shown in FIG. 40H, by hovering over line 4093, the GUI generates a bubble 4095 that identifies each anomaly represented by that line and a color-code indicating the score for that anomaly. The bubble 4095 additionally includes a link for the GUI user to view all associated anomalies (e.g., "View All 2 Anomalies"). Upon clicking on the link to view all anomalies, the GUI navigates to the associated Anomalies Table 4200, in the format shown in FIG. 42.

As can be seen, the GUI introduced here enables a user to access the same views and information via several possible navigational paths. For example, link 4056 in the Kill Chain view in FIG. 40D, link 4087 in the Threat Anomalies listing in FIG. 40D, and link 4201 in the Anomalies Table in FIG. 42 each navigate to the "Land Speed Violation" Anomaly Details view 4300 in FIG. 43. Similarly, there are several paths (via the charts, diagrams, listings, and maps shown in FIGS. 40E, 40F, 40G, and 40H, to access User Facts 4100 in FIG. 41 and Anomalies Table 4200 in FIG. 42.

Figure 44A:
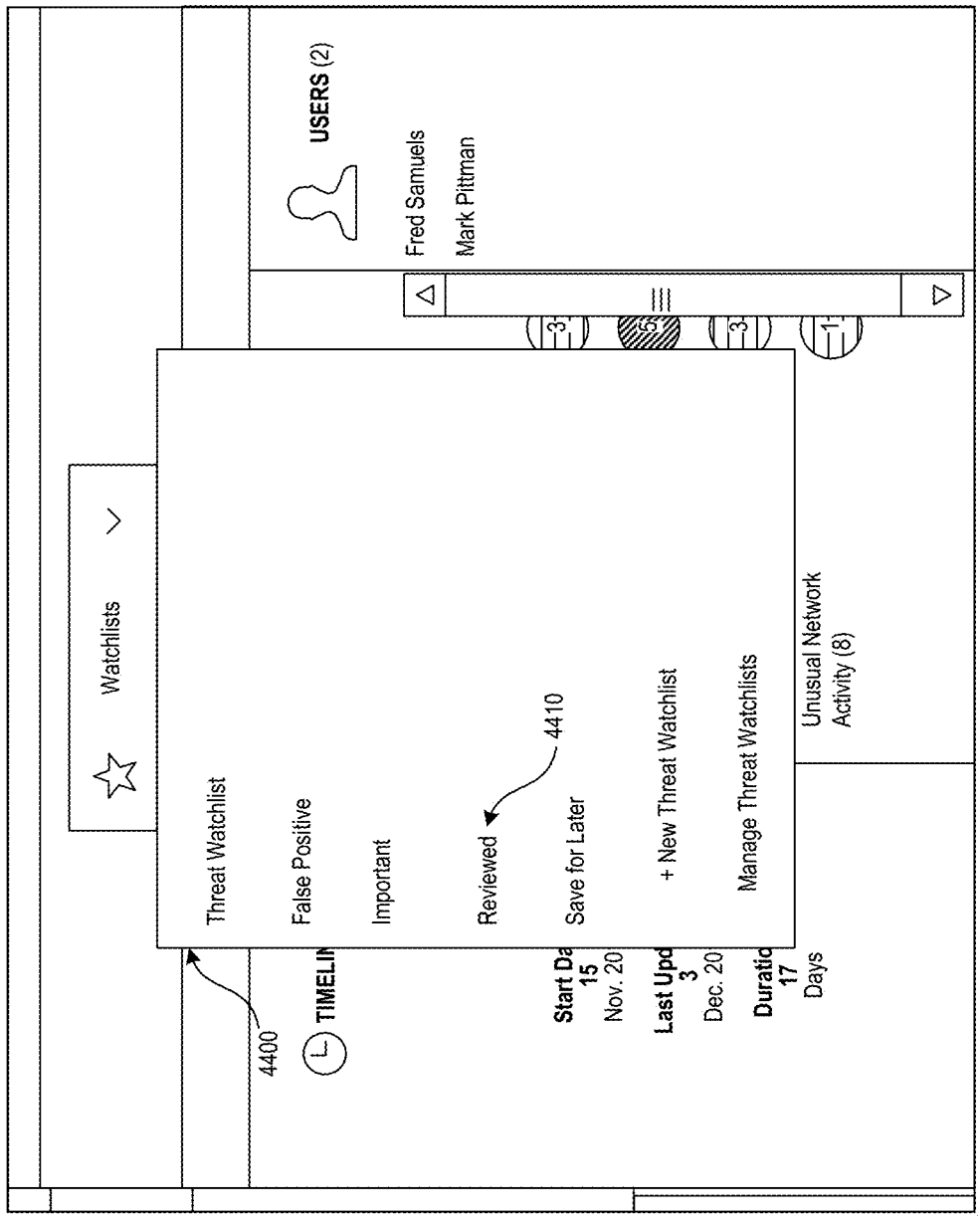
FIG. 44A is an illustrative view of an expanded "Watchlists" tab in the "Threats Review" screen of FIG. 40A, in accordance with various embodiments of the disclosure.

As shown in FIG. 40A, Threats Review page 4000 additionally includes "Watchlist" tab 4012, which enables the GUI user to track the threat. Upon clicking on tab 4412, as shown in FIG. 44A, the GUI provides a bubble 4400 prompting the user to tag the threat with "Threat Watchlist," "False Positive," "Important," "Reviewed," "Save for Later," or to define a new category for tagging (via the "New Threat Watchlist" selection). The tag remains associated with the threat until the GUI user changes the watchlist. For example, by designating the threat as "Reviewed" 4410, as shown in FIG. 44A, the GUI associates the threat as "Reviewed" in subsequent reviews of the threat, as shown at 4411 in FIG. 44B.

In addition to providing threat, anomaly, and entity information in various views via the "Threat Review," the GUI also enables users to directly navigate to desired views containing the same information via the Views tab 3902 as shown in FIG. 39B. The Views tab 3902 can be accessed from any view in the GUI. As shown in FIG. 39B, the Views tab 3902 enables a user to toggle between a Threats view 3906, Anomalies view 3907, Users view 3908, Devices view 3909, and Applications view 3910.

Figure 45A:
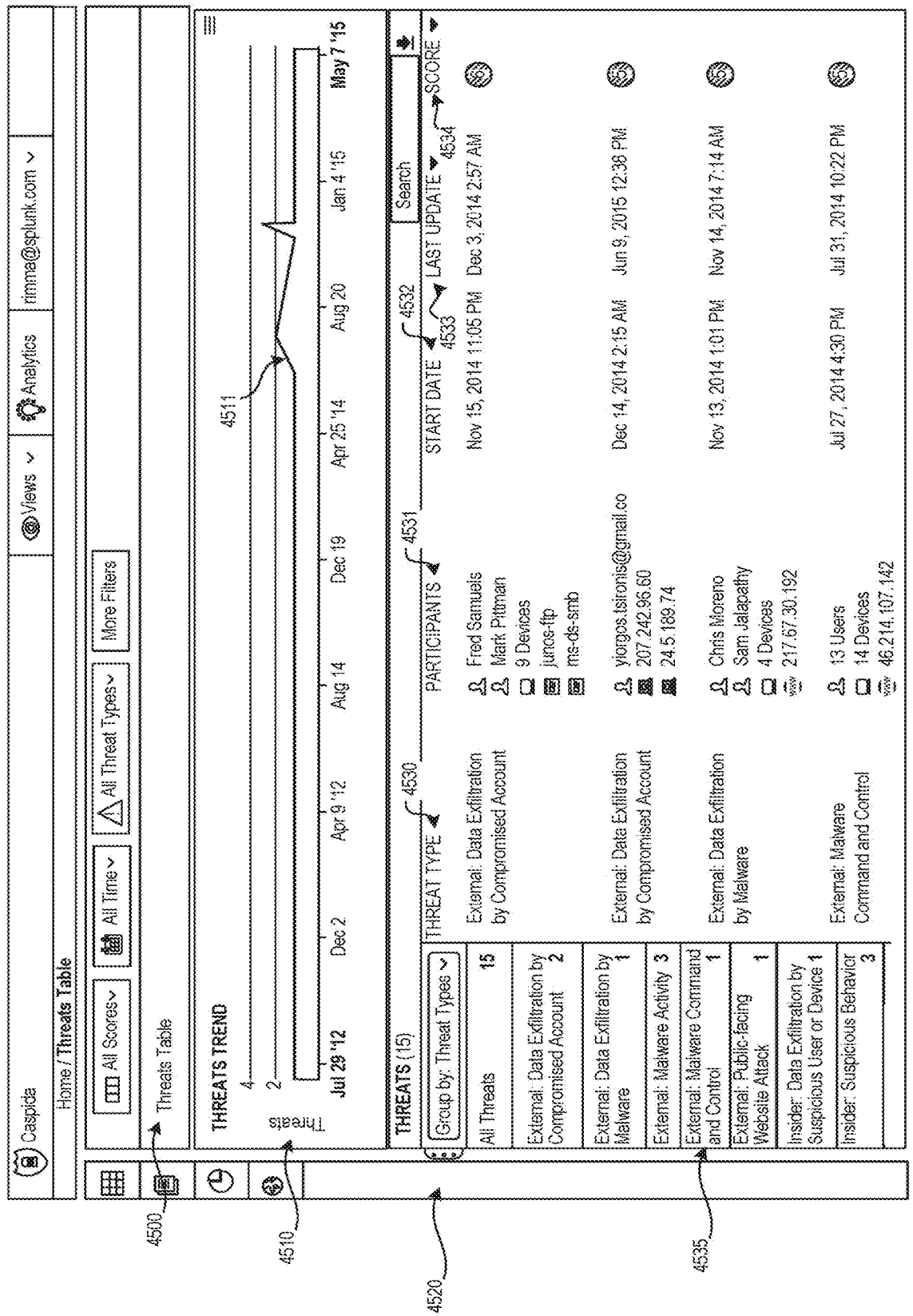
FIG. 45A is an illustrative view of a "Threats Table" screen in the GUI of FIG. 39A, in accordance with various embodiments of the disclosure.

FIG. 45A provides an example view that the GUI generates when a GUI user selects the Threats view 3906 in FIG.

Figure 45B:
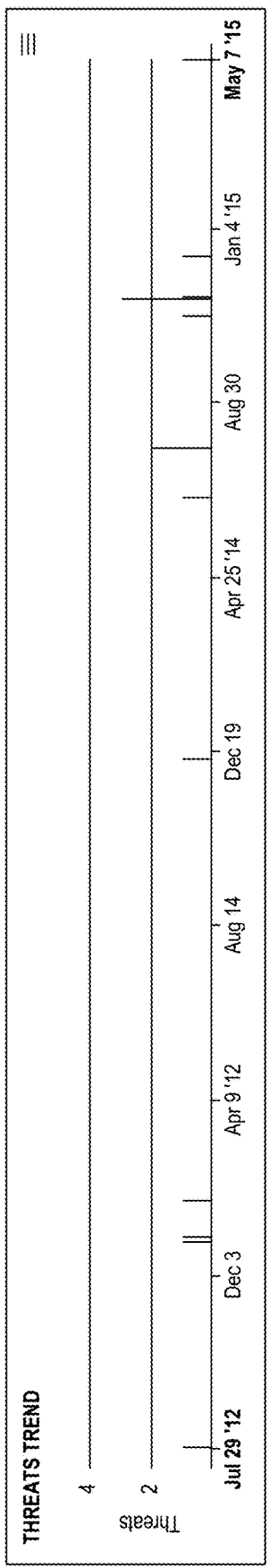
FIG. 45B is an illustrative view of a "Threats Trend" as a line chart.
Figure 45C:
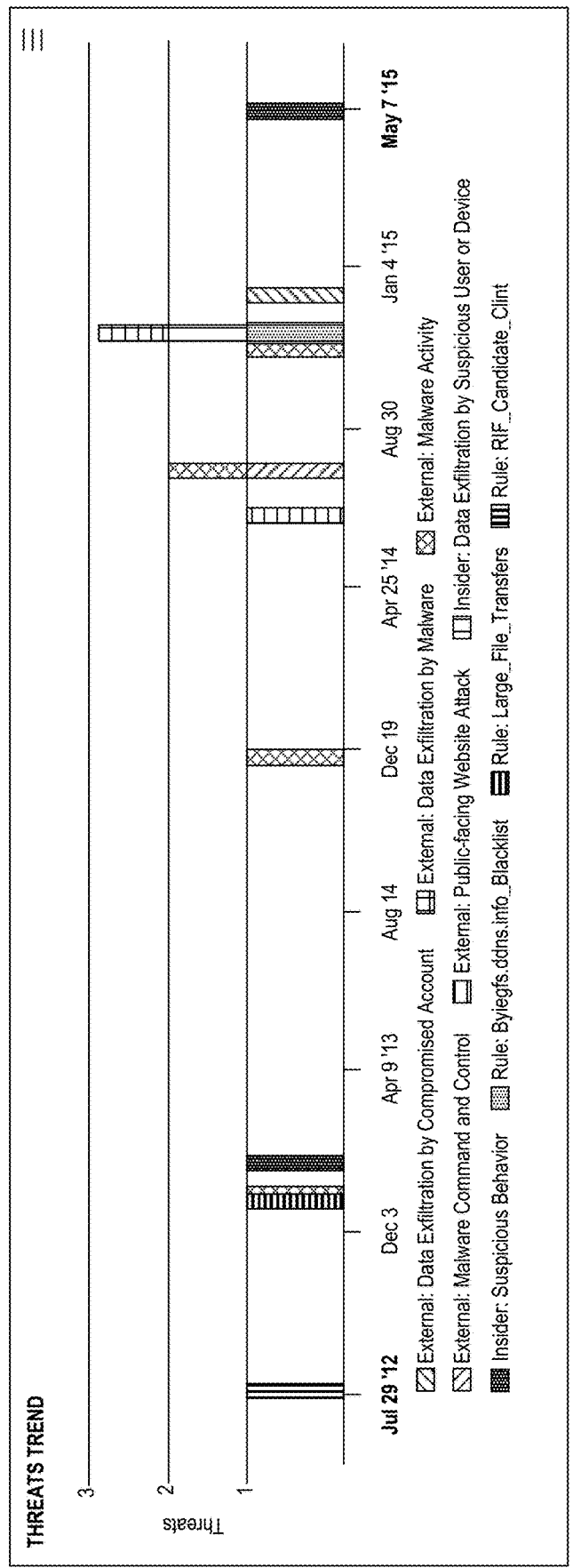
FIG. 45C is an illustrative view of a "Threats Trend" as a column chart.

39B. The Threats Table view 4500 provides a Threats Trend timeline 4510 and a Threats listing 4520. The Threats Trend 4510 illustrates the number of threats over a period of time. This can be provided as a line chart, as shown in FIG. 45A. As alternatives, the same information can be re-formatted as a column chart, as shown in FIG. 45B, or as a breakdown column chart as shown in FIG. 45C.

While viewing the Threats Trend 3906 (in any format), the GUI user can use the cursor to hover over displayed data to receive more specific information. For example, referring to FIG. 45A, hovering over the data on the line at 4511 causes a text bubble 4512 to appear, indicating a specific date (or time) and the number of threats at that point, as shown in FIG. 45D.

Referring back to FIG. 45A, the Threats listing 4520 lists all active threats. The Threats listing provides, for each entry, the Threat Type 4530, Participants 4531, Event Date 4532, Last Update 4533, and Score 4534. A summary section 4535 identifies the number of threats of each type and provides an option to just display the threats of a certain specified type.

Figure 45D:
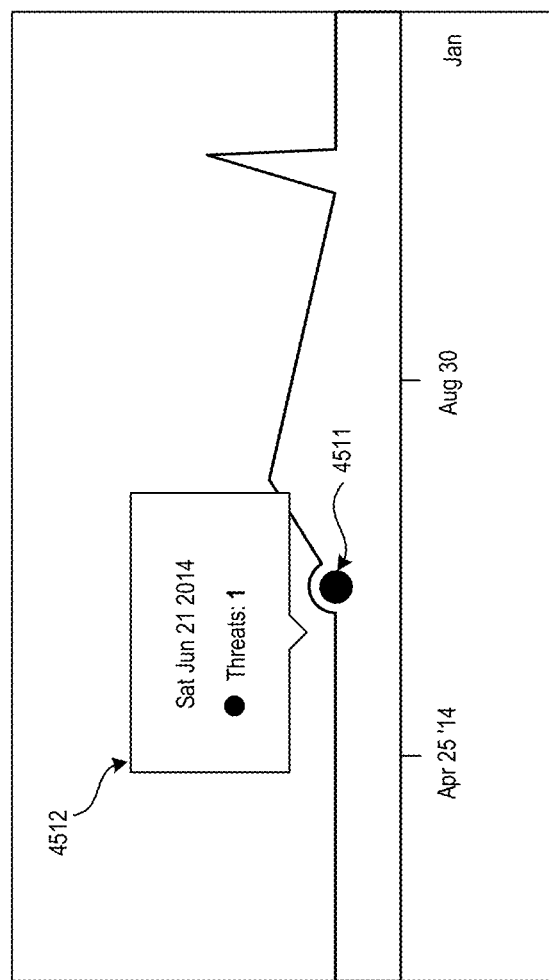
FIG. 45D is an illustrative view of a text bubble generated upon hovering a data point in the "Threats Trend" diagram of FIG. 45A, in accordance with various embodiments of the disclosure.

In FIG. 45D, if the GUI user clicks on the text bubble 4512, the Threats listing 4520 changes to display only the subset of threats that are associated with the selected date on the timeline. To receive specific information about a threat in the subset of threats, the GUI user clicks on a link in the Threats listing 4520. The GUI then navigates to the Threat Details page 4540, as shown in FIG. 45E. This page provides the same information (including the same charts, graphs, etc.) provided in the Threats Review page 4000 when the "Details" tab 4011 is selected. In the same manner as shown in FIGS. 40A-40E and as described above with reference to those figures, the Threats Detail page 4540 also provides the same summary chart, Threats Relations graphic, Kill Chain view, Threat Anomalies Timeline, Threat Anomalies Trend, Threat Anomalies listing, and Device Locations map. And as in FIG. 2, the Threats Detail page 4540 also enables the GUI user to create a Watchlist or to take Action.

Finally, while viewing Threats Table 4500, the GUI user can navigate to the User Facts view 4100 in FIG. 41 or the Anomaly Details 500 in FIG. 43 in largely the same manner. For example, from within the Threats listing 4520 on FIG. 45A, a GUI user can click on the link for any participant (user, device, or application) and then receive the User Facts view 4100. As another example, from the Kill Chain view in FIG. 45E, a GUI user can select any anomaly associated with a phase in the Kill Chain (namely, intrusion, expansion, and exfiltration, and view the Users Table or equivalent information concerning other entities.

Figure 46A:
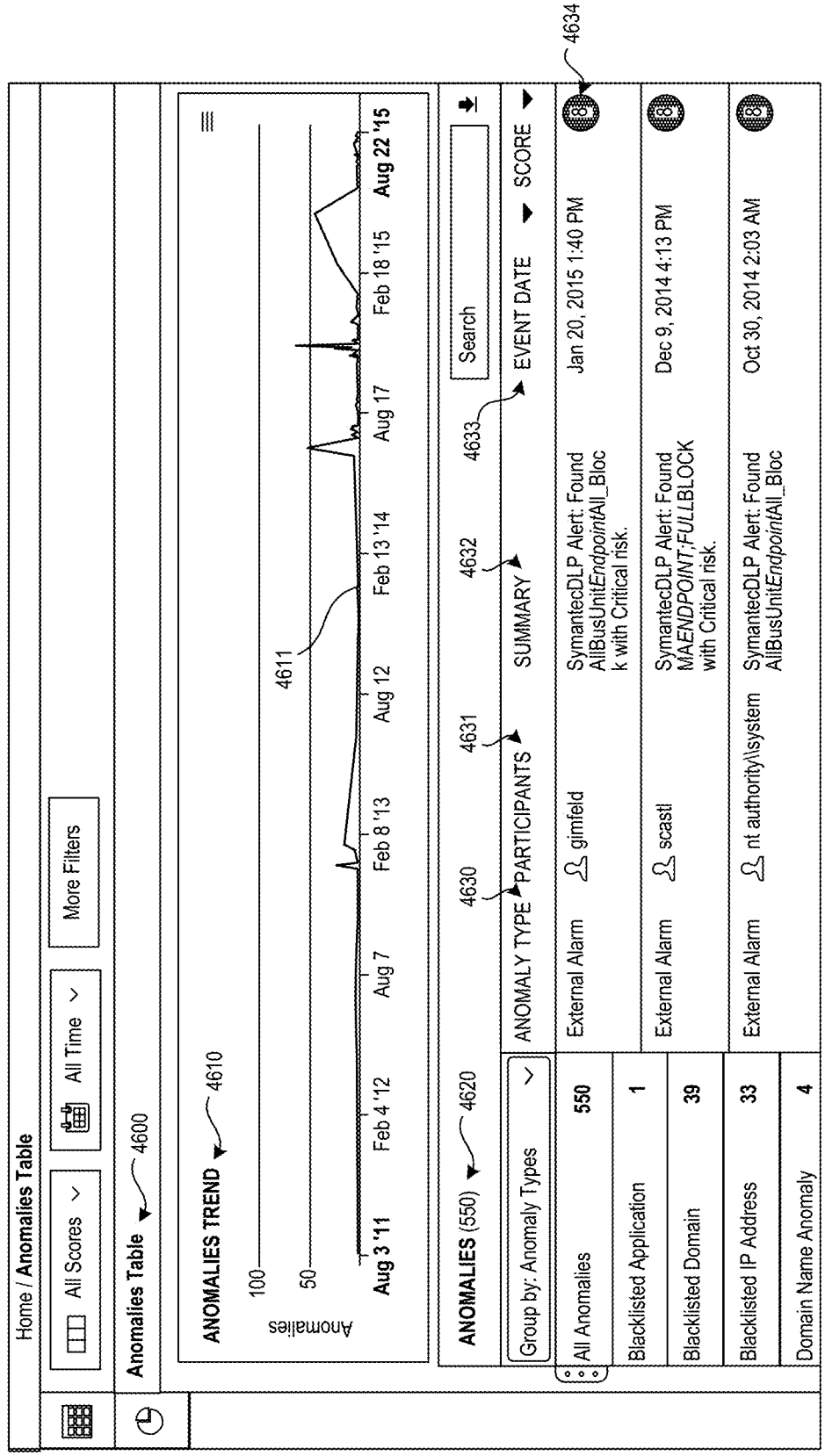
FIG. 46A is an illustrative view of an "Anomalies Table" screen in the GUI of FIG. 39A, in accordance with various embodiments of the disclosure.

FIG. 46A provides an example view that the GUI generates when a GUI user selects the Anomalies view 3907 in FIG. 39B. The Anomalies table 4600 provides an Anomalies Trend timeline 4610 and an Anomalies listing 4620. The Anomalies Trend 4610 illustrates the number of anomalies over a period of time. This can be provided as a line chart, as shown in FIG. 46A. As alternatives, the same information can be re-formatted as a column chart, or as a breakdown column chart (not shown), analogous to the Threat Trend as shown in FIGS. 45A-45C.

While viewing the Anomalies Trend 4610 (in any format), the GUI user can use the cursor to hover over displayed data to receive more specific information. For example, referring to FIG. 46A, hovering over the data on the line at 4611 causes a text bubble to appear, indicating a specific date (or time) and the number of anomalies at that point (not shown).

In the Anomalies Table view 4600, the Anomalies listing 4620 lists all active anomalies. The Anomalies listing provides, for each entry, the Anomaly Type 4630, Participants 4631, Summary 4632, Event Date 4633, and Score 4634. To the left of the listing, the view identifies the number of anomalies of each type and provides an option to just display the anomalies of a certain specified type.

Figure 46B:
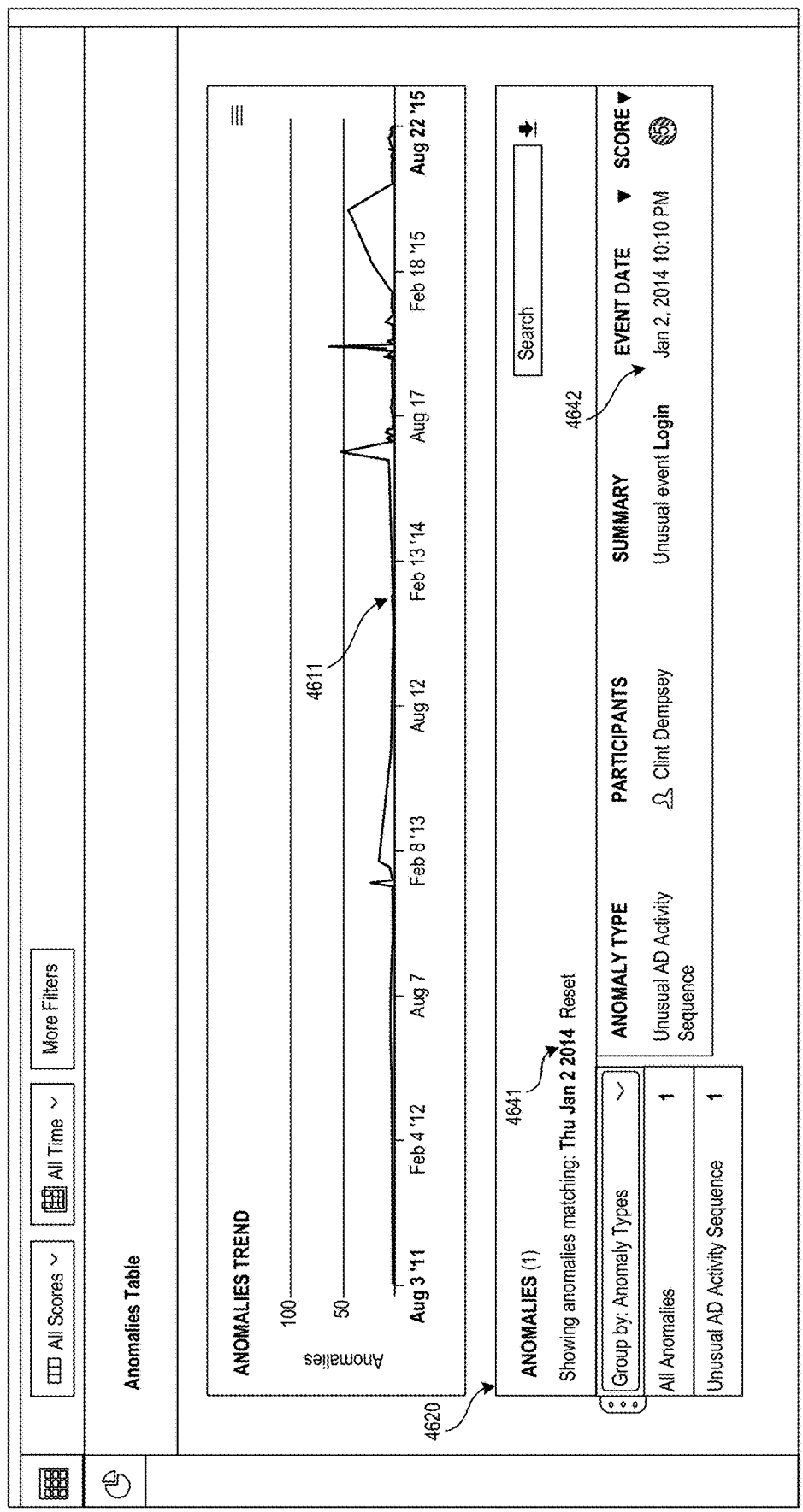
FIG. 46B is an illustrative view of the "Anomalies Trend" and the "Anomalies" listing in the "Anomalies Table" screen of FIG. 46A, depicting a selection of a data point in the "Anomalies Trend" diagram.

As shown in FIG. 46B, if the GUI user clicks on the graph of the Anomalies Trend at 4611, the Anomalies listing 4620 changes, as indicated at 4641, to display only the subset of anomalies that are associated with the selected date on the timeline, as shown at 4642.

Figure 46C:
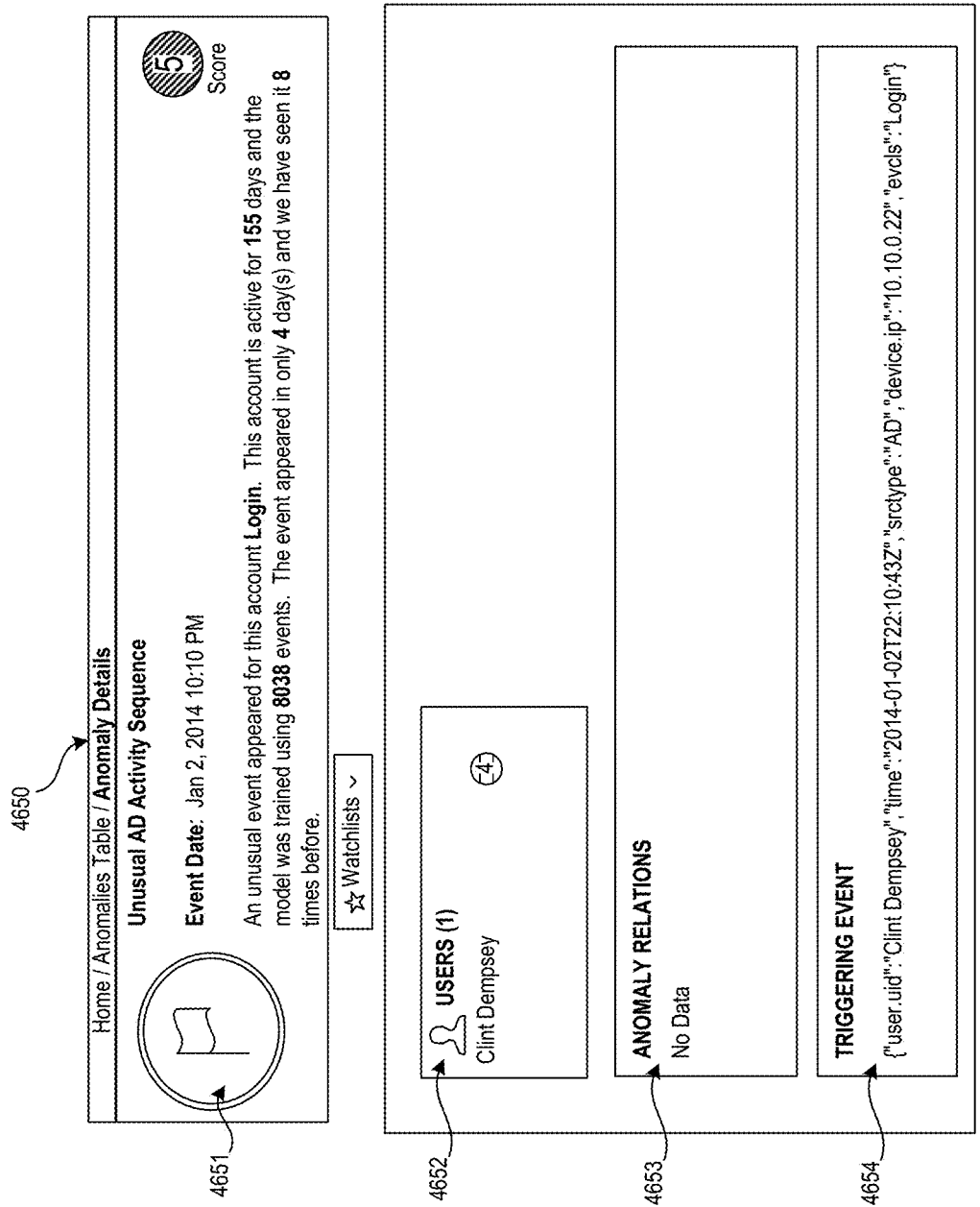
FIG. 46C is an illustrative view of a portion of an "Anomalies Details" screen for a selected anomaly in the GUI of FIG. 39A, including a "Users" section, "Anomaly Relations" section, and "Triggering Event" section, in accordance with various embodiments of the disclosure.
Figure 46D:
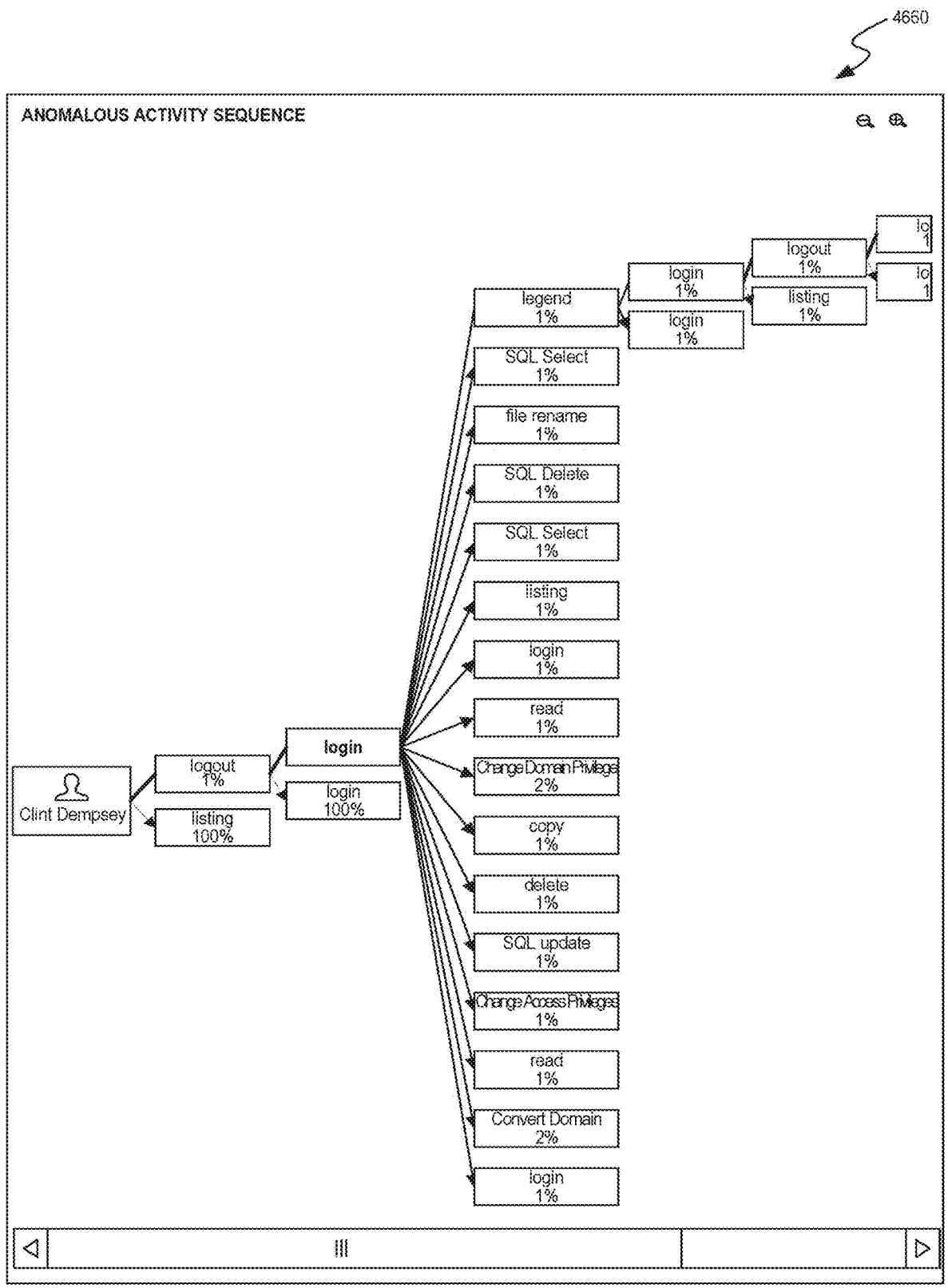
FIG. 46D is an illustrative view of a portion of an "Anomalies Details" screen for a selected anomaly in the GUI of FIG. 39A, including an "Anomalous Activity Sequence" diagram, in accordance with various embodiments of the disclosure.
Figure 46E:
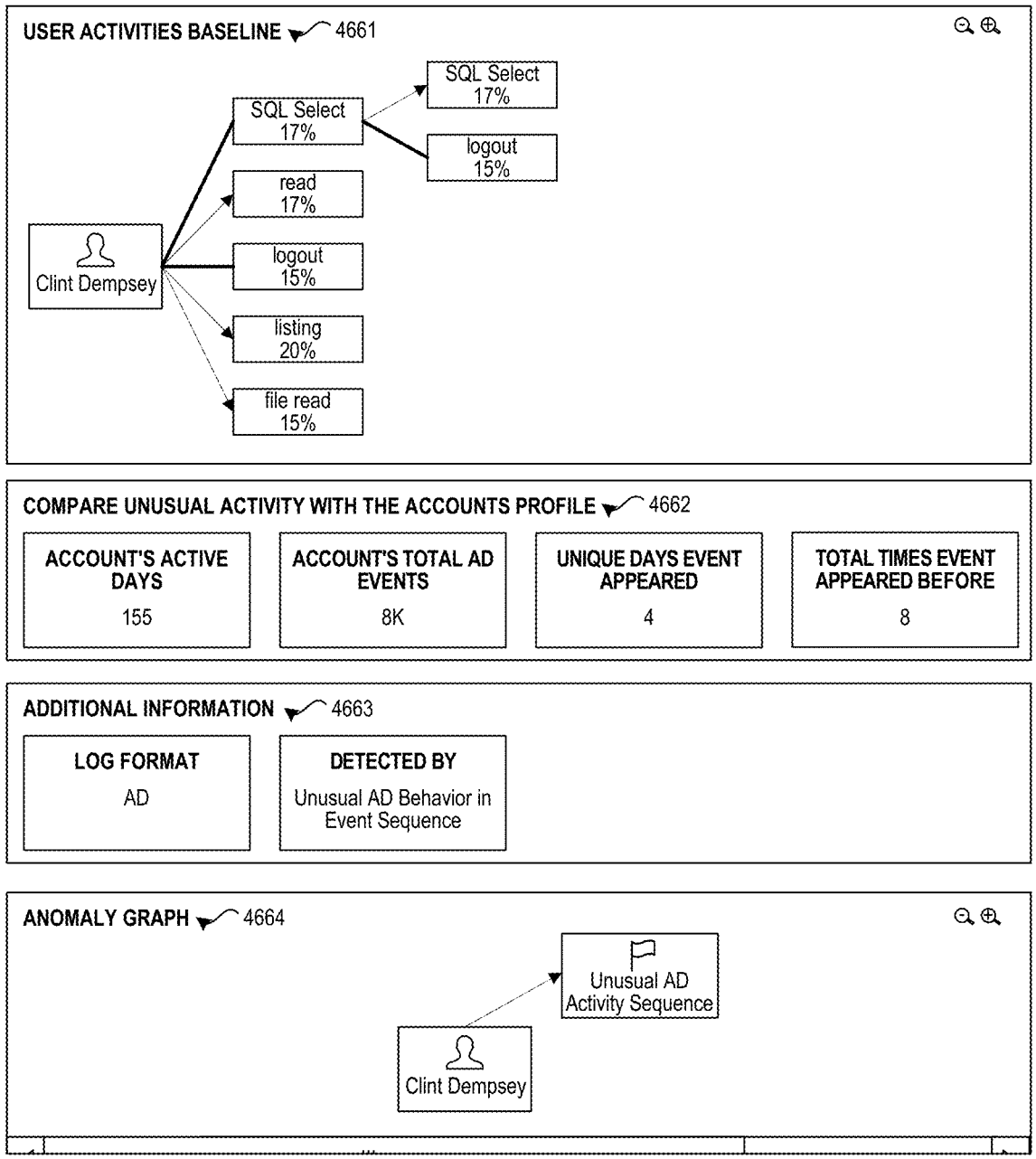
FIG. 46E is an illustrative view of a portion of an "Anomalies Details" screen for a selected anomaly in the GUI of FIG. 39A, including an "User Activities Baseline" diagram, "Compare Unusual Activity with the Accounts Profile" graphic, "Additional Information" graphic, and "Anomaly Graph" diagram, in accordance with various embodiments of the disclosure.

To receive specific information about an anomaly, the GUI user can click on an entry in the Anomaly listing 4620. Each entry is a link. Upon clicking, the GUI navigates to an Anomaly Details view 4650 that corresponds with the selected entry in the Anomaly listing. An example of an Anomaly Details view 4650 is shown in FIGS. 46C-46E. The Anomaly Details view 4650 provides specific information, charts and graphics about the selected anomaly, along with additional links to the entities that participated in the anomaly.

As can be seen in FIG. 46C, the Anomaly Details page 4650 can include a summary section 4651 identifying the anomaly by type (e.g., "Unusual AD Activity Sequence"), event date (e.g., "Jan. 2, 2014 10:10 PM") a short description (e.g., "An unusual event appeared for this account Login . . . "), and a score (e.g., "5").

For the anomaly corresponding to the Anomaly Details view 4650 ("Unusual AD Activity Sequence"), a single user is the only entity that is associated with the anomaly. The Anomaly Details view 4650 includes a box identifying the "Users" 4652 (e.g., "Clint Dempsey") along with the user's associated score (e.g., "4"). "Users" can include all personnel in the organization who caused the anomaly, were victims, or otherwise participated in some network activity that triggered the identification of the anomaly.

In this example, the Anomaly Details view 4650 additionally includes an "Anomaly Relations" box 4653. This box illustrates the connection, or "relationship" between different entities (users, devices, and applications) that participated in the anomaly. Since, in the example Anomaly Details page 4650, there is only listed User, the "Anomaly Relations" graphic is left blank.

Figure 46F:
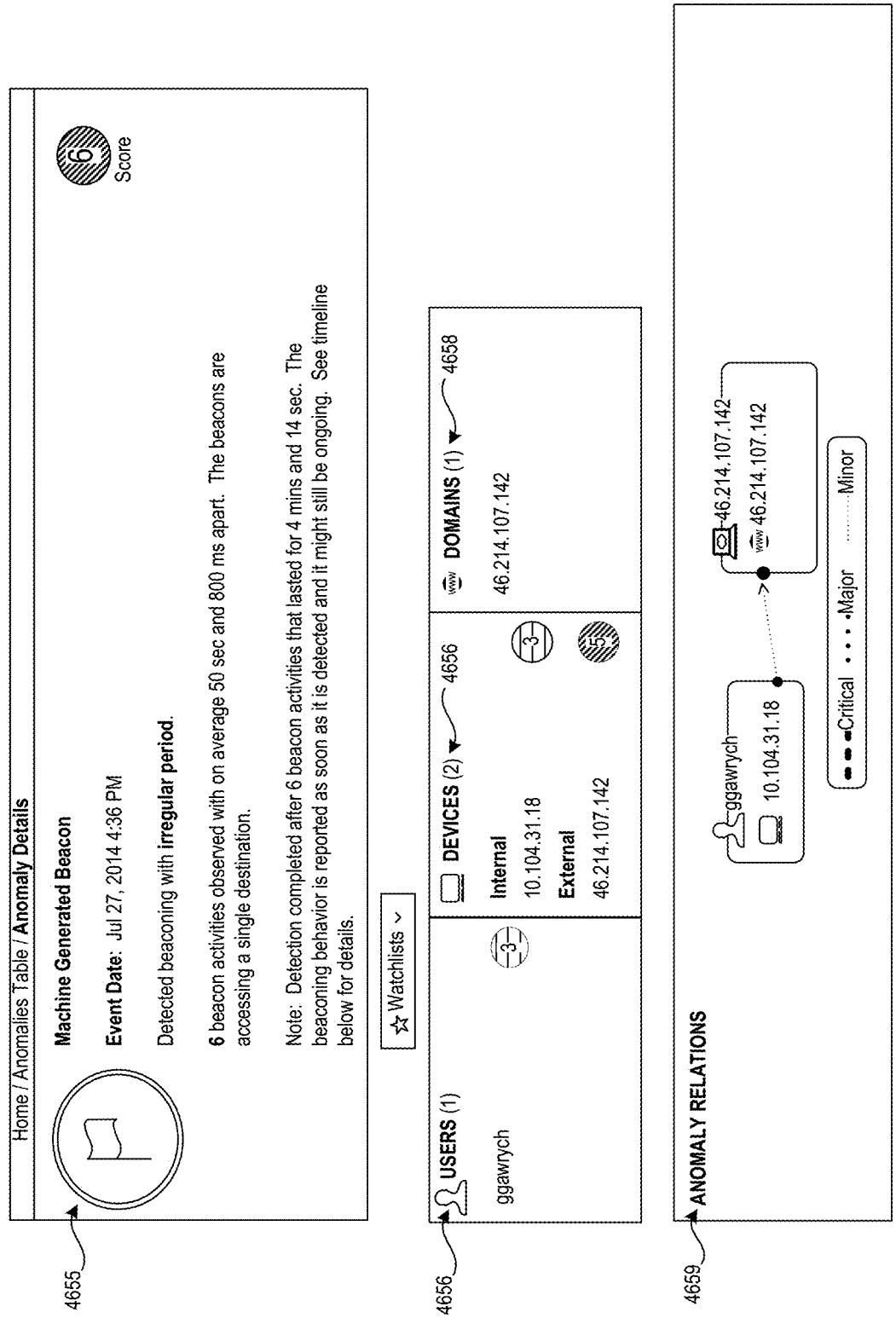
FIG. 46F is an illustrative view of a portion of an "Anomalies Details" screen for an anomaly of the type "Machine Generated Beacon," including a "Users," "Devices," and "Domains" sections, and an "Anomaly Relations" box.

FIG. 46F provides a second example of an Anomaly Details view, this time for a "Machine Generated Beacon" that occurred on Jul. 27, 2014 at 4:36 PM, as shown at 4655. This anomaly is associated with 4 entities: User "ggawrych" 4656, Internal Device "10.104.31.18" and External Device "46.214.107.142" 4657, and Domain "46.214.107.142" 4658. Anomaly Relations box 4659 illustrates the relationship between these entities. As can be seen, User "ggawrych" uses Internal Device "10.104.31.18" to access domain "46.214.142" operating on External Device "46.214.107.142."

Returning to the Anomaly Details view 4650 in FIG. 46C, the detailed view additionally includes a "Triggering Event" box 4654. This box provides the event data that triggered identification of the anomaly.

FIG. 46D illustrates an "Anomalous Activity Sequence" box 4660 in the Anomaly Details view 4650. Given that the type of anomaly in Anomaly Details view 4650 is an "Unusual AD Activity Sequence," this graphic illustrates the string of activities that triggered the anomaly. It is worth noting that this graphic would not apply for other types of anomalies, such as the "Machine Generated Beacon" 4655 of FIG. 46F. Accordingly, each Anomalies Detailed View provides different boxes and graphics to illustrate parameters that correspond to the type of anomaly in the view.

FIG. 46E provides additional boxes that may be associated with the "Unusual AD Activity Sequence," in Anomaly Details view 4650. This includes "User Activities Baseline" box 4661, which illustrates the typical activities for the user that do not trigger an anomaly and the "Compare Unusual Activity with the Account's Profile" box 4662. Finally, the Anomaly Details view 4650 may include a box for "Additional Information" 4663 and an "Anomaly Graph" box 4664 illustrating the relationship between the user and the anomaly.

Similar to the "Threats" view in FIGS. 45A-45E, the "Anomalies" view in FIGS. 46A-46F includes a multitude of links by which the GUI user can navigate to additional pages. For example, in FIG. 46A, upon selection of one of the "Participants" in the Anomalies listing 4620, if the "Participant" is a user, the GUI will generate a "User Facts" view corresponding to the user, similar to that in FIG. 41. If the "Participant" is a device or application, then the GUI will instead generate a "Device Facts" or "Application Facts" view (not shown). In the same manner, the user, device or application can be selected in the Anomaly Details view, such as in FIG. 46C or FIG. 46F, to generates the "User Facts," "Device Facts," or "Application Facts" views. Also, the GUI user can configure the "Watchlist" from the Anomaly Details view, in a similar manner as for the Threat Details view.

Returning to FIG. 39B, by selecting the "Users" toggle in the "Views" tab 3902, the GUI user navigates to a "Users Table" view 4700 as illustrated in FIG. 47A. The "Users Table" provides a list of each user that is associated with a threat or anomaly. The listing can include the user name 4701, the Department in which the user works in the organization, if known from the event data or other data, the number of associated anomalies 4703, the number of associated threats 4704, the date and/or time of the most recent update 4705, and the score associated with that user 4706.

Figure 47B:
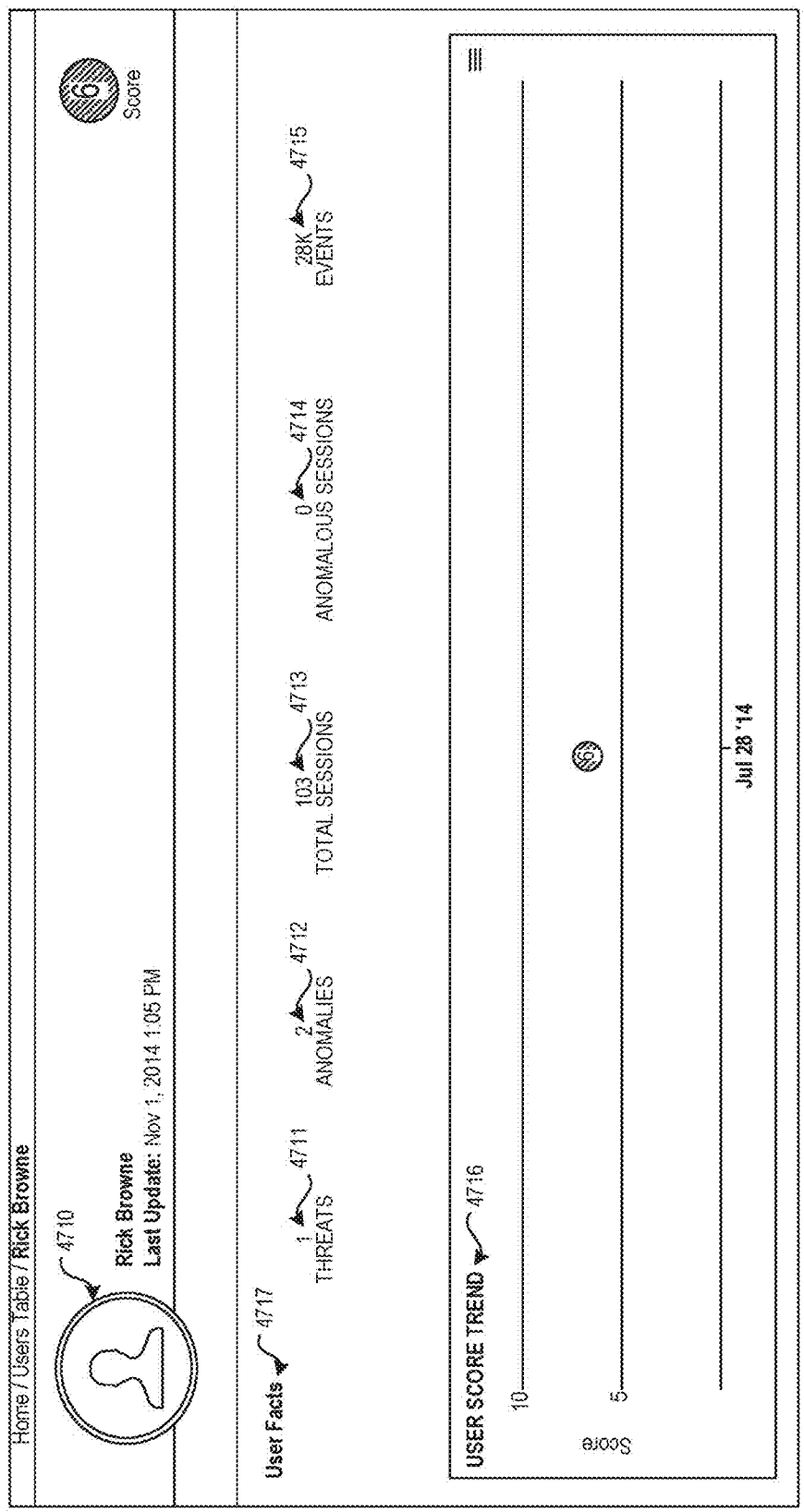
FIG. 47B is an illustrative view of a "User Facts" screen in the GUI of FIG. 39A, in accordance with various embodiments of the disclosure.

By clicking on an entry in the Users Table view, such as "Rick Browne" 4707, the GUI navigates to the Users Facts view 4710 for that selected user, as shown in FIG. 47B. The User Facts view can include a summary section 4717 providing, for example, the number of threats 4711, the number of anomalies 4712, the number of total sessions 4713, the number of anomalous sessions 4714, and the number of events 4715. The view can additionally include a "User Score Trend" box 4716, which illustrates the change, if any, in the score associated with the user over a period of time.

Figure 47C:
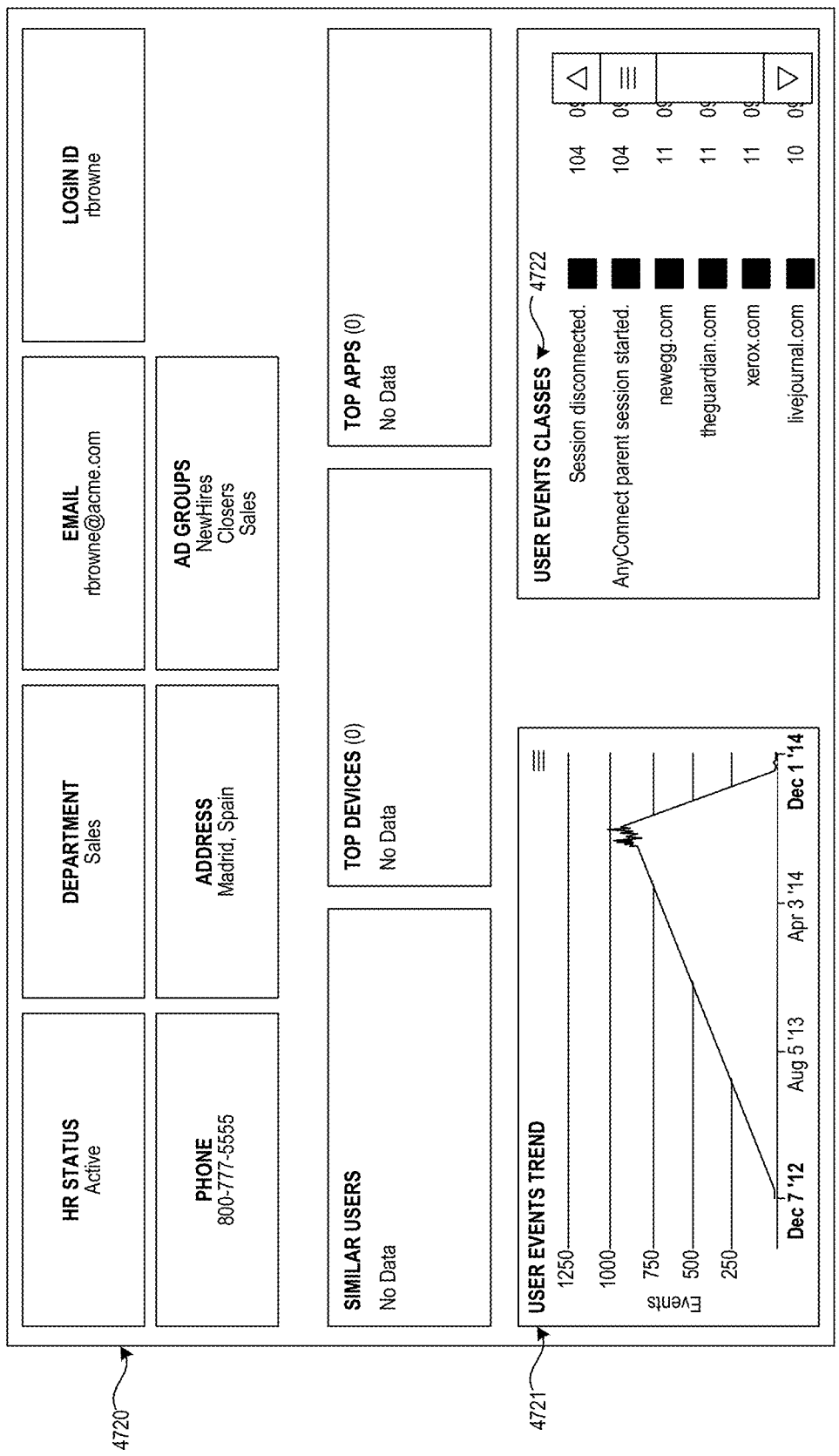
FIG. 47C is another illustrative view of a "User Facts" screen in the GUI of FIG. 39A, in accordance with various embodiments of the disclosure.

The Users Table view 4707 can additionally include a user profile box 4720 indicating, for example, the user's HR (human resources) status, Department in the organization (e.g., "Sales"), email address, login ID, Phone number, Address, and AD groups. The profile box may also include information concerning Similar Users, Top Devices, and Top Apps. As also shown in FIG. 47C, the Users Table view may also include a User Events Trend box 4721, which depicts how many events that the user participated in over a time period. A sudden increase in the number of events can be useful in evaluating potential network compromise. As yet another example, the Users Table view can provide a User Events Classes box 4722, which shows the number of each class of events for which the user was a participant.

Figure 47D:
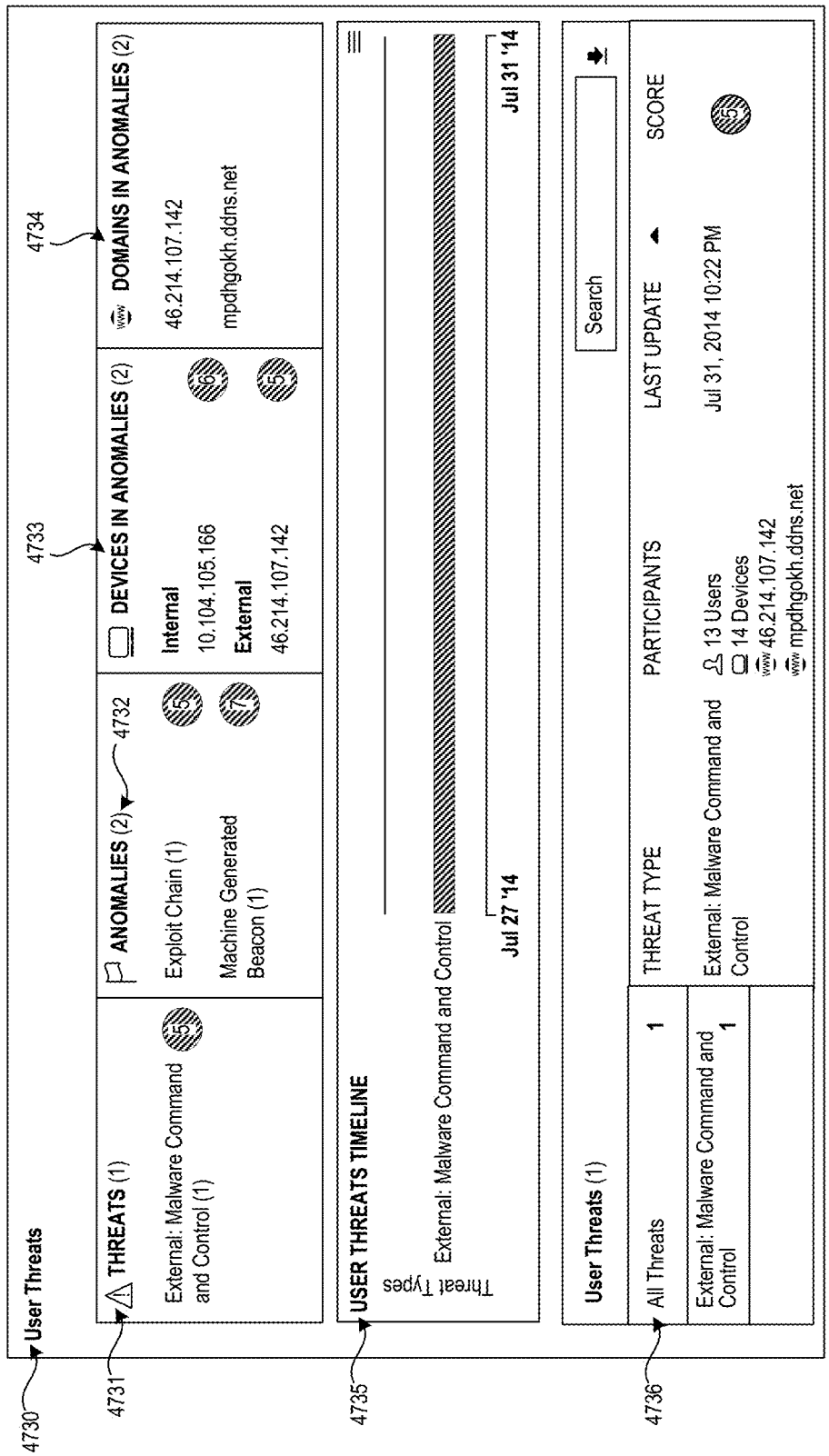
FIG. 47D is an illustrative view of a "User Threats" screen in the GUI of FIG. 39A, in accordance with various embodiments of the disclosure.

Referring back to FIG. 47B, each number in the summary section 4717 can provide a link to other views. For example, by clicking on the number of threats ("1") 4711, the GUI generates a "User Threats" view 4730 as shown in FIG. 47D. The "User Threats" view 4730 can include a summary section, including, for example, the number and type of each associated threat 4731, the number and type of each associated anomaly 4732, the number of devices operated by the user that have been associated with anomalies 4733, and the domains involved in the anomalies that the user accessed 4734. The summary view additionally can include an associated score for each threat, each anomaly, and each device. Each device identified in 4733 can provide a link to a "Device Facts" view that corresponds to that selected device, as further described below. Likewise, each domain identified in 4734 can provide a link to a "Domain Facts" view that corresponds to that selected domain, as also further described below.

The "User Threats" view 4730 also may include a "User Threats Timeline" box 4735 that visually depicts when the user became associated with each type of threat identified in 4731 and the duration of that threat. The data on the timeline can be color-coded according to the score of the threat. Hovering (or highlighting) the data on the timeline causes the GUI to generate a text bubble that summarizes the identity and timing of the threat.

Finally, the "User Threats" view 4730 also may include a "User Threats" listing 4736, which, for each threat associated with the user, identifies the threat type, all participants, the last update, and the score. In the example shown in FIG. 47D, there is a single entry in the listing because there is one threat associated with the user. By clicking on an entry in the listing, the GUI user navigates to the "Threats Details" view corresponding to that threat, similar to "Threats Details" view 4540 of FIG. 45E.

Figure 47E:
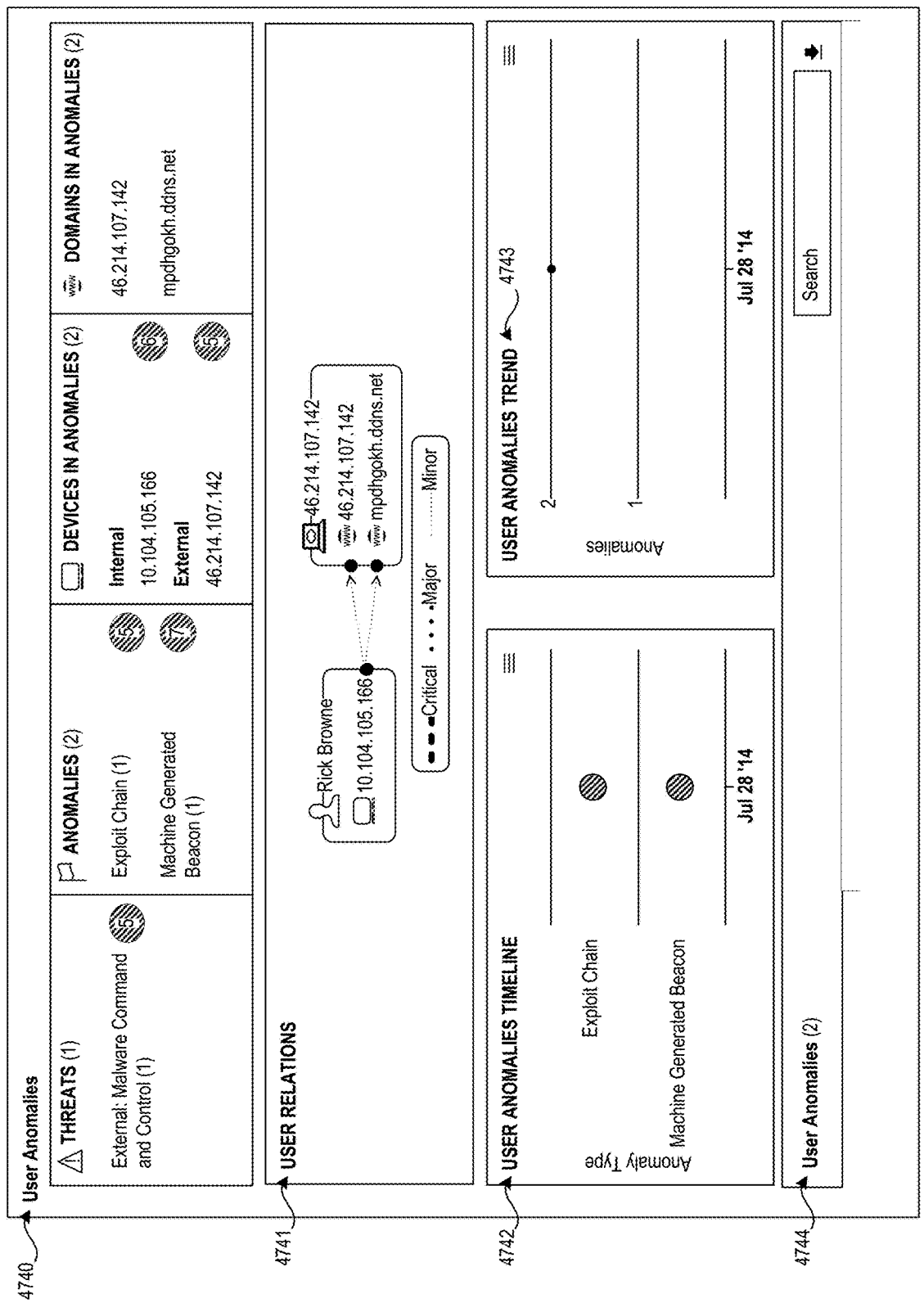
FIG. 47E is an illustrative view of a "User Anomalies" screen in the GUI of FIG. 39A, in accordance with various embodiments of the disclosure.

Referring back to FIG. 47B, by clocking on the number of anomalies (e.g., "2") 4713, the GUI generates a "User Anomalies" view 4740 as shown in FIG. 47E. The "User Anomalies" view 4740 can include the same summary of information section provided in the "User Threats" view 4730. The "User Anomalies" view 4740 additionally can include a "User Relations" box 4741, which illustrates the connections between the user ("Rick Browne"), the Internal device that he operates ("10.104.105.166"), and the external device ("46.214.107.142") and domain ("mpdhgokh.ddns-.net") that he communicated with when the anomaly was triggered.

The "User Anomalies" view 4740 additionally can include a "User Anomalies Timeline" box 4742. The timeline depicts each anomaly that is associated with the user as a circle and indicates the date that the anomaly occurred. In this example, it can be seen that two anomalies, "Exploit Chain" and "Machine Generated Beacon," both occurred on Jul. 28, 2014. View 4740 also may include a "User Anomalies Trend" box 4743, indicating how many anomalies occur on each date. As shown in FIG. 47F, the "User Anomalies" view 4740 also can include a "User Anomalies" box 4744 that lists each anomaly and for each, it identifies each participant, a summary of the anomaly, the event date, and the score. A GUI user can click on the listing to navigate to an "Anomaly Details" view, similar to that shown in FIGS. 46C and 46F. The GUI user can also click on a device or domain identified in the "Participants" column shown in FIG. 47F to navigate to a ""Device Facts" view that corresponds to that selected device, as further described below. Likewise, each domain identified in 4744 can provide a link to a "Domain Facts" view that corresponds to that selected domain, as also further described below.

Figure 47G:
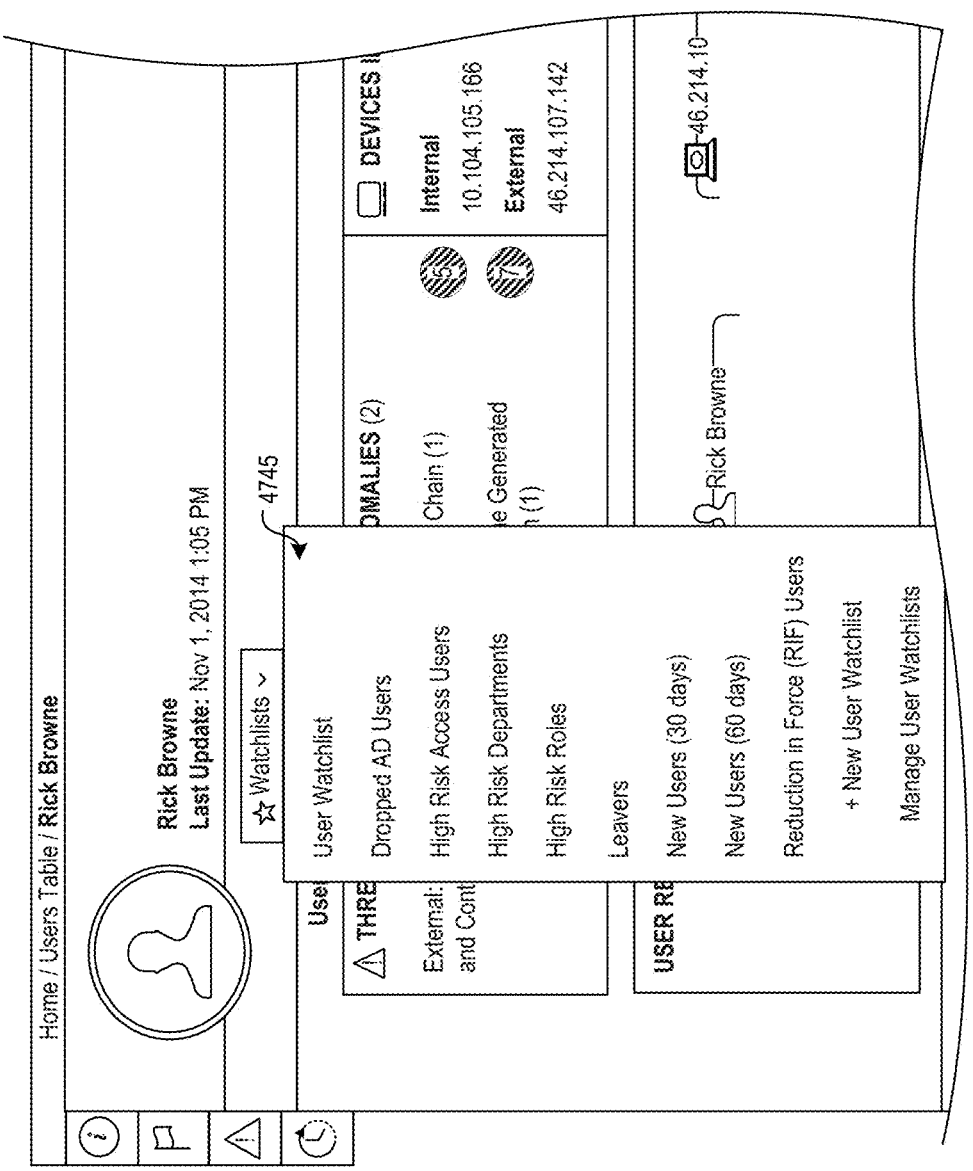
FIG. 47G is an illustrative view of a "Watchlist" screen in the GUI of FIG. 39A, in accordance with various embodiments of the disclosure.

Finally, the "User Threats" view 4730 and "User Anomalies" view 4740 each may include a "Watchlist," the functionality was explained previously with reference to FIG. 44A. A "Watchlist" for a user 4745 is shown in FIG. 47G.

Returning again to FIG. 1B, by selecting the "Devices" toggle in the "Views" tab 3902, the GUI user navigates to a "Devices Table" view 4800 as illustrated in FIG. 48A. Analogous to the "Users Table" 4700 described above with reference to FIG. 47A, the "Devices Table" provides a list of each device that is associated with a threat or anomaly. The listing can include the IP Address 4801, the Scope (e.g., "External" or "Internal") 4802, the number of associated anomalies 4803, the number of associated threats 4804, the date and/or time of the most recent update 4805, and the score associated with that user 4806.

Figure 48B:
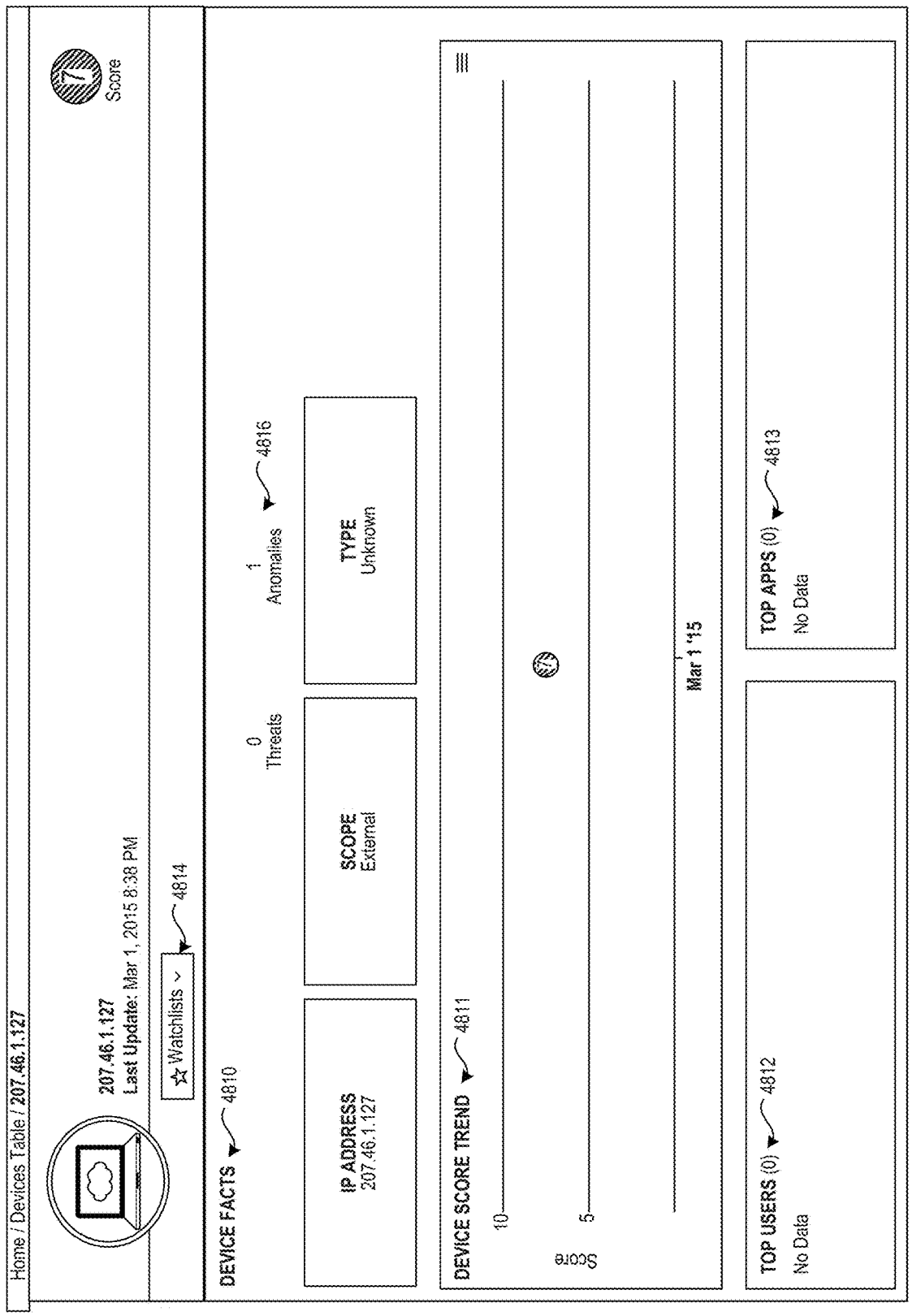
FIG. 48B is an illustrative view of a "Device Facts" screen in the GUI of FIG. 39A, in accordance with various embodiments of the disclosure.

By clicking on an entry in the "Devices Table" view, such as "207.46,1.127" 4807, the GUI navigates to the "Devices Facts" view 4810 for that selected device, as shown in FIG. 48B. The "Devices Facts" view can include a summary section and other information, such as a "Device Score Trend" box 4811, which indicates the date that the device was assigned a score and whether that score has changed over time. The view can additionally include a "Device Score Trend" box 4811, which illustrates the change, if any, in the score associated with the user over a period of time. As other examples, the "Device Facts" view 4810 may include a "Top Users" box 4812, which indicates whether there are one or more primary users for the device, and a "Top Apps" box 4813, indicating whether, from the event data, it can be discerned whether there are any known applications running on the device. As with the "User Facts" table, a "Watchlist" tab 4814 is provided.

Figure 48C:
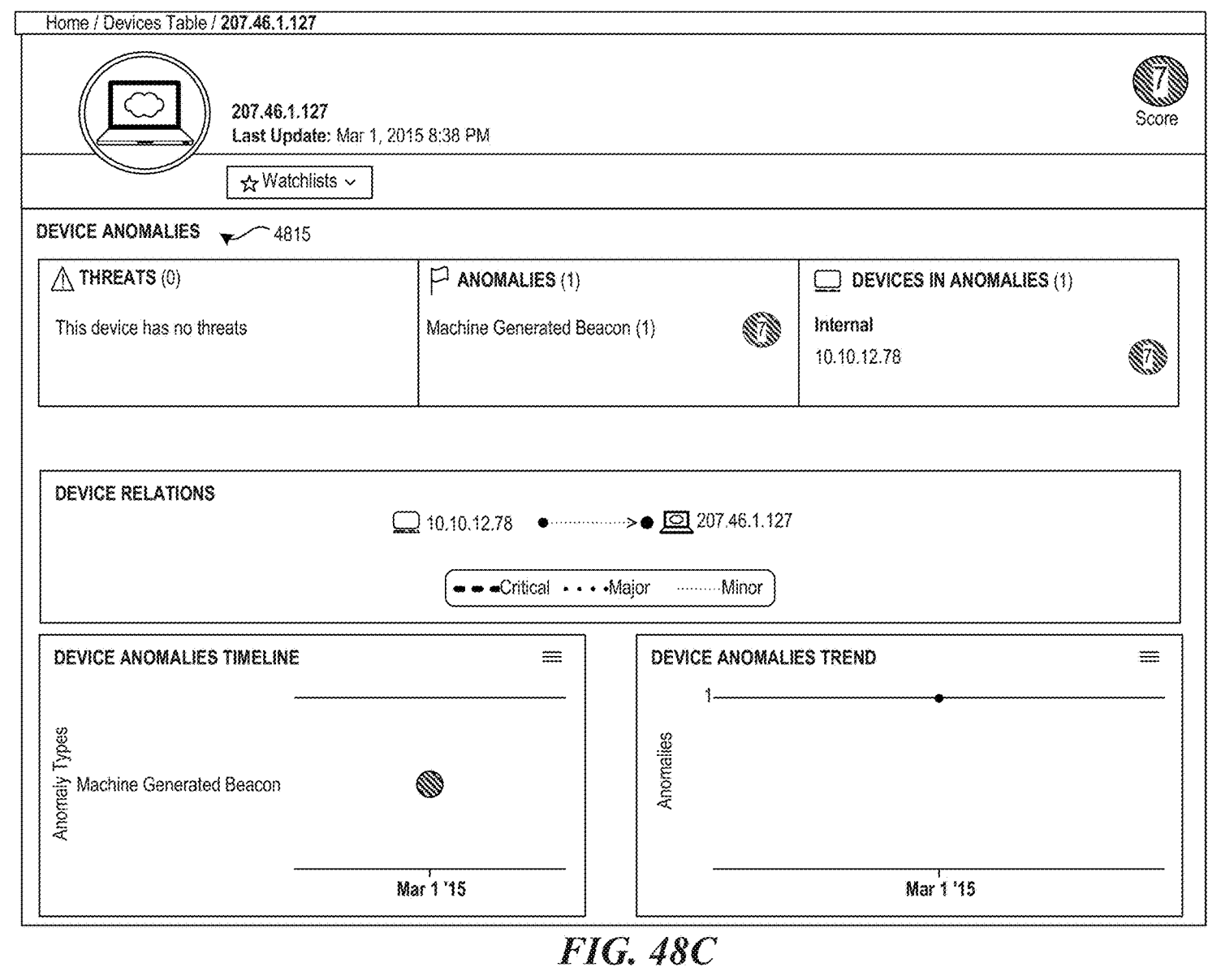

In the example of FIG. 48B, by clicking on the Anomalies ("1") 4816 in the summary view, the user navigates to a "Device Anomalies" view 4815 in FIG. 48C, analogous to the "User Anomalies" view 4740 in FIG. 47E. In this example, there are no threats associated with the device. If, however, there is an associated threat, then upon clicking on the "Threats" number in the summary view 4810, the user will navigate to a "Device Threats" view, analogous to the "User Threats" view described previously.

The Users Table view 4709 can additionally include a user profile box 4720 indicating, for example, the user's HR (human resources) status, Department in the organization (e.g., "Sales"), email address, login ID, Phone number, Address, and AD groups. The profile box may also include information concerning Similar Users, Top Devices, and Top Apps. As also shown in FIG. 9C, the Users Table view may also include a User Events Trend box 4721, which depicts how many events that the user participated in over a time period. A sudden increase in the number of events can be useful in evaluating potential network compromise. As yet another example, the Users Table view can provide a User Events Classes box 4722, which shows the number of each class of events for which the user was a participant.

Returning once again to FIG. 39B, by selecting the "Applications" toggle 3910 in the "Views" tab 3902, the GUI user navigates to an "Applications Table" view 4900 as illustrated in FIG. 49A. Analogous to the "Users Table" and "Devices Table" described above, the "Applications Table" provides a list of each application that is associated with a threat or anomaly. The listing can include the application name, the number of associated anomalies, the number of associated threats, the date and/or time of the most recent update, and the score associated with the application.

Figure 49B:
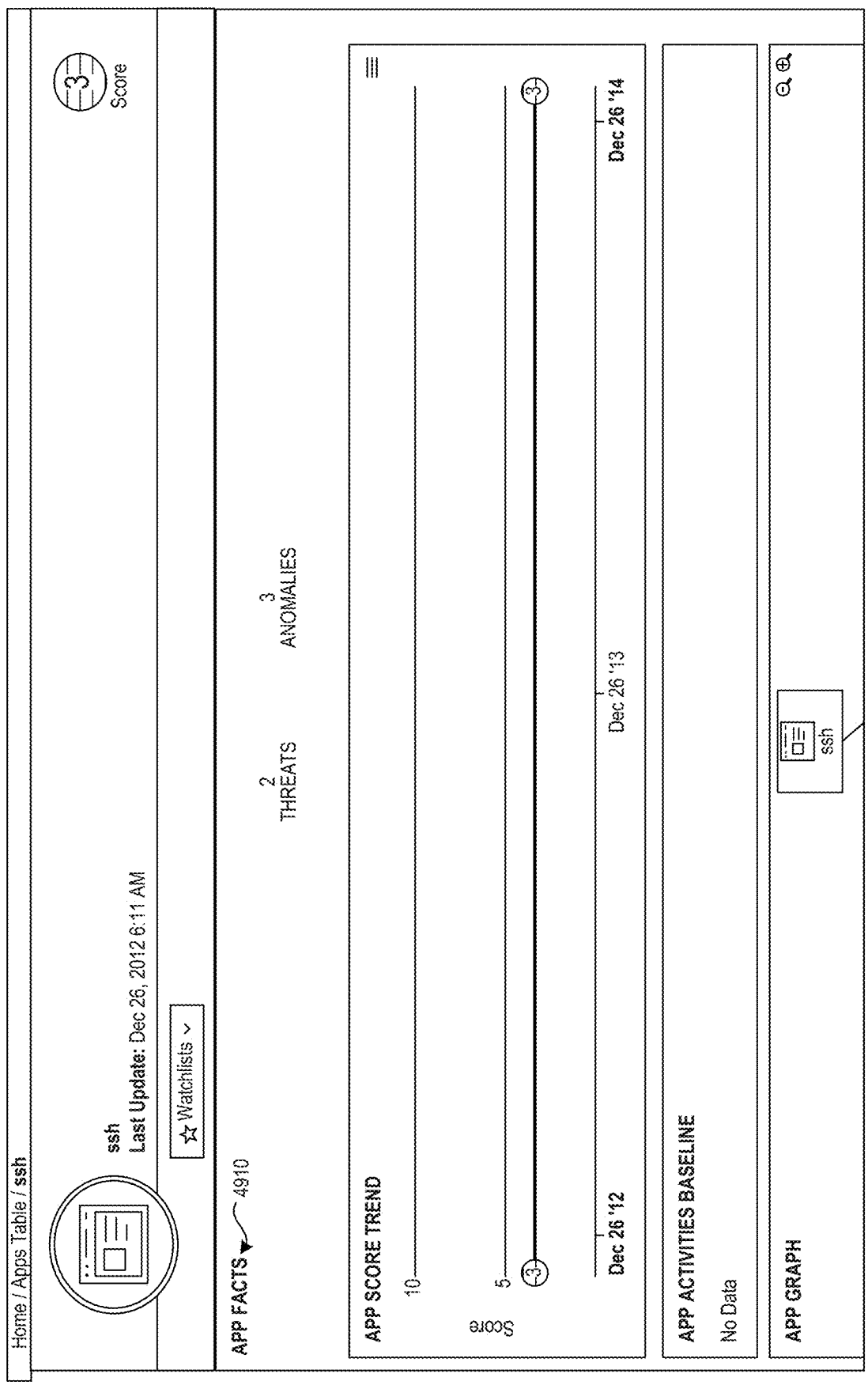
FIG. 49B is an illustrative view of an "App Facts" screen in the GUI of FIG. 39A, in accordance with various embodiments of the disclosure.

By clicking on an entry in the "Apps Table" view, such as "ssh," the GUI navigates to the "App Facts" view 4910 for that selected application as shown in FIG. 49B. The "App Facts" view can include a summary section and other information, such as an "App Score Trend," "App Activities Baseline," and "App Graph," which are analogous to graphs and charts described previously with reference to the "User Facts" and "Device Facts" views. As with the "User Facts" and "Device Facts" table, a "Watchlist" tab is provided.

Figure 50A:
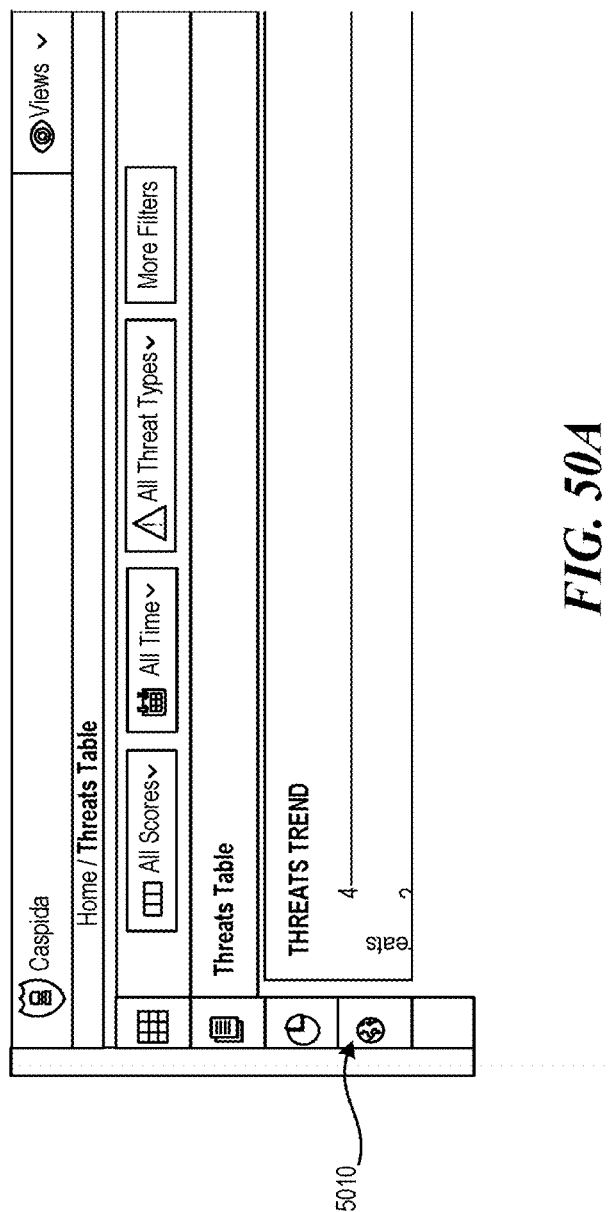
FIG. 50A is an illustrative view of a Geomap icon in a Threats Table view in the GUI of FIG. 39A, in accordance with various embodiments of the disclosure.
Figure 50B:
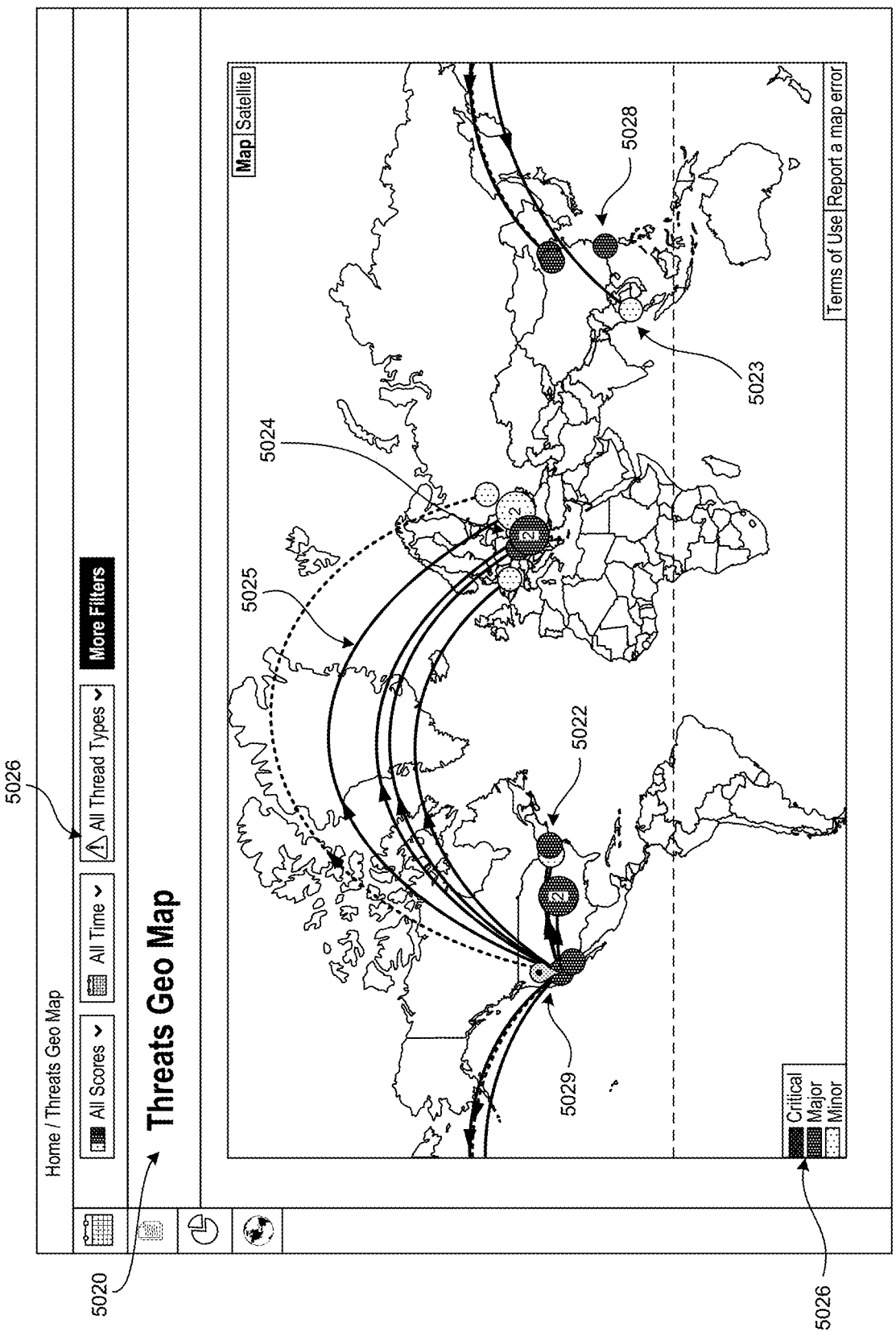
FIG. 50B is an illustrative view of a Geomap in the GUI of FIG. 39A, in accordance with various embodiments of the disclosure.
Figure 50C:
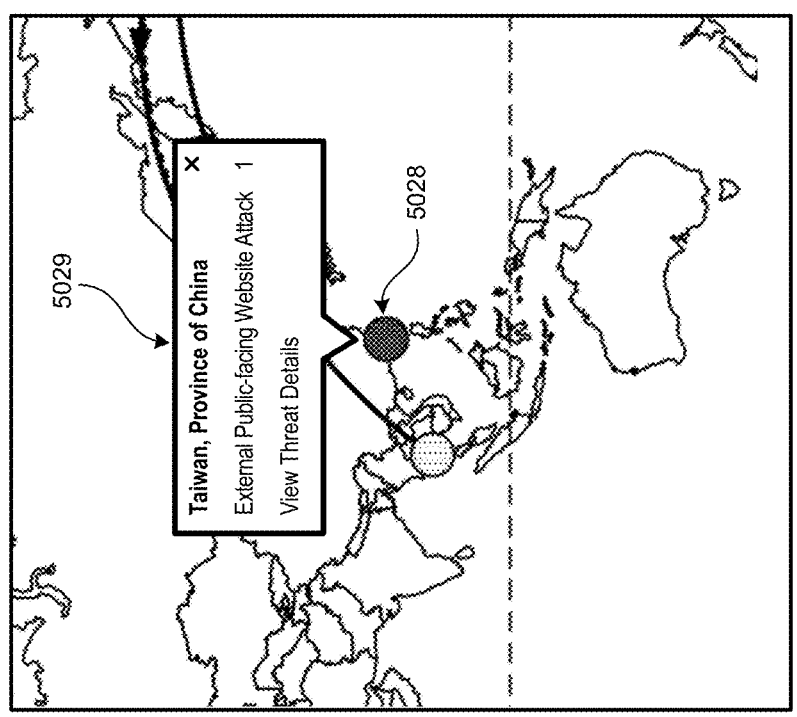
FIG. 50C is an illustrative view of a text bubble for a threat in a Geomap in the GUI of FIG. 39A, in accordance with various embodiments of the disclosure.

Returning to the "Threats Table" view 4500 in FIG. 45A, the GUI as introduced here additionally includes a selector from the "Threats Table" that, upon selection, generates the display of a geographical representation of the identified threats. Referring to FIG. 50A, by selecting the globe icon 5010, the GUI generates a "Threats Geo Map" 5020, as shown in FIG. 50B. The Threats Geo Map depicts, on a globe, each identified threat as a circle on the map at the threat's location. For example, threat 5023 is located in Asia, in or near Thailand, and there is at least two threats 5022 on the East coast of the United States. Each circle designating a threat is color-coded according to the score associated with the threat. For example, threat 5023 may be a yellow color, indicating that the threat is minor (see the reference table at 5026), whereas threat 5028 (in China) may be orange, indicating that the threat is major.

The threats depicted on the Geo Map also may be of different sizes, indicating that number of threats at a particular location. For example, threat 5023 is a small circle, whereas threat 5024 is a larger circle.

By hovering over a threat, such as a threat at 5022, a text bubble will appear, indicating the location and number of threats at that location. Clicking on a threat modifies the text bubble to provide an indication of the type of threat and a link to "View Threat Details." Upon clicking on this link, the GUI user navigates to the associated "Threat Details" view, such as the "Threat Details" view 4540 of FIG. 45E.

Another icon 5029 is depicted where the internal network is located. Lines are then shown connecting the internal network location 5029, as a hub, to each threat location. The lines include arrows, indicating that the threat is radiating from the internal network hub to other geographical locations.

Figure 50D:
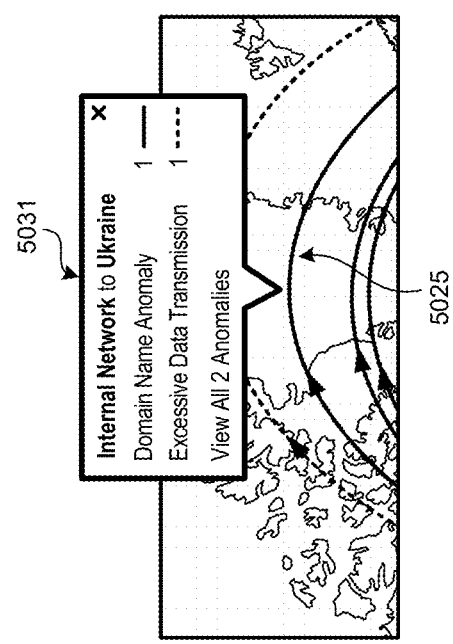
FIG. 50D is an illustrative view of a text bubble for anomalies in a Geomap in the GUI of FIG. 39A, in accordance with various embodiments of the disclosure.

Line 5025 is an example of a line connecting the internal hub to a threat. Upon clicking on the line, as shown in FIG. 50D, a text bubble appears that identifies the one or more anomalies that are associated with the threat. The text bubble identifies each type of anomaly by type, the number of anomalies of each type, and a color-coding indicating the severity of each anomaly. In the example of FIG. 50D, the text bubble also provides a link by which the user can click to "View All 2 Anomalies." Upon clicking on this link, the GUI user navigates to the "Anomalies Table" view, such as the "Anomalies Table" view 4600 as shown in FIG. 46A.

Figure 51:
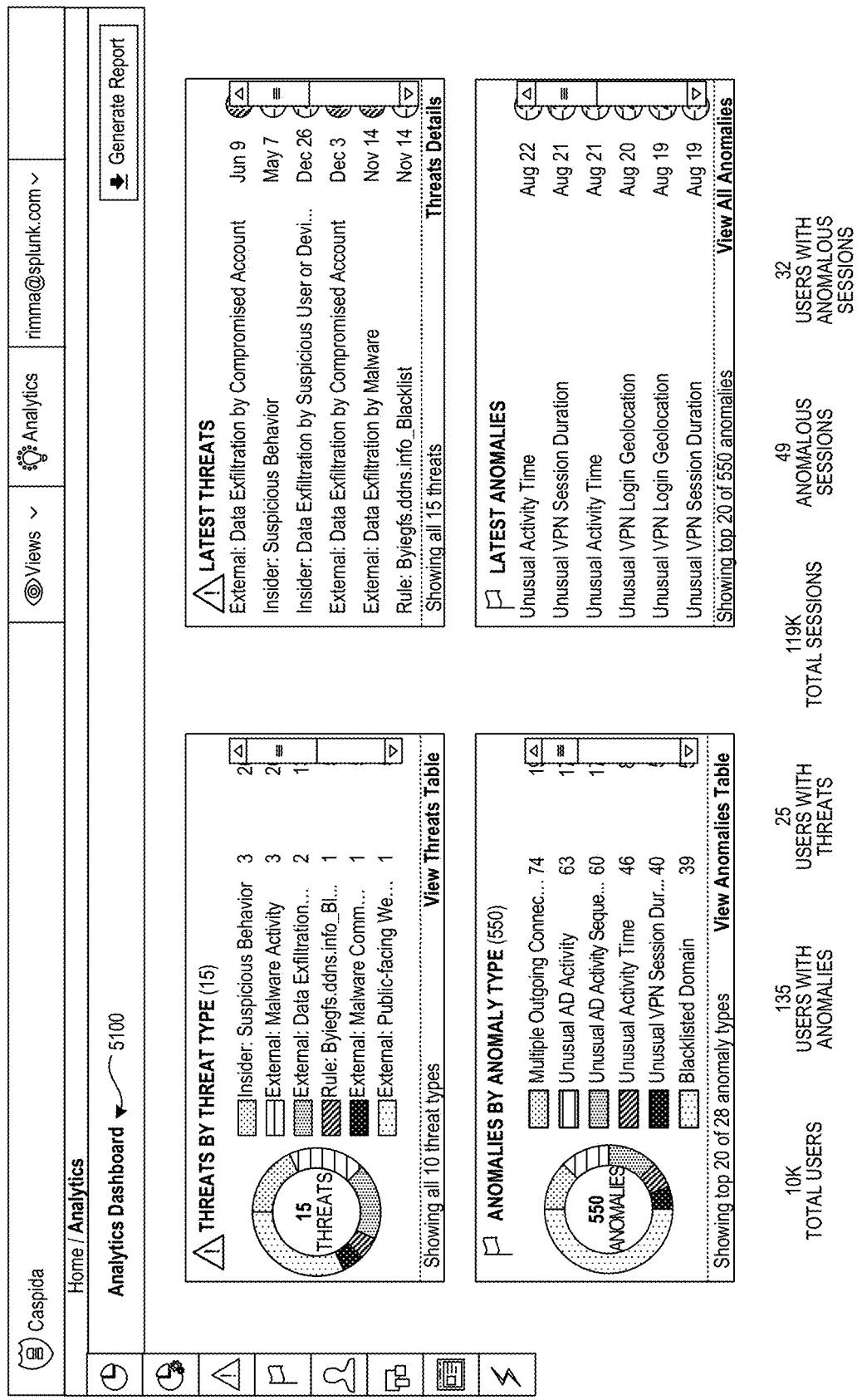
FIG. 51 is an illustrative view of an "Analytics Dashboard" in the GUI of FIG. 39A, in accordance with various embodiments of the disclosure.

Returning to FIG. 39A, upon selecting the "Analytics" tab 3903, the GUI generates an "Analytics Dashboard" 5100 as shown in FIG. 51. This dashboard presents several charts and other graphics similar to those shown in other figures shown above, including "Threats By Threat Type," "Anomalies by Anomalies Type," "Latest Threats," and "Latest Anomalies."

XI. Probabilistic Suffix Trees

As discussed above, one of the many features of the security platform introduced here is the capability of detecting unknown anomalies and threats. The security platform can achieve this through any of various machine learning models. Specifically, a number of these machine learning models can be adapted to perform security-related analysis, including behavioral analysis for specific entities (e.g., a user, a machine, a group of user or machines). Using the techniques discussed herein, machine learning models can establish behavioral baselines for various different entities of various different types (e.g., users, devices, etc.) and can detect behavioral deviations from such baselines as potentially indicative of malicious activities. In addition, the security platform provides a structure for the network administrators or security analysts to easily design, configure, and/or modify the models in order to suit their own purposes and the deployed environment.

Many traditional techniques only focus on detecting security breaches on a per event basis (e.g., inspecting each event according to rules or signature comparison to determine whether any single event is malicious), and these traditional techniques would not be able to detect any security-related issue if each of the events considered individually appears to be normal. To address this problem, a number of example models (e.g., an event sequence prediction model, which may be customized for detecting abnormal entity behaviors) utilized by the security platform are configured to discover behavioral anomalies by determining whether a given sequence of events as associated with an entity deviates from an anticipated behavioral baseline, even though each event individually may well be considered not malicious or anomalous. For this purpose, in various implementations of these models, a probabilistic suffix tree (PST) based data processing procedure can be employed.

The PST based data processing procedure can utilize a "windowed" version of a probabilistic suffix tree to detect an unusual sequence (e.g., event sequence). As used herein, a sequence can by any timely ordered sequence of arbitrary symbols. In practical implementations, these symbols can denote particular types of security events including, for example, Connection-Fail, Password-Rest, or File-Access. In several embodiments, each symbol discussed herein is an event feature set as discussed in this disclosure. A symbol can correspond to at least a machine-observed event. However, note that the PST based data processing procedure described here is generally applicable to any type of sequence, not limited to those that are disclosed herein. To facilitate discussion, in the following context, Event-Types are used as an example of the symbols. Further, for simplicity, the Event-Type symbols discussed here may be denoted with single characters (e.g., x, y, z) and/or integers (e.g., 0, 1), which will be made clear by the context. Also, the PST based data processing procedure may be referred to herein as the PST-based machine learning model or, simply, the PST model.

More specifically, the PST model is to be used in a way that, given an observation window with a number of previous symbols, the PST model can predict what the next symbol may be, to identify whether a target window is anomalous (e.g., by having an anomaly count beyond a baseline). Before the PST model is ready to do so, the PST model needs to receive training so that it can more accurately anticipate or predict the next symbol. For example, the PST model can be trained by a certain set of historical symbols. This set of historical symbols (i.e., the amount of training) denotes whether the PST model is considered ready (i.e., the prediction can be considered enough trustworthy). The amount of training can be controlled based on any of various training principles including, for example, by a fixed time, by a fixed number of symbols, or by other suitable methods including automatic training. The fixed time type of training can include training the PST model by using all previous symbols that took place within a certain time window (e.g., one week). The fixed symbol number type of training can include training the PST model by using a select number of previous symbols (e.g., 5,000 events). An example of an automatic training can include training the PST model by using past symbols until the PST model meets a certain criterion, such as convergence. For example, in some embodiments, similar to how the PST model can score (discussed in more detail below), a vector comprised of computed scores from the in-training PST model can be built and compared to other versions of the PST model to determine if the model state of the in-training PST model is ready (e.g., is converging or has converged by a certain degree). Note that, in some applications, the observation window is to be kept at a relatively small size (e.g., around four to five symbols) in order to keep computational complexity at a reasonable degree. According to some embodiments, a maximum value of five symbols is used for such observation window. This approach to sequence analysis utilizes the property of the PST that can "memorize history." The sequence generation process of the PST model can be modeled as a variable length Markov chain, which may be similar to a formation of finite state automaton. The "memory capacity" of the PST model can be controlled by the maximum length of historic symbols, which is the probabilistic suffix tree's depth, and is the length of the Markov chain.

After a PST model is trained, it can be used to more reliably predict the next symbol. Specifically, given a history of a number of symbols (e.g., five symbols), a trained PST model can generate the entire probability distribution for all "next" symbols for the entire set of possible symbols seen for a particular entity. For simplicity, the probability of a particular next symbol given a particular sequence of historical symbol is denoted as "P(next|history)," which is also referred to herein as "predictions." For example, if a PST model generates that P(a|aabcd)=0.1, P(b|aabcd)=0.8, P(c|aabcd)=0.1, and P(d|aabcd)=0, it means that, given the history "aabcd," the probability of the next symbol in the sequence being "a" is 10%, "b" is 80%, "c" is 10%, and it is highly unlikely to see "d" as the next symbol. In this way, if the actual next symbol in the sequence is "a", "b", or "c," these symbols may be deemed acceptable or normal because they are acceptably predicted (e.g., because they all have probabilities that meet or exceed a certain threshold, for example, 10%).

Figure 52:
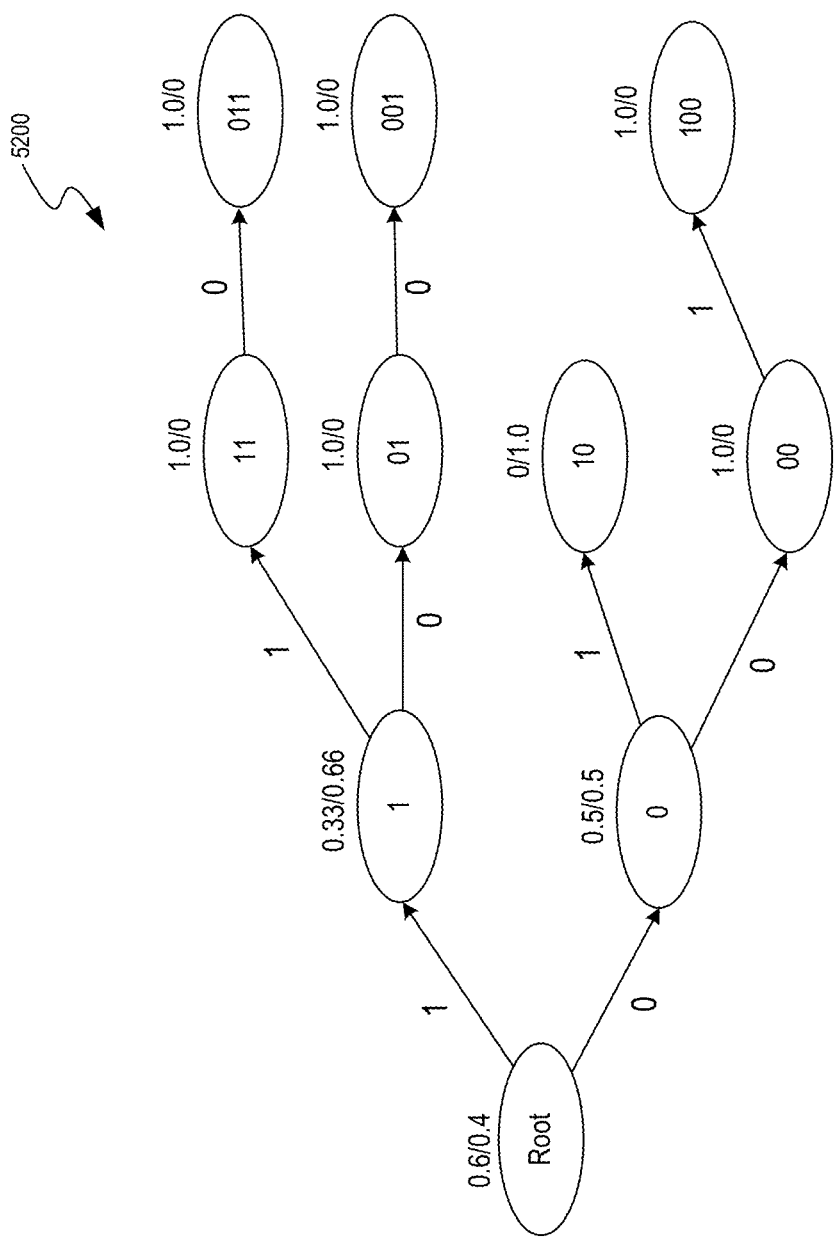
FIG. 52 shows an example of a probabilistic suffix tree based model receiving a particular sequence (e.g., during training).

However, if the actual next symbol that appears is a "d," then because the prediction of the probability of "d" appearing is very low, this event/symbol is considered unusual, or rare. Thereafter, in some embodiments, such rare event can trigger an alert to the administrator for further analysis. As used herein, an unusual symbol (e.g., representing an event) is the actual occurrence of a symbol when the PST model predicts the probability of such symbol's occurrence is less than a threshold, for example, 0.1% or 0.01%. The threshold can be selected and/or adjusted by the administrator according to the environment. An example of a PST model having been trained by a particular sequence [100111] is shown in FIG. 52. In the PST model shown in FIG. 52, the PST's depth is 3.

In addition, because different types of entities may have different characteristics in their behaviors, to further enhance the accuracy of behavioral anomaly detection for a specific entity (e.g., a user), various embodiments of the PST model can be configured to first establish a baseline prediction profile (or simply "baseline") for a specific entity after the PST model is trained. Specifically, a profiling window of successive prediction can be used to build the baseline prediction profile (e.g., for a specific entity, to learn that how many unusual events per window for the specific entity is consider normal).

Figure 53:
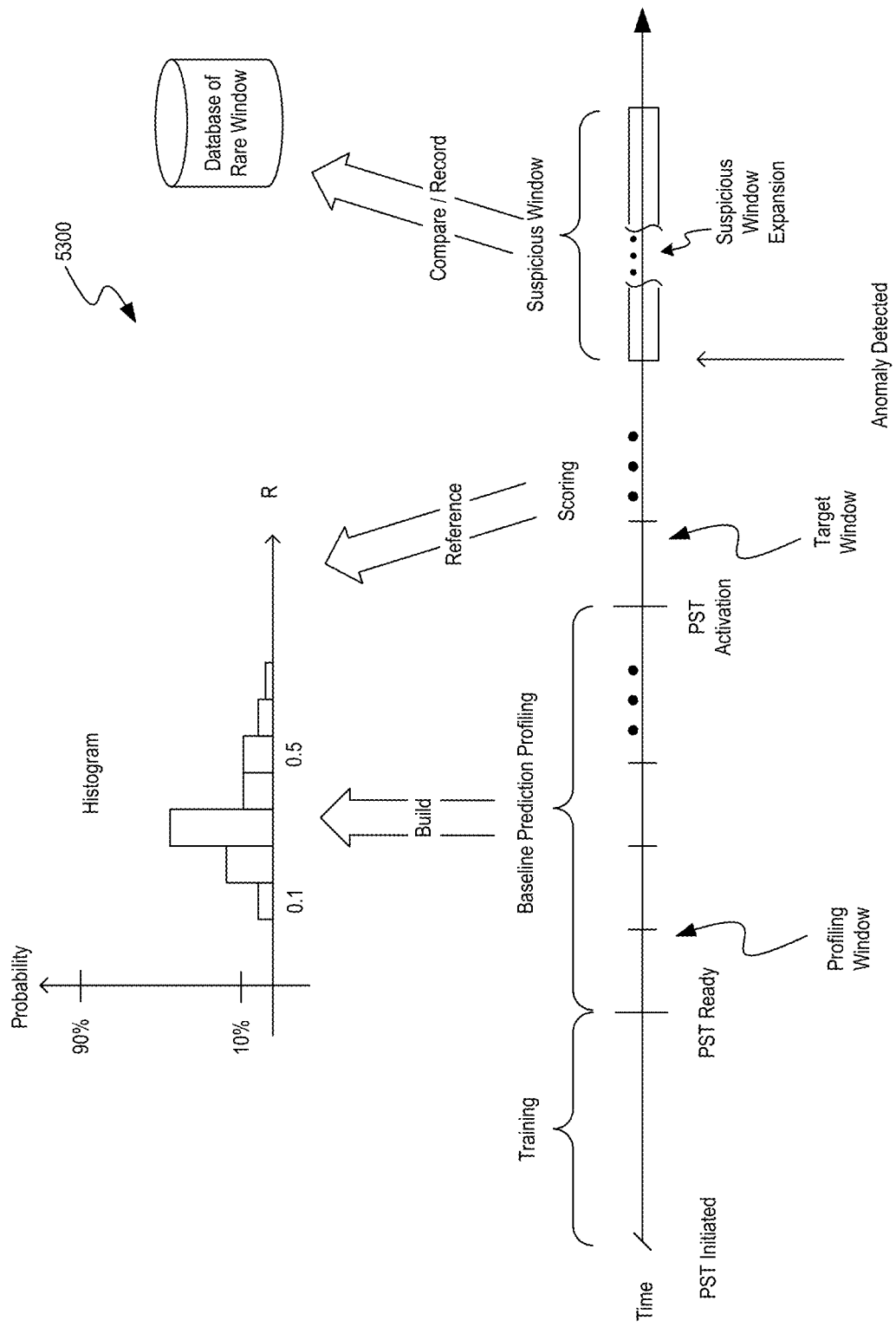
FIG. 53 shows an example timeline illustrating the training of a probabilistic suffix tree based model, the establishment of a baseline prediction profile, and the activation of a particular model version.

In some implementations, when the PST model is ready (i.e., has been sufficiently trained), the results of the PST model's next symbol predictions within a profiling window can be recorded. Some embodiments provide that the profiling window has a fixed length. With this additional layer of baseline prediction profile, the PST model can become more robust against the potential noise from the presence of a few unusual events, thereby less likely to trigger a false alarm. In other words, if it is actually normal for a certain type of entity (e.g., an administrative user) to have a certain number of unusual symbol predictions within a profiling window, then the PST model can learn this by the baseline prediction profile, reducing the probability that the PST model triggers a false alarm in those normal and common cases. For simplicity, a profiling window can be denoted as "W," and the length of a profiling window can be denoted as |W|. An example timeline 5300 is shown in FIG. 53, illustrating the training of a probabilistic suffix tree based model, the establishment of a baseline prediction profile, and the activation of a particular model version.

In certain embodiments, the properties of a profiling window can be easily changed or tweaked. Different variations of the profiling window can also be used by a PST model to suit different purposes. In a number of implementations, a profiling window can be evaluated based on a count on the ratio, R, of the number of predictions that are below a threshold (e.g., 0.01%) inside the profiling window to the length of the window. This R can also be referred to as the rarity score. For example, if inside a given profiling window of length 10, there are 4 predictions that are below 0.01%, then the ratio R of unusual events in that profiling window is 4/10 (or R=0.4). In some implementations, to establish the baseline prediction profile using the profiling window technique is to learn what a usual R is for a particular user.

In order to do so, in some embodiments, after the PST model becomes ready, the predictions (of the occurrence of unusual events) inside each profiling window during a certain time length are collected, by sliding a profiling window through the certain time length. This time length is denoted as the baseline prediction profiling phase on FIG. 53. Then, a histogram can be made to record all the ratios that are observed. This histogram essentially records the usual R for a particular user. Specifically, the collecting of the predictions from each profiling window can be repeatedly performed for a period of time (i.e., "sliding through" the period of time). This period of time may be N times the length of the profiling window (i.e., N×|W|). In some examples, N is 10. During the baseline prediction profile establishment (shown in FIG. 53), for a period of time after the PST model becomes ready, the R for each profiling window is tracked and stored in a histogram. This learned histogram can be denoted as "H." With this histogram built for the specific entity, for any new R, the PST model can produce a P(R|H). The P(R|H) is the probability of seeing a window with a ratio R, given the history of previous Rs. In this manner, a baseline prediction profile for a specific entity can be built.

After the histogram is built, the PST model can be activated to detect anomalies for the specific entity. This can also be referred to as the scoring phase. To detect an anomaly (e.g., an abnormal behavior of a specific entity as exhibited by a sequence of events), one implementation is to first make record of the rare sequence for the particular entity. Specifically, after the PST model is activated, a target window can be used by the PST model to identify the rare sequence. Similar to the scoring process for the profiling window during the baseline prediction profiling phase, the PST model can be used to generate predictions and calculate the ratio R for a given target window in order to score the target window. For better prediction accuracy, the size of the target window can be set to the same size as the profiling window. After generating an R for a target window, the PST model then refers to the histogram to find the probability of encountering such window with at least an R of this level. If this probability (i.e., P(R|H)) is lower than a certain threshold (e.g., <0.5%), then the PST model determines that this particular target window is anomalous (i.e., for having a rare sequence for the particular entity), and that this anomalous window needs to be recorded (e.g., in a database of rare windows, described below) and/or flagged as anomalous.

Furthermore, in a number of implementations, an anomalous window expansion technique can be used to more fully capture the anomalous activity. In some of these implementations, when a target window has an R that has low enough probability, a window collection process is initiated. The purpose of the anomalous window expansion technique is to expand the window of unusual activity with the attempt to include as many related unusual actions of the entity inside a single window as possible. One example of the technique allows the original target window (e.g., which is of a fixed length, such as |W|) to be expanded up to a certain size when such target window is found to be anomalous. Note that, however, the longer the window can expand, the larger the required memory is to accommodate such expansion. The expanded window can be denoted as "E," where |E| is equal to or greater than |W|.

In at least one example, to achieve this suspicion window expansion, upon the detection of an unusual R in a target window, the PST model can fix the start point of that target window and start increasing the window's size (e.g., by one window) each time it is determined that the next target window also has an R score that is below or equal to the R that triggered the anomalous window expansion process (or until the maximum expansion size is reached). When a next window with a normal R appears, the collection process of the anomalous window can stop.

Then, in certain embodiments, the aforementioned collected anomalous window can be compared with a database of rare windows. Specifically, in these embodiments, a database of rare windows (also referred to here as rare window cache) can be maintained to keep record of rare windows that the system has seen in the past. Each time there is a new rare window, this database can be referenced to check if there has been any "similar" rare window in the past, and if so, how many. The rationale for this rare window cache technique is the observation that a rare window that has been observed many times in the past tends to be less "anomalous" than a rare window of activity that does not appear to be similar to anything that has been observed before. This technique can be useful in some instances, for example, to discover whether a shared account (e.g., root) may be stolen.

Specifically, for a given sequence, in order to determine whether the system have seen any similar sequence before, the PST model is capable of comparing two sequences with each other. There are many known methods to compare sequences and determine similarity. Nonetheless, disclosed here is a particular way that can be used to compare the similarity, namely, by using a combination of two metrics, the cosine similarity and the Jaccard similarity.

PST-SIM: The PST implementation of cosine similarity (PST-SIM) is the cosine similarity between two vectors representing the two sequences. Each vector is comprised of the probabilities learned by training an isolated PST for each sequences (more details on building a vector for a sequence are discussed below). This PST-SIM metric can be useful to capture the similarity between the frequent subsequences of the two sequences.

JAC-SIM: The PST implementation of the Jaccard similarity (also known as the Jaccard index) is the Jaccard similarity between the symbols in the two sequences. It can be defined as JAC-SIM(A, B)=|A intersection B|/|A union B|. This JAC-SIM metric gives more weight to the presence of few different symbols, and it does not take into consideration the symbols' appearance frequencies or their order.

Because it is observed that these two metrics have different goals, some embodiments employ a combination of two metrics. In particular, the PST-SIM puts emphasis on a bigger, overall picture of the symbol distribution and evaluates how similar the distributions are. On the other hand, the JAC-SIM is more sensitive to the presence or absence of symbols between two sequences. In other words, the more new symbols there are in one sequence as compared to the other, the more different the JAC-SIM result becomes. Conversely, if only a few symbols are missing, and the remaining common symbols appear in the same or similar manner in both sequences, then the PST-SIM result typically is not very affected by the few missing symbols. In some embodiments, the similarity between two sequences is calculated by Sim(S1, S2)=0.5×PST-SIM(S1, S2)+0.5×JAC-SIM(S1, S2).

In some occasions, such as those described above (e.g., to see whether a PST trainee has started to converge to another PST, or to perform the PST-SIM comparison), two PSTs need to be compared. A PST (e.g., in a PST model, shown in FIG. 52) contains the conditional and marginal probabilities of all the symbols used in the training. Therefore, one way to compare two PSTs is to vectorize the two PSTs, and compare their corresponding probabilities (both marginal and conditional) one by one. After vectorizing the PSTs, resulting in two probability vectors, a suitable vector similarity metric (e.g., Euclidian distance, or cosine similarity) can be used to compare the two PSTs.

Consider an example with three possible symbols, {x,y, z}, and a PST of depth 2 (meaning that the PST model at most looks at two historical symbols to predict the next one). Further, in this example, assume that the marginal probabilities are P(x)=0.8, P(y)=0.15, and P(z)=0.05, and the conditional probabilities are P(x|xx)=0.7, P(y|xx)=0.3, P(z|y)=1.0, and so forth. Then, for two sequences A and B, Table 1 is an example of two probability vectors of the PSTs for the two sequences.

TABLE 1

|  | P(x) | P(y) | P(z) | P(x|) | P(y|) | P(z|y) | ... |
|---|---|---|---|---|---|---|---|
| PST-A | 0.8 | 0.15 | 0.05 | 0.7 | 0.3 | 1 | ... |
| PST-B | 0.6 | 0.4 | 0 | 1 | 0.4 | 0.8 | ... |

Note that, in some embodiments, for each rare sequence, only this PST summary of the rare sequence (i.e., vectorized PST) is kept in the rare window cache. Because the PST summary of the sequence includes all the probability information, the PST summary can be treated as a rare window signature. The PST summary, representing a rare sequence, can be used to compare with another sequence, for example, by using a combination of the PST-SIM and the JAC-SIM. In addition, for each rare window, the rare window cache keeps a record of how many times the rare window has been observed and, in some embodiments, for how many distinct days. In this way, when a new rare window is observed, the PST model can check the rare window cache to determine whether the new rare window has appeared before, and if affirmative, for how many times and over how many different days. This information can be useful for deciding if the new rare window is worth raising an alarm or not.

Figure 54A:
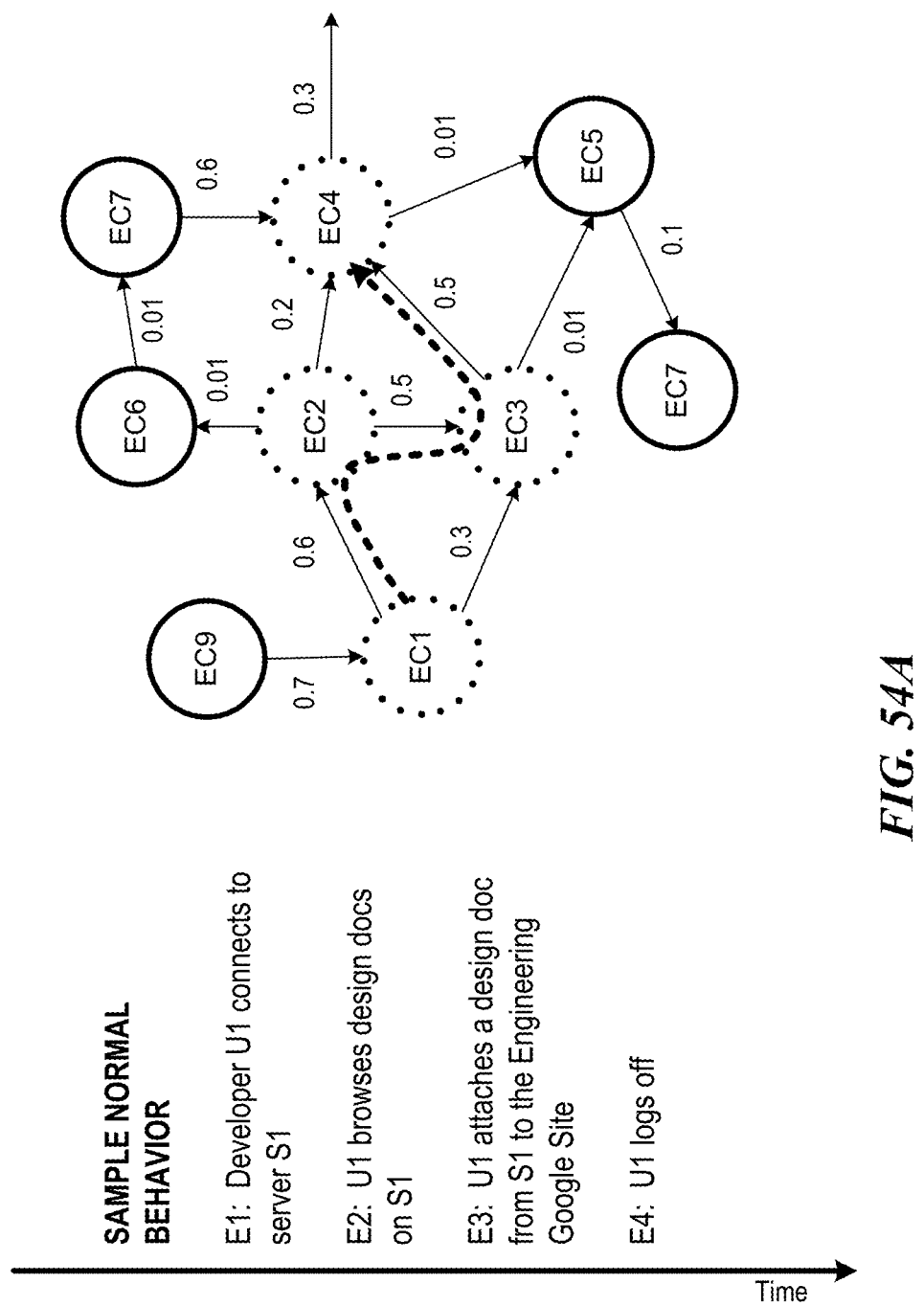
FIG. 54A shows an example of how a normal behavioral sequence may be represented in a probabilistic suffix tree based model.
Figure 54B:
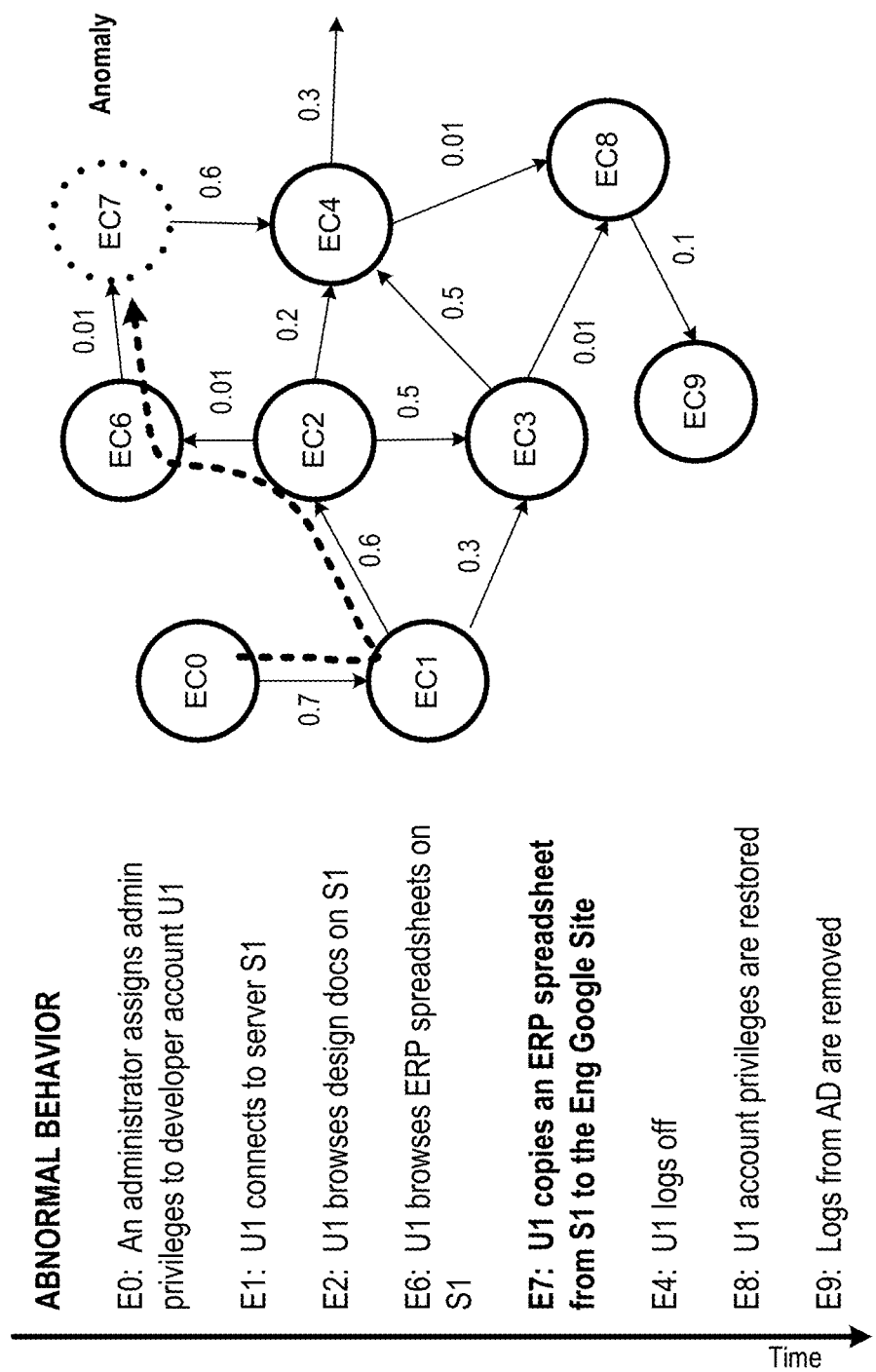
FIG. 54B shows an example of how an unusual behavioral sequence may be discovered in a probabilistic suffix tree based model.

With all the above in mind, FIG. 54A shows an example of how a normal behavioral sequence may be represented in a probabilistic suffix tree based model, and FIG. 54B shows an example of how an unusual behavioral sequence may be discovered in a probabilistic suffix tree based model. As can been seen from these two figures, the PST model can be very powerful to distinguish abnormal behaviors from normal behaviors, even in a complex network environment with many users collaborating.

Figure 55A:
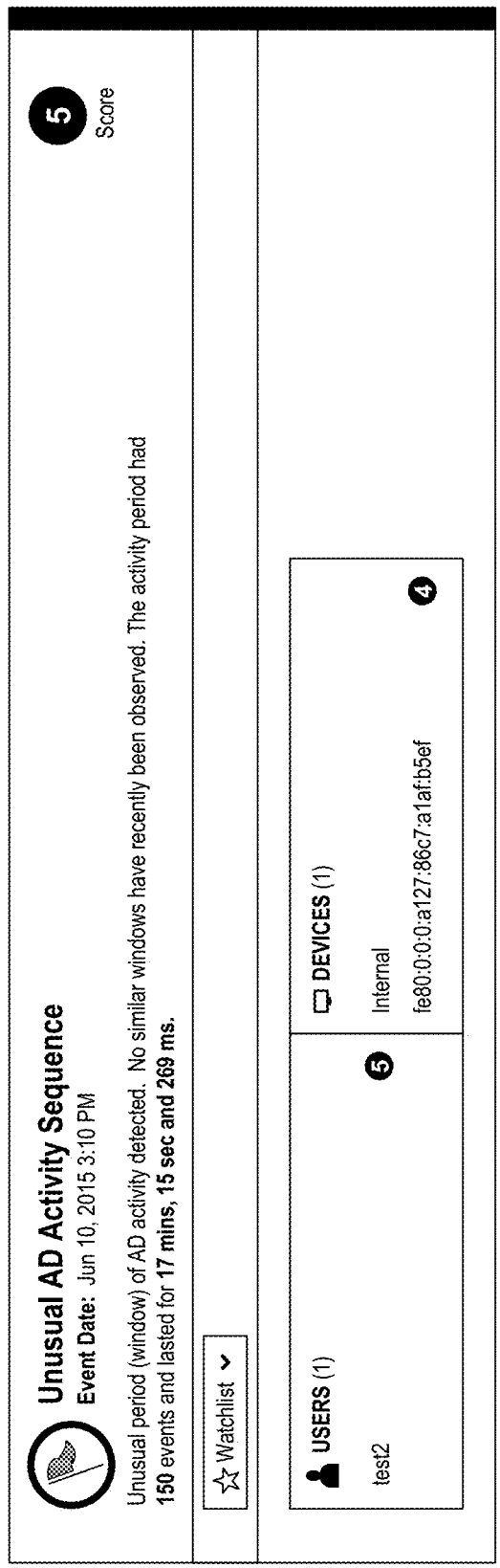
FIG. 55A shows an example user interface for displaying discovered anomalies.
Figure 55B:
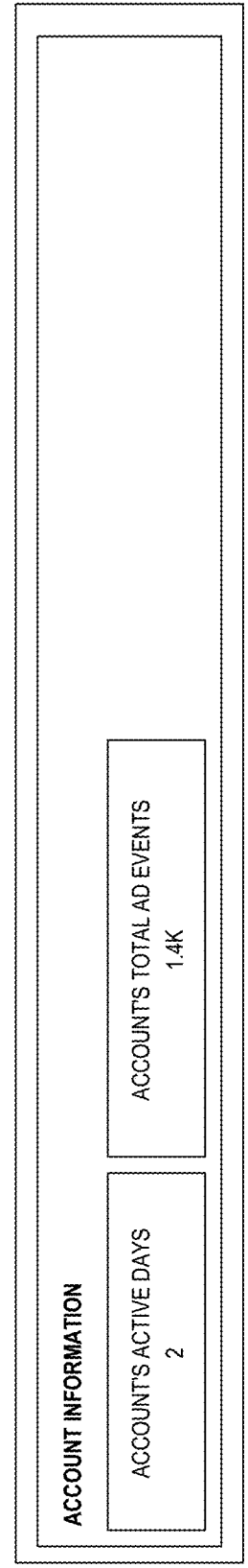
FIG. 55B shows an example user interface displaying additional information about the user.
Figure 56:
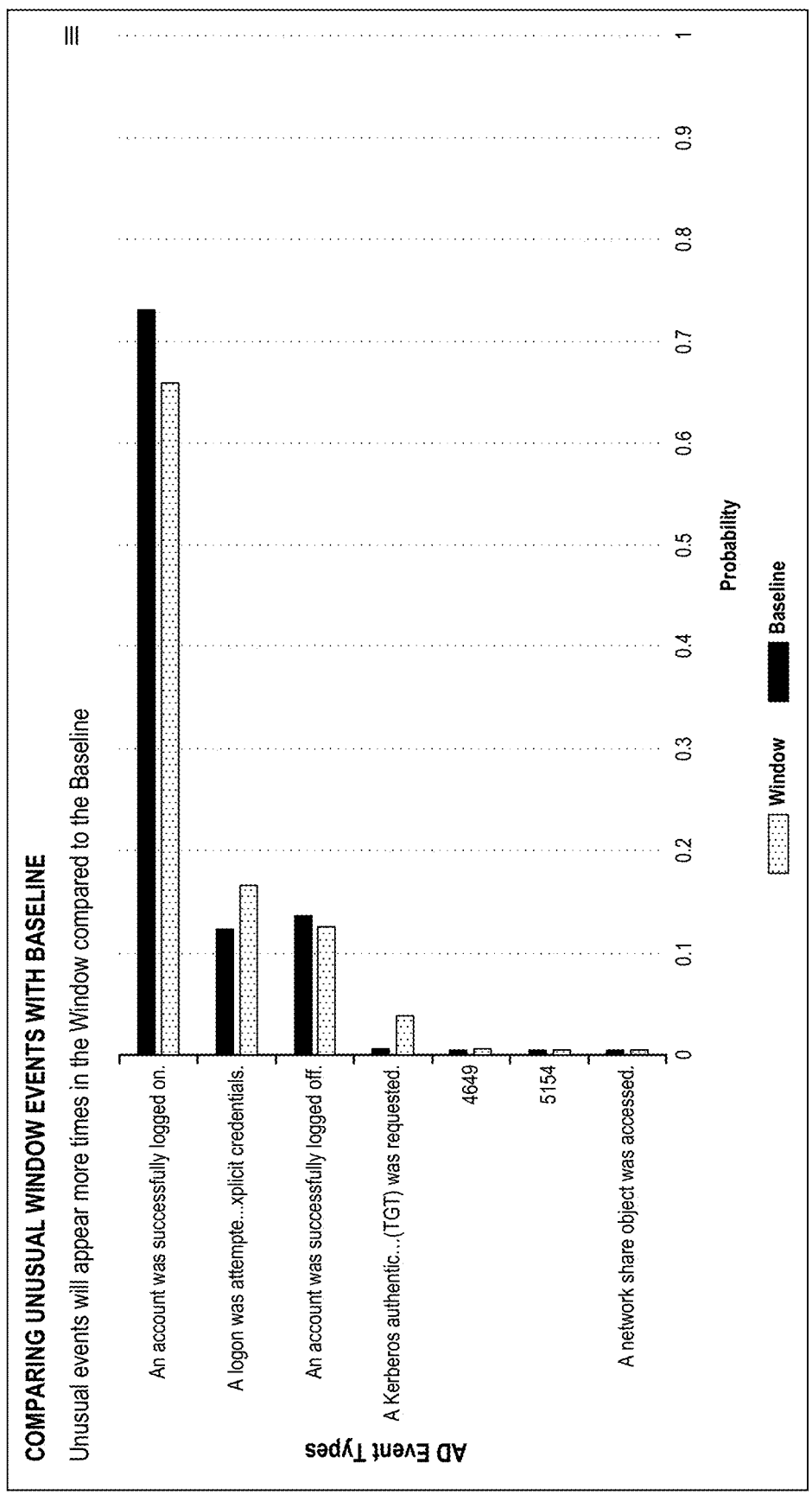
FIG. 56 shows an example user interface displaying results from comparing the marginal of the events for the anomalous window and the entire data for the user (e.g., baseline).

FIG. 55A through FIG. 58 show example graphical user interface (GUI) display screens of how an unusual behavioral sequence discovered can be presented to an administrator for actions and/or feedbacks. When an anomaly is discovered, the result can be presented to a user via a user interface, such as a GUI. As illustrated in FIG. 55A, the user interface can include textual description, such as which user has an unusual window, what kind of unusual sequence it is (e.g., Active Directory), how many events are in the window, how long the window has lasted, and so on. As illustrated in FIG. 55B, additional information about the user can be presented in the user interface, such as information about the training of the model for the user. Further, as illustrated in FIG. 56, results from comparing the marginal of the events for the anomalous window and the entire data for the user (e.g., baseline) can be automatically shown (e.g., in diagrams).

Figure 57:
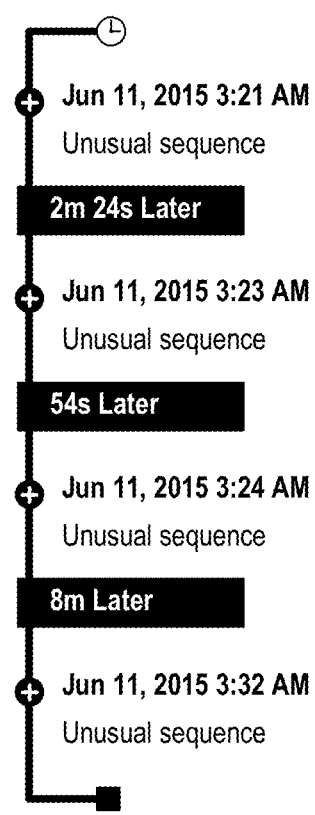
FIG. 57 shows an example overview of all the unusual sequence as a timeline.
Figure 58:
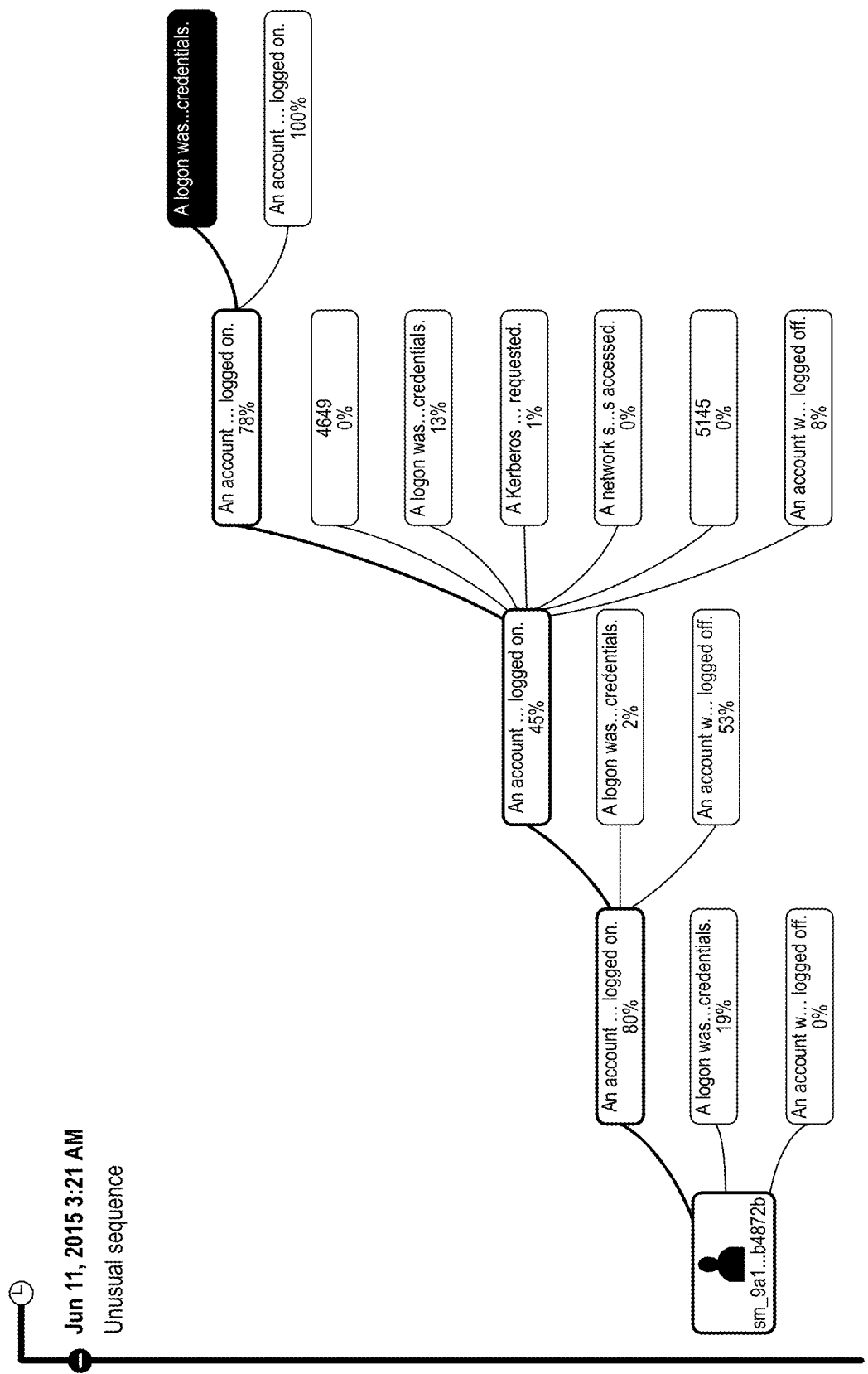
FIG. 58 shows an example user interface for an administrator to interact with each timeline event.

Further, as an option, all the "unusual" PST predictions that contributed to the high R can be shown to the administrator, and in some embodiments, can be shown as a timeline of unusual sequences. Illustrated in FIG. 57 is an overview of all the unusual sequence, shown as a timeline. Then, the administrator can interact with (e.g., click on) each timeline event and expand on the unusual sequence of events that lead to the low PST prediction, such as shown in FIG. 58.

In the above described manner, the PST model can enable the security platform to discover behavioral anomalies by determining whether a given sequence of events as associated with an entity deviates from a generally anticipated behavioral baseline, even though each event individually may well be considered not malicious. Also, the security platform provides intuitive ways for the administrator to receive alert and to understand relevant information in order to make an educated decision.

XII. Clustering on Graphs

In a network security context, it may be advantageous to identify clusters of nodes ("node clusters" or "clusters") in a graph, such as in the above-mentioned composite relationship graph or a projection of it. Doing so may be advantageous for various reasons, such as detecting similarities between users or devices and/or detecting deviations in an entity's activity from a behavioral baseline. For example, identification of node clusters can facilitate detection of lateral movement by user (e.g., a user accessing a device that he does not normally access) or detection of an account takeover situation.

For example, the system may initially determine that a particular entity is a member of a particular node cluster, or that the entity normally interacts with an entity that is a member of the node cluster. A cluster may represent a group of users who all tend to access the same set of devices on the network, for example. Subsequently a decision engine may detect that the particular user in that group has engaged in activity that represents a divergence from the identified cluster, such as a user in the cluster accessing a device that is not among those normally accessed by users in his cluster. In response to detecting this divergence, the decision engine can determine that the user's activity represents an anomaly, or perhaps even a threat.

What follows is a description of efficient, highly scalable, and parallelizable technique for identifying node clusters in a graph. The technique can be implemented by one or more of the above-mentioned machine learning models, for example, and can be implemented in the real-time path, the batch path, or both.

Briefly stated, in the cluster identification technique introduced here, an automated cluster identification process (e.g., from logic of a machine learning model) computes L1-norm values for the nodes in a graph to assign positions to the nodes on a one-dimensional (1D) grid. The process then identifies one or more node clusters in the graph based on the assigned positions of the nodes on the 1D grid. More specifically, the process creates node groups by iteratively relocating nodes on the 1D grid to positions where the L1-norm for each node is minimum. After finding optimal positions for the nodes on the 1D grid in this manner, each group of nodes located at the same position on the 1D grid (if any) represents a cluster.

Figure 59:
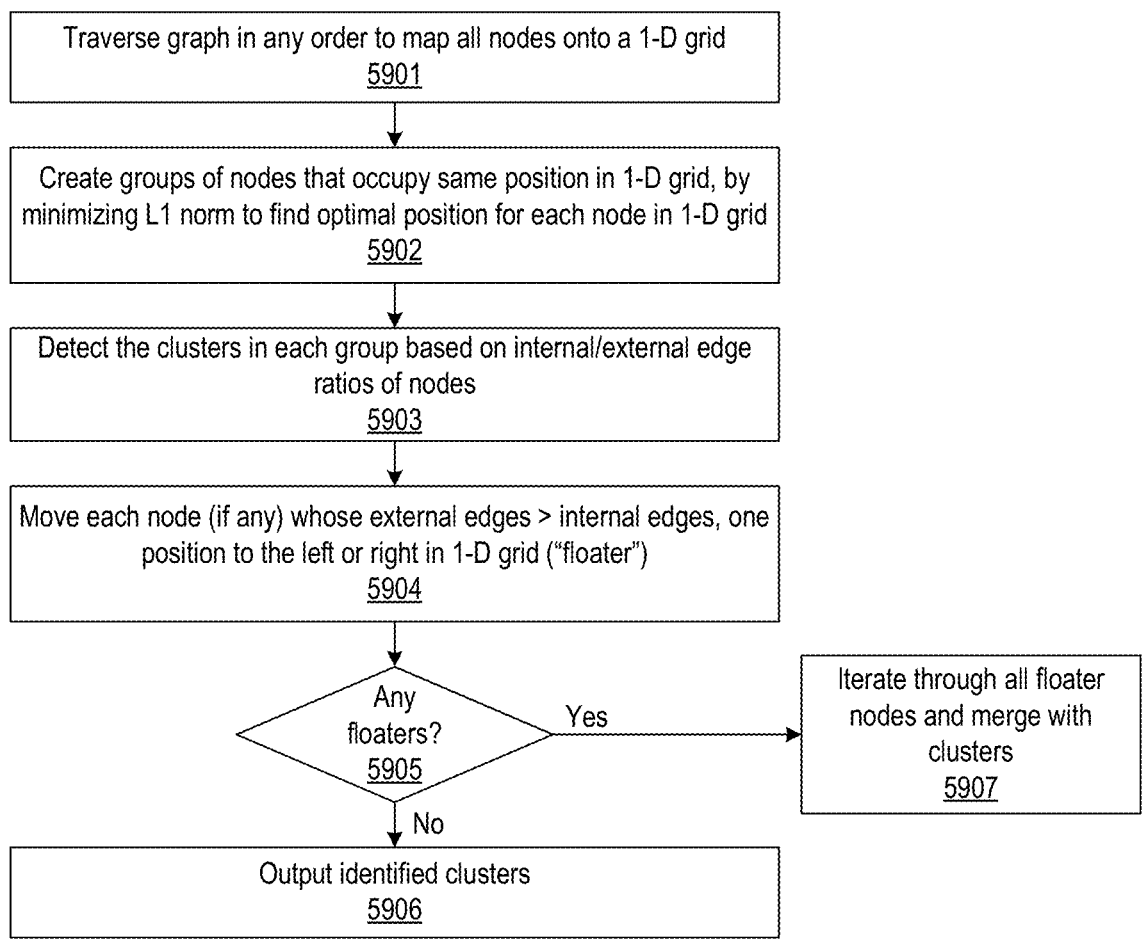
FIG. 59 is a flowchart showing an example of an automated process for cluster identification from a graph.

The technique is now further described with reference to FIGS. 59 through 62. FIG. 59 is a flowchart showing an example of the above-mentioned process. The initial input to the process is any graph, an example of which is shown as graph 6101 in FIG. 61A. In other embodiments, the process of FIG. 59 may be performed while a graph is being constructed. It is assumed that edge weights are represented by integers, not floating point numbers, and that multiple associations between nodes are collapsed into the weight of a single edge after proper boosting/weighting.

Figure 61A:
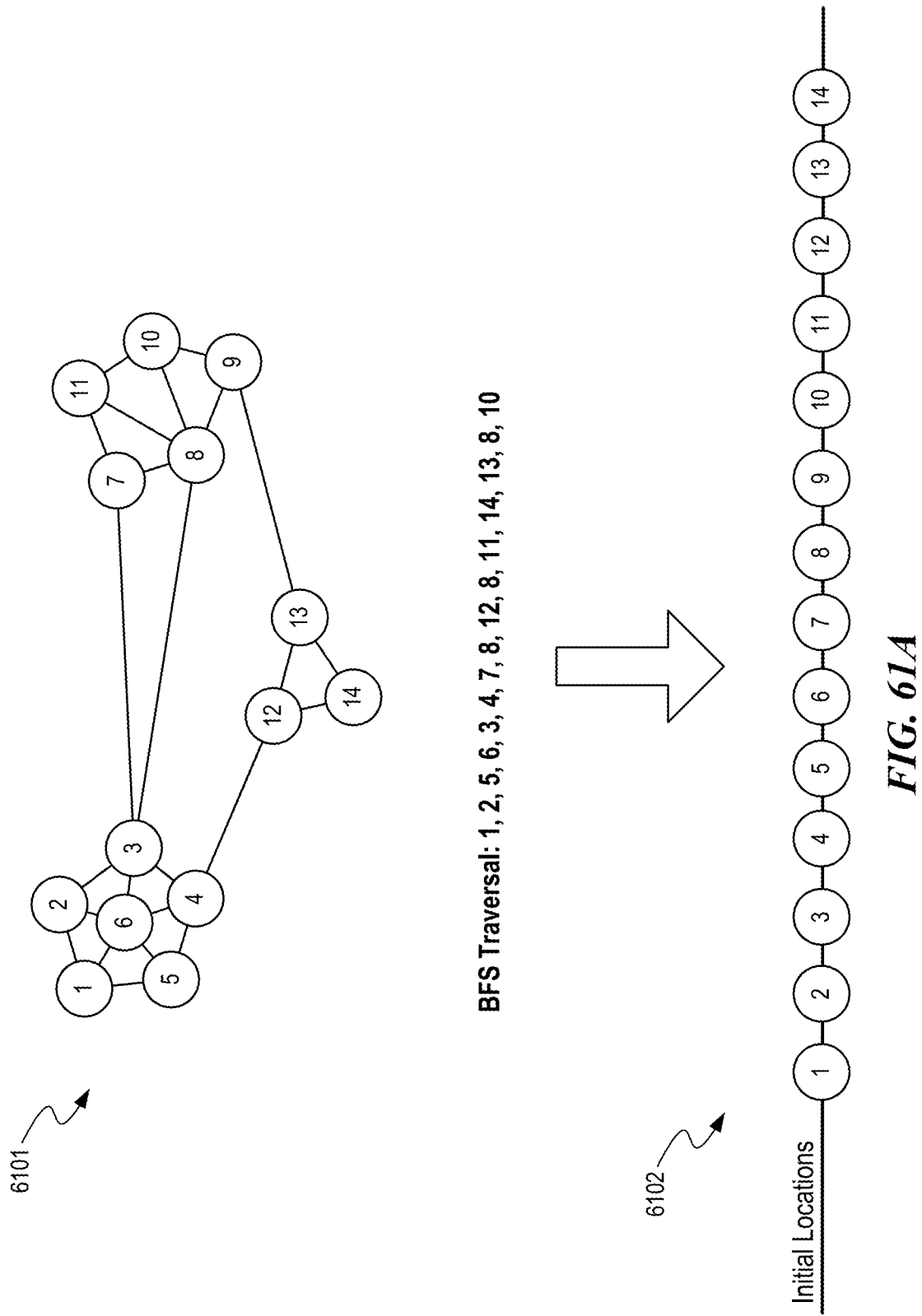
FIG. 61A shows an example use case corresponding to the cluster identification process for a generic graph, at a first stage of processing.

At step S901 in FIG. 59, the process initially traverses the graph node by node and maps the nodes onto a one-dimensional (1D) grid. The graph may be traversed in any order. For example, a breadth first search (BFS) order may be convenient. An example of a 1D grid resulting from traversing graph 6101 in BFS order is shown as grid 6102 in FIG. 61A. In FIG. 61A, the numeral inside each node (circle) indicates the order in which the node has been "touched" during a BFS traversal and, hence, its position in the 1D grid 6102. Therefore, to facilitate description, the nodes of graph 6101 are referred to by their positions in the 1D grid 6102, e.g., Node 1, Node 2, etc., corresponding respectively to positions 1, 2, etc.

After mapping the nodes to the 1D grid, the process at step S902 creates groups of nodes that have the same position on the 1D grid, by iteratively minimizing the L1-norm of each node to find its "optimal" position on the 1D grid. A "norm" in this context is a function that assigns a strictly positive length or size to each vector in a vector space (except the zero vector, which is assigned a length of zero). an L1-norm, at least in the context of this description, is the sum of the individual distances (absolute) along the 1D grid between each candidate position for a node under consideration and each other candidate position for the node under consideration. The candidate positions are the positions of all nodes directly connected to the node under consideration in the graph. The "optimal" position for a node under consideration is the position of that node, in the 1D grid, where the node's L1-norm is minimum.

Figure 61B:
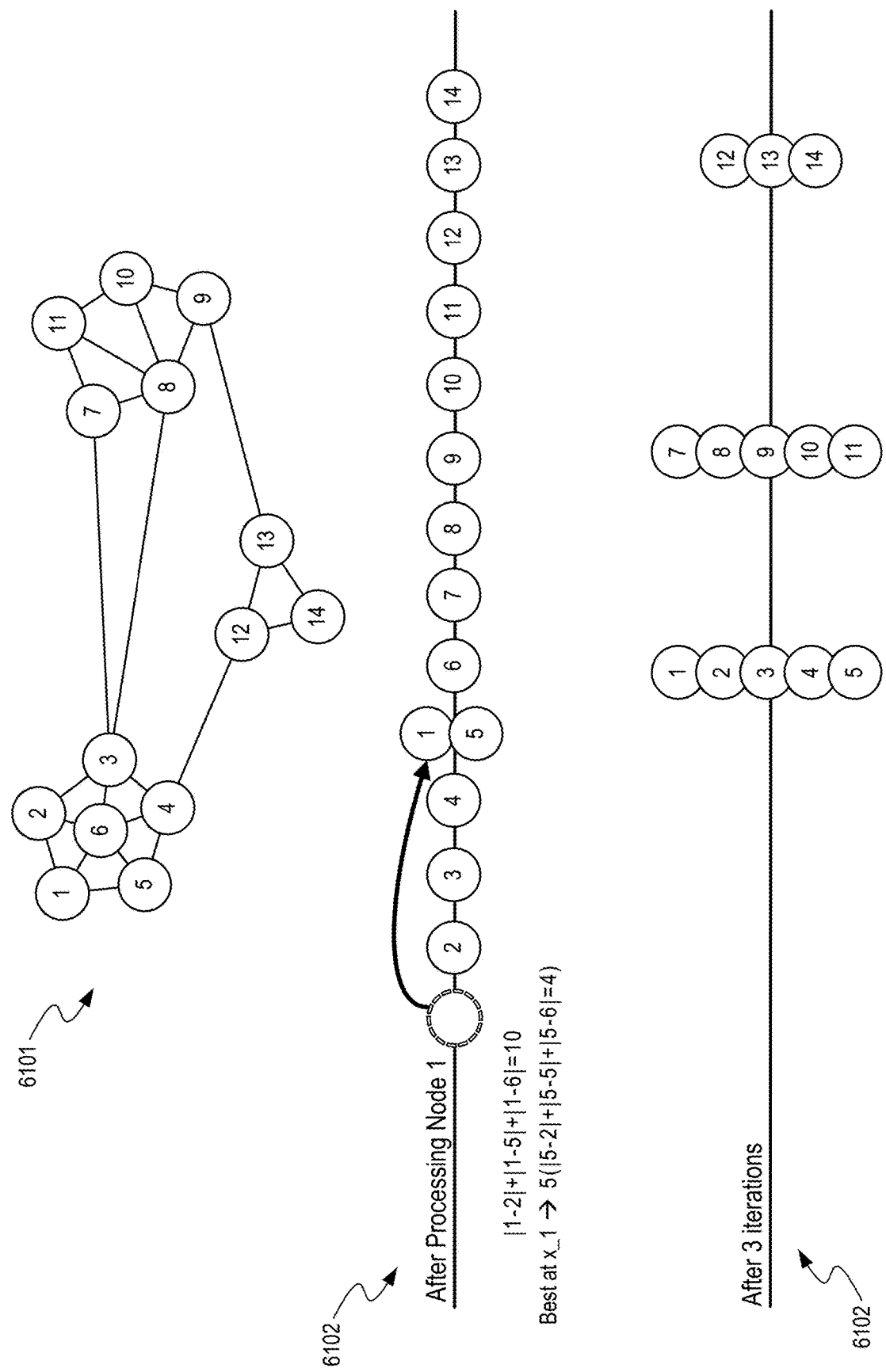
FIG. 61B shows an example use case corresponding to the cluster identification process for a generic graph, at a second stage of processing.

Referring to the example of FIGS. 61A and 61B, therefore, after mapping all the nodes to the 1D grid 6102, the process will initially attempt to determine the optimal position for Node 1. To do so, the process computes the L1-norm for Node 1 in each of its candidate positions. Node 1 is directly connected to Nodes 2, 5 and 6 in the graph 6101 (i.e., the nodes that occupy positions 2, 5 and 6 and the 1D grid). Therefore, the candidate positions for Node 1 are the positions occupied by Nodes 2, 5 and 6 on grid 6102. Therefore, the process computes the L1-norm for Node 1 each of those candidate positions, and chooses the position at which the L1-norm is smallest as the optimal position for Node 1. If Node 1 were maintained at its initial position on the 1D grid, its L1-norm would be computed as the sum of the absolute distances, along the 1D grid, between position 1 and positions 2, 5 and 6 on grid 6202, i.e., the L1-norm of Node 1 at position 1 is $L1\text{-Norm}_{1,1} = |1-2|+|1-5|+|1-6|=10$. In contrast, if Node 1 were to be moved to the position of Node 5 on the 1D grid, the L1-norm of Node 1 at position 5 would be computed as $L1\text{-Norm}_{1,5} = |5-2|+|5-5|+|5-6|=4$.

As can be easily verified, the L1-norm of Node 1 is minimum at position 5 on grid 6102 in the example of FIGS. 61A and 61B. Therefore, the position of Node 5 is deemed to be the optimal position of Node 1 in the initial iteration, so Node 1 is moved to the position of Node 5, as shown in FIG. 61B. Note that a node's optimal position can change in subsequent iterations, however, as the node and/or other nodes may be relocated along the 1D grid.

After processing all of the nodes of the graph in this manner in step S902, one or more nodes may occupy the same position on the 1D grid; such nodes are considered to constitute a node group, which may be a cluster. However, before concluding that a node group is in fact a cluster, the process looks for any node(s) in each node group that have a stronger connection to nodes outside their group; such nodes should be removed from their current group (i.e., relocated along the 1D grid).

Referring back to FIG. 59, therefore, in step S903 the process detects the actual clusters in each group based on the internal-to-external edge ratios of the nodes. In this context, a node can have one or more "internal" edges and one or more "external" edges. An internal edge is any edge that connects the node to another node within the same node group (created in step S902), whereas an external edge is any edge that connects a node to another node outside its node group. If any node has external edges whose summed weight exceeds the summed weight of all of its internal edges (i.e., its internal/external edge ratio is less than one), then at step S904 removes that node from its current node group by shifting the node one position to the left or right along the 1D grid (the direction does not matter). Each node relocated in this manner is called a "floater." Hence, if at step S905 there are any floaters, the process proceeds to 5907, in which the process iterates through all of the floater nodes and merges them with the existing cluster(s). If there are no floaters at step S905, the process proceeds to step S906, in which it outputs the identified clusters (e.g., to another machine learning model, a decision engine, a user interface, etc.).

FIG. 61B also shows, at the bottom, the positions of all of the nodes after three iterations. It can be seen that three clusters have been identified: Nodes 1 through 6; Nodes 7 through 11; and Nodes 12 through 14.

In addition to being efficient, highly scalable and parallelizable, this process is also incremental, which means if a single node or multiple nodes are added to the graph, it is not necessary to remap the entire (modified) graph onto the 1D grid; instead each newly added node of the graph can be inserted directly into the 1D grid by minimizing its L1-norm as described above.

The above-described cluster identification technique can be used to identify clusters in essentially any kind of graph. A special case of such a graph, however, is a bipartite graph. A bipartite graph is a graph whose nodes can be divided into two disjoint sets, called normal nodes and pseudo-nodes (i.e., normal nodes and pseudo-nodes are each independent sets), such that every edge connects a normal node to a pseudo-node. For example, a bipartite graph may be created in which the normal nodes represent users and the pseudo-nodes represent devices accessed by those users. Such a graph can be used, for example, to facilitate detection of lateral movement by users. An implementation of the above-described technique can be applied to detect clusters in a bipartite graph, as discussed further in a section below. An example of such an implementation for bipartite graphs is illustrated in FIGS. 60A and 60B, with a corresponding example of a use case illustrated in FIG. 62.

Figure 60A:
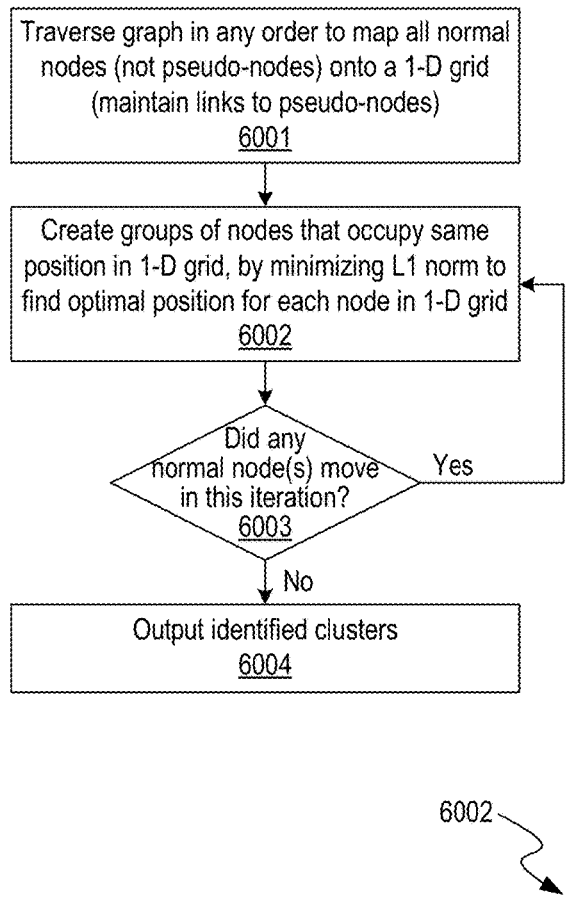
FIG. 60A is a flowchart showing an example of an automated process for cluster identification from a bipartite graph.
Figure 62:
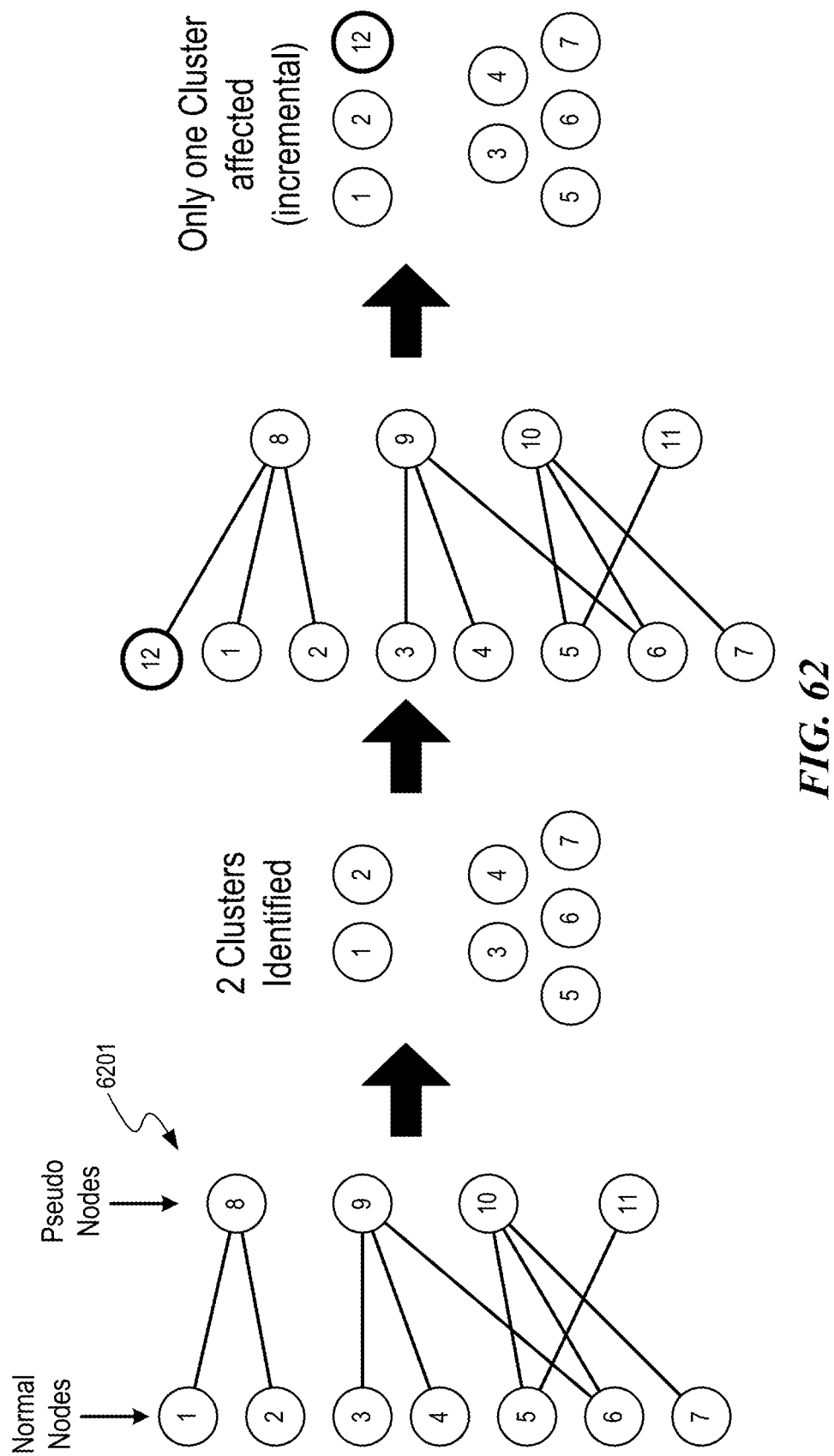
FIG. 62 illustrates an example use case corresponding to the cluster identification process for a bipartite graph.

Referring first to FIG. 60A, at step 6001 the process initially traverses the bipartite graph and maps only the normal nodes onto a 1D grid. The graph may be traversed in any order, such as BFS order. Next, at step 6002 the process creates groups of nodes that occupy the same position in 1-D grid, by minimizing the L1-norm of each normal node to find its optimal position in the 1-D grid. Referring to FIG. 62, the normal nodes are Nodes 1 through 7 (i.e., the left column of graph 6201) whose positions are the positions on the 1D grid, while the pseudo-nodes are Nodes 8 through 10 (the right column of graph 6201). The process of minimizing L1-norms for a bipartite graph is described further below.

The process then determines at step 6003 whether any normal nodes were moved during step 6002. If any normal nodes were moved during step 6002, the process loops back to step 6002 for another iteration. Otherwise, the process outputs the identified cluster(s) (e.g., to another machine learning model, a decision engine, a user interface, etc.), where a cluster is a group of nodes that occupy the same position on the 1D grid.

Figure 60B:
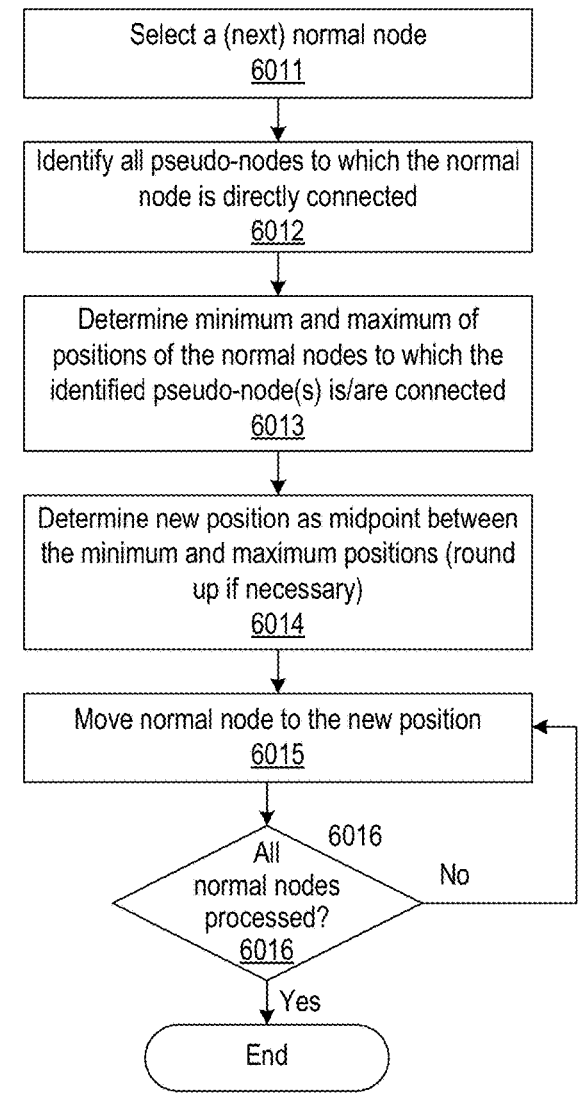
FIG. 60B shows an example of minimizing the L1-norm values to find optimal positions for the normal nodes.

FIG. 60B shows in greater detail the step 6002 of FIG. 60A, i.e., the step of minimizing the L1-norm values to find optimal positions for the normal nodes. Initially, at step 6011 the process selects a normal node of the graph (the "node under consideration"). The process then identifies all of the pseudo-nodes to which the selected normal node is directly connected, at step 6012. For example, in graph 6201 of FIG. 62, normal Node 1 is connected only to pseudo-Node 8. The process then, at step 6013, identifies the minimum and maximum of positions, on the 1D grid, of all normal nodes to which the identified pseudo-node(s) is/are connected.

For example, in step 6013, if (normal) Node 1 were the selected node, then the minimum and maximum positions would be 1 and 2, respectively, since Node 1 is connected only to pseudo-Node 8, which is also connected to normal Node 2. If Node 6 were the selected node, then the minimum and maximum positions would be 3 and 7, respectively, since Node 6 is connected to pseudo-Node 9, which is also connected to normal Nodes 3 and 4, and to pseudo-Node 10, which is also connected to normal Nodes 5 and 7.

The process next determines at step 6014 the "optimal" position for the normal node, as the position on the 1D grid that corresponds most closely to the midpoint between the minimum and maximum positions determined in step 6013 (rounding up if the exact midpoint falls between two positions on the grid). At step 6015 the process moves the selected normal node to the position determined in step 6014, with the effect being to minimize the selected node's L1-norm. This process repeats for each normal node until all of the normal nodes have been processed in this manner, and then returns to the process of FIG. 60A, proceeding then to step 6003 in FIG. 60A as described above.

As shown in FIG. 62, the process identifies two clusters from the example graph 6201, namely, Nodes 1 and 2 as one cluster, and Nodes 3 through 7 as another cluster. The process of FIGS. 60A and 60B is also incremental, such that the addition of a new node or nodes to the graph does not require remapping the entire graph onto the 1D grid; rather the new node(s) can be added directly to the 2D grid as described above.

XIII. Lateral Movement Detection

FIGS. 63 through 67 relate to a method for identifying a security threat based on detecting suspicious lateral movement of a user. Lateral movement refers to a user using a device or devices that he or she does not normally use, which may be (but is not necessarily) indicative of a security threat.

Lateral movement may indicate the possibility that the credential of a user has been stolen, or the user's device has been controlled by a malicious software. For example, a wrongdoer may steal a user's credential and use the stolen credential to access a device that the user typically does not access. An analyzer (e.g., the real-time analyzer 210 or the batch analyzer 240 in FIG. 3) may recognize such an event as an anomaly. Furthermore, if the analyzer detects that the anomaly (directly or through other anomalies) leads to a result that the wrongdoer (disguised as a legitimate user) gains access to a device designated as a critical resource, the analyzer can recognize a security threat represented by a set of the relevant anomalies.

The lateral movement detection method introduced here assigns similarity scores to devices in a computer network based on the relationships between users and the devices. For example, the relationships can include information regarding certain users logging into devices. The similarity scores suggest the similarities between the devices in terms of associated users. The method further generates or identifies classification metadata of the user and the device, based on event data about the login event, to further explain the relevance of the user and the device in a security context. The method then detects an anomaly based on the classification metadata and similarity scores when a user interacts with a device having a similarity score that is significantly different from the similarity scores of devices with which the user usually interacts. Based on the detected anomaly, the method may further determine a security threat based on the relationship information by identifying, in a relationship graph, a relationship path from a user through anomalies to a critical resource.

In some embodiments, the method described here can be implemented by a machine learning model. For example, processing logic of a machine learning mode can generate the classification metadata, or assign usage similarity scores, or both, as further described below.

In some embodiments, the processes of generating the classification metadata and/or assigning usage similarity scores are performed in real-time as the event data are received. In other embodiments, either or both of these processes are performed in batch mode based on event data stored in a non-volatile storage facility.

Figure 63:
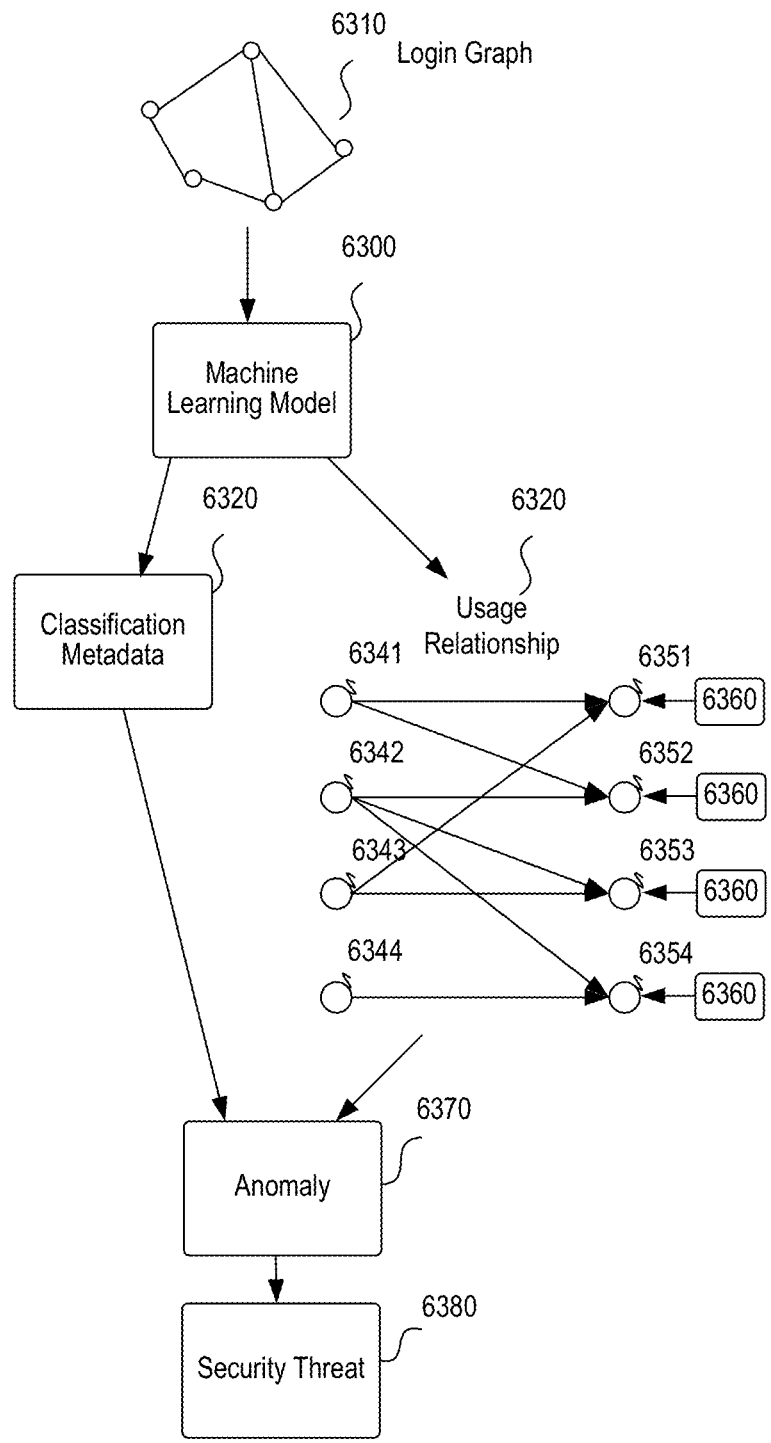
FIG. 63 is a block diagram illustrating a machine learning model that detects lateral movement in a computer network.

FIG. 63 is a block diagram illustrating a machine learning model that detects lateral movement in a computer network. The computer network includes entities, such as devices and network devices. The machine learning model 6300 analyzes event data 6310. The event data 6310 can be, e.g., timestamped machine data. The event data 6310 include information regarding the computer network activities of the users and network devices. In one embodiment, the event data 6310 includes a projection of the security graph. The particular projection of the security graph (also referred to as "login projection" or "login graph") records the information that relates to login events in which the users log into the network devices in the computer network.

Based on the event data 6310 (e.g., the login graph), the machine learning model 6300 generates classification metadata 6320 for each of the network devices and for each of the users. The classification metadata 6320 helps explain the relevance in a network security context of each of the users and each of the network devices. For example, the classification metadata 6320 for a particular user can include metadata indicative that the user is a regular user, an administrative user, or an automated (machine-implemented) user, for example. Similarly, the classification metadata 6320 for a particular network device can include metadata indicative that the particular network device is a workstation, a server or a printer, for example.

Because the classification metadata 6320 are generated based on the event data 6310, the machine learning model 6300 does not need additional metadata that explicitly annotates the types of the user and network devices. The machine learning model 6300 can automatically recognize the types of the users and network devices, based on the event data representing the network activities involving the users and network devices.

The machine learning model 6300 further identifies usage relationships 6330 between the users and the network devices based on the event data 6310. For example, if the event data 6310 includes a login graph having information that relates to the login events, the machine learning model 6300 can identify the usage relationships 6330 as login events indicative of the users logging into the network devices. In some embodiments, the usage relationship 6330 can be presented as a graph having nodes and edges interconnecting the nodes, as illustrated in FIG. 63. The nodes represent network entities such as users and network devices, and the edges represent the login events that the users log into the network devices.

As shown in FIG. 63, the usage relationships 6330 between the users and the network devices can be captured in a bipartite graph including a first set of nodes representing users (nodes 6341, 6342, 6343 and 6344) and a second set of nodes representing network devices (nodes 6351, 6352, 6353 and 6354). The first and second sets are disjoint sets. Every edge in the bipartite graph connects a user node in the first set to a device node in the second set. In addition, the relationships 6330 between the user nodes and the device nodes also represent a time series of events in which the users have interacted (e.g., logged in) with the network devices.

Figure 65:
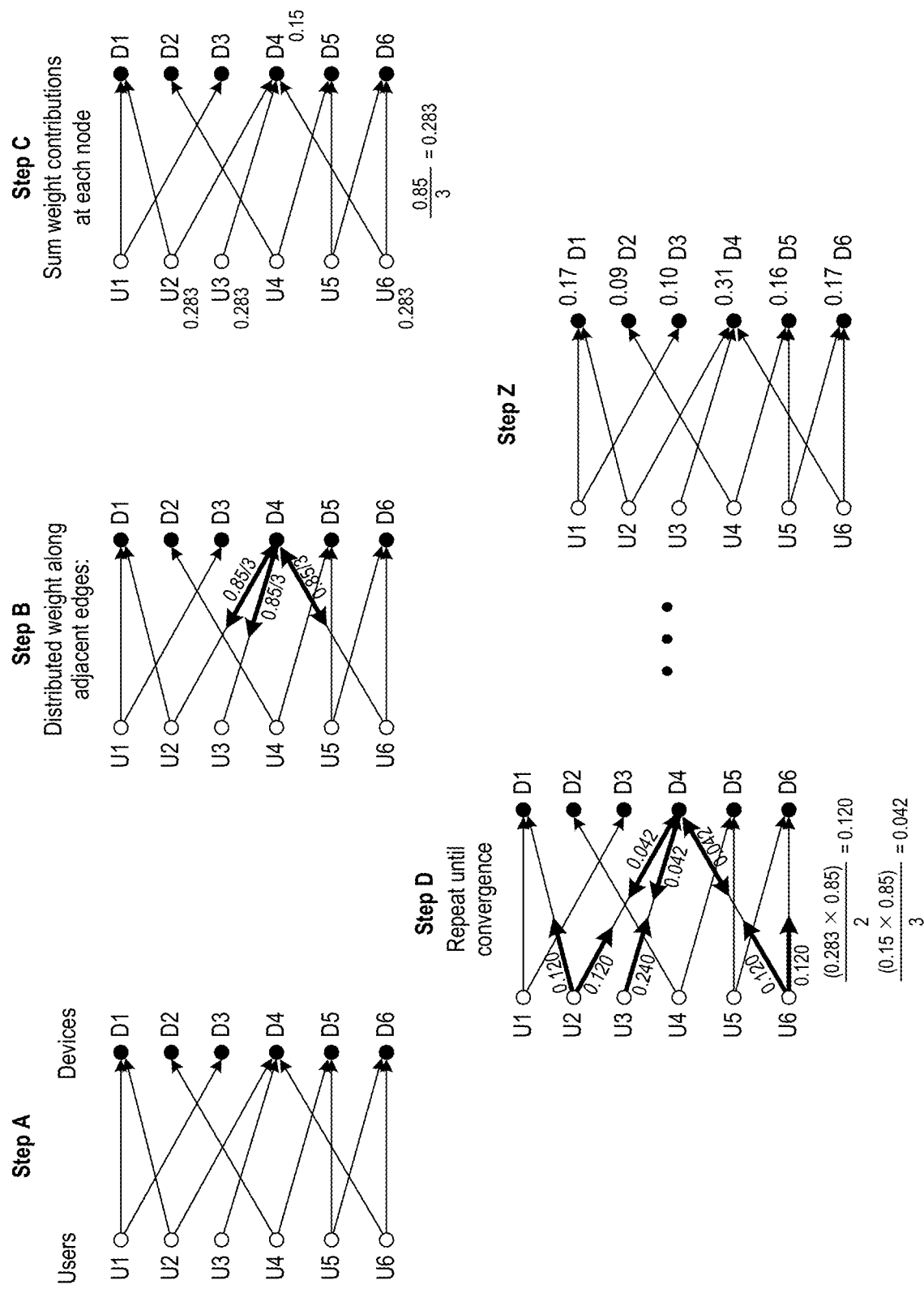
FIG. 65 illustrates an example of a process of assigning similarity scores to network devices.

Based on the usage relationships 6330, the machine learning model 6300 assigns usage similarity scores 6360 (also referred to as "similarity scores") to the network devices represented by the device nodes. The usage similarity scores 6360 indicate which of the devices have been used by the same or similar group of users. The details of the process of assigning usage similarity scores 6360 are illustrated in FIG. 65.

The similarity scores are assigned such that any given set of network devices that are accessed by the same or similar group of users are assigned similarity scores that are closer in value to each other than the similarity scores of any other set of network devices that are not accessed by the same or similar group of users. In other words, a group of network devices that have similar groups of login users tend to have similarity scores that are closer in value to each other than similarity scores of network devices that do not have similar groups of login users.

Figure 64:
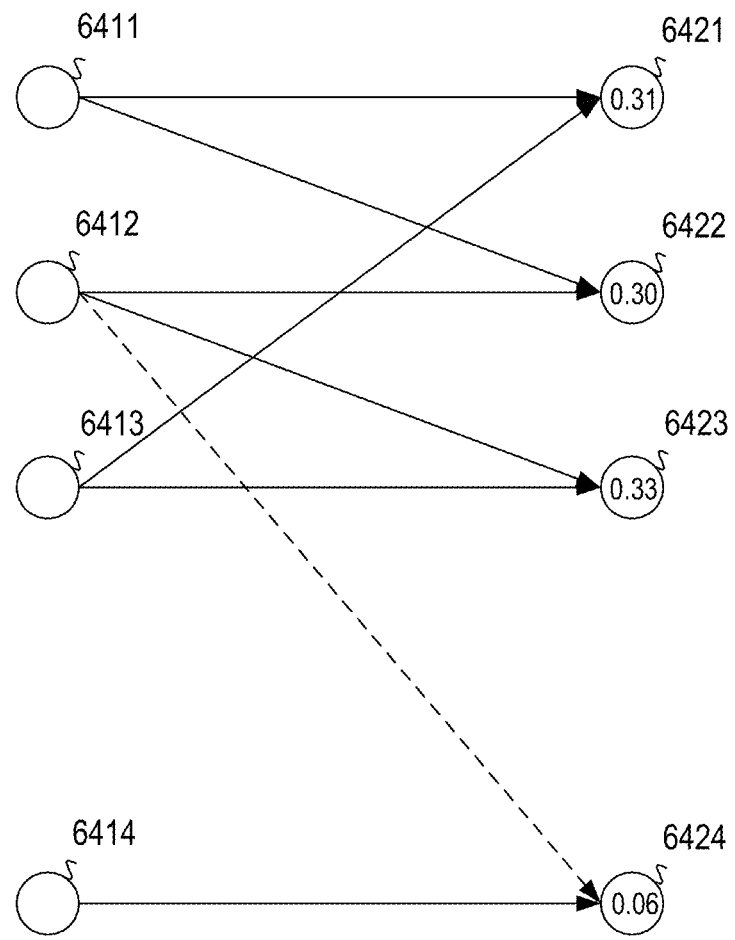
FIG. 64 illustrates an example of a bipartite graph showing events of users logging into network devices.

FIG. 64 illustrates an example of a bipartite graph showing events of users logging into network devices. The bipartite graph 6400 includes a group of user nodes 6411, 6412, 6413 and 6414, and a group of device nodes 6421, 6422, 6423 and 6424. The edges between the user nodes and device nodes represent the login activities. To facilitate discussion, the reference numerals in FIG. 64 are used interchangeably to refer to the nodes and the users or network devices represented by those nodes.

As shown in FIG. 64, two users 6411 and 6413 have logged into device 6421. Two users 6411 and 6412 have logged into device 6422. Two users 412 and 6413 have logged into the device 6423. Therefore, devices 6421, 6422 and 6423 are associated with a similar groups of users, i.e., users 6411, 6412 and 6413.

In contrast, before user 6412 logs into device 6424, wherein the dashed line represents that particular login activity, only user 6414 has logged into device 6424. The group of user(s) that has/have logged into device 6424 is substantially different from the groups of users that have logged into devices 6421, 6422 and 6423. This difference is reflected in the similarity scores assigned to devices 6421, 6422, 6423 and 6424. Devices 6421, 6422 and 6423 have similar (numerically close) similarity scores of 0.31, 0.30 and 0.33, respectively. On the other hand, device 6424 has a similarity score of 0.06, which is significantly different from the similarity scores of devices 6421, 6422 and 6423.

Once the user 6412 logs into device 6424 (as represented by the dashed line in FIG. 64), the machine learning model 6300 determines the similarity score of the particular device 6424 (i.e., 0.06 for device 6424) fails to satisfy a specific closeness criterion relative to similarity scores of network devices with which the particular user usually interacts (i.e., 0.30 for device 6422 and 0.33 for device 6423). The closeness criterion can be of various different types in different embodiments. For example, the machine learning device 6300 may determine that the difference between the similarity score of the particular network device 6424 and an average of the similarity scores for network devices 6422 and 6423 is 0.255, which exceeds a threshold of 0.2. The machine learning model 6300 then detects an anomaly because the difference of similarity scores exceeds the threshold value.

In an alternative embodiment, the machine learning model 6300 can further calculate an anomaly score for the particular user and decide whether anomaly is detected based on the anomaly score. The anomaly score indicates a likelihood that the anomaly relates to a security threat. The anomaly score can be calculated based on, for example, the difference between a similarity score of the particular network device and a statistical measure (e.g., an average) of similarity scores of other devices with which the user has interacted. The machine learning model 6300 then detects the anomaly if the model determines that the anomaly score exceeds a threshold value for anomaly scores.

For example, the similarity score of the network device 6424 is 0.06, and the average similarity score of network devices 6422 and 6423 is 0.315. The difference between the similarity scores is 0.255. The machine learning model calculates the anomaly score as, e.g., 0.355, by summing the similarity score difference of 0.255 and an extra weight of 0.1 in recognition that the network device 6424 is a server of high importance. Because the anomaly score of 0.355 exceeds a threshold of 0.3, the machine learning model 6300 detects an anomaly.

Alternatively, the machine learning model 6300 can detect an anomaly based on an access profile of a particular user. The access profile of the particular user includes network devices with which the particular user interacts and that have similarity scores that satisfy a specific closeness criterion. For example, the differences of the similarity scores of network devices 6422 and 6423 within the access profile of user 6412 is 0.03 and is less than a threshold value of 0.1. In some embodiments, the access profile of the particular user 6412 can further include, e.g., information of events indicative that the particular user succeeded logging in to a network device, failed logging in to a network device, succeeded validating credential of a network device, failed validating credential of a network device, succeeded accessing a network object stored on a network device, or failed in accessing a network object stored on a network device.

When the user 6412 interacts with a particular network device 6424, the machine learning model 6300 calculates the anomaly score for the particular user based on a difference between the similarity score of the particular network device 6424 and the average of similarity scores of network devices 6422 and 6423 in the access profile of the particular user 6412. The machine learning model 6300 detects the anomaly if the similarity score difference indicates that the particular user 6412 has interacted with the particular network device 6424 outside of the access profile of the particular user 6412.

The machine learning model 6300 can assign similarity scores to the network devices in various ways. FIG. 65 illustrates an example of a process of assigning similarity scores to network devices. At step A in FIG. 65, the machine learning model 6300 receives a bipartite graph. The bipartite graph includes a group of nodes U1-U6 representing users (also referred to as "user nodes") and another group of nodes D1-D6 representing network devices (also referred to as "device nodes"). The bipartite graph further includes edges interconnecting the nodes. The edges represent the relationships between the users and the network devices. The machine learning model 6300 selects a device node D4 and assigns an initial weight value of 1 to the selected device node D4. In some embodiments, the machine learning model 6300 can, e.g., select the device node in a random manner. The initial weight value can also have a value different from 1.

At step B in FIG. 65, the machine learning model 6300 keeps a percentage (15%) of the initial weight value of 1 at the device node D4, and equally distributes a remainder of the initial weight value 1 from the device node D4 along the edges of D4 to nodes U2, U3 and U6. In some embodiments, the machine learning model decides the percentage of 15% before starting the similarity score assignment process.

The value distribution process can be viewed as a Markov chain process. At each step, the value distributor(s) have a probability of 15% (hence the percentage is also referred to as "probability percentage") to remain at the same node as in the previous step; the value distributor(s) have a probability of (100%−15%=85%) to follow an edge of the node to move to another node. In some other embodiments, the similarity score assignment process can use a percentage other than 15%.

As show in step C of FIG. 65 after the distribution, the machine learning model 6300 keeps a weight value of 0.15 (=1*15%) at the device node D4. The machine learning model 6300 equally distributes a remainder of the initial weight value (0.85=1*0.85%) to user nodes U2, U3 and U6. Each node of user nodes U2, U3 and U6 receives a weight value of 0.283 (=0.85/3).

For each node, the machine learning model 6300 repeats the process of distributing along edges until the weight values at the network devices D1-D6 converge. The step D in FIG. 65 shows the next step in the iterative process. For device node D4, the machine learning model 6300 keeps a weight value of 0.023 (=0.15*15%) at device node D4, and distributes 0.042 (=(0.15*85%)/3) to each of user nodes U2, U3 and U6. For user node U2, the machine learning model 6300 keeps a weight value of 0.042 (=0.283*15%) at user node U2, and distributes 0.120 (=(0.283*85%)/2) to each of device nodes D1 and D4.

Similarly, for user node U3, the machine learning model 6300 keeps a weight value of 0.042 (=0.283*15%) at user node U3, and distributes 0.241 (=(0.283*85%)/1) to device D4. For user node U6, the machine learning model 6300 keeps a weight value of 0.042 (=0.283*15%) at user node U6, and distributes 0.120 (=(0.283*85%)/2) to each of device nodes D4 and D6.

The machine learning model 6300 continues the iterative process until the weight values at the network devices D1-D6 converge. At each step of the iterative process, for each node, the machine learning model 6300 keeps 15% of the weight value at the node and then equally distributes the remainder of the weight values along the edges to other nodes. The convergence criterion can be any criterion indicative of this type of convergence. For example, the machine learning model 6300 can determine that the iterative process reaches a convergence when the change of weight values between two consecutive steps at each node is less than a threshold value.

Step Z of FIG. 65 shows the status of a final step with converged weight values when the iterative process reaches a convergence. The converged weight values at the devices D1-D6 are similarity scores assigned to these devices. The machine learning model 6300 uses the similarity scores to determine whether multiple network devices are similar in terms of associated users that interact with the devices.

Figure 66D:
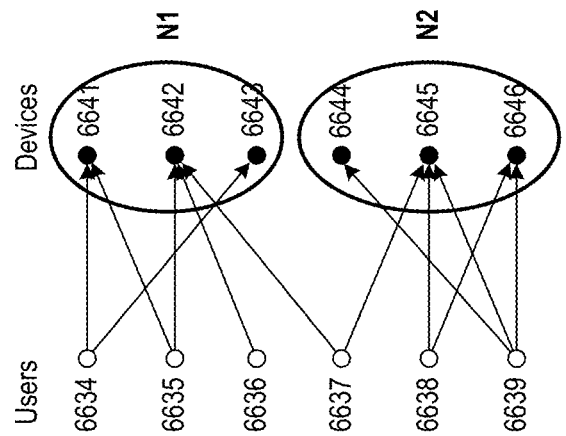
FIG. 66D shows an example of a bipartite graph having network devices that are associated with similar groups of users.
Figure 66C:
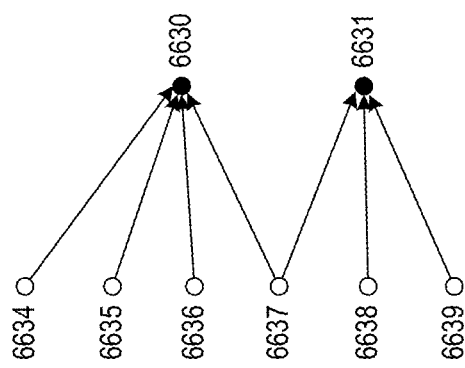
FIG. 66C shows an example of a bipartite graph having network devices that have one shared user.
Figure 66B:
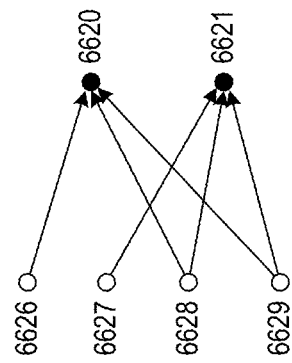
FIG. 66B shows an example of a bipartite graph having network devices that have multiple shared exclusive users.
Figure 66A:
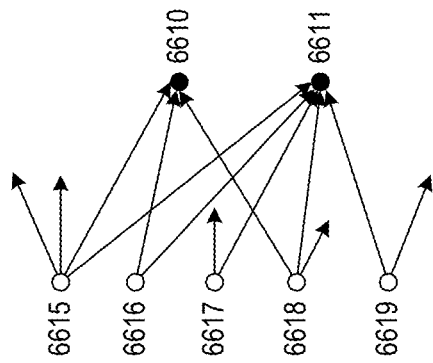
FIG. 66A shows an example of a bipartite graph having network devices that have many shared users and tend to have close similarity scores.

FIGS. 66A through 66D illustrates examples of bipartite graphs that the machine learning model 6300 uses to determine whether network devices are similar in terms of interacting users. In FIG. 66A, the network devices 6610 and 6611 have many shared users (6615, 6616, 6618 and 6619) and therefore tend to have similarity scores close to each other.

In FIG. 66B, the network devices 6620 and 6621 have multiple shared exclusive users (6628 and 6629). Exclusive users are users that interact with the network devices 6620 and 6621 only. The network devices 6620 and 6621 thus tend to have similarity scores close to each other. In FIG. 66C, the network devices 6630 and 6631 only have a single shared user 6637. The network devices 6630 and 6631 thus tend to have similarity scores that have a large difference.

In FIG. 66D, the network devices 6641, 6642 and 6643 are associated with similar groups of users, including users 6651, 6652, 6653 and 6654. The network devices 6644, 6645 and 6646 are associated with similar groups of users, including 6654, 6655 and 6656. If the user 6654 is removed from the bipartite group, the devices can be separated into two groups N1 (6641, 6642 and 6643) and N2 (6644, 6645 and 6646) without interactions between the two groups, based on the user interactions.

User 6654 is the only user that has connected to devices of both groups N1 and N2. The group N1 of devices 6641, 6642 and 6643 have similarity scores close to each other.

The group N2 of devices 6644, 6645 and 6646 have similarity scores close to each other. Assuming that user 6654 typically interacts with device 6645 from group N2, the access profile of user 6654 includes the group N2 of devices 6644, 6645 and 6646. The interaction between the user 6654 and device 6642 from group N1 then triggers an out-of-group access anomaly, because the similarity score of device 6642 is significantly different from the similarity scores of devices 6644, 6645 and 6646 within the access profile of user 6654.

Figure 67:
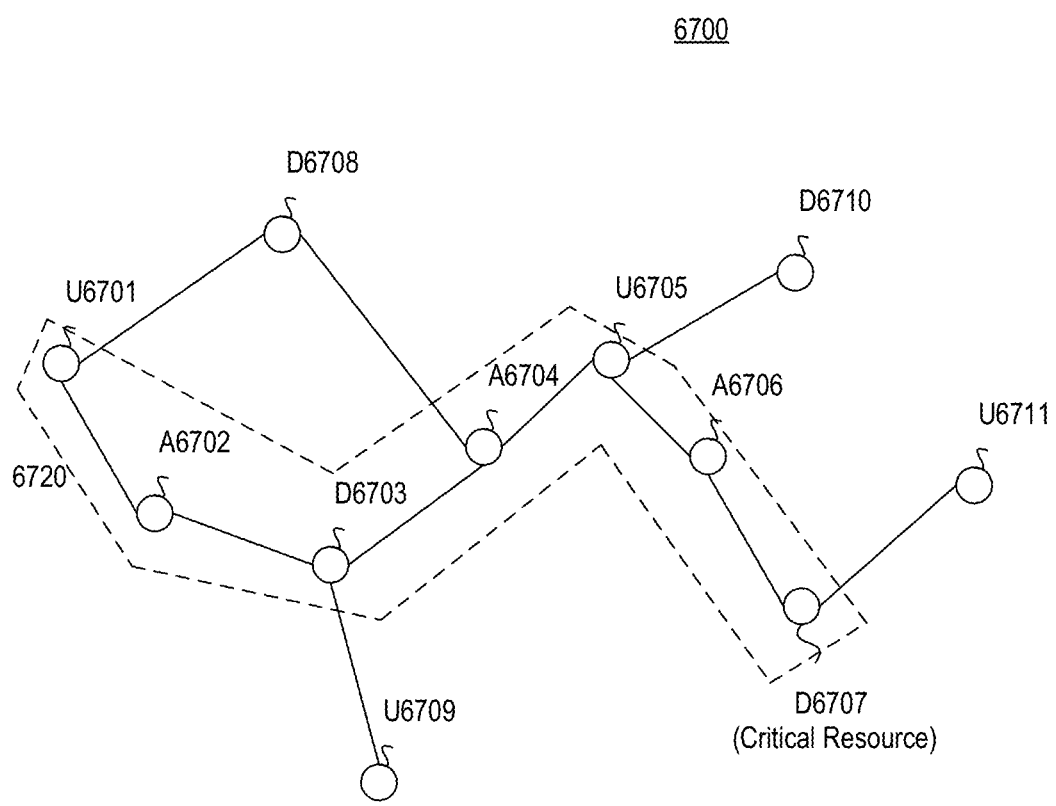
FIG. 67 illustrates an example of a graph data structure for detecting security threats based on a detected out-of-profile anomaly.

The detected out-of-group anomaly is an indication of a suspicious lateral movement of a particular user in the network. Based on the anomaly, the machine learning model 6300 can further decide whether the anomaly 6370 leads to a security threat 6380, as illustrated in FIG. 63. FIG. 67 illustrates an example of a data structure for detecting security threats based on the detected out-of-profile anomaly.

The machine learning module 6300 retrieves a graph data structure 6700 that records anomalies in the network and the relationships between the anomalies and the users and network devices. The graph data structure includes nodes interconnected by edges. The nodes represent anomalies and entities such as users and network devices; while the edges represent relationships between the entities and anomalies.

For example, FIG. 67 shows that the retrieved graph data structure 6700 includes user nodes U6701, U6705, U6709 and U6711 and device nodes D6703, D6707, D6708 and D6710. The retrieved graph data structure 6700 further includes anomaly nodes A6702, A6704 and A6706. Among the anomaly nodes, the anomaly node A6702 represent an out-of-profile anomaly. In other words, the user represented by user node U6701 has accessed the device represented by device node D6703 with which the user does not usually interact.

The retrieved graph data structure 6700 is different from the login graph that the machine learning module 6300 uses to detect the out-of-profile anomaly. The login graph only records information that relates to the login events of the users. In contrast, the retrieved graph data structure 6700 can include relationships beyond the login events and can include anomalies of other types besides out-of-profile anomalies. For example, the retrieved graph data structure 6700 includes anomaly node A6706 representing a blacklist anomaly. The blacklist anomaly indicates that the user U6705 has accessed the network device D6707 from a blacklisted IP address.

The retrieved graph data structure 6700 further includes anomaly node A6704 representing a beaconing anomaly. The beaconing anomaly indicates that the device represented by device node D6703 sends suspicious beaconing messages periodically to a user device associated with the user represented by user node U6705.

The machine learning model 6300 identifies, in the retrieved graph data structure 6700, a relationship path 6720 that suggests a security threat. The relationship path 6720 starts with user node U6701 and anomaly node A6702 that represents the out-of-profile anomaly. The relationship path 6720 ends with the anomaly node A6706 and device node D6707 that represents a device designated as a critical resource. For example, the device designated as a critical resource can be, e.g., a domain controller server that responds to security authentication requests within the computer network.

The relationship path 6720 includes user nodes and device nodes interlinked by anomaly nodes A6702, A6704 and A6706. In other words, the relationship path 6720 starts from user U6701 through anomaly nodes A6702, A6704 and A6706 to the device D6707 designated as a critical resource of the computer network.

The machine learning model 6300 identifies a security threat based on the relationship path 6720. The security threat is represented by the anomaly nodes A6702, A6704 and A6706 along the relationship path 6720. These anomaly nodes suggest that the security threat is imposed by a series of anomalies. For example, in one embodiment, the security threat can indicate that an unauthorized user (invader) has misappropriated a credential of the particular legitimate user to enter the network through device D6703 and breached one or more network devices (D6703, D6707) along the relationship path to access the critical resource on device D6707.

When a security threat has been detected, the security platform then reports the threat to an administrator of the network (e.g., via the GUI features described above) and/or writes the security threat into a threat log for later review by an administrator.

XIV. Malware Detection

Techniques will now be disclosed for detecting anomalies indicative of the presence of malware within a computer network based on an analysis of network traffic, including communications between entities (both internal and external) associated with the network. Malware is generally understood to be unauthorized software operating on or associated with entities (e.g., devices) within a computer network. In some embodiments, the detection of malware based on analysis of network traffic rests on the assumption that malware in certain instances leaves an observable footprint in the traffic. For example, malware operating as part of a malicious command and control infrastructure may periodically transmit a beacon signal to another entity seeking command instructions. As described in other sections of this specification, the presence of malware may be inferred based on detecting any of a set anomalous activity, such as communications to machine-generated domains, machine-generated communications (e.g., beacons), and communications to blacklisted entities (e.g., users, domains, addresses, etc.).

While any individual inference may have value, reducing false positives in identifying security threats to the network is desirable. To that end, embodiments are described here that analyze a range of anomalous behavior to detect an anomaly indicative of the presence of malware. In some embodiments, anomaly detection occurs in real-time or near real-time as the event data is received, instead of relying on historical log data to perform batch processing. An example processing engine suitable for high rate data processing in real-time is Apache Storm. In other embodiments the processing engine could be implemented by using Apache Spark Streaming.

Figure 68:
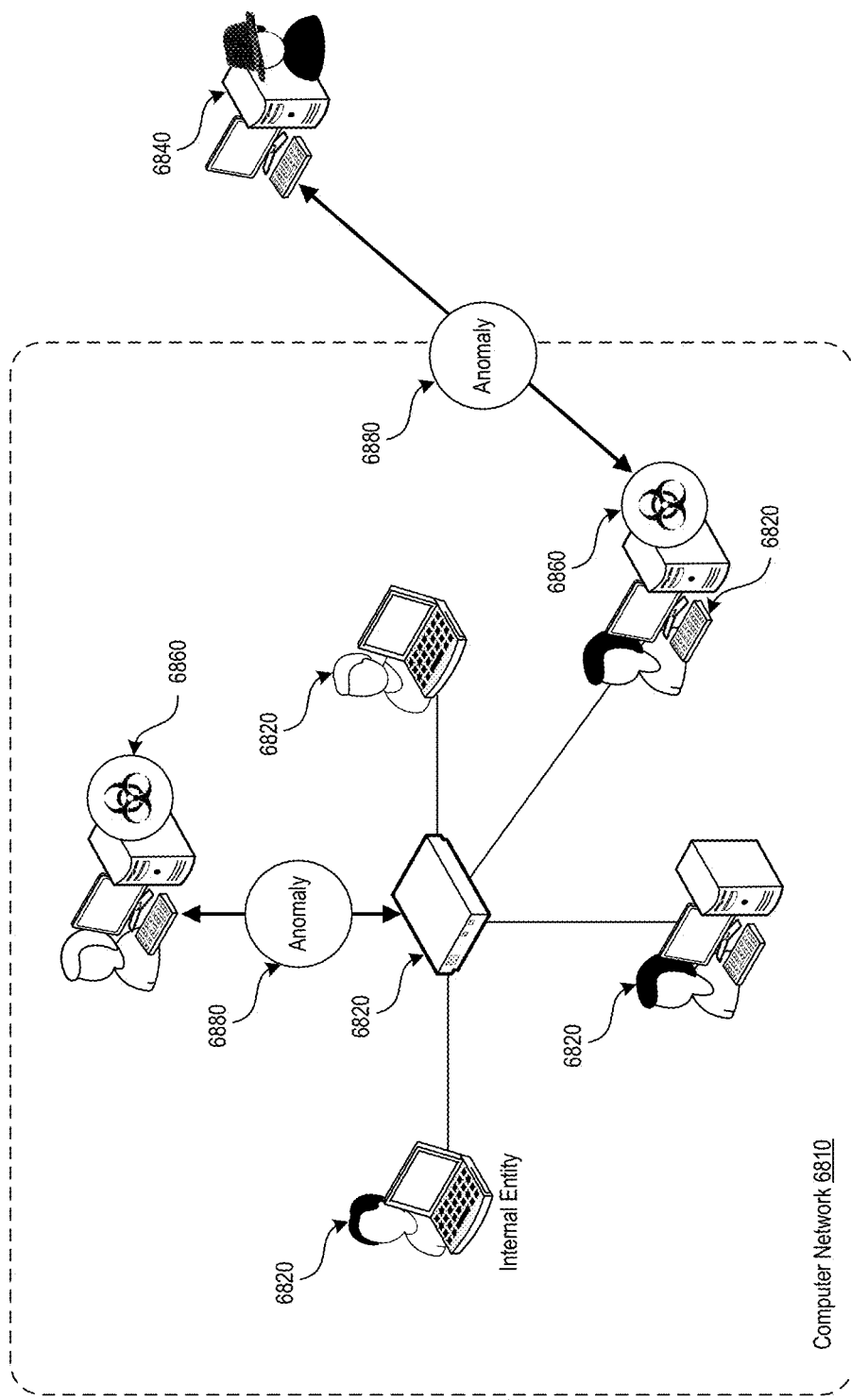
FIG. 68 is a conceptual diagram of an example network traffic scenario for detecting anomalies indicative of malware on a computer network.

FIG. 68 is a high-level conceptual diagram of an example network traffic scenario that illustrates the above principle. FIG. 68 shows a computer network 6810 enclosed by the dotted line. Within computer network 6810 are a number of associated internal entities 6820 including, for example users and devices. As used herein, an entity should be broadly understood to include any sort of element or component operating within or otherwise associated with a computer network. For example, entities include physical computing devices, virtual computing devices, users, software modules, accounts, identifiers, and addresses. The identification of a particular entity or set of entities associated with a particular set of event data can be resolved through a process described elsewhere in this specification.

As an illustrative example, a machine generated log entry associated with an event may contain information associating that event with one or more of an IP address, a unique identification (UID), uniform resource locator (URL), and user ID. In such an example each of these identifiers may be considered a discrete entity associated with the computer network or two or more identifiers maybe associated with the same entity. For example, a static IP address, MAC address, and UID may all be associated with a physical computing device entity. Similarly, multiple user account IDs may be associated with a single physical user (i.e., a person) of the computer network.

Operating outside of computer network 6810 is an external entity 6840 that may be associated with a malicious actor. Communications may occur between different internal entities 6820, and between internal 6820 and external entities 6840, as shown. In some embodiments, an analysis of these communications based on received event data, leads to the detection of anomalies 6880 indicating the presence of malware 6860 within the computer network 6810.

A. Malware Communications Detection—Process

Figure 69:
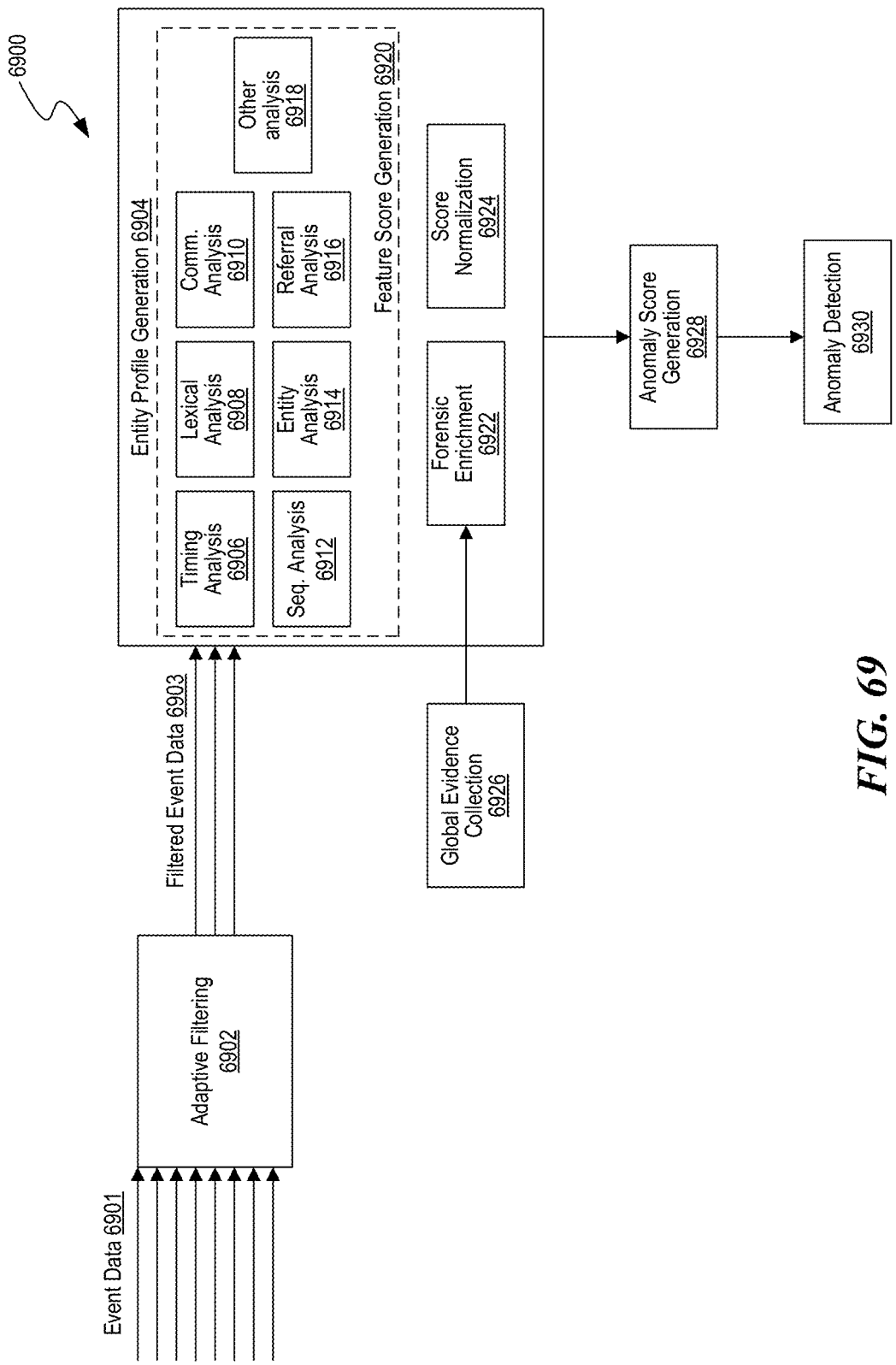
FIG. 69 is a flow diagram illustrating an example process for detecting an anomaly indicative of malware based on network traffic.

FIG. 69 is a diagram illustrating an example process 6900 for detecting an anomaly indicative of malware based on network traffic. The process 6900 begins with receiving event data 6901. Event data 6901 is generally understood to include any data related to activity on the computer network. Here, because network data traffic activity is a primary focus, the event data 6901 preferably includes timestamped machine data such as domain name system (DNS) generated log data, firewall generated log data, or proxy generated log data. In some embodiments, the event data 6901 is associated with a communication between an internal entity within a computer network and an external entity outside the computer network. In some embodiments, the event data 6901 is also associated with communications between internal entities within a computer network. As described in more detail elsewhere in this specification, in some embodiments, event data 6901 is received from a data intake and preparation stage, which may include an ETL pipeline.

In some embodiments, the process of receiving event data 6901 includes adaptively filtering the event data according to a dynamic whitelist at process 6902. This is in contrast with static filtering, for example according to a static whitelist, to filter out communications to entities known to be benign. Here, adaptive filtering can be applied to filter out event data associated with more common or more popular network traffic given a particular context. In some embodiments, popularity metrics are defined based on an analysis of network traffic across the entire network or across a particular subgroup within the network. For example, while domain xyz.com may not be known to be benign, an analysis of the network traffic can uncover that a high percentage of users on the network regularly connect to xyz.com. Accordingly, it can be inferred that xyz.com is benign and that it is not worth the processing effort to analyze the domain for malware associations. Note that this process of adaptively filtering the received event data is not necessary to the overall anomaly detection process, however it can streamline computational processing, which aids in detecting anomalies in real-time or near real-time. The filtering also helps to reduce the number of false positives.

Process 6900 continues with generating a plurality of feature scores by processing the filtered event data 6903 or unfiltered event data 6901 (collectively referred to herein as event data 6901) as shown at feature score generation 6920, and generating an entity profile associated with at an entity (internal or external) that includes a plurality of generated feature scores as shown at entity profile generation 6904. As shown in FIG. 69, feature score generation 6920 includes generation of a plurality of feature scores, each of the plurality of feature scores generated by a different one of various different analyses of the event data. For example, feature score generation can include timing analysis 6906, lexical analysis 6908, communications statistics 6910, sequencing analysis 6912, entity associations analysis 6914, referrals analysis 6916, and various other types of analysis 6918.

In an embodiment, one or more feature scores for a particular entity are generated based on each above-mentioned category of analysis. For example, timing analysis could yield two or more feature scores, including at least a feature score based on a periodicity of communications associated with a particular entity and a feature score based on variance in interval periods between communications associated with a particular entity. Feature scores are described in more detail below, however, note that the listed categories of analysis are only examples, and no particular category is necessary. An embodiment may include more or fewer categories resulting in more or fewer feature scores.

As shown in FIG. 69, in some embodiments, entity profile generation 6904 includes a process of forensic data enrichment 6922 through global evidence collection 6926. For example, data regarding a particular entity may be gathered from sources internal (e.g., a system blacklist) or external (e.g., a WHOIS lookup) to the computer network. Additional data gathered through evidenced collection 6926 and applied via enrichment 6922 may impact feature score generation and anomaly detection based on the underlying feature scores. As with anomaly scores, a feature score can represent a quantified evaluation of the risk associated with a particular entity based on a particular analysis. Accordingly, the models used to generate feature scores may depend on additional available (e.g., through enrichment 6922) data associated with an entity. For example, processing equivalent sets of event data 6901 using the same analysis (e.g., periodicity of communications) may yield different feature scores for mission critical systems than for non-critical systems. As with the adaptive filtering 6902, Global evidence collection 6926 and forensic enrichment 6922 are not required.

As shown in FIG. 69, in some embodiments, entity profile generation 6904 includes a process for score normalization 6924. Score normalization 6924 involves normalizing the plurality of feature scores for later processing at the anomaly score generation stage, as described elsewhere herein.

Process 6900 continues with generating an anomaly score based on the entity profile including the plurality of feature scores included in the entity profile, for example as shown at anomaly score generation 6928. Generating an anomaly score is described in more detail elsewhere herein.

Process 6900 concludes with detecting an anomaly if the generated anomaly score satisfies a specified criterion, for example as shown at anomaly detection 6930. Here the detected anomaly is indicative of malware within a computer network. Anomaly detection is also described in more detail elsewhere herein.

B. Generating Feature Scores and the Entity Profile

As previously described, each feature score is generated based on one various different analyses of the event data. Feature scores are calculated on a per-entity basis and can be understood broadly as a quantified evaluation of a level of risk associated with the entity or a likelihood that the entity is associated with malware. In some embodiments feature scores are calculated or assigned by processing the event data through a model to generate a numerical value. In some embodiments the model includes model processing logic defining a process for assigning a feature score based on processing the event data X102 and a model state defining a set of parameters for applying the model processing logic. For example, in some embodiments, the models used to generate feature scores are the same as the anomaly models used to generate anomaly scores. In some embodiments, the models used to generate feature scores are machine-learning (both supervised and unsupervised) models. For example, a supervised machine learning model may use training examples developed by network security experts to more effectively generate feature scores based on received data. In some embodiments, each feature score is a numerical value in a range. For example, processing event data according to a feature score model may yield a value between 0 and 10 with 0 being the least anomalous (or risky) and 10 being the most anomalous (or risky).

As mentioned, feature scores are calculated on a per-entity basis. Therefore, a plurality of feature scores is generated for a particular entity. The combined set of feature values associated with particular entity make up the entity profile. For example, the table below lists feature scores $f_1$ though $f_n$ for an example external domain, xyz.com.

|  | Timing analysis | Comms. analysis | Lexical analysis | Other analysis |
| --- | --- | --- | --- | --- |
| Entity xyz.com | $f_1$ 5.2 | $f_2$ 4.0 | $f_3$ 3.2 | $f_n$ 7.8 |

The above example is simplified for clarity. In use, an entity profile for a particular entity might include tens or even hundreds of feature scores. In some embodiments, the feature scores associated with a particular entity are represented as a feature vector, $f=\{f_1\ f_2\ f_3\ \ldots\ f_n\}$. For example, the entity profile for domain xyz.com can be represented as feature vector, $f=\{5.2\ 4.0\ 3.2\ \ldots\ 7.8\}$.

As previously discussed, the different analyses used to generate the feature scores can include, for example, lexical analysis (e.g., sequencing of characters in a domain name associated with an entity, analysis of the timing of communications associated with an entity (e.g., periodicity of communications and/or variance of interval times between communications), analysis of the sequencing of communications associated with the entity (e.g., to detect exploit chains, analysis of data transmission statistics associated with the entity (e.g., ratio of bytes in to bytes out), and analysis of referral strings associated with the entity.

In some embodiments, generating the feature scores includes analyzing a sequencing of characters in an entity identifier (e.g., a domain name) associated with an entity (internal or external) and assigning a feature score based on the analysis, wherein the feature score is indicative of the level of confidence that the entity identifier is machine-generated. In other words, applying a lexical analysis to a character-based entity identifier to assign a feature score indicative of whether the identifier is machine generated or not. This analysis and feature scoring assumes, based on industry expertise, that a machine-generated identifier is more likely to be associated with malicious activity (e.g., malware) given the context. For example, malware running within a computer network may periodically transmit a beacon message ("beacon") to an external entity (e.g., a domain) seeking command and control instructions. As network security has advanced so has malware. It is no longer effective for malware to transmit beacons to a static domain because that domain can be quickly identified and blacklisted by existing network security solutions. Instead, the malware may be configured to communicate with external entities through continuously changing machine-generated domain names.

One characteristic that can reveal the machine-generated nature of a character-based identifier is a high degree of entropy or randomness in the sequencing of characters. One way to analyze the entropy or randomness in the characters is through an n-gram analysis. In some embodiments, a machine learning model for n-gram analysis can be trained using a large body of lexical information for domain names in any number of languages. Based on this training, a list of n-gram probabilities are developed. In other words, a model based on n-gram analysis can provide the chance of observing a specific sequence of characters. FIG. 70 shows two tables 7002 and 7004 of domain names with associated probabilities based on n-gram analysis. As shown in FIG. 70, table 7002 includes domain names with lower probabilities relative to the domain names of table 7004. In other words, the probabilities sequence of characters in the domain names in table 7002 occurring in natural human language are lower relative to the probabilities of the sequencing of characters in the domain names in table 7004. This clear to a human observer just by looking at the domain names, but the n-gram probabilities provide important insight to a computer-based model tasked with feature scoring.

In some embodiments, generating the plurality of feature scores includes analyzing the timing of communications associated with the entity (internal or external) over a time period and assigning a feature score based on the analysis, wherein the feature score is indicative of a level of confidence that the communications are machine-generated. This is similar to the ideas introduced in the discussion of beacon detection in this Specification. Generally, the timing of communications (e.g., periodicity and/or variance of interval times) can provide insight into the nature of the communications. For example, based on industry expertise, communications with high periodicity are less likely to be human generated and more likely to be machine generated, for example a beacon communication.

In some embodiments, generating the plurality of feature scores includes analyzing a sequencing of communications associated with an entity (internal or external) over a time period and assigning a feature score based on the analysis, wherein the feature score is indicative of a level of confidence that the communications are associated with an exploit chain. An Exploit is a piece of software, a chunk of data, or a sequence of commands that takes advantage of a bug or vulnerability in order to cause unintended or unanticipated behavior to occur on computer software, hardware, or something electronic (usually computerized). Such behavior frequently includes things like gaining control of a computer system, allowing privilege escalation, or a denial-of-service attack. An exploit chain typically involves patterns in the sequencing of communications.

In some embodiments, generating the plurality of feature scores includes analyzing the data transmission statistics associated with an entity (internal or external) over a time period and assigning a feature score based on the analysis, wherein the feature score is indicative of a level of confidence that the external entity is associated with a command and control infrastructure external to the computer network. For example, the ratio of bytes in to bytes out in a particular communication or set of communications may provide insight into the purpose of the communication. A higher volume of data going out to an external entity than is coming in may indicate the exfiltration data by malware within the network in response to commands from the external entity.

C. Generating an Anomaly Score

The anomaly score associated with a particular entity is based on the entity profile (including the underlying feature scores) of the particular entity. The anomaly score may be conceptualized as combination of all of the feature scores for a particular entity.

As has been described in this Specification, in some cases anomaly scores calculated or assigned by processing event data through an anomaly model to generate a numerical value. Here, the anomaly score is calculated or assigned by processing the plurality of feature scores through an anomaly model. In some embodiments the anomaly model includes model processing logic defining a process for assigning a feature score based on the plurality of feature scores and a model state defining a set of parameters for applying the model processing logic. In some embodiments, the models used to generate the anomaly scores are machine-learning (both supervised and unsupervised) models. For example, a supervised machine learning model may use training examples developed by network security experts to more effectively generate an anomaly score based on the plurality of feature scores. In some embodiments, generating the anomaly score may include an ensemble learning process in which multiple different types of machine learning models are applied to process the plurality of feature scores. In some embodiments, the anomaly score is a numerical value in a set range. For example, processing the plurality of feature scores according to an anomaly model may yield a value between 0 and 10 with 0 being the least anomalous (or risky) and 10 being the most anomalous (or risky).

In some embodiments, generating the anomaly score may simply involve a calculating a weighted linear combination of feature scores. Recall that an entity profile including a plurality of feature scores may be represented as a feature vector, $f=\{f_1\ f_2\ f_3\ \ldots\ f_n\}$. In such an embodiment, the anomaly score may simply be represented as:

$$\text{anomaly score} = \sum_{i=1}^{n} w_i f_i$$

Wherein $w_i$ is a weighting factor applied to each feature score $f_i$ and wherein the anomaly score is simply the summation of each of the plurality of feature scores with the weighting factor.

The weighting factor, $w_i$ applied to any given feature score in the anomaly scoring process may depend on a number of factors, including the type of entity to which the feature score is applied, the volume of data used to calculate the feature score, user configuration preferences, or the type of analysis used to generate the feature score.

As mentioned, in other embodiments, the plurality of feature scores may be processed according to one or more machine learning models to generate an anomaly score indicative of the probability or likelihood that malware is present in the computer network given the set of feature scores for a particular entity. Some machine-learning models appropriate for this application include naïve Bayes and logistic regression.

In some embodiments ensemble learning techniques can be applied to process the plurality of feature scores according to a plurality of models (including machine-learning models) to achieve better predictive performance in the anomaly scoring and reduce false positives. An example model suitable for ensemble learning is Random Forest. In such an embodiment, the process may involve, processing an entity profile according to a plurality of machine-learning models, assigning a plurality of intermediate anomaly scores, each of the plurality of intermediate anomaly scores based on processing of the entity profile according to one of the plurality of machine-learning models, processing the plurality of intermediate anomaly scores according to an ensemble-learning model, and assigning the anomaly score based on processing the plurality of intermediate anomaly scores.

Machine learning models are typically more effective if provided large volumes of data to process and learn from. Accordingly, in some embodiments, the type of model applied to generate an anomaly score depends on the volume of data used to generate the feature scores. For example, some events are associated with no more than a single log line of event data, while others are associated with hundreds of lines of log lines of event data. Accordingly, in some embodiments, a process for generating an anomaly score involves first determining a volume of event data used to generate the entity profile or any one of the plurality of feature scores. Next the entity profile is processed according to one or more of a plurality of anomaly models depending on the determined volume of event data. For example, in an embodiment, the entity profile is processed through a first anomaly model (e.g., an ensemble learning model) if the volume of event data is at or above a threshold volume or the entity profile is processed through a second anomaly model (e.g., weighted linear combination) if the volume of event data is below the threshold volume. An anomaly score is then assigned based on the processing. The thresholds described above can be static or dynamic. A dynamic threshold may adaptively change based on a number of factors, such as the overall volume of event data being generated on the computer network, the type of entity to which the anomaly score is applied, user configuration preferences, and the types of analysis used to generate the feature scores. In some embodiments, a plurality of threshold values establish a number of regimes under which the entity profile is processed. For example, the detected volume of data may fall under one of three regimes, low volume, medium volume, and high volume. Depending on the regime, the profile entity is processed according to a different anomaly model.

The entity profile can, in some cases, include additional data beyond the plurality of feature scores. For example, in some embodiments, entity profile generation includes a process of forensic data enrichment through global evidence collection. In such a process, data regarding a particular entity is gathered from sources internal (e.g., a system blacklist) or external (e.g., a WHOIS lookup) to the computer network. In some embodiments, this data enrichment process aids the process of generating an anomaly score to reduce false positives. The parameters used to apply the processing logic can depend on information about the entity and/or environment not otherwise indicated in the plurality of feature scores. For example, a mission critical computing system associated with a given set of feature scores is viewed differently than a non-critical computing system associated with the exact same set of feature scores. Similarly, external data can be applied validate an anomaly detection. Here the process of generating the anomaly score includes comparing an entity identifier associated with an entity (internal or external) with entries in an external data source external to the computer network (e.g., a WHOIS lookup) and assigning an anomaly score indicating a confidence level that the entity identifier matches a particular entry in the external data source based on the comparing.

D. Anomaly Detection and Notification

Once the anomaly score is generated, an anomaly indicating malware in the computer network is detected if the anomaly score satisfies a specified criterion. Consider the previously discussed example range of values from 0 to 10 for anomaly scores. In this example, the specified criterion may be set such that an anomaly is detected if the anomaly score is 6 or above. The specified criterion need not be static, however. In some embodiments, the criterion is dynamic and changes based on situational factors. Situational factors may include volume of event data, presence or absence of preconditional events, user configurations, and volume of event data.

If an anomaly indicating malware in the computer network is detected, and indication of that anomaly can be outputted for display to a user via a user interface of a computing device. FIG. 71 shows an example incident response output 7100 based on entity profiles configured for display to a user. The incident response output 7100 is represented in simplified form for clarity as a table including a plurality of entity identifiers 7102 with associated feature scores 7104a-7104d and a recommended response 7106 based on the plurality of feature scores. The particular arrangement of information should not be construed as limiting. In this example, the entity identifier is a domain name, however, the entity identifier associated with the entity can be any identifier, such as a domain name, a uniform resource locater (URL), uniform resource identifier (URI), an Internet Protocol (IP) address, a unique identifier (UID), a device identification, or a user identification. As shown in FIG. 71, the plurality of feature scores 7104a-7104d are displayed as classifications, i.e. no risk, moderate risk, and high risk, instead of numerical values. These classifications can be based on the underlying numerical feature scores. In some embodiments, the numerical feature score values (e.g., 0 to 10) are displayed to the user via the incident response output. The analyst recommendation 7106 provides information guiding the user to take action based on the raised anomaly associated with entity 7102. For example, the domain "www.evil.com" has a communication feature score indicative of a high risk to network security due to ongoing unblocked communications. The recommendation 7106, accordingly lists this as a critical priority due to the ongoing and unblocked nature of the communications. In some embodiments, the analyst recommendation 7106 is provided by a human security analyst based on an assessment of the feature scores associated with the entity. In some embodiments, the analyst recommendation is automatically generated by the system based on the feature scores and or the anomaly score, for example through the use of established network security rules.

Detected anomalies indicative of malware on the computer network can be stored in an anomaly graph data structure that includes a plurality of nodes representing entities associated with the computer network, and a plurality of edges representing an anomaly linking two of the plurality of nodes. Further, the anomaly data can be incorporated into a system wide network security graph. A network security graph includes a plurality of nodes representing entities associated with the computer network and a plurality of edges, each of the plurality of edges linking two of the plurality of nodes and representing an association between the entities represented by the nodes. In such a graph the detected anomalies can be incorporated as a node linked to one or more entities by an edge.

XV. Beaconing Detection

Malware is malicious software (e.g., virus, Trojan horse, or the like) installed on a computer or other device without the knowledge or permission of the owner of the device for an improper purpose, such as to steal private data or as a prank.

Various techniques have used to detect and defend malware. Many of these techniques monitor the Internet Protocol (IP) pairs in outgoing traffic from a computer to determine whether the outgoing traffic is indicative of malware. Each IP pair includes an IP address of the computer from which the traffic originates and IP address of the traffic's destination. The techniques can detect malwares by examining whether any of the IP addresses are blacklisted, occurring frequently, etc. These techniques have drawbacks, however.

For example, monitoring the IP pairs of outgoing traffic can be resource intensive, especially if the outgoing traffic of the computer is voluminous. Further, the problem is only compounded as the number of computers in a network, e.g., computers in an organization's network, increases. Monitoring the computers in real-time can also be challenging considering the number of IP pairs can be in significantly large numbers.

Malware programs tend to communicate with their command and control (C&C) entity (e.g., a website) to receive new instructions and they tend to contact the C&C entity periodically. Typically, machine-generated traffic, such as traffic generated by malware, tends to have a distinct pattern from user-generated traffic, such as traffic generated from a user browsing a webpage or accessing other resources on the Internet. Most techniques fail to recognize the distinction between the machine-generated traffic and the user-generated traffic that can help in detecting malware efficiently.

Described herein is a technique for detecting machine-generated traffic in outgoing traffic of a computer device ("device") and determining whether the machine-generated traffic represents an anomaly. The outgoing traffic can include user-generated traffic, which can include connection requests generated from a user associated with the device, such as when the user accesses a website, checks email and downloads applications. The outgoing traffic can also include legitimate (not malware related) machine-generated traffic, which is generated by the device or an application executing on the device without intervention from the user, such as updates to applications, messages for synchronizing time of the device, device-to-device communication within another device in a distributed computing system of which the device is a part, a heartbeat signal generated by an application on the device, which can be a signal that is generated at regular intervals to indicate that the application is working as expected. The machine-generated traffic can also include traffic generated by some applications, such as a malware, that can be malicious in nature. Some of the machine-generated traffic can be in the form of a beacon, which is a signal that is transmitted periodically or in a manner that satisfies a particular criterion for periodicity/regularity.

The malware beacon detection technique introduced here distinguishes between user-generated traffic and machine-generated traffic and, if the traffic is machine-generated, determine whether the machine-generated traffic is benign or suspicious (e.g., anomalous). The technique can use various methods to filter out benign machine-generated traffic. For example, the technique can use different heuristics and whitelists to determine whether the traffic is benign. The technique can further analyze the anomalies to determine whether they are a threat and raise an alarm if they are one.

The technique determines if the outgoing traffic is user-generated traffic based on a number of parameters, such as a number of connection requests originating from the device in a predefined period, periodicity of the connections, number of web objects requested by the device, number of destinations contacted by the device, number of times a destination is contacted and number of ports of the destinations contacted.

The malware beacon detection technique introduced here can operate in real-time, e.g., as and when the traffic is generated from the computer device. The technique can perform the above described method using real-time infrastructure, e.g., real-time analyzer 210 of FIG. 2 and/or analysis module 330 of FIG. 3 described above. Additionally, or alternatively, the technique can operate in a batch processing mode by using the batch processing infrastructure, e.g., batch analyzer 240 and/or batch analysis module 382.

Further, the above described method can be performed by a model, such as a machine learning model. The model can output the result of the detection as a yes or no (or the equivalent), or as a score based on which the machine-generated traffic can be determined as an anomalous or not. The model can be implemented in real-time infrastructure and/or batch processing infrastructure.

Figure 72:
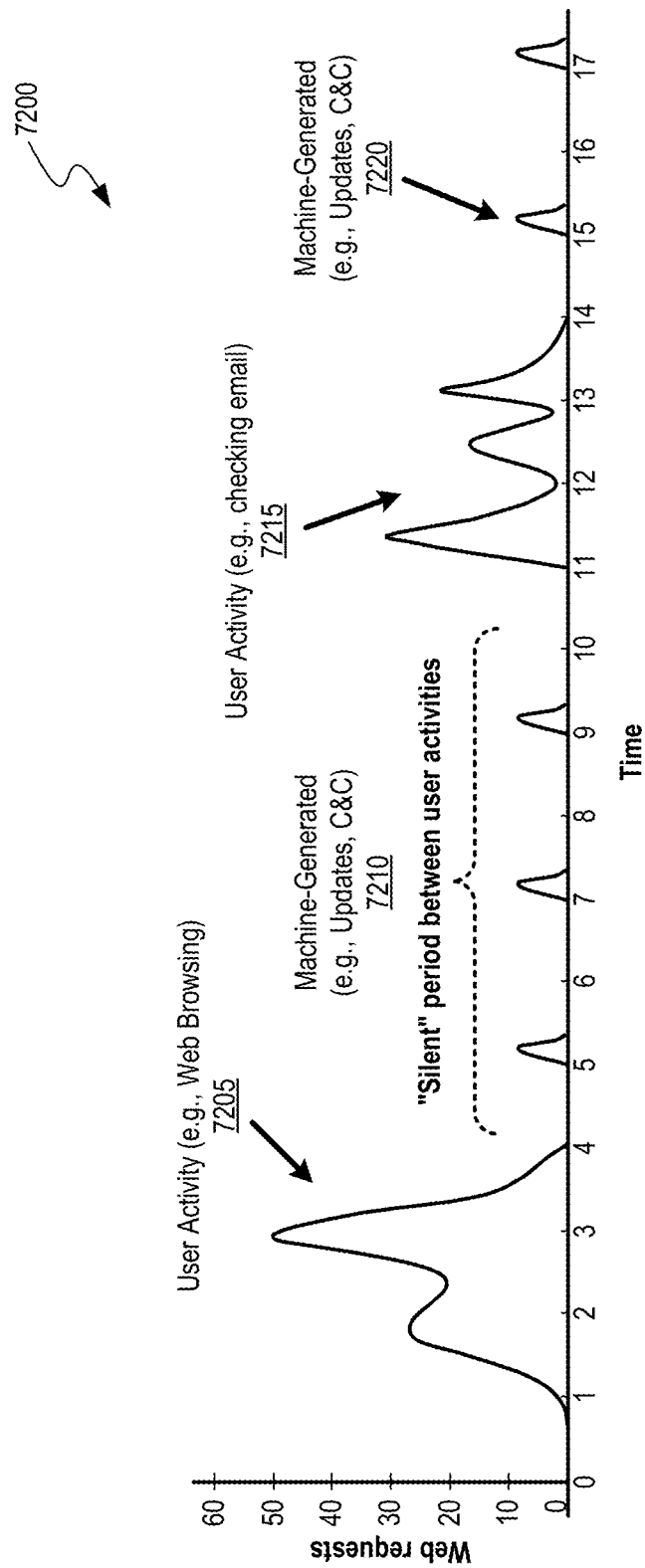
FIG. 72 shows an example graph of outgoing traffic from a network device.

Turning now to the figures, FIG. 72 shows an example graph 7200 of outgoing traffic of a device. The example graph 7200 depicts traffic generated from a device over a period, e.g., seventeen seconds. The example graph 7200 depicts the traffic as a number of connection requests originating from the device. The outgoing traffic can include two categories of traffic: user-generated traffic and machine-generated traffic. For example, the first outgoing traffic 7205 and the second outgoing traffic 7215 which represent traffic generated from user activity, e.g., from a web browsing activity, are categorized as user-generated traffic. On the other hand, the third outgoing traffic 7210 and the fourth outgoing traffic 7220, which represent traffic generated due to various machine-related activities that are performed without the intervention of a user of the device, are categorized as machine-generated traffic. Examples of such machine-generated traffic can include a beacon to an external server, which determines whether there is any update available for an application installed at the device; a message from the device to a server for synchronizing time of the device; or malware that is communicating with a C&C entity.

In the example graph 7200, when the user performs an activity, e.g., browses a webpage, the user generates a large volume of connection requests. When the user does not interact with the computer, there can be a silent period, e.g., a period with minimal activity or no activity. The technique can detect these silent periods and analyze the traffic generated during that time. For example, if malware contacts its C&C entity during the silent periods, the technique can detect such machine-generated traffic as anomalous.

In the first outgoing traffic 7205, which can represent traffic corresponding to a user accessing a webpage, a significantly high number of connection requests, e.g., reaching almost fifty, have been generated within a span of four seconds. A website can host content stored at different locations, e.g., at different servers. For example, a webpage of the website can host a number of images, advertisements, etc. that are stored at different servers. When a user accesses the webpage, the device can generate a number of connection requests that are sent to different servers for obtaining different portions of the webpage, e.g., images, cascading stylesheets (CSS). As the content of webpage is retrieved from their respective locations, the traffic decreases and the number of connections decrease to zero. That is, the number of connections increases and/or decreases rapidly.

In the second outgoing traffic 7210, which represents machine-generated traffic, the number of requests are comparatively low, e.g., do not exceed ten at any instance. That is, for a predefined period, the number of requests is typically lower than the number of requests compared to user-generated traffic. Also, the connection requests in the second outgoing traffic 7210 is more periodic than the connection requests in the first outgoing traffic 7205. For example, the connection requests appear every two seconds in the second outgoing traffic 7210.

From the example graph 7200, it can be observed that a user-generated activity can include a significantly higher number of connection requests than machine-generated traffic for a predefined period. It can also be observed that the connection requests in the user-generated traffic increase and/or decrease at a rate higher than a specified threshold, i.e., connection requests are generated aperiodically or irregularly. In the machine-generated traffic, the connection requests are generated in a more periodic manner than the user-generated traffic.

FIG. 73 lists an example of a set of parameters that can be considered for distinguishing between machine-generated traffic and user-generated traffic, consistent with various embodiments. The technique can distinguish between machine-generated traffic and user-generated traffic as a function of one or more of the set of parameters 7300. The set of parameters 7300 can include a number of connection requests generated at a device in a predefined period, periodicity of the connection requests, e.g., a period or frequency between the connections, number of different destinations contacted, e.g., a diversity of the Internet Protocol (IP) addresses, a number of web objects downloaded to the device, a number of ports at which the destinations are contacted and a Uniform Resource Identifier (URI) of the destinations. Some of the set of parameters 7300 can be part of the outgoing traffic data and therefore, can be readily available for use by the technique. However, some of the set of parameters 7300 are determined by the technique, e.g., based on the parameters available in the outgoing traffic data. Additional details with respect to distinguishing between user-generated traffic and machine-generated traffic are described at least with reference to FIGS. 74 and 75.

Figure 74:
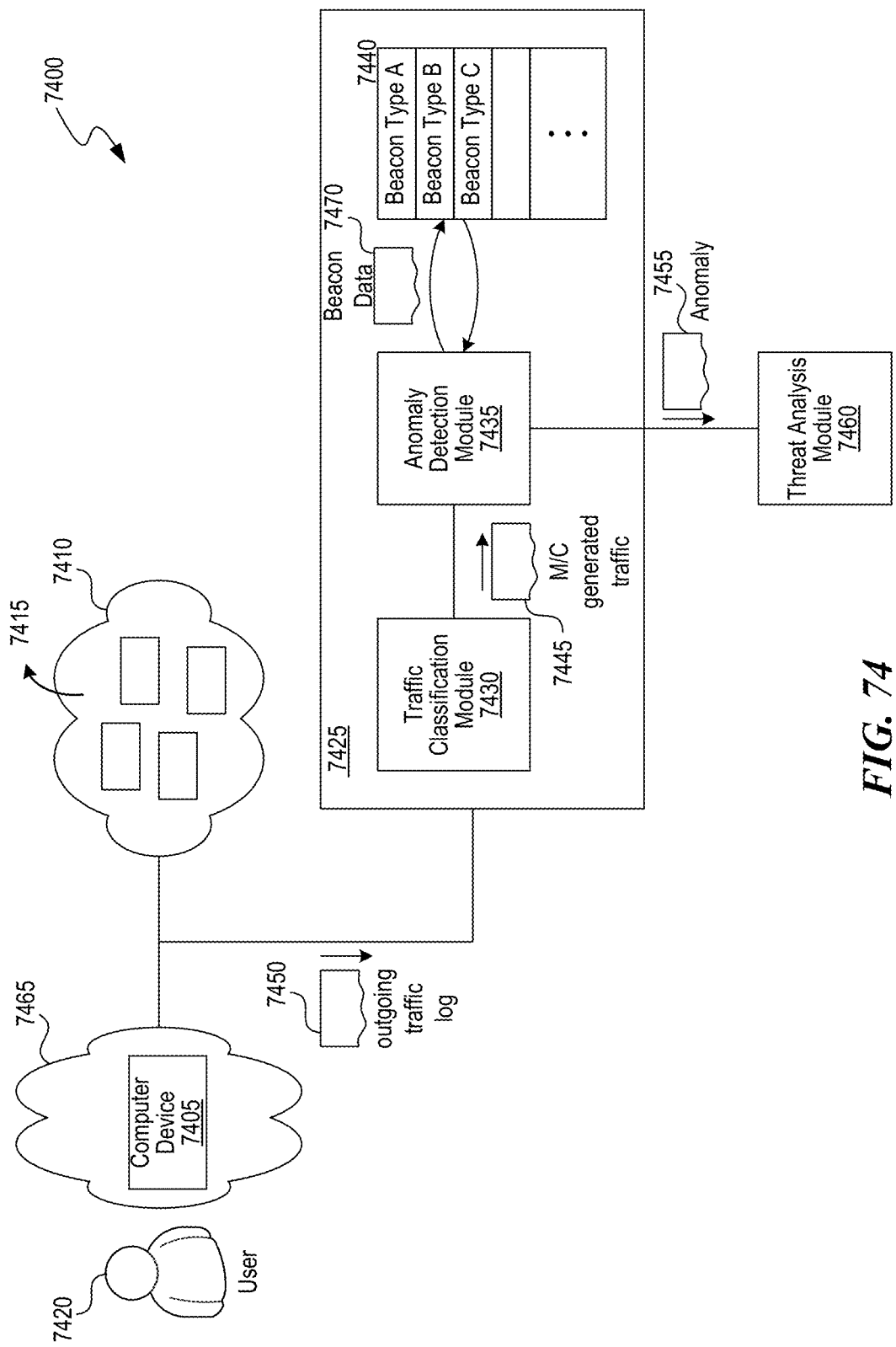
FIG. 74 is a block diagram of an environment in which a system for detecting anomalies in machine-generated traffic can be implemented.

FIG. 74 is a block diagram of an environment 7400 in which a system 7425 for detecting anomalies in machine-generated traffic can be implemented, consistent with various embodiments. In some embodiments, the system 7425 is implemented as part of the threat detection platform 300 of FIG. 3. The system 7425 can be implemented as part of the real-time infrastructure 330 or batch processing infrastructure 382. In some embodiments, the system 7425 is implemented as part of the real-time infrastructure 330. Further, in some embodiments, at least a portion of the system 7425 is implemented as part of a model in the real-time infrastructure 330 or batch processing infrastructure 382. The environment 7400 includes a computer device 7405 whose outgoing traffic is monitored for detection of anomalies and/or threats. The device 7405 can be part of a distributed computing system having a number of devices. For example, the device 7405 can be one of many devices in a computer network 7465 of an organization. The network 7465 can be a local area network (LAN), a wide area network (WAN), etc.

The outgoing traffic from device 7405 can include outgoing traffic that is internal to the network 7465 ("internal traffic"), e.g., communications with devices in the network 7465, and outgoing traffic that is external to the network 7465 ("external traffic"), e.g., communications with servers 7415 in the network 7410 such as Internet. The network 7410 is external to the network 7465. The system 7425 monitors the outgoing traffic of the device 7405, e.g., using outgoing traffic log 7450, and detects any existence of anomalies and/or threats.

In some embodiments, the system 7425 is configured to monitor a portion of the outgoing traffic from the device 7405, e.g., external traffic. The outgoing traffic log 7450 can be obtained from a proxy, gateway or a firewall of the network 7465 in which case the outgoing traffic log 7450 may not include internal traffic information. However, the monitoring may not be restricted to external traffic and the system 7425 can be used to monitor both external and internal traffic.

The outgoing traffic can be any class of traffic, e.g., web traffic or IP traffic. The web traffic can include Hyper-Text Transfer Protocol (HTTP) message, which can be associated with parameters such as a destination IP address, a URI of the destination, a port number, a type of web request—GET or POST, etc. The IP traffic can be associated with parameters such as a destination IP address and a port number.

The outgoing traffic log 7450 can be processed by one or more components prior to being input to the system 7425. For example, after a data receiver 310 obtains information regarding the outgoing traffic of the device 7405 from one of the sources 302, the semantic processor 316 can process the outgoing traffic information to remove, add or modify at least some of the information and generate the outgoing traffic log 7450 in a condition that is suitable for further processing by the system 7425 efficiently. For example, the semantic processor 316 can remove internal traffic, e.g., data transfers that occur between two internal devices as part of file backup, which is less likely or unlikely to be an anomaly, from the outgoing traffic information.

The traffic classification module 7430 analyzes the outgoing traffic log 7450 and detects if the outgoing traffic is machine-generated traffic 7445. If the outgoing traffic is machine-generated traffic 7445, the traffic classification module 7430 passes the outgoing traffic to the anomaly detection module 7435, which determines if the machine-generated traffic 7445 is benign traffic or an anomaly 7455. If the machine-generated traffic 7445 is an anomaly 7455, the anomaly detection module 7435 passes the anomaly 7455 to a threat analysis module 7460. The threat analysis module 7460 determines if the anomaly 7455 is a threat and generates a notification, e.g., an alarm, if it is one.

Referring back to the detection of machine-generated traffic 7445, the traffic classification module 7430 analyzes the connection requests in the outgoing traffic log 7450 to form a group of connection requests and determines if the group is user-generated traffic or machine-generated traffic. In some embodiments, the group of connection requests is either machine-generated traffic or user-generated traffic and cannot be both. However, two different groups can be of different classes of traffic. The traffic classification module 7430 can form the group based on various criteria. The traffic classification module 7430 can form a group by grouping the connection requests in the outgoing traffic log 7450 that are closer to each other in time. For example, the traffic classification module 7430 groups the connection requests that are generated within "20" seconds from the time a first connection request of the outgoing traffic log 7450 is generated into the same group. In some embodiments, the outgoing traffic log 7450 is received in real-time and the traffic classification module 7430 can start forming the group as and when the first connection request is generated at the device 7405.

The traffic classification module 7450 determines whether the group of connection requests is user-generated traffic or machine-generated traffic. The user-generated traffic, as described above, can be a result of an activity performed by a user 7420 associated with the device 7405, e.g., accessing a webpage in the Internet using the device 7405. The machine-generated traffic, as described above, can be generated by the device 7405 or an application executing on the device 7405 without intervention from the user 7420, such as updates to applications, messages for synchronizing time of the device, a heartbeat signal from an application or beacons from a malware.

The traffic classification module 7450 determines whether the group of connection requests is user-generated traffic or machine-generated traffic based on a set of parameters, e.g., set of parameters 7300 of FIG. 73. For example, the traffic classification module 7450 determines whether the group is user-generated traffic or machine-generated traffic as a function of one or more of a number of different destination IP addresses in the group, that is, a number of destinations contacted by the device 7405; a number of web objects downloaded by the group; a number of destination ports in the group; or a periodicity of the connection requests in the group.

The traffic classification module 7430 determines whether a periodicity of the connections in the group satisfy a periodicity criterion. In some embodiments, the periodicity of the connection requests is determined as a function of the timing between the connection requests in the group. For example, the periodicity can be an average of the periods between each of the connection requests in the group. The traffic classification module 7430 determines that the group is likely to be machine-generated traffic if the periodicity of the connection requests satisfies a periodicity criterion, e.g., exceeds a specified threshold; otherwise determines the group as likely to be user-generated traffic.

As described above at least with reference to FIG. 72, a user activity such as accessing a webpage can generate a high number of requests to different destinations within a predefined period, download a significant number of web objects, e.g., images, cascading stylesheets (CSS), and/or contact different destinations at different ports.

In some embodiments, the traffic classification module 7450 determines that the group is likely to be user-generated traffic if a diversity of the destination IP addresses in the group (i.e., the number of destinations contacted) exceeds a specified threshold. In some embodiments, the traffic classification module 7450 determines that the group is likely to be user-generated traffic if the number of web objects downloaded exceeds a specified threshold. In some embodiments, the traffic classification module 7450 determines that the group is likely to be user-generated traffic if the number of ports in the group exceeds a specified threshold. The traffic classification module 7430 can be configured to consider one or more of the above parameters for determining whether the outgoing traffic is user-generated traffic. If the traffic classification module 7430 determines that the outgoing traffic is likely to be user-generated traffic, the group may not be analyzed further to detect an anomaly.

The system 7425 can check if the group includes connection requests to any whitelisted destinations. A whitelist can be a list of destinations that are considered to be safe to be accessed by the devices in the network 7465. A user such as an administrator of the network 7465 can generate the whitelist. The whitelist can also be created and/or modified automatically, e.g., by one or more models executing in the real-time infrastructure 330 or the batch processing infrastructure 382. If the group includes connections requests to the whitelisted destinations the group may not be analyzed any further for detecting an anomaly.

In some embodiments, the system 7425 determines if the group includes whitelisted destinations prior to determining whether the group is user-generated traffic so that if the group includes whitelisted destinations the system 7425 does not have to analyze the group any further, thereby saving computing resources. The analysis of whether the group includes whitelisted destinations can be performed by the traffic analysis module 7425 or other modules, e.g., semantic processor 316.

The anomaly detection module 7435 further analyzes the machine-generated traffic 7445 to determine whether it is likely to be an anomaly. As described above, some of the machine-generated traffic 7445 can be benign and some anomalous, e.g., malicious. The anomaly detection module 7435 analyzes the group further to determine if the machine-generated traffic 7445 includes benign traffic or anomalous traffic. The anomaly detection module 7435 extracts beacon data 7470 from the machine-generated traffic 7445. The beacon data 7470 can include parameters such as destination IP address(es) of the connection requests in the group, destination port(s), and if the connection request is a HTTP request, the beacon data 7470 can also include a type of the connection request, e.g., a GET or POST, and URI of the destination. The anomaly detection module 7435 compares the beacon data 7470 with any of the known group types (also referred to as "beacon types") that are identified as likely to be anomalous to determine whether the machine-generated traffic is anomalous. Additional details of determining whether the machine-generated traffic is anomalous are described at least with reference to FIG. 75.

The traffic classification module 7430 can determine that the group is likely to be machine-generated traffic 7445 if the group is not whitelisted, satisfies periodicity criterion and not user-generated traffic. Further, the machine-generated traffic that is not identified as benign traffic is recognized as anomalous.

Figure 75:
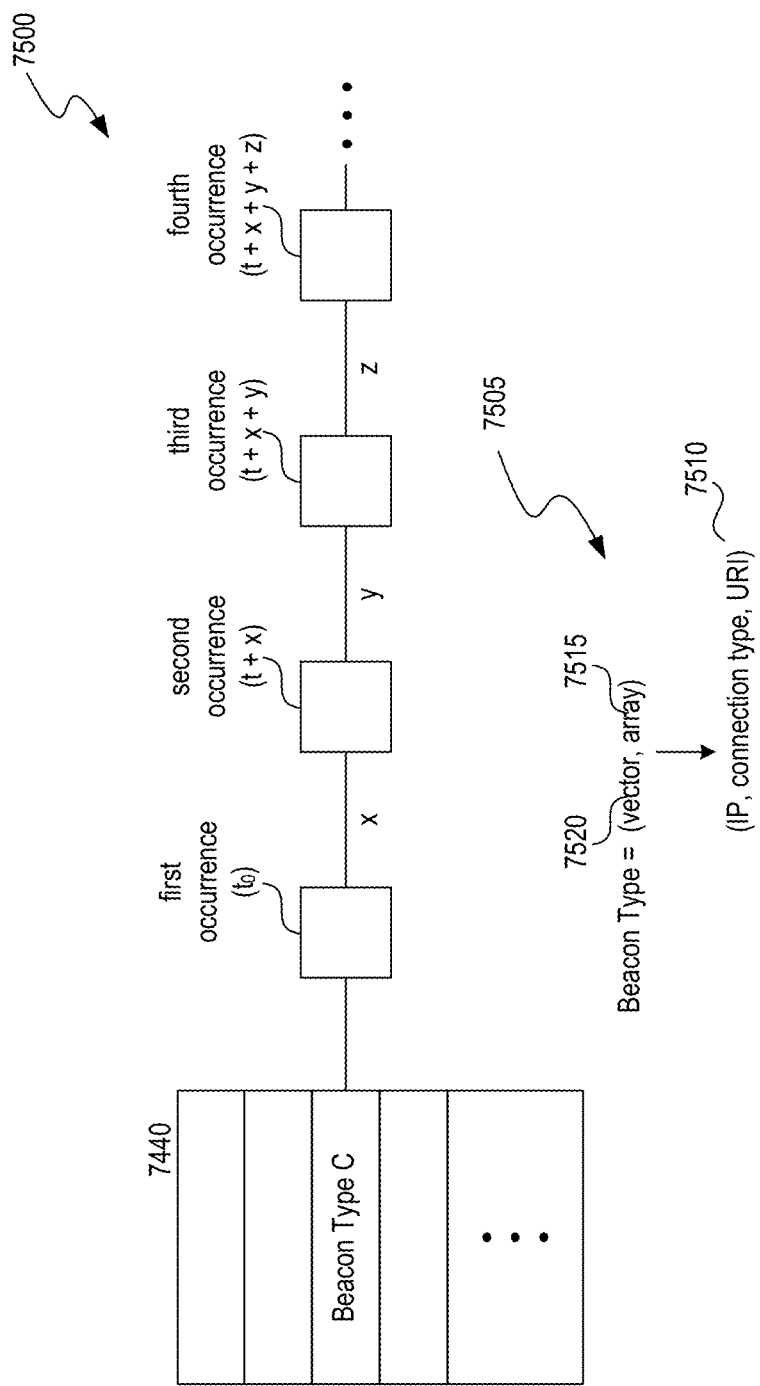
FIG. 75 is an example of a memory cache storing beacon types that are identified as likely to be anomalous.

FIG. 75 shows an example 7500 of a memory cache storing beacon types that are identified as likely to be anomalous, consistent with various embodiments. In some embodiments, a beacon type includes a group or a number of similar groups that are identified as likely to be anomalous. The anomaly detection module 7435 can store the beacon type in a memory cache 7440 associated with the system 7425. A beacon type 7505 can store beacon parameters 7510 such as destination IP address(es) of connection requests in a group, destination port(s), the type of connection request, e.g., HTTP GET or POST, a URI of the destination. The anomaly detection module 7440 stores the beacon parameters 7510 of a group as a vector 7520 and a timestamp, which indicates the time at which the group occurred in the outgoing traffic, in an array 7515 of the beacon type 7505. If multiple groups are stored in the beacon type 7505, then the beacon type 7505 can include multiple vectors, e.g., one for each corresponding group, and a timestamp entry for each of the groups in the array 7515.

In determining whether the group to which the beacon data 7470 corresponds is anomalous, the anomaly detection module 7435 compares the beacon data 7470 with the beacon types in the memory cache 7440 to determine if the beacon data 7445 matches with any of the beacon types in the memory cache 7440. If the beacon data 7445 matches with any of the beacon types, e.g., beacon type C, the anomaly detection module 7435 adds the beacon data 7445 to the beacon type C. The anomaly detection module 7435 determines if the group represents an anomaly as a function of a frequency of the occurrence of the groups in the beacon type C.

As described above, some of the machine-generated traffic 7445 can be benign and some anomalous, e.g., malicious. The anomaly detection module 7435 analyzes the group further to determine if the machine-generated traffic 7445 includes benign traffic or anomalous traffic. Typically, malware sends a beacon to its C&C regularly and in high frequency. That is, a gap or timing between the beacons is typically lesser than a specified threshold. Long gaps between the connection requests, e.g., timing exceeding the specified threshold, can usually be attributed to benign traffic, such as an application on a device checking with a server in the Internet for software updates, which can also send beacons regularly. However, the beacons for such software updates can be less frequent than the beacons of malware.

In the example 7500, the first occurrence of a group of beacon type C, is at time t, the second occurrence at time (t+x), the third occurrence at time (t+x+y), the fourth occurrence at time (t+x+y+z) and so on. The anomaly detection module 7435 determines the number of occurrences of the groups and timing between the occurrences of the group. If the frequency of the groups satisfy a periodicity criterion, e.g., if an average timing (average (x, y, z)) between the occurrences of the groups satisfies a specified timing threshold, and the groups occur at least a first threshold number of times, the anomaly detection module 7435 determines the group to which the beacon data 7470 corresponds and the other groups of the beacon type with which the beacon data 7470 matches as anomalous. When a group is recurring but not strictly periodic, e.g., the average timing (average (x, y, z)) does not satisfy the specified timing threshold, the anomaly detection module 7435 determines if the groups occurred at least a second threshold number of times in which the second threshold number is greater than the first threshold number. If the groups occurred at least a second threshold number of times, the anomaly detection module 7435 determines the groups as anomalous. If neither of the periodicity thresholds is satisfied, the group is determined as likely to be benign traffic.

After the anomaly detection module 7435 determines the groups to be anomalous, the anomaly detection module 7435 indicates those groups as an anomaly 7455 to the threat analysis module 7460, which can further analyze the anomaly 7455 to determine if it is a threat and raise an alarm, e.g., generate a notification, if it is one. The anomaly 7455 can include various information, e.g., information from the beacon data 7470 and/or information from the beacon type with which the beacon data 7470 matched. The anomaly detection module 7435 can also include additional data in the anomaly 7455 which can be used by the threat analysis module 7460 in determining if the anomaly 7455 is a threat.

Referring back to determining a matching beacon type in the memory cache 7440, the set of parameters that may be considered to determine a match can include at least one of destination IP address(es) of the connection requests, destination port(s), and if the connection request is a HTTP request, a type of the connection request, e.g., a GET or POST, and a URI of the destination. If a particular group matches with a beacon type, then the particular group and the groups stored in the beacon type can be considered to be similar groups. Various criteria can be defined to determine whether a group matches with a beacon type. For example, the beacon data 7470 is considered to match with a beacon type in the memory cache if all of the set of parameters of the beacon data matches with that of the beacon type. In another example, the beacon data 7470 is considered to match with the beacon type if at least one of the set of parameters of the beacon data matches with that of the beacon type. In another example, the beacon data 7470 is considered to match with the beacon type if at least a portion of one of the set of parameters, e.g., a portion of the destination IP address, of the beacon data matches with that of the beacon type.

Figure 76:
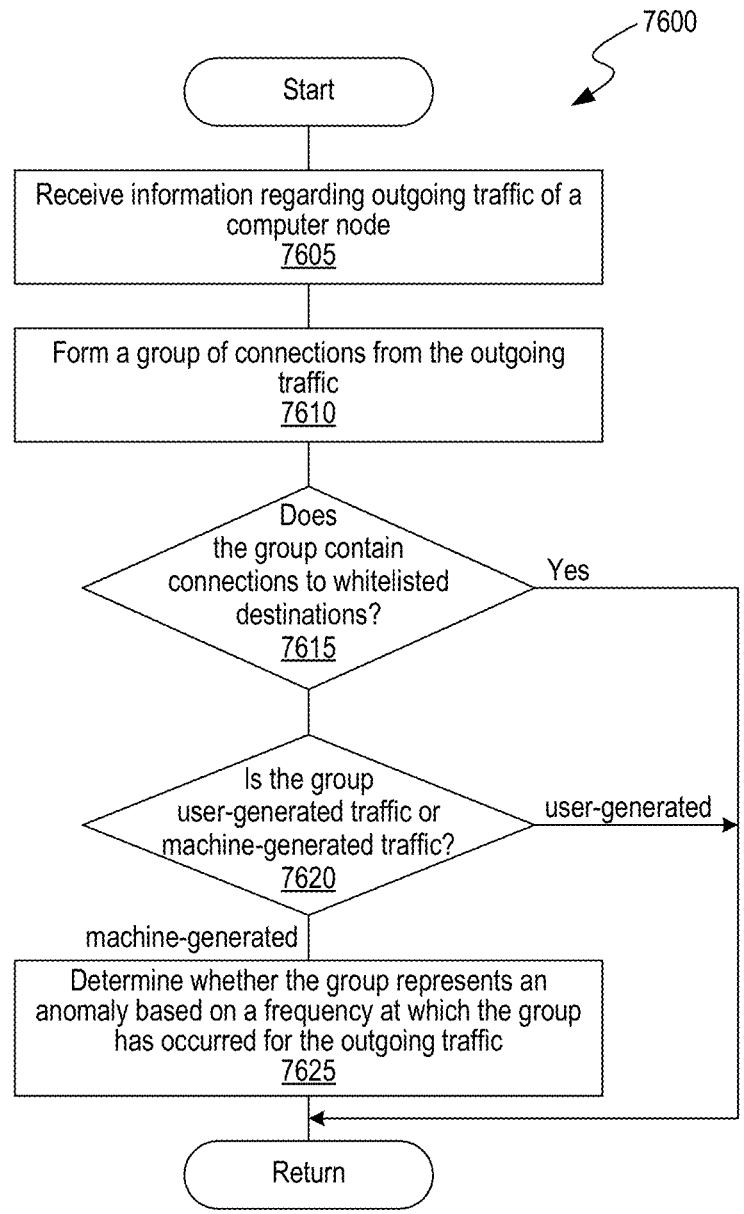
FIG. 76 is a flow diagram of a process for determining whether outgoing traffic from a device is anomalous.

FIG. 76 is a flow diagram of a process 7600 for determining whether outgoing traffic from a device is an anomalous traffic, consistent with various embodiments. In some embodiments, the process 7600 is implemented in the environment 7400 and using the system 7425. The process 7600 can be performed as part of a model in the real-time infrastructure 330 or batch infrastructure 382. At block 7605, the traffic classification module 7430 receives information regarding outgoing traffic of a device. For example, the traffic classification module 7430 receives outgoing traffic log 7450, which contains information regarding outgoing connection requests from device 7405. A connection request is a request for connecting to a particular computer/server in network 7465 and/or network 7410. The outgoing traffic can be web traffic, e.g., HTTP traffic, or IP traffic. Further, in some embodiments, the outgoing traffic does not include internal traffic, e.g., traffic between devices within the network 7465.

At block 7610, the traffic classification module 7430 analyzes the outgoing traffic to form a group of connection requests. The connection requests in the outgoing traffic can be grouped based on various criteria. In some embodiments, the connection requests are grouped based on a time at which the connection requests were generated at the device. For example, connection requests that are closer in time to each other within a predefined period are grouped together. Additional details with respect to forming the group are described at least with reference to FIG. 77.

At determination block 7615, the traffic classification module 7430 determines if the group contains connection requests to one or more destinations that are identified as acceptable destinations. The system 7425 can have access to a list of acceptable destinations, e.g., a whitelist. The destination information in the whitelist can include one or more of IP address of a destination, a URI of the destination or port of the destination.

If the connection requests are to whitelisted destinations, then the group is not monitored any further and the process 7600 returns. On the other hand, if the connection requests are to destinations that are not whitelisted, at determination block 7620, the traffic classification module 7430 analyzes the group to determine whether the group is user-generated traffic or machine-generated traffic. Examples of user-generated traffic can include traffic generated as a result of user activity, such as the user accessing a website, checking email and downloading applications. Examples of machine-generated traffic can include traffic generated by the device or an application executing on the device without intervention from the user, such as updates to applications, messages for synchronizing time of the device, device-to-device communication between devices in a distributed computing system, benign beacons, e.g., heartbeat signals generated by an application on the device, or beacons generated by malware.

In some embodiments, the traffic classification module makes the determination of whether the group is user-generated traffic or machine-generated traffic based on a set of parameters described at least with reference to FIG. 73. If the traffic classification module 7430 determines the group as user-generated traffic, then the group is not monitored any further and the process 7600 returns.

On the other hand, if the traffic classification module 7430 determines the group as machine-generated traffic, at block 7625, the anomaly detection module 7435 determines whether the group represents anomalous traffic. In some embodiments, the anomaly detection module 7435 makes the determination as a function of a frequency of occurrence of the group in the outgoing traffic, or as a frequency of occurrence of groups determined to be similar to the group. Additional details with respect to determining whether the machine-generated is anomalous are described at least with reference to FIG. 78.

Figure 77:
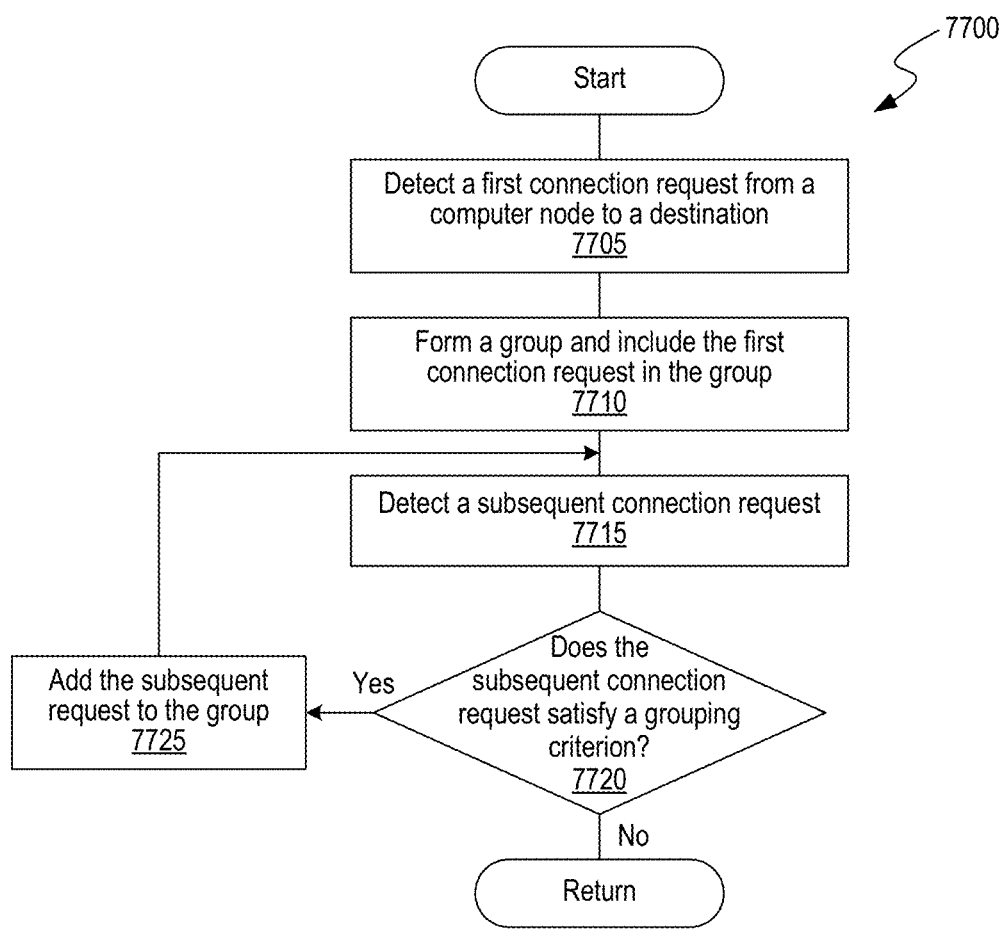
FIG. 77 is a flow diagram of a process for forming a group of connection requests from outgoing traffic of a device.

FIG. 77 is a flow diagram of a process 7700 for forming a group of connection requests from outgoing traffic of a device, consistent with various embodiments. The process 7700 may be implemented as part of block 7610 of process 7600. At block 7705, the traffic classification module 7430 monitors the outgoing traffic log 7450 to identify a first connection request from the device 7405. Upon identification of a first connection request, at block 7710, the traffic classification module forms a group and adds the first connection request to the group. The traffic classification module 7430 also records the time at which the first connection request was generated.

The traffic classification module 7430 continues to monitor the outgoing traffic log 7450 for subsequent connection requests from the device 7405. At block 7715, the traffic classification module 7430 detects a subsequent connection request in the outgoing traffic log 7450. At determination block 7720, the traffic classification module 7430 determines if the subsequent connection request satisfies a grouping criterion. The grouping criterion can be based on a period between the time at which the first connection is generated and that of the subsequent connection request. The traffic classification module can determine whether the subsequent request is received within a predefined period from the time the first connection request was received, e.g., within twenty seconds from the first connection request.

If the subsequent connection request satisfies the grouping criterion, at block 7725, the traffic classification module 7430 adds the subsequent connection request to the group, and the process continues monitoring for subsequent requests. On the other hand, if the subsequent connection request does not satisfy the grouping criterion, the process 7700 returns.

Figure 78:
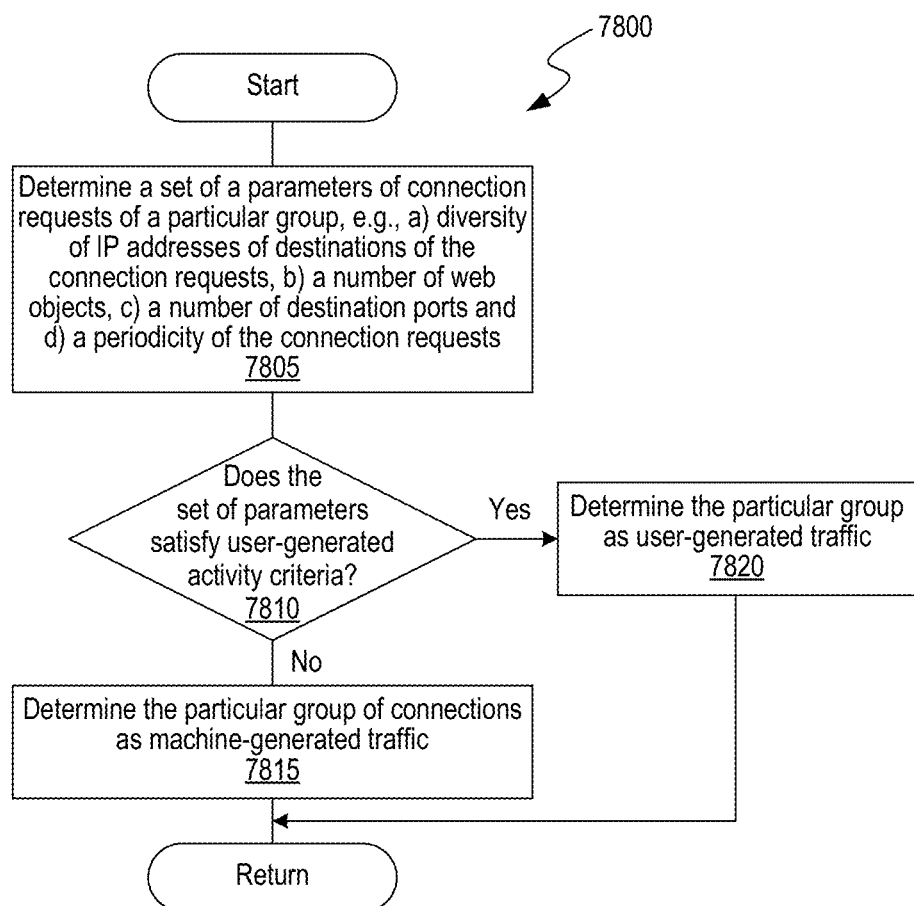
FIG. 78 is a flow diagram of a process for determining whether a particular group of connection requests in the outgoing traffic of a device is user-generated traffic or machine generated traffic.

FIG. 78 is a flow diagram of a process 7800 for determining whether a particular group of connection requests in the outgoing traffic of a device is user-generated traffic or machine generated traffic, consistent with various embodiments. In some embodiments, the process 7800 may be implemented as part of block 7620 of process 7600. At block 7805, the traffic classification module 7430 analyzes the connection requests to obtain a set of parameters for determining whether the particular group is user-generated traffic or machine-generated traffic. As described in FIG. 73, the set of parameters can include one or more of IP addresses of destinations of the connection requests in the particular group, (b) a number of web objects downloaded by the connection requests in the particular group, (c) a number of ports of the destinations, or (d) periodicity of the connection requests.

At determination block 7810, the traffic classification module 7430 determines if the set of parameters satisfies the user-generated activity criteria. For example, the traffic classification module 7430 determines that the group is user-generated traffic if the number of different IP addresses of the destinations, that is, a diversity of the IP addresses, exceeds a first specified threshold. In another example, the traffic classification module 7430 determines that the group is user-generated traffic if the number of web objects downloaded by the particular group exceeds a second specified threshold. In another example, the traffic classification module 7430 determines that the group is user-generated traffic if the number of ports exceeds a third specified threshold.

In some embodiments, the periodicity of the connection requests is determined as a function of the timing between the connection requests in the particular group. For example, the periodicity can be an average of the periods between each of the connection requests in the group. In some embodiments, the traffic classification module 7430 determines that the particular group is likely to be machine-generated traffic if the periodicity of the connection requests satisfies a periodicity criterion, e.g., exceeds a specified threshold; otherwise determines the particular group as likely to be user-generated traffic.

The user-generated activity criteria can be configured in various ways. In some embodiments, all of the set of parameters have to satisfy the criteria for determining that the group is user-generated activity. In some embodiments, one or more of the set of parameters have to satisfy the criteria for determining that the group is user-generated activity.

If the set of parameters satisfies the user-generated activity criteria, at block 7820, the traffic classification module 7430 determines that the particular group is user-generated activity; the traffic classification module 7430 stops analyzing the particular group further and the process 7800 returns. On the other hand, if the set of parameters does not satisfy the user-generated activity criteria, at block 7815, the traffic classification module determines that the particular group is machine-generated traffic.

Figure 79:
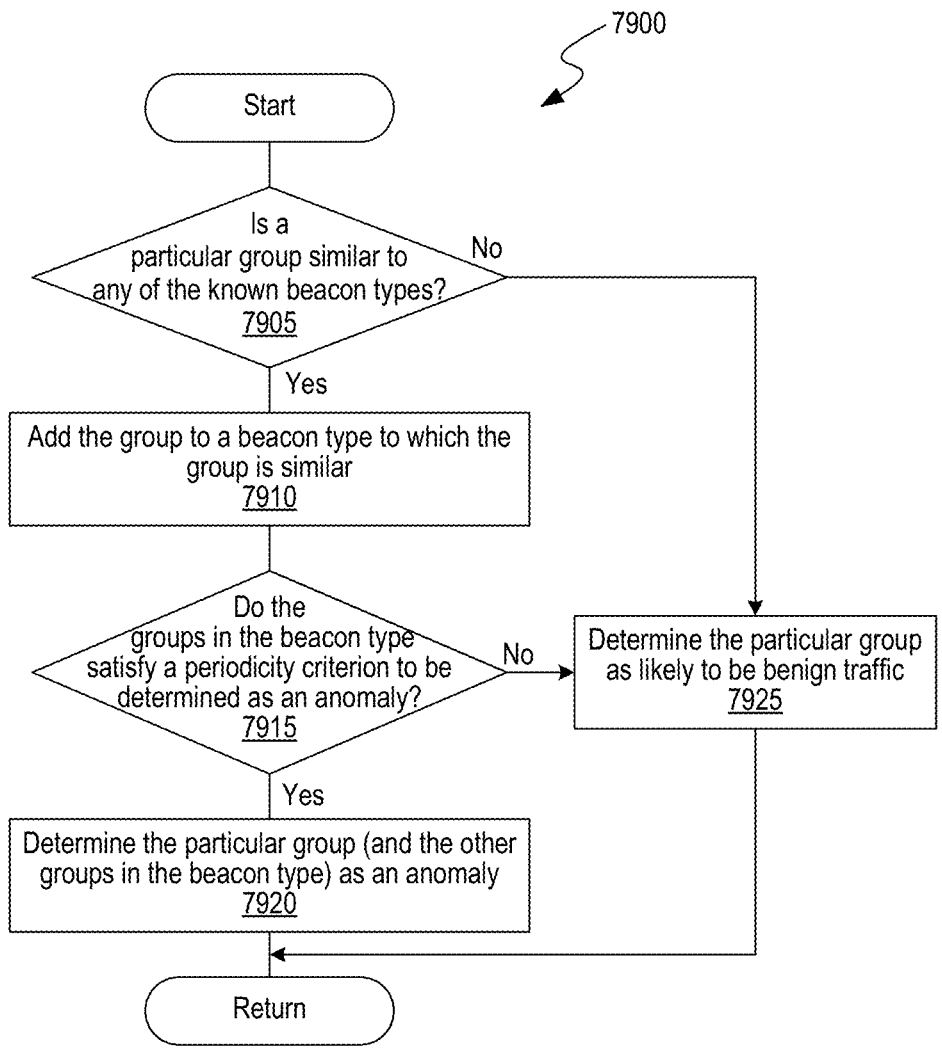

FIG. 79 is a flow diagram of a process 7900 for determining whether machine-generated traffic is anomalous, consistent with various embodiments. The process 7900 may be implemented as part of block 7625 of process 7600. The system 7425 analyzes a particular group of connection requests that is identified as machine-generated traffic, e.g., in process 7800, to determine whether the machine-generated traffic is benign or anomalous. At determination block 7905, the anomaly detection module 7435 compares the particular group with one or more beacon types, e.g., beacon types in memory cache 7440, that are identified as likely to be anomalous to determine if the particular group is similar to any of the beacon types. In some embodiments, the comparison is performed as described at least with reference to FIG. 75.

If the particular group is similar to any of the beacon types, e.g., beacon type "C", at block 7910, the anomaly detection module 7435 adds the particular group to the beacon type "C." If the particular group is not similar to any of the beacon types, at block 7925, the anomaly detection module determines that the particular group is likely to be benign traffic and the process 7900 returns.

At determination block 7915, the anomaly detection module 7435 determines if the groups in the beacon type satisfy a periodicity criterion. In some embodiments, a periodicity of the groups is determined as a function of the frequency at which the groups in the beacon type occurred in the outgoing traffic. For example, the periodicity can be an average of the periods between each of the groups in the beacon type.

In some embodiments, to determine the group as anomalous, the group may have to occur at least "X" times and periodically. When a group is recurring but not strictly periodic, the group may have to occur at least "Y" times, where "Y">"X" because a periodic behavior is a stronger indication of machine activity. Therefore, if a group is simply recurring, but not periodically enough, the group may have to occur more times before the anomaly detection module 7435 can determine it as anomalous. The groups can be considered to be periodic, if an average timing between the occurrences of the groups in the beacon type satisfies a specified timing threshold.

Accordingly, the periodicity criterion can state that if the groups in the beacon type are periodic, then groups have to occur a first threshold number of times else the groups have to occur a second threshold number of times for the groups in the beacon type to be considered as anomalous. Further, the periodicity criterion can require that the second threshold number to be greater than the first threshold number.

Referring back to determination block 7915, if the groups in the beacon type satisfy the periodicity criterion, at block 7920, the anomaly detection module 7435 determines that the groups in the beacon type are anomalous. If the groups in the beacon type do not satisfy the periodicity criterion, at block 7925, the anomaly detection module 7435 determines that the groups in the beacon type are likely to be benign traffic, and the process 7900 returns.

XVI. Rarity Analysis

Described herein is a technique for determining rarity of features of data traffic ("traffic") in a computer network. Determination of rarity can be used to detect anomalies represented in event data. The technique computes a rarity score for each of various values of a feature of event data, where each rarity score indicates how rare the occurrence of the corresponding particular value is relative to occurrences of other values of that feature, and then determines if network activity or an event in which that particular value of the feature occurs is anomalous, based on the rarity score.

Examples of features regarding which a rarity score can be computed in this manner include, for example: a field, attribute, and/or property of the data traffic on and/or an entity associated with the computer network, e.g., a username of a user, a source zone of the network from which the traffic is originating, a destination zone of the network to which the traffic is destined, the port identifier of a port through which data is transmitted, a name of an application that transmits and/or receives the data, and an identification (ID) of a device, such as an Internet Protocol (IP) address, that transmits and/or receives the data. The feature can be of high cardinality, i.e., can have one of a finite number of values. For example, a feature such as a port can have multiple values, e.g., 20, 22, 23, 25, 80, which are associated with specific network protocols. In the data traffic, a particular value of a feature may occur more commonly, e.g., more number of times, than another value of the feature. For example, in a computer network where most traffic into and/or out of the network is web traffic, port 80, which corresponds to Hyper Text Transfer Protocol (HTTP), may occur more commonly than other ports, e.g., port 23.

In some embodiments, the rarity determination technique determines the rarity of a particular value of a feature (such as one of the features mentioned above) as a function of the probability of occurrence of that particular value relative to the probability of occurrence of other values of the feature. In some embodiments, the technique considers the values that are as likely or less likely to occur than that particular value to determine the probability (also referred to as "relative probability") of occurrence of the particular value. After determining the probability of the particular value relative to the other values, the technique may compute a confidence interval of that probability to obtain the rarity score. In some embodiments, the rarity score is a value between 0 and 1. The technique can use known methods, such as the delta method, for computing the confidence interval.

If the rarity score for the particular value satisfies a rarity criterion, the technique can identify an activity or event in which the particular value occurred as anomalous. In some embodiments, the rarity score satisfies the rarity criterion if the rarity score is below a specified score threshold and the number of times that the particular value has been identified as corresponding to an anomaly is less than a specified count threshold.

The technique can also determine the rarity score for more than one feature, e.g., a feature pair, which indicates how rare it is to observe a first feature at a particular value when the second feature is observed at a first value. That is, the rarity score of a feature pair (X, Y) indicates how rare it is to observe "X=a" when "Y=p" and/or how rare it is to observe "Y=p" when "X=a." Consider an example in which data can be transmitted from one or more source devices to one or more destination devices. The data can be transmitted from a portion of the network identified as "Zone A" to a portion of the network identified as "Zone B," from "Zone C" to "Zone B," "Zone D to "Zone B," and/or "Zone A to "Zone D." The technique can determine how rare it is to observe a source zone being "Zone A" when the destination zone is "Zone B." Based on the rarity score of the feature pair, the technique can determine whether an event of which the feature pair is a part corresponds to an anomaly.

Figure 80:
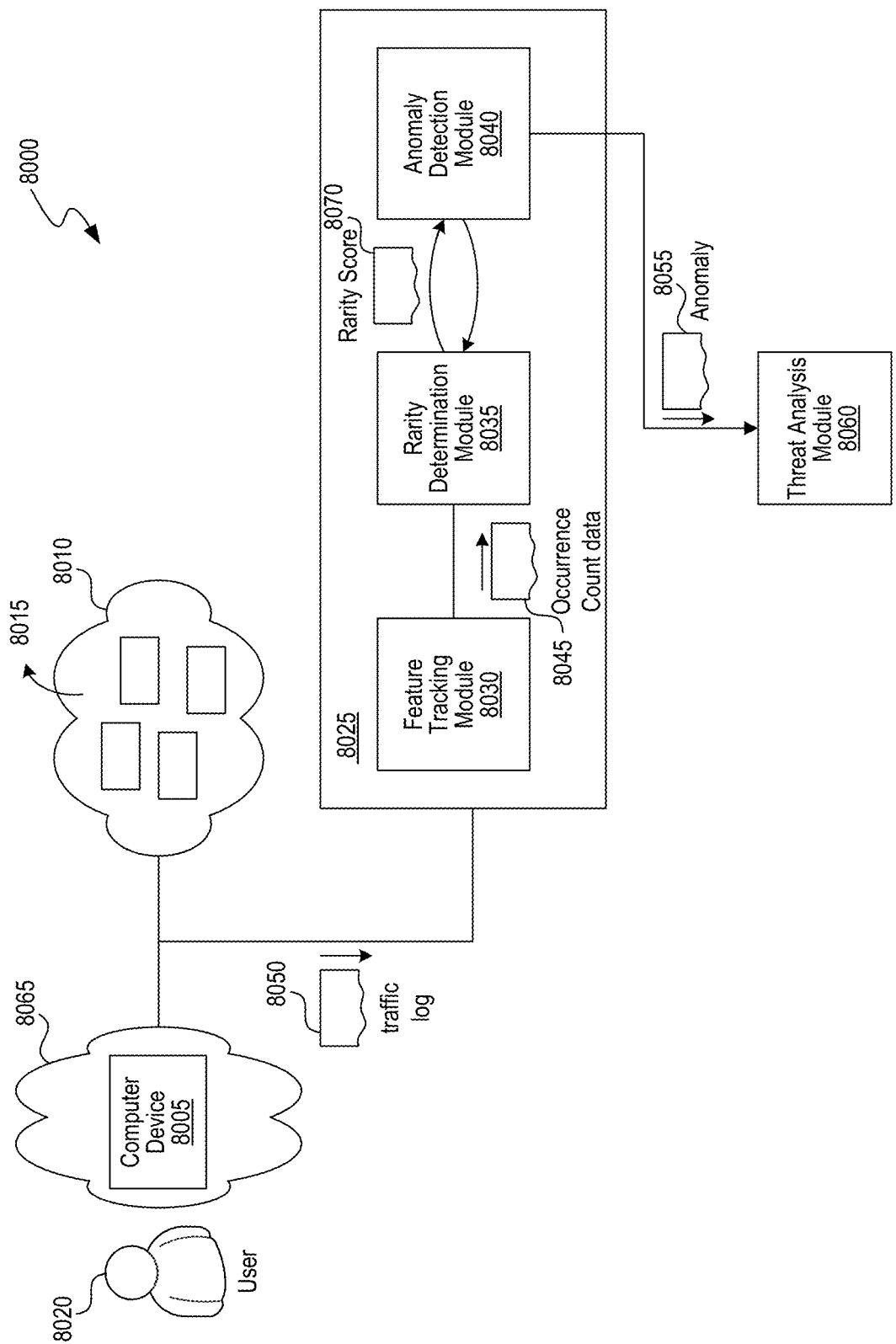

Turning now to the figures, FIG. 80 is a block diagram of an environment 8000 in which a system 8025 for detecting anomalies based on rarity scores of features can be implemented. In some embodiments, the system 8025 is implemented as part of the security platform 300 of FIG. 3. The system 8025 can be implemented as part of the real-time infrastructure 330 or batch processing infrastructure 382. Further, in some embodiments, at least a portion of the system 8025 is implemented as part of a machine learning model in the real-time infrastructure 330 or batch processing infrastructure 382. The environment 8000 includes a computer device ("device") 8005 whose data traffic is monitored for detection of anomalies and/or threats. The device 8005 can be part of a distributed computing system having a number of devices. For example, the device 8005 can be one of many devices in a computer network 8065 of an organization. The network 8065 can be a local area network (LAN), a wide area network (WAN), etc.

The traffic can include data transmitted by or received at the computer device 8005. The traffic from device 8005 can include traffic that is internal to the network 8065 ("internal traffic"), e.g., communications with devices in the network 8065, and traffic that is external to the network 8065 ("external traffic"), e.g., communications with servers 8015 in the network 8010 such as Internet. The network 8010 is external to the network 8065. In some embodiments, at least a portion of the traffic is generated due to activity of a user 8020 associated with the computer device 8005. The system 8025 monitors the traffic of the device 8005, e.g., using traffic log 8050, and detects any existence of anomalies and/or threats. The traffic log 8050 includes event data including multiple events representative of traffic into and/or out of the network 8065. The traffic log 8050 can be generated based on data obtained from a proxy, a gateway or a firewall associated with the network 8065.

The traffic can be any class of data traffic, e.g., web traffic or IP traffic. The web traffic can include an HTTP message, which can have parameters such as a destination IP address, a URI of the destination, a port number, a type of web request—GET or POST, etc. The IP traffic can have parameters such as a destination IP address and a port number.

A machine learning model that implements the rarity analysis technique described here can subscribe to one or more event views (described above), via the model registry. Through such event view(s), the model can access the appropriate features of the event data that includes or represents traffic log 8050, to enable the model to perform the rarity analysis. The semantic processor 316 (FIG. 3) can process the event data to remove, add or modify at least some of the information and generate the traffic log 8050 in a condition that is suitable for further processing by the system 8025 efficiently. For example, the semantic processor 316 can remove traffic that is between two devices which are identified as acceptable end points for message transmission, as such traffic is less likely or unlikely to be an anomaly.

Any event in the traffic log 8050 can include one or more features. To determine whether or not an event is anomalous, the system 8025 may analyze some or all of the features in the event. In some embodiments, the feature tracking module 8030 analyzes the traffic log 8050 to identify only the features that are needed for determining whether a particular event is anomalous. In some embodiments, a user, e.g., an administrator associated with the network 8065, can provide the list of features to be tracked for determining whether an event is anomalous. The list of features to be tracked may be provided in the definition of an event view.

The feature tracking module 8030 identifies the relevant features (i.e., features of interest) and the values of each relevant feature occurring in the traffic log 8050 and stores a count of the occurrences of each value of each relevant feature. For example, a feature such as the "port" field can occur multiple times in the traffic log 8050 some occurrences of which can have the same value, e.g., same port number, and other occurrences of which can have other values. For example, a first number of events in the traffic log 8050 can include port identifier of 80 and a second number of events can have different port identifiers, such as 20, 22, 23. Accordingly, the feature tracking module 8030 stores a count of the occurrences of values of a feature. Similarly, the feature tracking module 8030 stores a count of the occurrences of values of other features. The feature tracking module 8030 can store the count in a data structure that is convenient for easy and efficient storage and retrieval of the count data. The data structure can be stored in a storage system associated with the system 8025, e.g., persistence layer 368 of FIG. 3.

In some embodiments, the feature tracking module 8030 also tracks occurrences of a set of features in an event, e.g., a feature pair. As described above, the technique can also determine how rare it is to observe a first feature at a particular value when the second feature is observed at a first value. For example, the technique can determine, in data transmission between two entities, how rare it is to observe a source zone as "Zone A" when the destination zone is "Zone B". The feature tracking module 8030 can identify occurrences of such feature pairs and store a count of the occurrence of such feature pairs. The feature tracking module 8030 can store the count in a second data structure that is convenient and efficient for easy storage and retrieval of the count data of the feature pairs. The second data structure can be stored in a storage system associated with the system 8025, e.g., persistence layer 368 of FIG. 3.

The rarity determination module 8035 determines a rarity score of each particular value of each relevant feature, where the score is indicative of how rare it is to observe that particular value of the feature relative to other values of the feature. To do so, the rarity determination module 8035 first determines a probability of occurrence of the particular value as a function of probabilities of other values of the feature that are as likely or less likely to occur than the particular value. The probability of each of the possible values can be determined from the total observed number of occurrences of each value in the event data in relation to the total number of occurrences of all values for that feature. The rarity determination module 8035 can obtain count data 8045 of the feature, which includes counts of the numbers of occurrences of various values of the feature, from the feature tracking module 8030 or associated storage system.

After determining the probability of the particular value relative to the other values of the feature as described above, the rarity determination module 8035 computes a confidence interval of the probability to obtain a rarity score 8070. The rarity determination module 8035 can compute the confidence interval at an upper bound value, such as 95th percentile. In some embodiments, the rarity score is a value between 0 and 1. The rarity determination module 8035 can use any of various known methods, e.g., delta method, to compute the confidence interval. In some embodiments, computing the confidence interval is accomplished by using the delta method, which ensures that the rarity score 8070 is between 0 and 1.

As noted above, as one step in the rarity score computation, the rarity determination module 8035 identifies the set of values of the feature whose numbers of occurrences in the traffic log 8050 are less than or equal to the number of occurrences of the particular value in question. For the particular value, the rarity determination module 8035 determines the sum of the number of occurrences of that set of values and the particular value, which is denoted as "k". The rarity determination module 8035 determines the total number of occurrences of the feature, which is denoted as "n". The rarity determination module 8035 determines the rarity score 8070 of the particular value of the feature as a function of (k, n), e.g., as a confidence interval of the binomial (k, n).

The following is an example describing determining the rarity score for a geographic ("geo")-location feature, e.g., a location from where a connection request to the network 8065 is originating, where each value of the feature is a two-letter country identifier. Consider that the feature tracking module 8030 has tracked the following numbers of occurrences of various values (country identifiers) for the geo-location feature: "US: 100, UK: 30, IN: 20, RU: 3, CN: 2, JP: 1." For example, the events with value [US] for the geo location feature has occurred "100" times. The rarity determination module 8035 can compute the rarity of seeing the value [RU] as the sum of the probabilities of seeing (RU, CN, JP), where [CN] and [JP] in this example are values of the geo-location that have appeared as many or fewer times than [RU]. The sum of probabilities of (RU, CN, JP), which can indicate the relative probability of [RU], is used to determine the rarity score. The rarity determination module 8035 can determine the rarity score as a confidence interval for the binomial (k=6 and n=156), where k denotes the sum of occurrences of the particular value [RU] and occurrences of the values that have appeared as many or fewer times than [RU], and n denotes the total number of occurrences of the feature geo-location.

The rarity determination module 8035 can compute the rarity score as a 95% confidence interval. The rarity score of [RU] indicates how rare it is to observe the value [RU] relative to other values for the geo-location feature.

Similarly, the rarity determination module 8035 can also determine the rarity score 8070 for feature pairs. The rarity determination module 8035 can obtain the count data 8045 for the feature pair, determine the respective counts and then determine the rarity score 8070 for the feature pair. For example, the rarity determination module 8035 can determine a rarity score for observing a connection request for a given application, such as a virtual private network (VPN), from a geo location such as [RU]. The rarity determination module 8035 identifies a set of locations whose number of occurrences in the traffic log 8050 for the VPN connection request is less than or equal to the number of occurrences of the [RU] location. The rarity determination module 8035 determines a sum of the number of occurrences of the set of locations and the location [RU], which is denoted as "k". The rarity determination module 8035 determines a total number of occurrences of the feature pair with the application as VPN connection request, which is denoted as "n". The rarity determination module 8035 determines the rarity score 8070 of the particular value of the feature as a function of (k, n), e.g., as 95% confidence interval for the binomial (k, n).

Accordingly, the rarity determination module 8035 can determine the rarity score 8070 for a particular value of the feature, and/or for a feature pair.

The anomaly detection module 8040 determines whether an activity in which the particular value of the feature occurred is anomalous based on whether a rarity score criterion (e.g., one or more thresholds) is satisfied by the rarity score of the particular value. The rarity criterion can be a tuple of (score threshold, anomaly count threshold). The score threshold specifies a threshold for the rarity score and the anomaly count threshold specifies a threshold for the number of times a particular value can be identified as an anomaly 8055. In some embodiments, the anomaly detection module 8040 can determine that a particular value of the feature corresponds to an anomaly 8055 if the rarity score 8070 of that particular value is below the score threshold and the number of times that the particular value has been identified as an anomaly 8055 is below the anomaly count threshold.

If the number of times the particular value has been identified as an anomaly 8055 exceeds the anomaly count threshold, the anomaly detection module 8040 may not identify the particular value as anomaly. In some embodiments, if the particular value has occurred enough times, e.g., exceeds the anomaly count threshold, in a specified time interval, the anomaly detection module 8040 may determine that the particular value is no longer considered an anomaly and may, therefore, dynamically adjust the rarity criterion, e.g., the score threshold and/or the anomaly count threshold, to minimize and/or stop identifying the particular value as corresponding to an anomaly.

The anomaly detection module 8040 can similarly determine whether an activity in which a particular feature pair occurred is anomalous based on whether the particular feature pair satisfies a rarity criterion.

As described above, in some embodiments, an event in the traffic log 8050 can include a number of associated features. The anomaly detection module 8040 may in some cases have to determine whether one or more of the features and/or feature pairs in an event is anomalous to determine whether the event is anomalous.

FIG. 81 shows a table 8100 of example features and/or feature pairs to be considered for determining whether an example event is anomalous. The example event can be a "cloudtrail" event 8105, which is an event representative of application programming interface (API) calls for a web service. The cloudtrail event 8105 can include features such as: Event Class, which can be indicative of a class of the event; User Agent, which can be indicative of a name of the application; Device, which can be an identification of a device (e.g., IP address) contacting the web service, and User, which can be an identification of the user associated with the device (e.g., username of the user). The table 8100 indicates the features and the feature pairs that have to be analyzed to determine whether the event corresponds to an anomaly 8055.

For example, the table 8100 indicates that the features, Event Class and User Agent, and the feature pairs, (Event Class::Device), (Event Class::User), (User Agent::Device), and (User Agent::User) may have to be analyzed to determine whether the cloudtrail event 8105 is an anomaly 8055. That is, the anomaly detection module 8040 determines that the cloudtrail event 8105 corresponds to an anomaly if the above listed features and the feature pairs satisfy the rarity criterion.

In some embodiments, the rarity criterion for determining whether an event is anomalous can include additional parameters, such as a minimum number of features and/or feature pairs in the event to be anomalous, a list of features and/or feature pairs in the event to be anomalous.

FIG. 82 shows a table 8200 listing examples of thresholds and/or parameters of a rarity criterion, for various example events, that can be used for determining whether an event is anomalous. The thresholds in the table 8200 include a score threshold, a feature count threshold (which specifies the minimum number of features and/or feature pairs to be anomalous) and an anomaly count threshold. The parameters in the table 8200 can include rare features and/or rare feature pairs, which indicate the features and/or feature pairs, respectively, that have to be determined as anomalous to determine that the event itself is anomalous. The ignore feature indicates the features that when found to be anomalous, results in ignoring the event, that is, the event is not to be identified as an anomaly.

For example, for an event such as transmitting data to/from an application via a port, a score threshold is set to "0.001," a feature count threshold is set to "1" and the anomaly count threshold is set to "50." The rare features and rare feature pairs is set to null value. The ignore feature is set to null value.

It should be noted that one or more of the above thresholds are configurable, e.g., by a user, such as an administrator of the network 8065, or by the system 8025. For example, the system 8025 may dynamically adjust the score threshold to a lower value if a significant number of occurrences of the particular value is identified as an anomaly, e.g., in a predefined period. Further, one or more of the above parameters are also configurable, e.g., by the user.

The anomaly detection module 8040 determines that a particular value of a feature, a feature pair and/or an event is an anomaly 8055 if the particular value, the feature pair and/or the event satisfies the rarity criterion.

After the anomaly detection module 8040 determines the particular value, feature pair and/or event to be anomalous, the anomaly detection module 8040 indicates the particular value, feature pair and/or event as an anomaly 8055 to a threat analysis module 8060. The threat analysis module 8060 can further analyze the anomaly 8055 to determine if it is a threat and raise an alarm, e.g., generate a notification, if it is one. The anomaly 8055 can include various information, e.g., rarity score 8070 and/or information regarding various rarity criterion parameters, which can be used by the threat analysis module 8060 in determining if the anomaly 8055 is a threat.

Figure 83:
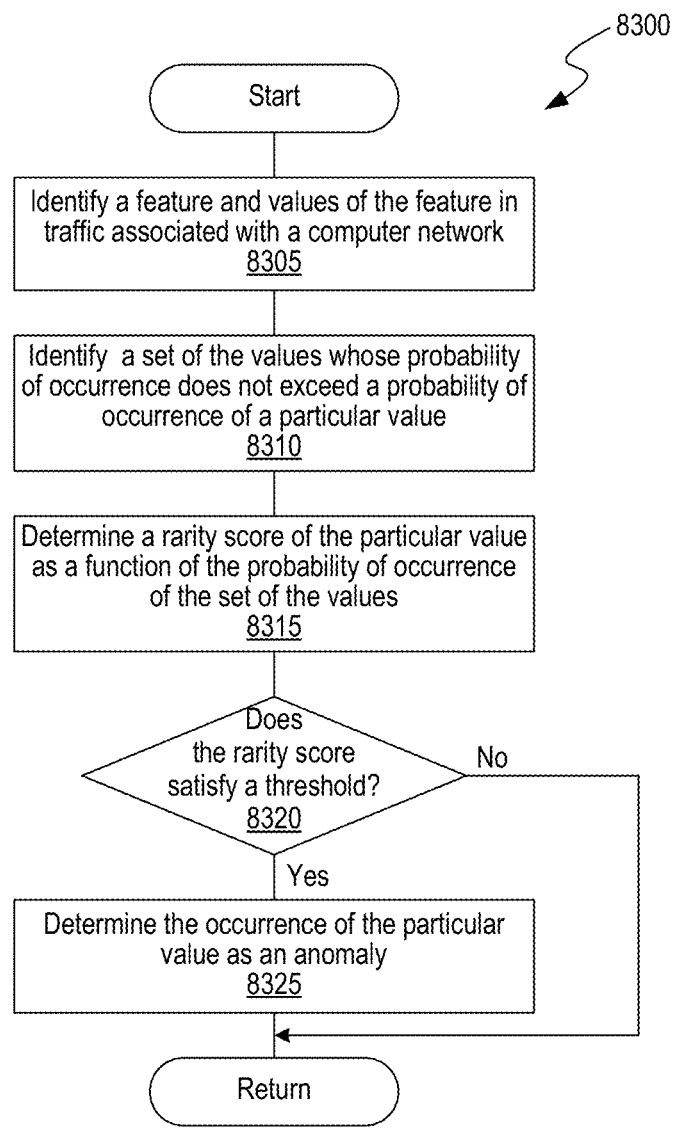

FIG. 83 is a flow diagram of a process 8300 for determining an anomaly based on a rarity score for a particular value of a feature, consistent with various embodiments. The process 8400 can be implemented in the environment 8000 and using the system 8025. The process 8300 can be performed as part of a model in the real-time infrastructure 330 or batch infrastructure 382. At block 8305, the feature tracking module 8030 identifies the occurrence of a feature and one or more values of the feature in the traffic of a network, such as network 8065. For example, for an event data in the traffic log 8059 representing a VPN connection request to a network 8065 from a user in a specific geo location, the geo location can be a feature and the various possible geo locations such as [US], [UK], [IN] or [RU] can be values of the feature. The process 8300 can facilitate determining whether the occurrence of a particular value of the feature is anomalous.

At block 8310, the feature tracking module 8030 identifies a set of values of the feature whose probability of occurrence does not exceed a probability of occurrence of the particular value. That is, the feature tracking module 8030 identifies the set of values that are as likely or less likely to occur in the traffic than the particular value of the feature.

At block 8315, the rarity determination module 8035 determines a rarity score for the particular value as a function of the probabilities of the occurrence of the set of values, in the manner described above. The rarity score can indicate a probability of occurrence of the particular value relative to the set of values, i.e., how rare is the occurrence of the particular value relative to the set of values.

At determination block 8320, the anomaly detection module 8040 determines whether the rarity score for the particular value of the feature satisfies a rarity criterion. If the anomaly detection module 8040 determines that the rarity score satisfies the rarity criterion, at block 8325, the anomaly detection module 8040 determines that an activity in the computer network associated with the particular value of the feature is anomalous. If the rarity score does not satisfy the rarity criterion, the process 8300 returns.

In determining whether the rarity score satisfies the rarity criterion, the anomaly detection module 8040 determines whether the one or more thresholds of and/or parameters of the rarity criterion are satisfied. For example, the anomaly detection module 8040 can determine a particular value of the feature as an anomaly if the rarity score for the particular value is below a score threshold and a number of times the particular value has been identified as an anomaly is below an anomaly count threshold of the rarity criterion.

Further, the process 8300 can also be used to determine whether an observed event of the traffic, which can include multiple features, is an anomaly based on a rarity score of the one or more features and/or feature pairs. The anomaly detection module 8040 can determine whether the event is anomalous by determining whether one or more parameters such as a rarity score of the one or more features of the event, a minimum number of features in the event that need to be anomalous, or a list of features that need to be anomalous satisfy the rarity criterion.

Figure 84:
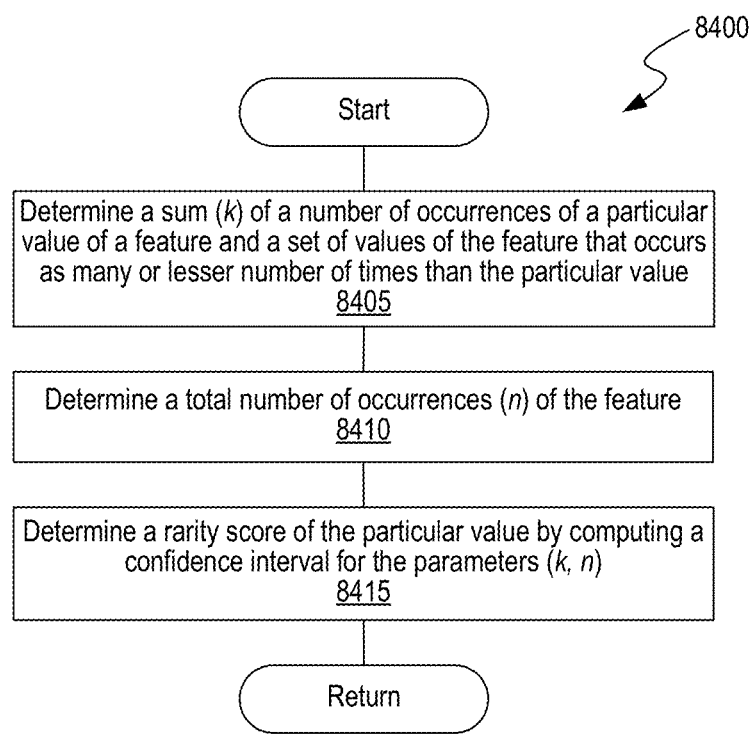

FIG. 84 is a flow diagram of a process 8400 for determining a rarity score for a particular value of a feature, consistent with various embodiments. The process 8400 can be implemented in the environment 8000 and using the system 8025. The process 8400 can also be performed as part of a model in the real-time infrastructure 330 or batch infrastructure 382. In some embodiments, the process 8400 can be performed as part of blocks 8310 and 8315 of process 8300. At block 8405, the feature tracking module 8030 identifies, from the traffic log 8050, a set of values of the feature that has occurred as many or fewer times than the particular value in the traffic. Consider that the feature tracking module 8030 has tracked the following occurrences of various values for a geo location feature: "US: 100, UK: 30, IN: 20, RU: 3, CN: 2, JP: 1." To determine a rarity score for the location "Russia," i.e., for value [RU], the feature tracking module 8030 determines the set of locations that have occurred as many or fewer times than [RU], which are "China," i.e., [CN] and "Japan," i.e., [JP]. The feature tracking module 8030 determines the sum of occurrences of the particular value [RU] and the set of values, [CN] and [JP], as (k=6).

At block 8410, the feature tracking module 8030 determines a total number of occurrences of the feature. Continuing with the above example, the feature tracking module 8030 determines the total number of occurrences of the geo location feature, which includes occurrences of all values of the feature, as (n=156).

At block 8415, the rarity determination module 8035 determines the rarity score for the particular value by computing a confidence interval for the parameters (k, n). In some embodiments, the rarity score is computed as an upper bound confidence interval, e.g., 95% confidence interval, of the parameters. The confidence interval method employed for computing the rarity score can be selected such that the rarity score is computed to a value between 0 and 1. In some embodiments, the rarity determination module 8035 employs a delta method for computing the confidence interval.

Continuing with the above example, the rarity determination module 8035 can determine the rarity score for [RU] as 95% th confidence interval of parameters (k=6 and n=156). The rarity score for [RU] indicates how rare it is to observe an occurrence of the geo location as [RU] relative to other locations.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Computer System Device Architecture

Figure 85:
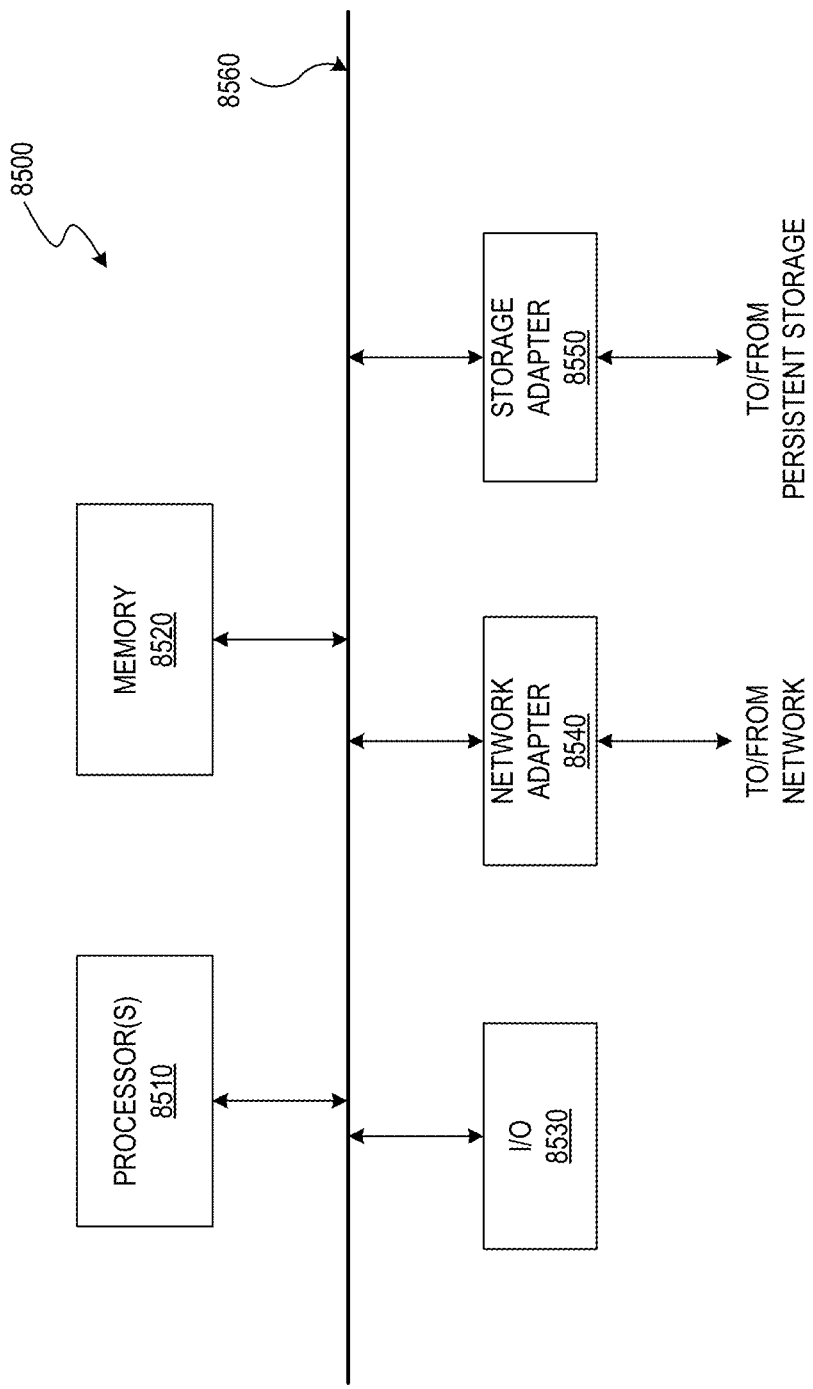

A security platform such as described above (e.g., security platform 300) can be implemented using one or more conventional physical processing devices. FIG. 85 is a block diagram showing an example of such a processing device, e.g., a computer system 8500. Multiple instances of such a computer system may be used to implement the security platform in a given embodiment.

In an illustrative embodiment, computer system 8500 includes one or more processor(s) 8510, memory 8520, one or more input/output (I/O) devices 8530, a network adapter 8540, and a storage adapter 8550, all interconnected by an interconnect 8560. Memory 8520 includes storage locations that are addressable by processor(s) 8510 and adapters 8540 and 8550 for storing software program code and data structures associated with the techniques introduced here. Memory 8520 may include multiple physically distinct memory devices, which may be all of the same type or of different types (e.g., volatile memory such as SRAM or DRAM, non-volatile memory such as flash, etc.). Processor(s) 8510 and adapters 8540 and 8550 may, in turn, include processing elements and/or logic circuitry configured to execute the software code and manipulate the data structures. It will be apparent to those skilled in the art that other processing and memory implementations, including various machine-readable storage media, may be used for storing and executing program instructions pertaining to the techniques introduced here.

Network adapter 8540 includes one or more ports to couple computer system 8500 with one or more other devices over one or more point-to-point links, local area networks (LANs), wide area networks (WANs), the global Internet, virtual private networks (VPNs) implemented over a public network, or the like. Network adapter 8540 can include the mechanical components and electrical circuitry needed to connect storage server 8500 to a network. One or more systems can communicate with other systems over the network by exchanging packets or frames of data according to pre-defined protocols, such as TCP/IP.

Storage adapter 8550 interfaces with an operating system running on processor(s) 8510 to access information on attached storage devices. The information may be stored on any type of attached array of writable storage media, such as hard disk drives, magnetic tape, optical disk, flash memory, solid-state drives, RAM, MEMs and/or any other similar media adapted to store information. Storage adapter 8550 includes a plurality of ports having I/O interface circuitry that couples with disks or other storage related devices over an I/O interconnect arrangement.

CONCLUSION

Embodiments of the techniques introduced here include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be implemented, at least in part, by a computer program product which may include a non-transitory machine-readable medium having stored thereon instructions that may be used to program/configure a computer or other electronic device to perform some or all of the operations described above. The machine-readable medium may include, for example, magnetic hard disk drives, compact disc read-only memories (CD-ROMs), magneto-optical disks, floppy disks, ROMs, RAMs, various forms of erasable programmable read-only memories (EPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

What is claimed is:

1. A method comprising:
   detecting, by a computer system, anomalies in activity on a computer network by processing, using a plurality of machine-learning anomaly models, received event data associated with the activity, each of the plurality of machine-learning anomaly models configured to detect a different one of a plurality of categories of anomalous activity on the computer network, wherein the event data processed using the plurality of machine-learning anomaly modes comprises feature sets of event data;
   prior to processing the feature sets of event data using the plurality of machine-learning anomaly models,
      receiving raw event data from a plurality of data sources; and
      processing the raw event data through an extract-transform-load (ETL) process to produce the feature sets of event data;
   wherein the detecting of the anomalies is performed in real time as the raw event data are received by the ETL process;
   generating, by the computer system, anomaly data indicative of the anomalies in response to said detecting; and
   identifying, by the computer system, a security threat to the computer network by processing, using a security threat model, the anomaly data, the security threat model configured to analyze relationships between anomalies detected across the computer network.

2. The method of claim 1, wherein processing the anomaly data includes one or more of: aggregating the anomaly data, correlating the anomaly data, or enhancing the anomaly data.

3. The method of claim 1, wherein processing the anomaly data includes:
   determining a measure of anomalies associated with a particular entity of the computer network over a time period, the particular entity including a user or a device; and
   determining that the measure of anomalies associated with the particular entity satisfies a specified criterion;
   wherein the security threat is identified in response to determining that the measure of anomalies associated with the particular entity satisfies the specified criterion.

4. The method of claim 1, wherein processing the anomaly data includes:
   determining a measure of entities of the computer network associated with a particular category of anomaly over a time period, the entities including users and/or devices; and
   determining that the measure of entities associated with the particular category of anomaly satisfies a specified criterion;
   wherein the security threat is identified in response to determining that the measure of entities associated with the particular category of anomaly satisfies the specified criterion.

5. The method of claim 1, wherein processing the anomaly data includes:
   monitoring a duration of a particular anomaly over a time period; and
   determining that the duration of the particular anomaly satisfies a specified criterion;
   wherein the security threat is identified in response to determining that the duration of the particular anomaly satisfies the specified criterion.

6. The method of claim 1, wherein processing the anomaly data includes:
   determining a measure of anomalies that have substantially matching profiles over a time period, the profiles based on the underlying event data associated with each anomaly; and
   determining that the measure of anomalies that have substantially matching profiles over the time period satisfies a specified criterion;
   wherein the security threat is identified in response to determining that the measure of anomalies that have substantially matching profiles over the time period satisfies the specified criterion.

7. The method of claim 1, wherein identifying the security threat includes detecting that a pattern of detected anomalies satisfies both a local rarity criterion and a global rarity criterion.

8. The method of claim 1, wherein processing the anomaly data includes:
   performing a global rarity analysis across a subset of the anomaly data over a time period, each of the detected anomalies associated with the subset of the anomaly data having been detected using a local rarity analysis; and
   determining that a pattern in the detected anomalies satisfies a global rarity criterion;
   wherein the security threat is identified in response to determining that the pattern in the detected anomalies satisfies the global rarity criterion.

9. The method of claim 1, wherein identifying the security threat includes detecting that a combination of different types of anomalies satisfies a specified scoring criterion.

10. The method of claim 1, wherein processing the anomaly data includes:
    combining anomaly data associated with different types of anomalies;
    assigning a threat indicator score based on a result of the combining; and
    determining that the threat indicator score satisfies a specified scoring criterion;
    wherein the security threat is identified in response to determining that the threat indicator score satisfies the specified scoring criterion.

11. The method of claim 1, wherein processing the anomaly data includes:
    inputting anomaly data associated with a detected first type of anomaly into a model configured to detect a second type of anomaly, the second type of anomaly different than the first type of anomaly; and
    detecting the second type of anomaly in response to inputting the anomaly data associated with the detected first type of anomaly into the model;
    wherein the security threat is identified in response to detecting the second type of anomaly.

12. The method of claim 1, wherein said processing the anomaly data includes:
    identifying a particular entity associated with the anomaly data;

comparing the particular entity against data stored in an external database of known security risks; and determining that the particular entity substantially matches a known security risk from the database based on the comparing;

wherein the security threat is identified in response to determining that the particular entity substantially matches the known security risk.

13. The method of claim 1, wherein processing the anomaly data includes:

annotating the anomaly data with data from an external database of known security risks.

14. The method of claim 1, wherein processing the anomaly data includes:

identifying an anomaly associated with a connection to a domain considered to be unfamiliar; and determining that the domain considered to be unfamiliar substantially matches a domain known to be a security risk;

wherein the security threat is identified in response to determining that the domain considered to be unfamiliar substantially matches the domain known to be a security risk.

15. The method of claim 1, wherein processing the anomaly data includes:

identifying an anomaly associated with a beacon type; and determining that the beacon type substantially matches a beacon type known to be a security risk;

wherein the security threat is identified in response to determining that beacon type substantially matches the beacon type known to be a security risk.

16. The method of claim 1, wherein detecting anomalies in activity on the computer network includes:

assigning an anomaly score based on the processing of the event data using a particular machine-learning model of the plurality of machine-learning models;

determining that the anomaly score satisfies a specified scoring criterion; and outputting an indication of a particular anomaly in response to determining that the anomaly score satisfies the specified scoring criterion.

17. The method of claim 1, wherein processing the anomaly data incudes:

assigning a threat indicator score based on the processing of the anomaly data;

determining that the threat indicator score satisfies a specified scoring criterion; and outputting an indication of the security threat in response to determining that threat indicator score satisfies the specified scoring criterion.

18. The method of claim 1, wherein said processing the anomaly data includes:

correlating a subset of the anomaly data against a plurality of pre-defined security scenarios;

generating a set of candidate security threats based on the correlation; and for each of the candidate threats:

comparing the subset of the anomaly data against pre-configured patterns associated with the candidate threat;

generating a pattern matching score based on a result of the comparing;

determining that the pattern matching score satisfies a specified scoring criterion;

wherein the security threat is identified in response to determining that the pattern matching score satisfies the specified scoring criterion.

19. The method of claim 1, further comprising:

outputting, via a user interface, an indication of the identified security threat to a user; and providing an alert to the user, via the user interface, in response to identifying the security threat.

20. The method of claim 1, further comprising:

outputting, via the user interface, a summary of key anomalies from a set of detected anomalies across the computer network.

21. The method of claim 1, further comprising:

generating a security threat score associated with the identified security threat, the security threat score indicative of a level of confidence that the identified security threat is an actual security threat to the computer network.

22. The method of claim 1, further comprising:

incorporating the anomaly data into a network security graph, the network security graph including:

a plurality of vertices representing entities associated with the computer network, the entities including users and/or devices; and a plurality of edges, each of the plurality of edges linking two of the plurality of vertices and representing an association between the entities represented by the vertices;

wherein each anomaly defined in the anomaly data is incorporated as a vertex linked to one or more of the entities by one or more edges.

23. The method as recited in claim 1, further comprising:

receiving the event data from a plurality of data sources;

wherein the detecting of the anomalies is performed in real time as the event data are received from the plurality of data sources.

24. The method of claim 1, further comprising:

receiving the event data from a plurality of data sources; and storing the event data using a distributed file system;

wherein the detecting of the anomalies is performed in a batch processing mode based on the stored event data.

25. The method of claim 1, wherein the event data includes timestamped machine data.

26. The method of claim 1, wherein the processing of event data is performed using a first processing engine running Apache Storm in a distributed computing cluster and wherein the processing of anomaly data is performed using a second processing engine running Apache Spark in the distributed computing cluster.

27. The method of claim 1, wherein the plurality of categories of anomalous activity include any of lateral movement, communication by blacklisted entities, malware communications, rare events, or beacon activity.

28. A system comprising:

a processor; and a memory unit having instructions stored thereon, which when executed by the processor cause the system to:

detect anomalies in activity on a computer network by processing, using a plurality of machine-learning anomaly models, received event data associated with the activity, each of the plurality of machine-learning anomaly models configured to detect a different one of a plurality of categories of anomalous activity on the computer network, wherein the event data processed using the plurality of machine-learning anomaly modes comprises feature sets of event data;

prior to processing the feature sets of event data using the plurality of machine-learning anomaly models, receive raw event data from a plurality of data sources; and process the raw event data through an extract-transform-load (ETL) process to produce the feature sets of event data;

wherein detection of the anomalies is performed in real time as the raw event data are received by the ETL process;

generate anomaly data indicative of the anomalies in response to said detecting; and identify a security threat to the computer network by processing, using a security threat model, the anomaly data, the security threat model configured to analyze relationships between anomalies detected across the computer network.

29. A non-transient computer readable medium containing instructions, execution of which by a computer system cause the computer system to:

detect anomalies in activity on a computer network by processing, using a plurality of machine-learning anomaly models, received event data associated with the activity, each of the plurality of machine-learning anomaly models configured to detect a different one of a plurality of categories of anomalous activity on the computer network, wherein the event data processed using the plurality of machine-learning anomaly modes comprises feature sets of event data;

prior to processing the feature sets of event data using the plurality of machine-learning anomaly models, receive raw event data from a plurality of data sources; and process the raw event data through an extract-transform-load (ETL) process to produce the feature sets of event data;

wherein detection of the anomalies is performed in real time as the raw event data are received by the ETL process;

generate anomaly data indicative of the anomalies in response to said detecting; and identify a security threat to the computer network by processing, using a security threat model, the anomaly data using, the security threat model configured to analyze relationships between anomalies detected across the computer network.

* * * * *